United States Patent [19]
Chamoff et al.
[11] Patent Number: 4,468,750
[45] Date of Patent: Aug. 28, 1984

[54] CLUSTERED TERMINALS WITH WRITABLE MICROCODE MEMORIES & REMOVABLE MEDIA FOR APPLICATIONS CODE & TRANSACTIONS DATA

[75] Inventors: Martin E. Chamoff; Don W. Piller, both of Austin, Tex.
[73] Assignee: International Business Machines Corporation, Armonk, N.Y.

[21] Appl. No.: 109,700
[22] Filed: Jan. 4, 1980
[51] Int. Cl.[3] ........................ G06F 15/16; G06F 15/21
[52] U.S. Cl. .................................... 364/900; 364/405; 364/401
[58] Field of Search ... 364/900 MS File, 200 MS File, 364/402, 403, 404, 405, 401; 235/379, 381; 340/147 P

[56] References Cited

U.S. PATENT DOCUMENTS

| | | | |
|---|---|---|---|
| 3,626,382 | 12/1971 | Pedersen | 364/900 |
| 3,631,403 | 12/1971 | Asbo et al. | 364/200 |
| 3,653,001 | 3/1972 | Ninke | 364/200 |
| 3,686,637 | 8/1972 | Zachar et al. | 364/200 |
| 3,862,716 | 1/1975 | Black et al. | 235/381 |
| 3,899,776 | 8/1975 | Sicko et al. | 364/900 |
| 3,916,386 | 10/1975 | Teixeira et al. | 364/900 |
| 3,937,925 | 2/1976 | Boothroyd | 235/379 |
| 3,943,493 | 3/1976 | Shelton | 364/200 |
| 3,956,615 | 5/1976 | Anderson et al. | 235/381 |
| 3,983,577 | 9/1976 | Ito et al. | 364/900 |
| 4,051,326 | 9/1977 | Badagnani et al. | 364/900 |
| 4,068,213 | 1/1978 | Nakamura et al. | 235/381 |
| 4,101,959 | 7/1978 | Domike et al. | 364/200 |
| 4,126,898 | 11/1978 | Spangler et al. | 364/900 |
| 4,134,537 | 1/1979 | Glaser et al. | 235/379 |
| 4,138,718 | 2/1979 | Toke et al. | 364/200 |
| 4,166,945 | 9/1979 | Inoyama et al. | 235/379 |
| 4,186,438 | 1/1980 | Benson et al. | 364/200 |
| 4,220,991 | 9/1980 | Hamano et al. | 364/405 |
| 4,249,163 | 2/1981 | Maurer et al. | 235/381 |
| 4,266,271 | 5/1981 | Chamoff et al. | 364/200 |
| 4,328,544 | 5/1982 | Baldwin et al. | 364/405 |

OTHER PUBLICATIONS

IBM Technical Disclosure Bulletin, vol. 21, No. 10 (Mar. 1979), Staging of Point-of-Sale Transactions, K. A. Gabbert et al., pp. 4202-4204.

*Primary Examiner*—James D. Thomas
*Assistant Examiner*—Archie E. Williams, Jr.
*Attorney, Agent, or Firm*—J. Michael Anglin

[57] ABSTRACT

A clustered system of data-entry terminals includes a plurality of physically separate data-entry terminals coupled to a communications link in a cluster. Each of the terminals includes a programmable digital processor for transferring data and programs over the communications link. Each of the terminals further includes entry devices and display devices for communicating information between an operator and the programmable processor.

6 Claims, 42 Drawing Figures

SATELLITE TERMINAL

| | | | | | | | | |
|---|---|---|---|---|---|---|---|---|
| 0 | 1 | 1 | 0 | 0 | UC | SE | DE | UE |
| 1 | COMMAND BYTE 0 | | | | | | | |
| 2 | COMMAND BYTE 1 | | | | | | | |
| 3<br>4 | DATA ADDRESS | | | | | | | |
| 5 | ERROR CODE | | | | | | | |
| 6 | | | | | | BUSY TIME OUT | LINE ACTIVE | NO RESPONSE |
| 7 | | | | LINE ADDR 01, 10, 11 | | STATION ADDRESS 000-110 (111=POT) | | |
| 8 | BUSY | LINE PARITY ERROR | | | EXCEPTION STATUS | | | EVEN/ODD RESPONSE LEVEL |
| 9 | QUEUE 0 | QUEUE 1 | QUEUE 2 | QUEUE 3 | QUEUE 4 | QUEUE 5 | QUEUE 6 | QUEUE 7 |
| A | QUEUE ID 000 - 111 | | | | | | | |
| B<br>C | MAX BYTE COUNT | | | | | | | |
| D<br>E | RECEIVED BYTE COUNT | | | | | | | |

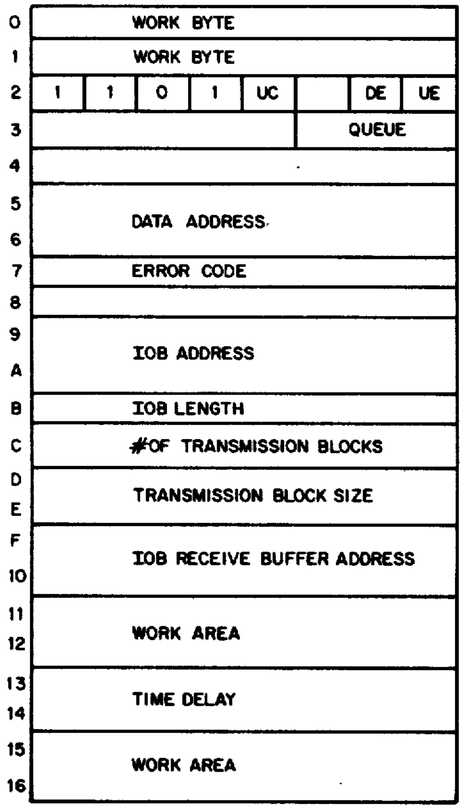

FIG. 30

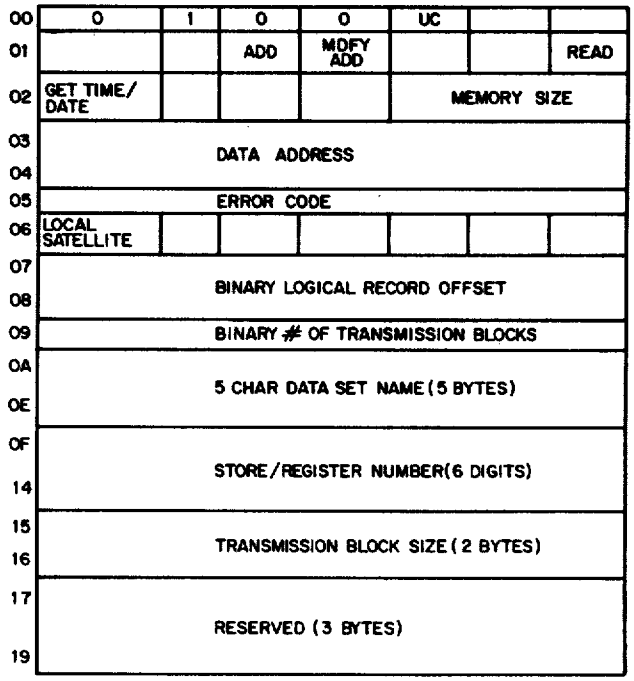

FIG. 31

| | | | | | | | |
|---|---|---|---|---|---|---|---|
| 0 | WORK BYTE | | | | | | |
| 1 | WORK BYTE | | | | | | |
| 2 | 1 | 1 | 0 | 1 | UC | | DE | UE |
| 3 | | | | | QUEUE | | | |
| 4 | | | | | | | | |
| 5 | DATA ADDRESS | | | | | | |
| 6 | | | | | | | |
| 7 | ERROR CODE | | | | | | |
| 8 | | | | | | | |
| 9 | IOB ADDRESS | | | | | | |
| A | | | | | | | |
| B | IOB LENGTH | | | | | | |
| C | # OF TRANSMISSION BLOCKS | | | | | | |
| D | TRANSMISSION BLOCK SIZE | | | | | | |
| E | | | | | | | |
| F | IOB RECEIVE BUFFER ADDRESS | | | | | | |
| 10 | | | | | | | |
| 11 | WORK AREA | | | | | | |
| 12 | | | | | | | |
| 13 | TIME DELAY | | | | | | |
| 14 | | | | | | | |
| 15 | WORK AREA | | | | | | |
| 16 | | | | | | | |

| | | | | | | |
|---|---|---|---|---|---|---|
| 00 | 0 | 1 | 0 | 0 | UC | | |
| 01 | | ADD | MDFY ADD | | | READ |
| 02 | GET TIME/ DATE | | | MEMORY SIZE | | |
| 03 | DATA ADDRESS | | | | | |
| 04 | | | | | | |
| 05 | ERROR CODE | | | | | |
| 06 | LOCAL SATELLITE | | | | | |
| 07 | BINARY LOGICAL RECORD OFFSET | | | | | |
| 08 | | | | | | |
| 09 | BINARY # OF TRANSMISSION BLOCKS | | | | | |
| 0A | 5 CHAR DATA SET NAME (5 BYTES) | | | | | |
| 0E | | | | | | |
| 0F | STORE/REGISTER NUMBER (6 DIGITS) | | | | | |
| 14 | | | | | | |
| 15 | TRANSMISSION BLOCK SIZE (2 BYTES) | | | | | |
| 16 | | | | | | |
| 17 | RESERVED (3 BYTES) | | | | | |
| 19 | | | | | | |

| | | | | | | | | |
|---|---|---|---|---|---|---|---|---|
| 00 | 1 | 1 | 1 | 0 | UC | | | |
| 01 | | INHIBIT DISK RESET | CANCEL | | | WRITE | READ | SYNC |
| 02 | | INHIBIT CS | | | | | MEDIA CLUSTER RESTART | H FORMAT |
| 03<br>04 | DATA ADDRESS | | | | | | | |
| 05 | ERROR CODE | | | | | | | |
| 06 | | MEDIA 2D | | | | | DISK IN | |
| 07<br>08 | WORK AREA ADDRESS | | | | | | | |
| 09<br>0A | BINARY LOGICAL RECORD OFFSET | | | | | | | |
| 0B | BINARY # OF LOGICAL RECORDS | | | | | | | |
| 0C<br>10 | 5 CHARACTER DATA SET NAME OR BINARY BOE (5 BYTES) | | | | | | | |
| 11<br>13 | BINARY EOD (3 BYTES) | | | | | | | |
| 14<br>16 | BINARY EOE (3 BYTES) | | | | | | | |
| 17<br>19 | DISK ERROR LOCATION (CCHHRR) | | | | | | | |

FIG. 32

| | | | | | | | | |
|---|---|---|---|---|---|---|---|---|
| 0 | 0 | 0 | 0 | 1 | UC | | DE | UE |
| 1 | ALARM | UPDATE DISPLAY 1 | UPDATE DISPLAY 2 | FLASH DISPLAY | UPDATE PROMT | READ HARD CTR | WRITE HARD CTR | UPDATE TIME |
| 2 | BUFFER RESET | SINGLE KEY MODE | | ENABLE KYBD | ENABLE HALF-PENCE | ENABLE DEC PT | INHIBIT DISPLAY | |
| 3<br>4 | DATA ADDRESS | | | | | | | |
| | ERROR CODE | | | | | | | |
| 6 | | | | HALF PENCE | | SEC LOCK STATUS | | |
| 7 | MACHINE MODEL | | | | MEMORY SIZE | | | |
| 8 | HARD CTR | WAND | | | | | | |
| 9 | DRUM PROMPT POSITION | | | | | | | |
| A | DECIMAL POINT POSITION | | | | | | | |
| B | AMT DUE | SUB TOTAL | CHANGE | REFUND | COMMU-NICATE | | | |
| C | 1 | 1 | 1 | 1 | TIME (HOURS) | | | |
| D | 1 | 1 | 1 | 1 | TIME (HOURS) | | | |
| E | 1 | 1 | 1 | 1 | TIME (MIN) | | | |
| F | 1 | 1 | 1 | 1 | TIME (MIN) | | | |

FIG. 33

| | | | | | | | | |
|---|---|---|---|---|---|---|---|---|
| 0 | 0 | 0 | 0 | 1 | UC | | DE | UE |
| 1 | ALARM | UPDATE DISPLAY 1 | UPDATE DISPLAY 2 | FLASH DISPLAY | UPDATE PROMPT | | | UPDATE TIME |
| 2 | BUFFER RESET | SINGLE KEY MODE | | ENABLE KYBD | HALF PENCE DISPLAY | ENABLE DEC PT | INHIBIT DISPLAY | |
| 3 | DATA ADDRESS | | | | | | | |
| 4 | | | | | | | | |
| | ERROR CODE | | | | | | | |
| 6 | | | | HALF PENCE | | SEC LOCK STATUS | REPETI-TIVE ALARM | WAIT FOR ACTION CODE KEY |
| 7 | MACHINE MODEL | | | | MEMORY SIZE | | | |
| 8 | | WAND | | | | | | |
| 9 | DRUM PROMPT POSITION | | | | | | | |
| A | DECIMAL POINT POSITION | | | | | | | |
| B | AMT DUE | SUB TOTAL | CHANGE | REFUND | COMMU-NICATE | | | |
| C | 1 | 1 | 1 | 1 | TIME (HOURS) | | | |
| D | 1 | 1 | 1 | 1 | TIME (HOURS) | | | |
| E | 1 | 1 | 1 | 1 | TIME (MIN) | | | |
| F | 1 | 1 | 1 | 1 | TIME (MIN) | | | |

FIG. 34

| | | | | | | | | |
|---|---|---|---|---|---|---|---|---|
| 0 | 0 | 0 | 1 | 0 | UC | | DE | UE |
| 1 | | EJECT | AUTO INSERT | MANUAL INSERT | | PRINT DOC OR R | PRINT JR | USE 2 BUFF |
| 2 | OPEN DRAWER 1 | OPEN DRAWER 2 | | | | | | REC |
| 3 | DATA ADDRESS | | | | | | | |
| 4 | | | | | | | | |
| 5 | ERROR CODE | | | | | | | |
| 6 | CELL A | CELL B | INSERT ATTEMPT | DRAWER STATUS | | | | REC'Y REQ'D |
| 7 | # OF SPACES FOR RECEIPT/SALES SLIP | | | | | | | |
| 8 | # OF SPACES FOR JOURNAL | | | | | | | |
| 9 | FIRST LINE REGISTRATION | | | | | | | |

FIG. 35

CLUSTERED TERMINALS WITH WRITABLE MICROCODE MEMORIES & REMOVABLE MEDIA FOR APPLICATIONS CODE & TRANSACTIONS DATA

DESCRIPTION

TECHNICAL FIELD

This invention relates to data-entry terminals, and more particularly relates to a cluster configuration of data-entry terminals which operate completely independently of any central host data processor.

BACKGROUND ART

Various systems utilizing a plurality of data-entry terminals have been heretofore developed which enable the entry of data for data processing from a plurality of different locations. For example, prior systems have utilized a plurality of point-of-sale terminals in a retail store environment to enable sales data to be entered at a plurality of locations about a retail establishment. In such prior point-of-sale systems, the terminals have often been connected to a common data bus and the data directed to a common computer host which may be located at the retail establishment or at a remote location. Such systems are relatively bulky and expensive due to the requirement of a large and complex separate host data processing computer or controller for storing input data.

In order to eliminate the requirement of a separate on-line host data processing computer, stand-alone terminals have been previously developed utilizing magnetic storage cassettes which are used to record sales data from each terminal. The cassettes may then be subsequently removed and taken to a remote location for subsequent processing.

In point-of-sale terminal system, it is necessary to perform arithmetic operations on sales data with the use of various function programs. In one type of point-of-sale system using a magnetic tape cassette, function programs for operating on point-of-sale data are permanently stored in non-volatile memories in each of the terminals. In another type of such prior system, function programs are input into each of the terminals at the beginning of the day when the system is powered up. In both types of prior systems, there has been a requirement for storage in each of the terminals for function programs which are required to be executed during operation of the terminals. Such prior systems have thus required a plurality of separate storage facilities in each point-of-sale terminal to provide the desired operation.

Moreover, such prior multiple terminal point-of-sale systems have not been completely satisfactory with respect to ease of adaptability to various desired configurations and have not been easily changeable in configuration to accommodate breakdown of one or more portions of the system. For example, in such prior systems, in order to change the interconnection of a master terminal in the system, extensive cable rearrangements or line switching changes have generally been required.

A need has thus arisen for a point-of-sale data-entry terminal system wherein the data-entry terminals are self-contained in unitary portable housings without the requirement of additional data recording housing and the like. A need has also arisen for a point-of-sale data terminal wherein permanent storage for function programs is not required for each terminal, and wherein the configuration of the system may be easily reconfigured without the requirement of cable rearrangement or line switching. A need also exists for a point-of-sale data-entry terminal system wherein primary bus control and central storage may be easily changed from one terminal to another to provide backup in case of a malfunction. Such changeover should be by simple operator action at the terminal keyboard instead of extensive cable rearrangement or line switching.

DISCLOSURE OF INVENTION

In accordance with the present invention, a clustered system of data-entry terminals includes a plurality of physically separate data-entry terminals. Each of the terminals includes entry and display structures for communicating data between an operator and the terminal, along with a processor for operating upon data input to the terminal. A communications link is coupled among the terminals to form a data-entry cluster. One or more of the terminals are media terminals, and include circuitry for potentially controlling the flow of data via the communications link and also for providing central storage for potential data input from all terminals in the cluster.

In accordance with another aspect of the present invention, a clustered system of data-entry terminals includes a plurality of self-contained data-entry terminals, each having entry devices for allowing the input of data by an operator. Each of the terminals further includes a programmable processor for operating upon data input into the terminal according to a plurality of operator selectable programs. A communications link is coupled between the terminals to form a data-entry cluster. One of the terminals is designated a primary media terminal and includes an additional programmable prrocessor and storage for storing the programs. The additional programmable processor is operable to control the reception of data from each of the terminals over the link for storage in the storage. The additional programmable processor is further operable to control the transfer of programs from the storage over the link to each of the terminals when requested by the terminals.

In accordance with yet another aspect of the present invention, the data-entry terminal includes a housing having a keyboard for the entry of data and for the selection of functions by an operator. A display is provided on the housing for displaying information to the operator. A first programmable processor is included for operating upon the data under the control of selected function programs. A first storage is operable in conjunction with the first processor for storing data. A second programmable processor is provided to control the transfer of data from the first storage. A second storage is associated with the second programmable processor for storing data transmitted from the first storage and for storing function programs. The second programmable processor is operable to transfer function programs from the second storage to the first storage to enable operation on the data with the function programs by the first processor.

The invention may also be considered to have an overall organization exactly opposite to that of known clustered systems, particularly those used in data-entry and point-of-sale environments. Heretofore, such systems comprised a number of remote terminals each connected to a physically separate controller box. The controller provided sophisticated control of a storage medium, including data formatting and other high-level functions; it also commonly assigned a single time-shared programmable processor to the various terminals so as to provide the appearance of a separate high-level functions for each terminal. Each terminal contained no significant high-level function of its own. The present system, on the other hand, has a separate programmable processor physically localized in each terminal, so that each terminal provides substantially the whole of its own intelligence, including high-level data formatting, arithmetic calculations, totals accumulation, operator guidance thru complex transactional sequences, and the like. Storage control is then reduced almost to a ministerial function; indeed, the physical size of the storage equipment is small enough that it can be included under the same cover with one of the terminals. Although the storage controller does include a processor, its functions are entirely low-level, such as reading and writing a disk sector.

Briefly, the present invention replaces a network of dumb terminals and a smart controller with a network of smart terminals and a dumb controller. The advantages of this conceptual change will become apparent from the description below.

BRIEF DESCRIPTION OF DRAWING

For a more detailed description of the present invention and for other objects and advantages thereof, reference is made to the following description, taken in conjunction with the accompanying drawings, in which.

Figure 5:
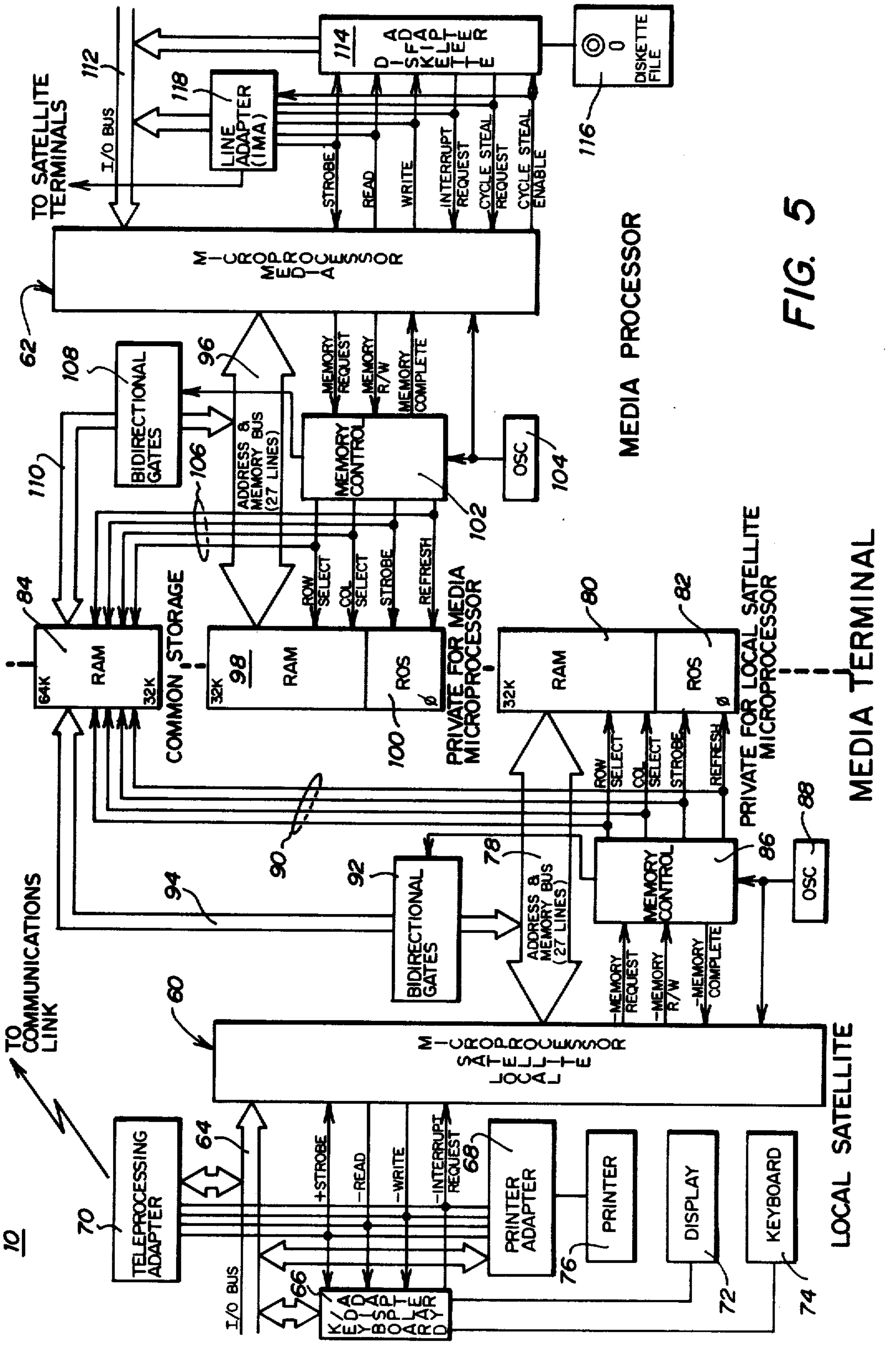
FIG. 5 is a block electrical diagram of a media terminal according to the present invention.
Figure 6:
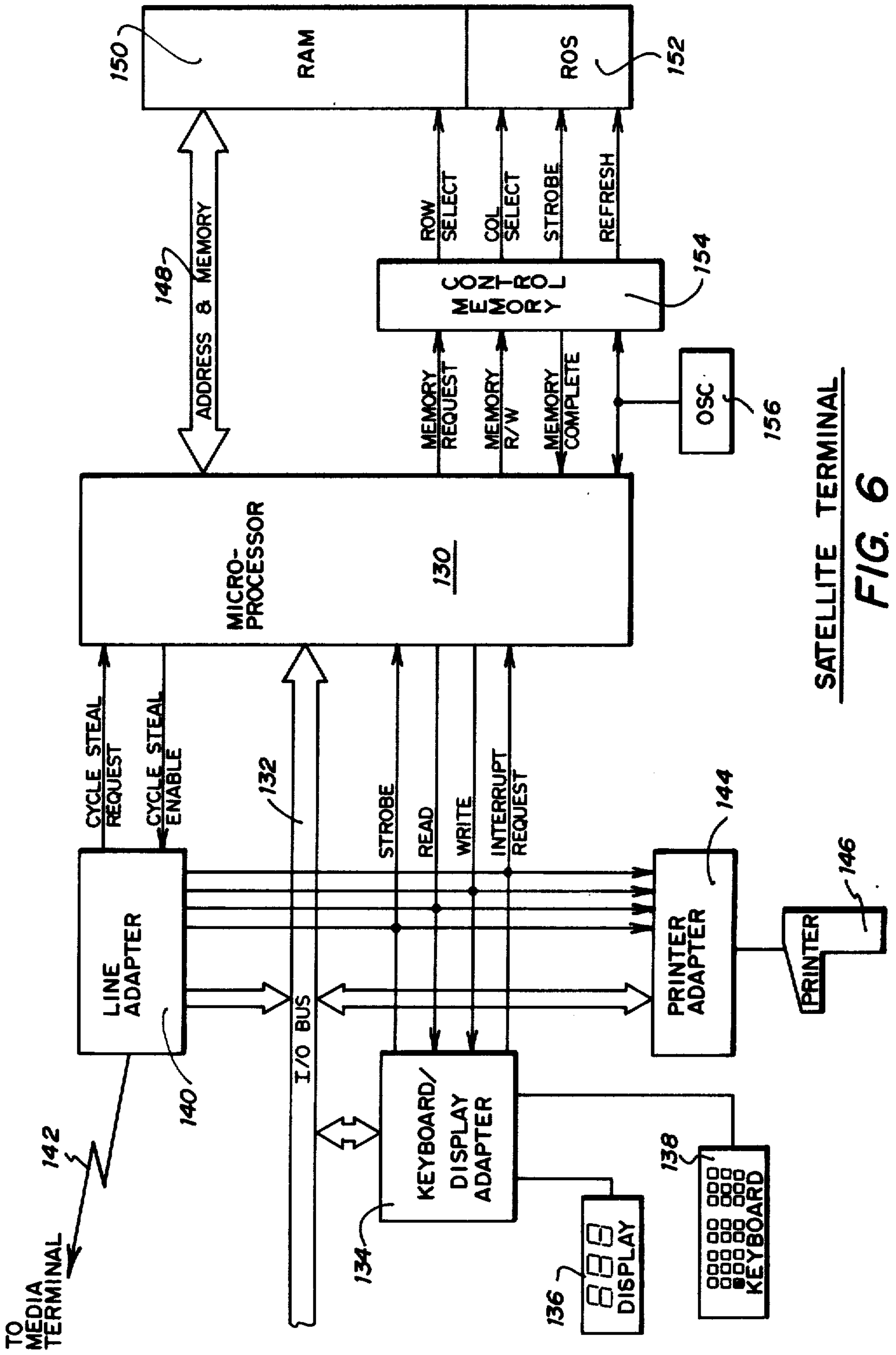
FIG. 6 is a block electrical diagram of a satellite terminal according to the present invention.
Figure 10:
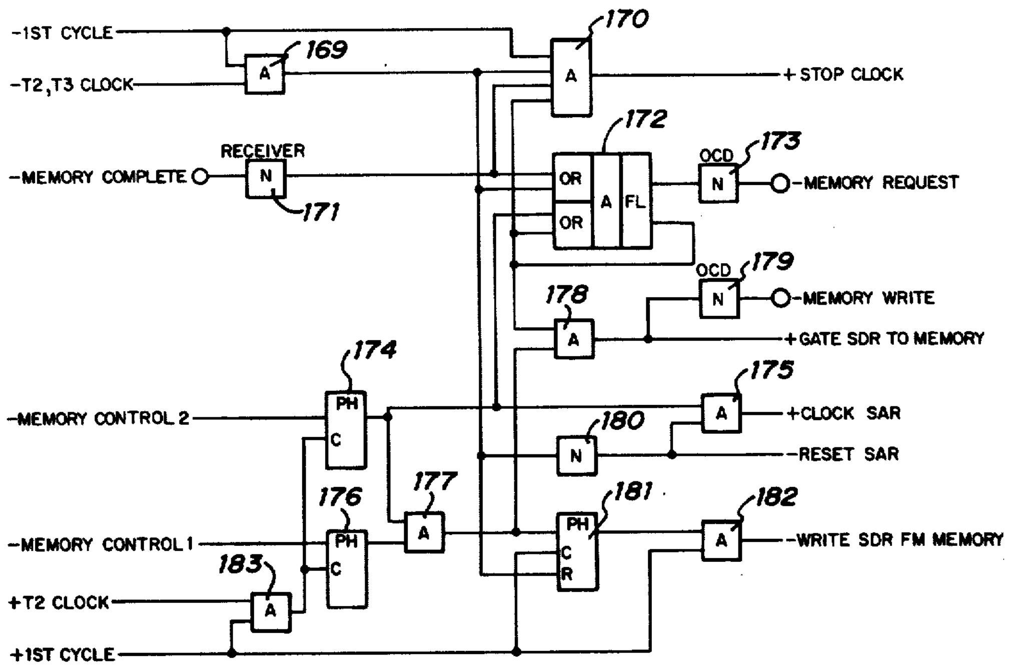
Figure 11:
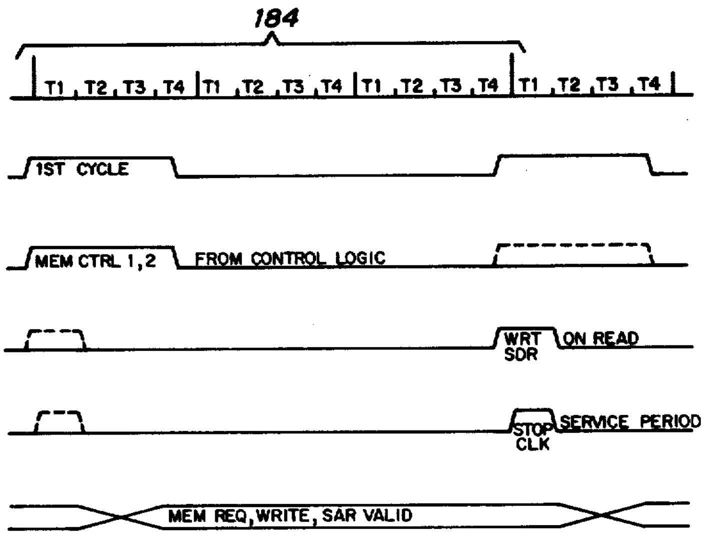
Figure 13:
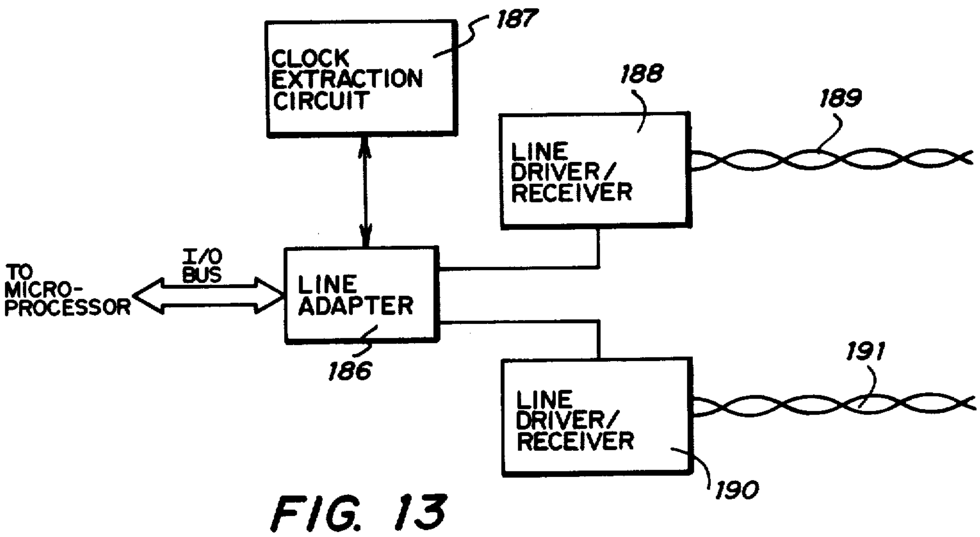
Figure 14:
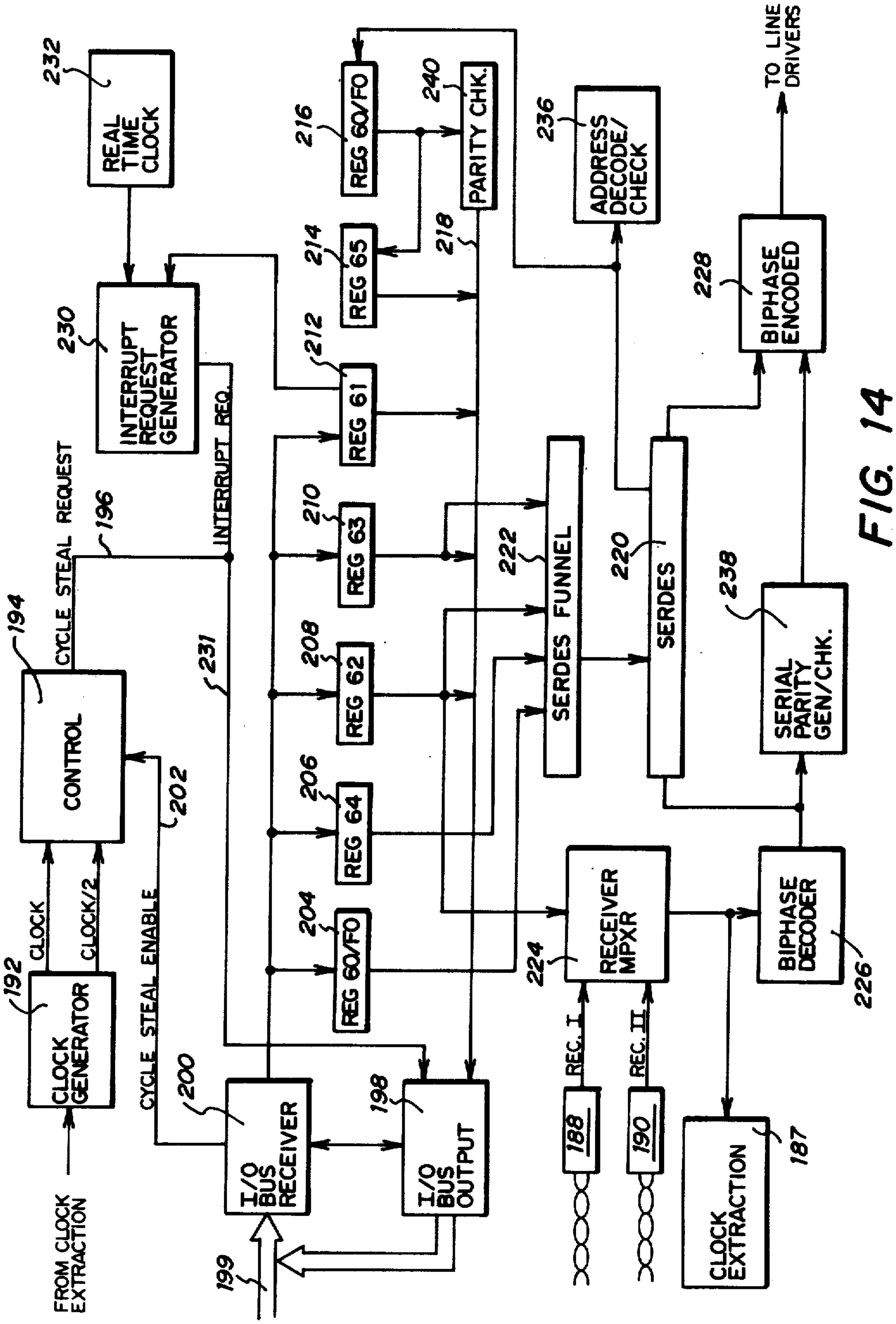
Figure 15:
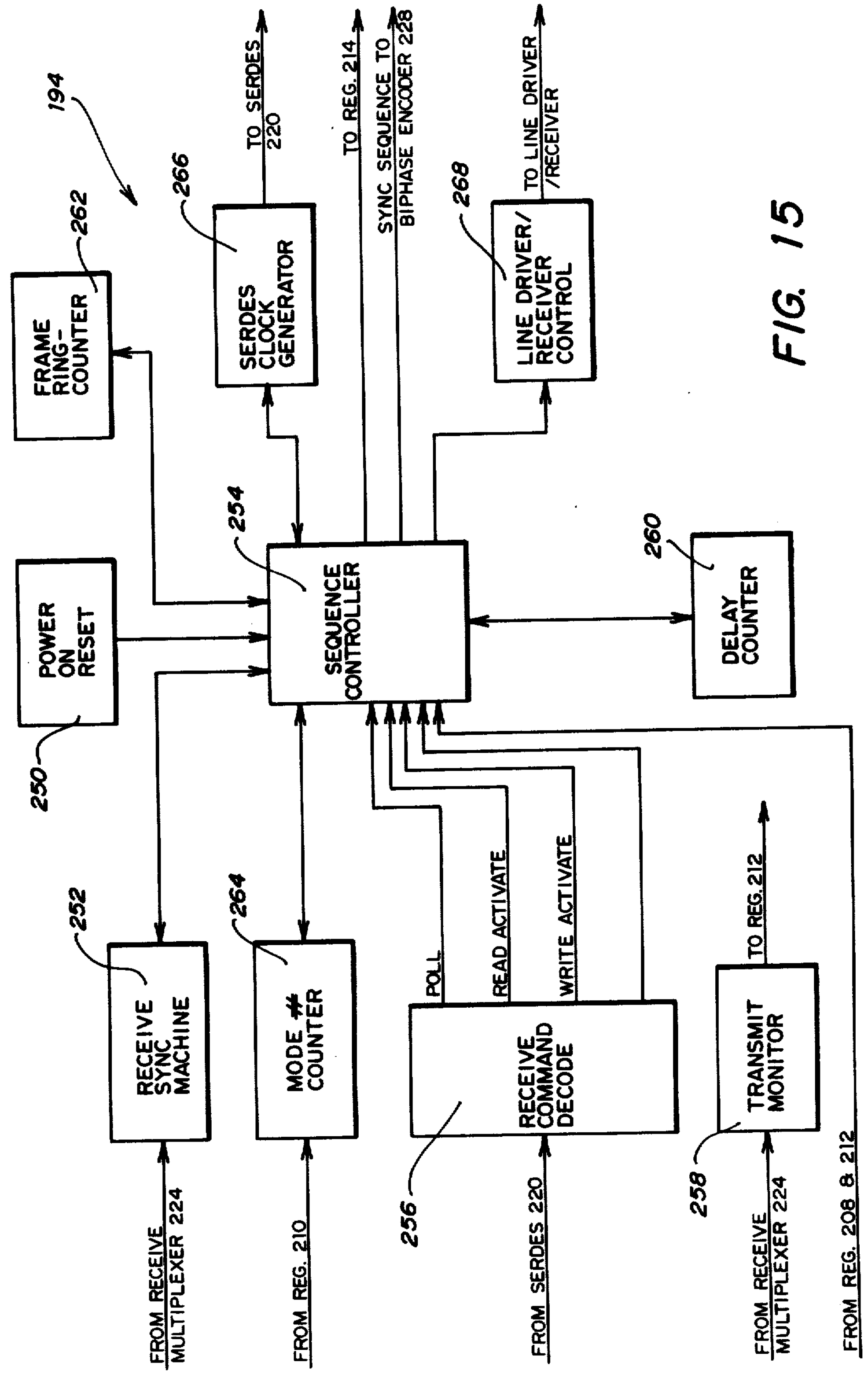
Figure 20:
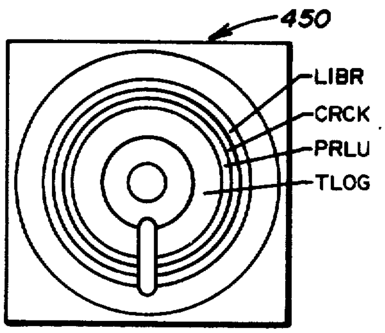
Figure 21:
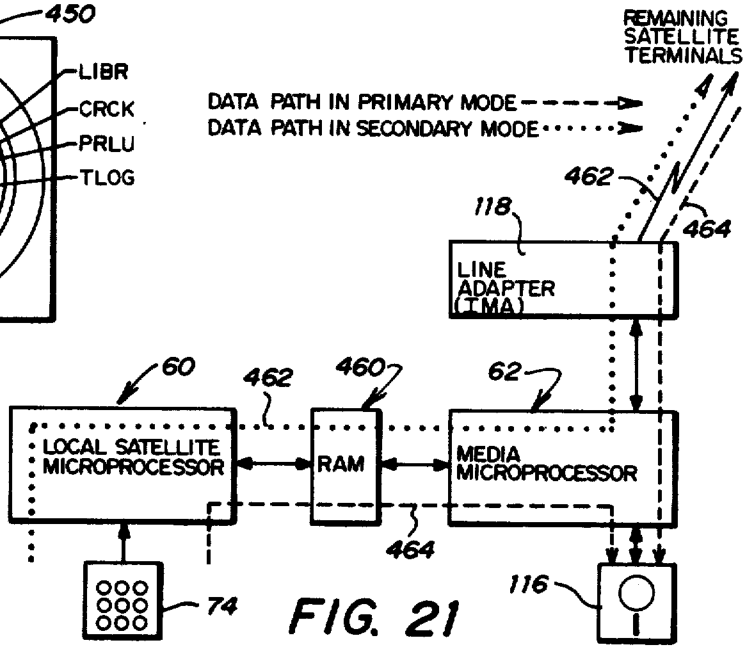
Figure 22:
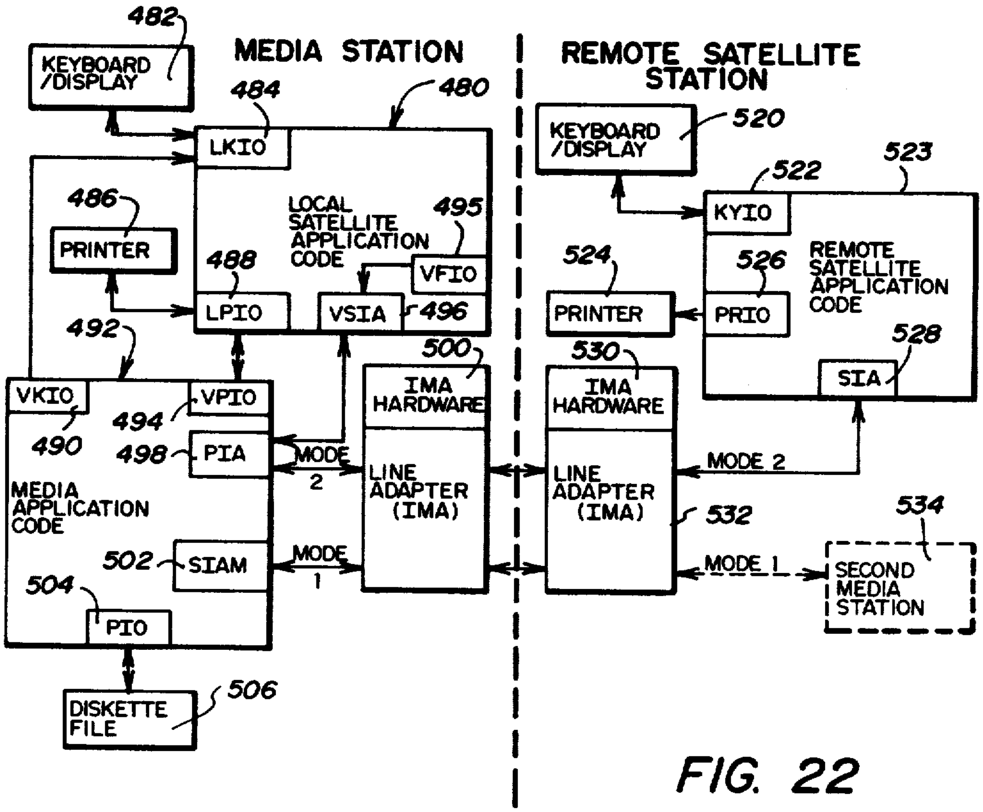
Figure 23:
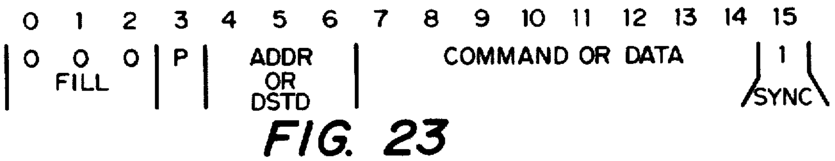
Figure 24:
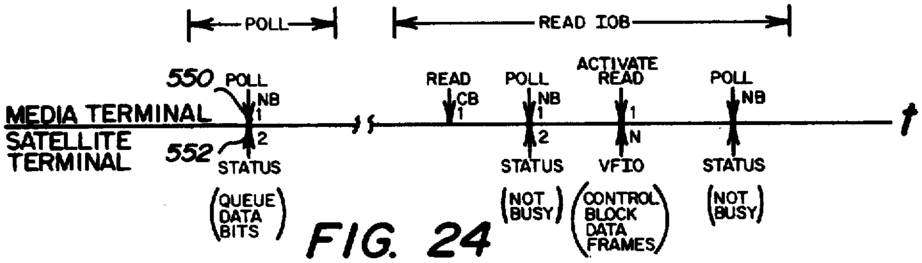
Figure 25:
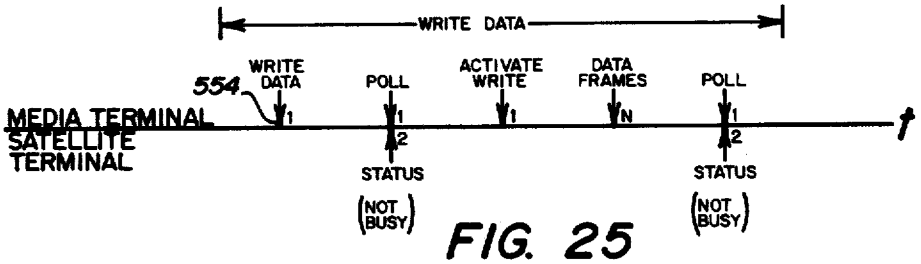
Figure 26:
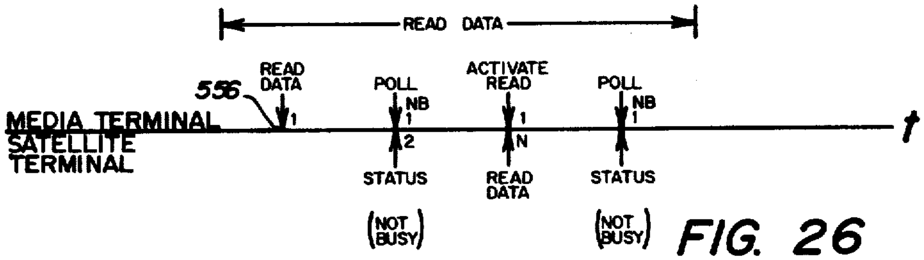
Figure 27:
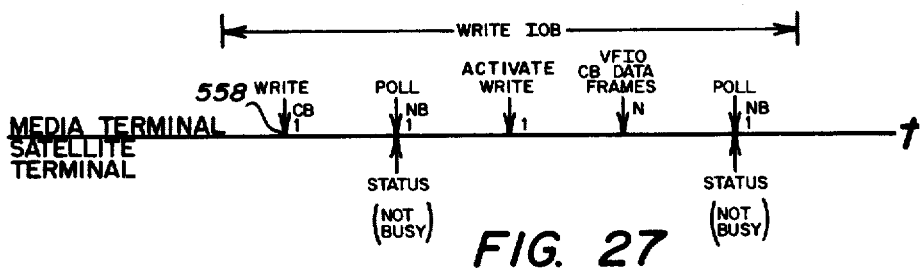
Figures 28, 29:
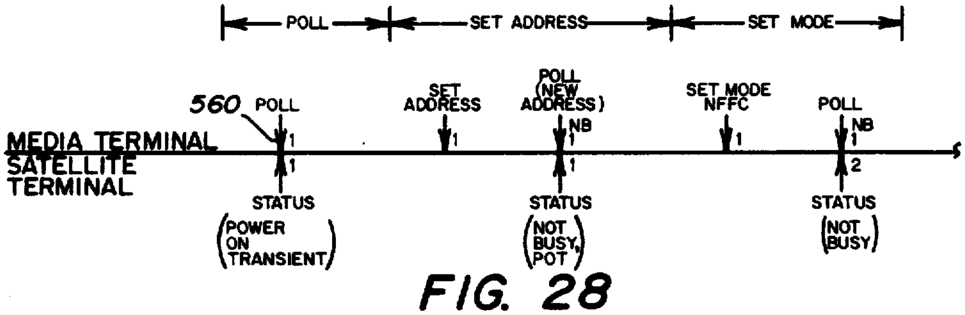

FIGS. *9a–e* illustrates waveforms indicating the operation of the storage channel for the media terminal shown in FIG. 5;

FIG. 10 is a schematic diagram of circuitry of the microprocessor which interfaces with the memory control;

FIG. 11 illustrates waveforms indicating the operation of the circuitry of FIG. 10;

FIGS. *12a–d* illustrate waveforms indicating the operation of the I/O channel of the media terminal shown in FIG. 5;

FIG. 13 is a block electrical diagram of the control circuit shown in FIG. 14;

FIG. 14 is a block electrical diagram of the line adapter circuit shown in FIGS. 5 and 6;

FIG. 15 is a block electrical diagram of the control circuit shown in FIG. 14;

FIGS. 16–19 are flowcharts of operation of the portion of the line adapter circuit shown in FIG. 14;

FIG. 20 is a somewhat diagrammatic illustration of the storage portions of the diskette utilized with the present invention;

FIG. 21 is a diagrammatic illustration of data paths of a media terminal in both primary and secondary modes of operation;

FIG. 22 is a somewhat diagrammatic illustration of various digital processing routines utilized in various modes of operation of a media terminal in conjunction with a remote satellite station;

FIG. 23 is an illustration of the frame format for digital processing commands utilizing the present invention;

FIG. 24 is a somewhat diagrammatic illustration of polling and transferring control blocks from a satellite terminal by a media terminal;

FIG. 25 is a somewhat diagrammatic illustration of the write commands and responses which transfer programs and data from a media terminal to a satellite terminal;

FIG. 26 is a somewhat diagrammatic illustration of commands and responses when data is transferred from a satellite terminal to a media terminal;

FIG. 27 is a somewhat diagrammatic illustration of commands and responses when transferring control blocks from a media terminal to a satellite terminal;

FIG. 28 is an illustration of commands and responses during polling and address setting between a media terminal and a remote satellite terminal;

FIG. 29 illustrates the control block for the primary intermachine adapter control subroutines.

FIG. 30 illustrates the control block for the secondary intermachine adapter I/O control subroutine;

FIG. 31 illustrates the control block for the virtual file IOB subroutine;

FIG. 32 illustrates the control block for the local satellite disk IOB subroutine;

FIG. 33 illustrates the control block for the keyboard/display I/O control subroutine;

FIG. 34 illustrates the control block for the virtual keyboard/display I/O control subroutine; and FIG. 35 illustrates the control block for the printer I/O control subroutine.

BEST MODE FOR CARRYING OUT THE INVENTION

Figure 1:
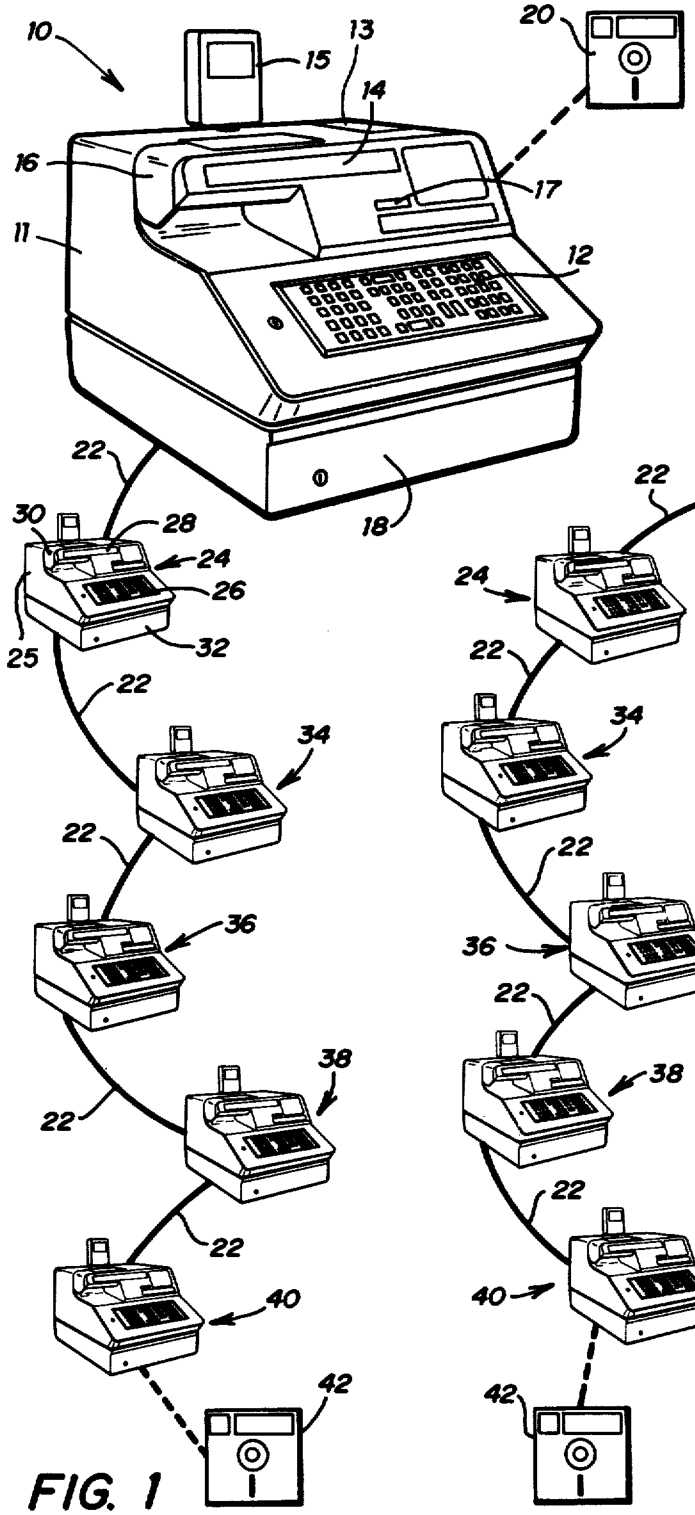
FIG. 1 is a somewhat diagrammatic illustration of one configuration of the present data-entry point-of-sale terminal system utilizing a single media terminal and a plurality of serially connected satellite terminals.

FIG. 1 illustrates a configuration of the present system. A primary media terminal 10 is a data entry terminal configured for use as a point-of-sale terminal in a retail store environment or the like. Media terminal 10 includes a keyboard 12 to receive transaction data, function selections and the like, and a display 14 to display entered data, computed data and instructional prompts to the operator. A customer display 15 displays total data and the like to the customer. Media terminal 10 also includes a printer 16 to print various point-of-sales data for both the operator and the customer. For more detailed information on the construction and operation of the printer 16, reference is made to the co-pending patent applicaton Ser. No. 948,860, entitled "Shared Document Feed Station", by Theodore H. Anderson, Wallace E. Beuch and Richard E. Lagergren, assigned to the assignee of the present application and filed on Oct. 5, 1978, now U.S. Pat. No. 4,229,113.

An operator guidance or prompt display 17 comprises a rotatable drum for displaying various guidance commands to the operator. A cash register drawer 18 is normally utilized in conjunction with the media terminal 10 to enable deposit of cash, the making of change and the like. A storage diskette unit 20 is incorporated in the housing of the media terminal 10 and is shown in FIG. 1 in a diagrammatic manner. The diskette unit 20 utilizes a conventional thin circular storage diskette which may be selectively inserted and removed from the media terminal 10. Diskette unit 20 may comprise, for example, either the IBM Diskette 1 or Diskette 2D manufactured and sold by the assignee of the present application. Diskette 1 is in the 128-character format and can store 242,944 characters of data.

An enclosure or housing 11 encloses and provides physical support and/or electrical connections to the above input/output (I/O) devices and for the electronics to be described herein below. Access door 13 allows diskette 20 to be inserted into and removed from a conventional drive mechanism, not shown. Housing 11 provides a unitary physical package for system 10, not requiring any separate host computer, time-shared central controller or other external intelligence to provide the entire range of functions of a complete point-of-sale or data-entry system. The shape and size of housing 11 allows system 10 to be placed upon a checkout counter or table top, in the manner of a conventional cash register or transaction recorder.

A twin axial bus or cable 22 connects the primary media terminal 10 with a satellite terminal 24 for bit-serial data transfer. Satellite terminal 24 is housed in a similar housing 25 as media terminal 10 and also includes a keyboard 26, a display 28, a printer 30 and a cash register drawer 32. Satellite terminal 24 is also constructed and operated in a similar manner as media terminal 10, with the execption that the satellite terminal 24 does not include a storage diskette unit.

Similarly, additional satellite terminals 34, 36 and 38 are connected to the twin axial bus 22. Each of the satellite terminals 34–38 are connected identically to the satellite terminal 24.

A backup media terminal 40 is connected at the end of the twin axial bus 22. Conventional terminating resistances, not shown, are normally connected at the primary media terminal 10 and the backup media terminal 40. The backup media terminal 40 is constructed identically to the primary media terminal 10 and includes the capacity to incorporate a diskette 42. However, in the normal operational mode, backup media terminal 40 does not utilize its diskette 42 for storage, and is operated merely as a satellite terminal. Thus, in the normal operational mode, the primary media terminal 10 operates as the primary bus controller and as the data storage center for the system.

As will be subsequently described, in case of malfunction of the primary media terminal 10, the backup media terminal 40 may be simply converted into the primary media terminal for the system and may receive a diskette 42 in order to act as the bus controller and data storage center for the system. The change over of the backup media terminal 40 from a satellite operational mode to a primary media terminal mode may be accomplished by simple operator operations through the keyboard of the backup media terminal 40 and does not require any changing of the twin axial bus 22 configuration of the system and also does not require any line switching of the system.

In operation of the system shown in FIG. 1, the six terminals shown in FIG. 1 are dispersed throughout a retail sales location. Various sales personnel can enter sales data into the system via the keyboards of the various terminals. Various calculations may be made by the system and displayed on the displays of the terminals, such as sales tax computations, discount computations, credit information, arithmetic computations and the like.

Data entered into the satellite terminals is temporarily stored in memory at the satellite terminal. The primary media terminal 10 periodically sequentially polls the various satellite terminals. At polling, a satellite terminal transmits data for permanent storage to the primary media terminal 10 for storage on the diskette 20. The satellite terminals also generate paging requests for various function or application programs and data tables to the primary media terminal 10. For example, if a satellite terminal is operating in a sales mode and the operator desires to transfer to a total readout mode, the satellite terminal requests the function program to accomplish the total readout mode from the primary media terminal 10. The requested program is then obtained from a library of programs and tables stored on the same diskette 20 and transmitted to the requesting satellite terminal for storage in the satellite terminal's memory. A desired total readout function is then performed at the satellite terminal.

The present system thus provides a single storage medium for the entire system which may be periodically removed (or transmitted by conventional teleprocessing means) to enable storage and processing of the sales data from the entire point-of-sale terminal system in another data processor. Various different functions and additional capabilities may be easily input into the system by insertion of differently programmed diskettes.

If it is desired to transfer control of the system from the primary media terminal 10 to the backup media terminal 40 due to a malfunction or the like, the diskette 20 may be removed from the primary media terminal 10 and inserted into the backup media terminal 40. Through simple instructions entered through the keyboard of the backup media terminal 40, bus control and data storage of the entire system is then transferred to the backup media terminal 40.

Although five satellite terminals have been illustrated with the present invention, it will be understood that greater or smaller numbers of satellite terminals may be utilized in order to provide a great amount of flexibility of the size of the present system. In addition, it will be recognized that any media terminals of the invention may be used as stand alone terminals without any satellite terminals.

Figure 2:
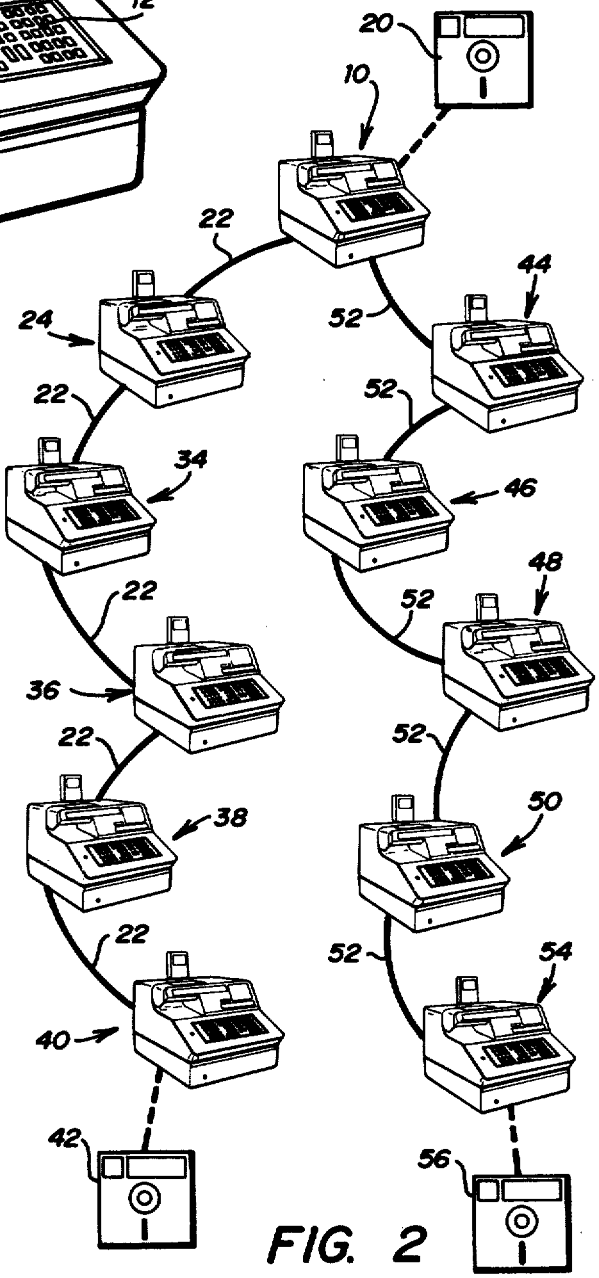
FIG. 2 is a somewhat diagrammatic illustration of a second configuration of the present invention utilizing a primary media terminal interconnected to two links of satellite terminals, each link including a backup media terminal operating as a satellite.

FIG. 2 illustrates a system similar to that shown in FIG. 1 but with expanded capability. Like numerals are utilized in FIG. 2 for like and corresponding parts previously identified in FIG. 1.

Thus, it may be seen that the system includes a first link identical to the link shown in FIG. 1 and comprising a primary media terminal 10, four satellite terminals 24, 34, 36 and 38 and a backup media terminal 40. The primary media terminal 10 includes a diskette 20. The backup media terminal 40 also includes a diskette 42 which is not used in normal backup operations.

In addition to the link thus described, FIG. 2 also includes a second link comprising satellite terminals 44, 46, 48 and 50 which are interconnected along a twin axial bus 52. A second backup media terminal 54 is connected at the end of the twin axial bus 52 and includes a diskette 56. In normal operation, the primary media terminal 10 serves as the bus controller and storage medium for the satellite terminals 44–50 and also for the backup media terminal 54 which acts as a satellite terminal. If a malfunction occurs in the primary media terminal 10, the backup media terminals 40 and 54 may be actuated and utilized as primary media terminals to control their respective satellite terminals.

Figure 3:
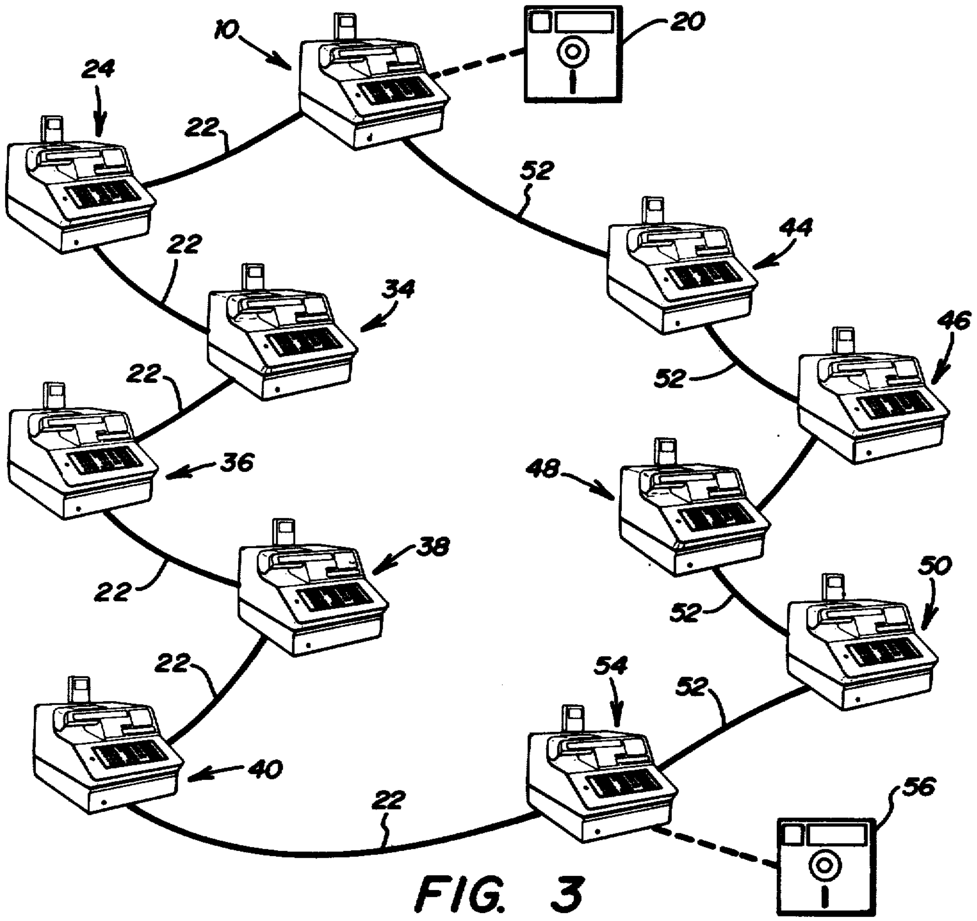
FIG. 3 is a somewhat diagrammatic illustration of another configuration of the present invention including a primary media terminal connected to two links of satellite terminals and including a backup media terminal operating as a satellite terminal and interconnected to both links.

FIG. 3 illustrates yet another system configuration of the present invention, with like numerals being utilized for like and corresponding parts identified in FIGS. 1 and 2. In this configuration, the primary media terminal 10 is connected via twin axial bus 22 with satellite terminals 24, 34, 36, 38 and 40. In this configuration, satellite terminal 40 is not provided with a diskette and thus functions only as a satellite terminal. Primary media terminal 10 includes the diskette 20. Primary media terminal 10 is connected via the twin axial bus 52 with satellite terminals 44, 46, 48 and 50. The backup media terminal 54 is connected to the twin axial bus 52 and also to the twin axial bus 22. In normal operation, the backup media terminal 54 acts as a satellite terminal under the control of the media terminal 10. In case of malfunction of the media terminal 10, the diskette 56 is activated and the backup media terminal 54 is operated as the primary media terminal.

An advantage of the present invention is that all data on a system can be captured on a single diskette even though the primary media terminal malfunctions. In the case of such malfunction, the diskette is merely removed from the primary media terminal and inserted in the backup media terminal. The backup media terminal is then activated through its keyboard to operate as a primary media terminal and additional data is then deposited on the diskette. Thus, all data from the system may be entered on a single diskette even though different media terminals are utilized as the primary media terminal. (In most cases, a suitably initialized diskette may be left in the backup terminal at all times, so that no actual diskette transfer need be made. The other processor then merely splices together the data collected on two different diskettes.)

In operation of one of the terminals of the invention, the operator depresses various keys on the keyboard to request different functions or applications programs and to input data. The display 14 (FIG. 1) is provided, as previously noted, to display the data being entered into the terminal and also to display the resulting computations performed by the system. The prompt display 17 also displays instructions and error code messages to the operator.

Figure 4:
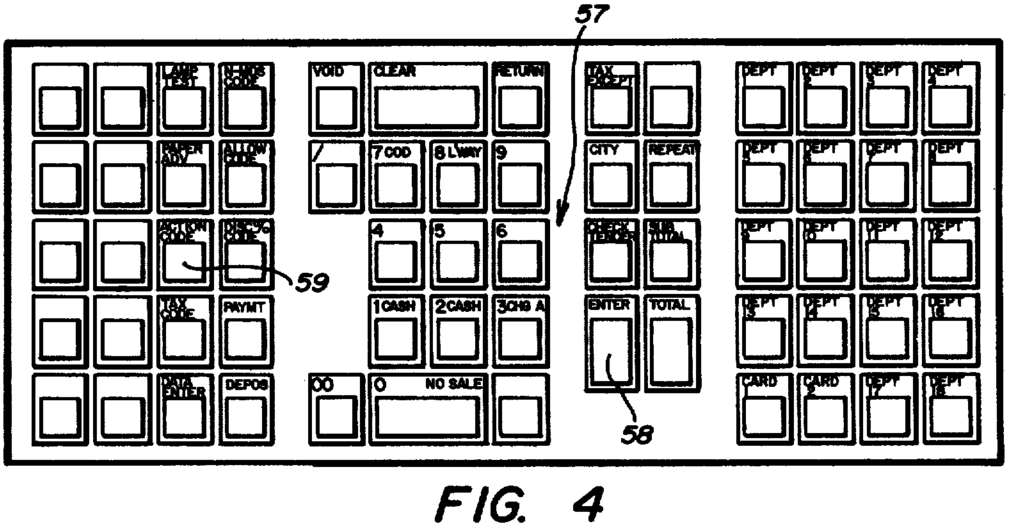
FIG. 4 is a diagram of the keyboard of the present terminal.

FIG. 4 illustrates a typical expanded keyboard for use with the terminal shown in FIGS. 1–3. The keyboard includes a data entry section generally identified by the numeral 57 which comprises a sufficient number of keys for entering digits 0–9. The remaining keys shown in FIG. 4 are function keys in order to command various operating functions in the system. By proper operation of the keyboard shown in FIG. 4, numerical data may be gathered by various transaction accumulators incorporated in the terminals shown in FIGS. 1–3. The transaction accumulators receive numerical data entered through the keyboard shown in FIG. 4 and automatically upgrade the transactional total stored on the machine control totals and the grand totals at the completion of each sales transaction. The accumulated totals thus assist the operator in taking cash and total balances from each terminal during or at the end of a sales period. The transactional accumulator responsive to the keyboard shown in FIG. 4 comprises sales, returns, taxable sales, taxable returns and deposits/payments/accumulators.

To initiate operation in one of the terminals shown in FIG. 1, a prompt instruction appears on the prompt display 17. In response to the prompt information, the operator keys in data through the data keys 57 (FIG. 4). The data appears on the transaction display in a customer transaction display 15 as it is being keyed. The operator then presses one of the function keys in order to enter the data. For example, the operator could depress the enter key 58. If desired, the operator can then press various other of the function keys. Outputs can also be generated for the various accumulators previously noted, or the transaction display, the printer or the transaction log on the diskette. After the selected operation, the next prompt appears on the prompt display 17 in order to instruct the operator on the next steps to be followed.

As noted, an important aspect of the present invention is the ability to quickly and simply change one of the satellite terminals into the primary media terminal by operation through the keyboard and without the requirement of changing cabling. To describe such changeover operation, assume that the media terminal 40 shown in FIG. 1 was being operated in the secondary or satellite mode and that the media terminal 10 was being operated in the primary mode. Assume that an operator is using the terminal 40 in a sales transaction. If an amount due is displayed on the terminal's display, the customer is about to tender the amount due to the operator. If at this time the primary media terminal 10 has a malfunction, the terminal 40 may be easily changed into the primary media mode by pressing the action code key "59" (FIG. 4). After the operator depresses the 9 data key, the display 14 would then display the sequence PO91. This sequence prompts the operator to enter the operational mode desired for the satellite terminal. The operator may then key in a 1, 2 or 3 in order to select primary mode, secondary mode or stand alone mode. Since the terminal was operating in secondary mode, the operator would depress 1 to request the primary mode and would then press the enter key 58. At that time, the terminal 40 would begin operation in the primary mode and would become the primary media station for the system shown in FIG. 1. The amount due which was originally displayed on the display of the satellite terminal would return so that the operator could continue the transaction being entered when an interruption occurred.

Another aspect of the present invention is that the operator has the ability to select the operational mode of the terminal when any of the terminals are first powered on. Upon initial powering up of the terminals 10 and 40 as shown in FIG. 1, the display 14 displays a P711. This prompts the operator to select the desired operational mode 1, 2, or 3 for the terminals. The operator then depresses the desired key to select the mode. Finally, the "enter" key 58 is depressed.

FIG. 5 is a block electrical diagram of the primary media terminal 10. As will be subsequently described, an important aspect of the present invention is that the primary media terminal 10 includes two separate microprocessor circuits which share common memory. The data flow in operation of the media terminal 10 is determined by whether the media terminal 10 is being operated in the primary mode as a primary media terminal or whether the media terminal 10 is being operated in a secondary mode as a backup media terminal or satellite terminal.

Referring to FIG. 5, media terminal 10 may be seen to include a local satellite microprocessor 60 and a media microprocessor 62. Both of these microprocessors may be of conventional design. It is within the skill of the art to map the specific features described herein into the bus and control configurations of other microprocessor architectures. The local satellite microprocessor 60 includes an I/O bus 64 on which are hung a keyboard/display adapter 66, a printer adapter 68 and a teleprocessing adapter 70. The keyboard/display adapter 66 also is connected to terminals of the microprocessor 60 through strobe, read, write and interrupt request lines. The keyboard/display adapter 66 operates to drive a display 72 of the media terminal 10 and a keyboard 74 of the media terminal 10.

The printer adapter 68 is also connected to the strobe, read, write and interrupt request lines of the local satellite microprocessor 60 and serves to drive the printer 76 of the terminal 10. The teleprocessing adapter 70 is also connected to the strobe, read, write and interrupt request lines and serves to enable teleprocessing of the data stored within the media terminal 10 via conventional binary synchronous teleprocessing techniques to a remote location.

The local satellite microprocessor 60 is connected to a random access read/write storage (conventionally denoted by the misnomer "RAM") 80 and a read only storage (ROS) 82 via an address and memory bus 78. Address and memory bus 78 comprises 27 lines.

The RAM 80 and ROS 82 provide storage capability for the local satellite microprocessor 60 at byte addresses 0 to 32K. The RAM 80 and ROS 82 provide private storage capability for the local satellite microprocessor 60.

Additional storage for the local satellite microprocessor 60 is also provided by a RAM 84 which provides storage from addresses 32K to 64K. As will be subsequently described, this storage is shared with the media microprocessor 62.

A memory control 86 receives memory requests and memory read/write signals from the local satellite microprocessor 60. Memory complete signals are applied from the memory control 86 to the local satellite microprocessor 60. An oscillator signal is provided from a oscillator 88 to both the local satellite microprocessor 60 and the memory control 86. The output of the memory control 86 generates row select, column select, strobe and refresh signals which are applied to the RAM 80 and the ROS 82. The row select, column select, strobe and refresh signals are also applied via leads 90 to RAM 84. Control of address and memory exchanged between the address and memory bus 78 and the RAM 84 is controlled by bidirectional gates 92 which control the passage of data on a bus 94.

An address and memory bus 96 extends from the media microprocessor 62 to a private media storage including a RAM 98 and a ROS 100. This private storage provides storage from 0 to 32K for the media microprocessor 62. A memory control circuit 102 receives memory requests and memory read/write signals from the media microprocessor 62 and generates a memory complete signal thereto. An oscillator 104 generates oscillator signals which are applied to both the media microprocessor 62 and to the memory control circuit 102. The memory control circuit 102 generates a row select, column select, strobe and refresh signals to the RAM 98 and ROS 100. Additional common storage is provided for the media microprocessor 62 by use of the RAM 84. Row select, column select, strobe and refresh signals are generated via leads 106 from the memory control circuit 102 to the RAM 84. Bidirectional gates 108 control data flow through a data bus 110 to the common storage RAM 84. RAM 84 provides additional storage for the media microprocessor 62 from 32K to 64K.

The media microprocessor 62 includes an I/O bus 112 on which is hung a diskette file adapter 114. A diskette file 116 is controlled by the diskette file adapter 114 to provide diskette storage for the system. Diskette file 116 may comprise, for example, an IBM Diskette 1 or IBM Diskette 2-D described in U.S. Pat. No. 3,668,658. A line adapter (IMA) 118 also is connected to the I/O bus 112. Line adapter 118 provides line synchronization between the media station and the satellite terminals connected by the twin axial bus shown in FIGS. 1-3. In addition, the line adapter 118 handles the satellite polls, to be subsequently described, generated by the media station to the satellite terminals. Line adapter 118 provides parity reset commands and generates interrupt requests for other commands from the media station. The line adapter 118 can transmit or receive data in either direction upon appropriate command.

Both the diskette file adapter 114 and the line adapter 118 generate strobe, interrupt request and cycle steal request signals to the media microprocessor 62. The media microprocessor 62 applies read, write and cycle steal enable signals to both the diskette file adapter 114 and the line adapter 118 as illustrated.

As will be subsequently described in greater detail, the microprocessors 60 and 62 of the media terminal 10 shown in FIG. 5 enable operation in either primary or secondary modes. When the media terminal 10 shown in FIG. 5 is operating in the primary mode, the media microprocessor 62 provides bus control and data transfer from the satellite terminals. The media microprocessor 62 also handles paging requests from the primary media terminal 10 to the satellite terminals and functions to request data to be stored in the diskette file 116. The media microprocessor 62 also handles requests for data tabled from the satellite terminals.

For example, if a satellite terminal desires to change mode and go from sales mode to a total readout mode, the function program to accomplish the total readout mode is located in the diskette file 116. When this program is requested by the satellite terminal, the program is transmitted from the diskette file 116 under the control of the media microprocessor 62 to the satellite terminal. The total readout function would then be performed at the satellite terminal and the satellite terminal could then request another function such as the sales program back to provide additional sales program functions.

When the media station shown in FIG. 5 is operating in the secondary mode, data received from the keyboard 74 is temporarily stored under the control of the local satellite microprocessor 60 in the RAM 80 and RAM 84. Polled data is then transferred in the manner of a satellite terminal to the primary media terminal for storage in the system's diskette file.

FIG. 6 is a block diagram of a typical satellite station or terminal as shown in FIGS. 1–3. The satellite terminal includes a microprocessor 130 including an I/O bus 132. A keyboard/display adapter 134 is connected to the I/O bus 132 which supports an LED display 136 and a keyboard 138. The keyboard/display adapter 134 generates strobe and interrupt request signals to the microprocessor 130 which in turn supplies read and write signals to the keyboard/display adapter 134 for control of the display 136 and keyboard 138.

A line adapter 140 is connected to the I/O bus 132 and is connected by a twin axial bus 142 to the media terminal and to other satellite terminals in a parallel connection, which is conventionally termed a party-line or multi-drop configuration. A twin axial bus merely refers to a pair of conductors for transmitting a balanced electrical signal. Typically, this type of bus also includes a grounded shield displaced symmetrically about the two conductors. Any other bit-serial communications bus or link, such as coaxial or twisted-pair, would also function in this system. The line adapter 140 is connected via the strobe, read, write and interrupt request signals to the microprocessor 130. The line adapter 140 also functions to generate a cycle steal request signal and to receive a cycle steal enable signal from the microprocessor 130.

A printer adapter 144 is connected to the I/O bus 132 and is operable to control a printer 146. The printer adapter 144 also receives the strobe, read, write and interrupt request signals of the microprocessor 130.

An address and memory bus 148 from the microprocessor 130 is connected to a RAM 150 and ROS 152 to provide storage therefor. A memory control 154 receives a memory request and memory read/write signal from the microprocessor 130. A memory complete signal is applied from the memory control 154 to the microprocessor 130. An oscillator 156 applies a signal to both the microprocessor 130 and the memory control 154.

The memory control 154 applies row select, column select, strobe and refresh signals to the RAM 150 and ROS 152 to control the temporary storage for the microprocessor 130.

The microprocessors 60, 62 and 130 shown in FIGS. 5 and 6 preferably (but not necessarily) comprise digital microprocessors each formed on a single semiconductor chip which directly execute the instruction set of an IBM System/3 Digital Processor. The programs implemented in the microprocessors 60 and 62 of the media terminal 10 and microprocessor 130 of the satellite terminal of the invention are set forth in detail on the program listing written in IBM System/3 Assembly Language which will be subsequently set forth. The functions performed by the microprocessors of the invention could be duplicated with the attached processing instructions on an IBM System/3 Digital Processor.

Figure 7:
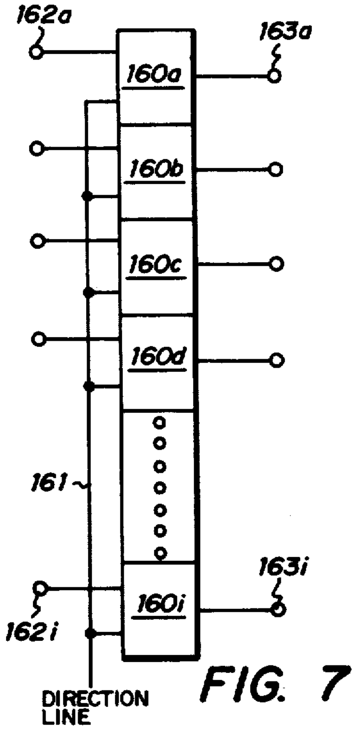
FIG. 7 is a block diagram of the bi-directional gates utilized with the media terminal shown in FIG. 5.

FIG. 7 illustrates a block diagram of the bidirectional gates 92 and 108 utilized to control the storage of data in the common storage RAM 84 in the media terminal 10 of FIG. 5. The bidirectional gates comprise nine gate stages 160*a–i*. A common direction line terminal 161 is connected to control the signal direction provided by the gate stages 160*a–i*. Each gate stage 160*a–i* is provided with a first terminal 162*a–i* and a second terminal 163*a–i*, respectively. These terminals may serve as either input or output terminals depending upon the level applied to the direction line 161.

Figure 8:
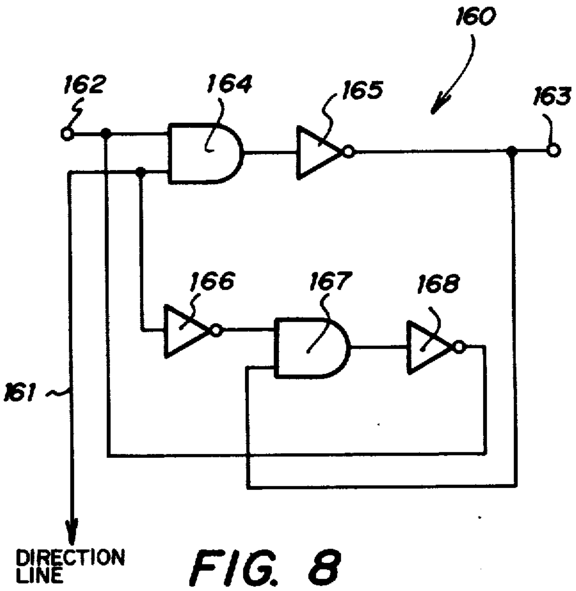
FIG. 8 is a schematic electrical diagram of one stage of the bidirectional gate shown in FIG. 7.

FIG. 8 is a schematic diagram of one of the bidirectional gate stages 160*a–i* shown in FIG. 7. The directional line 161 is illustrated as being applied to one input of an AND gate 164. Terminal 162 is applied as a second input to gate 164. The output of gate 164 is applied through an inverter 165 to terminal 163. The direction line 161 is also applied through an inverter 166 as an input to an AND gate 167. The output of gate 167 is applied through an inverter 168 back to terminal 162. Terminal 163 is connected as an input to an AND gate 167. It will thus be seen that the bidirectional gate stage shown in FIG. 8 enables transfer of data to and from the common storage RAM 84 (FIG. 5) depending upon the direction signal applied to the direction line 161.

Figure 9:
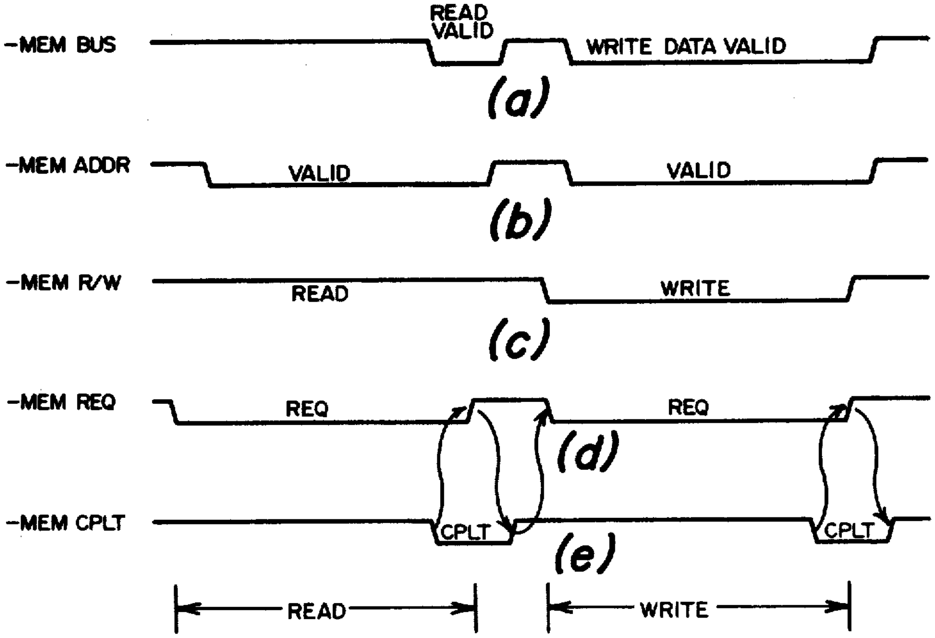

FIGS. 9*a–e* illustrate various control signals associated with the memory controls 86, 102 (FIG. 5) and memory control 154 (FIG. 6). FIG. 9*a* illustrates the waveforms appearing on the address and memory buses 78 and 96. FIG. 9*b* illustrates the memory address signal, while FIG. 9*c* illustrates the memory read/write signal. FIG. 9*d* illustrates the memory request signal, while FIG. 9*e* illustrates the memory complete signal. The first one-half portion of the waveforms in FIGS. 9*a*–9*e* illustrate the completion of a read cycle. The remaining one-half portion of the waveform illustrates a write cycle.

The operation of the storage channel illustrated by FIGS. 9*a–e* may thus be apparent by referral to the waveforms. In storage read and write operations, the storage address, write data, memory request, and R/W control lines are presented simultaneously. Some skew may be apparent due to circuit delays. Memory control circuits initiate a storage cycle some time later. The microprocessor then waits until a memory complete signal is returned from the memory control circuits. The microprocessor then accepts the byte from the storage or assumes the write operation is complete. The oscillator applied to the memory controls is provided for storage clocking. The memory request, memory read/write and memory complete lines are DC interlocked. In operation, the memory request causes the memory complete line to be activated when the storage is physically complete. This in effect causes the memory request line to go inactive which allows the memory complete line to go inactive. This inactive memory complete line is utilized as a signal to tell the microprocessor to make a new memory request to the storage.

The instruction for the memory controls 86 and 102 is conventional and comprises a series of gates constructed in a well known priority select circuit. The priority select circuits receive common store requests and in response thereto operate the bidirectional gates 92 and 108 in order to selectively utilize the common storage provided by the RAM 84. If an address outside the range of the common storage is requested, the private storage associated with each microprocessor 60 and 62 is utilized.

FIG. 10 is a schematic diagram of the sequencing control circuitry for the microprocessors 60 and 62 which provides interfacing between the microprocessors and the memory controls 86 and 102. The 1st cycle signal is applied to an AND gate 169 along with −T2 and −T3 clock signals. The output of AND gate 169 is applied to an input of AND gate 170, the output of which generates the stop clock signal. The Memory Complete signal applied from the memory control 86 (FIG. 5) is applied to an input of a NOT gate 171 whose output is applied to a gate complex 172. Gate complex 172 comprises two OR gates, the outputs of which are applied to an AND gate whose output is applied to an FL (also known as RS) latch. The output of the FL latch is applied through a NOT gate 173 to generate the −Memory Request signal applied from the local satellite microprocessor 60 to the memory control 86 as shown in FIG. 5.

The output of AND gate 169 is applied, along with the output of NOT gate 171, to an input of one of the OR gates of the gate complex 172. The −Memory Control 2 signal is applied to the phase hold input of a double gated (also frequently termined bistable or D-type) latch 174, an output of which is applied as an input to the second OR gate of the gate complex 172. The output of the double gated latch 174 is also applied as an input to an AND gate 175. The −Memory Control 1 signal is applied to the phase hold terminal of a double gated latch 176. The output of double gated latch 174 is applied as an input to an AND gate 177. The output of the double gated latch 176 is also applied as an input to AND gate 177. The output of the double gated latch 174 is applied as an input to the second OR gate of the gate complex 172, along with the output of the RS latch of the gate complex 172. The output of the RS latch is also applied as an input to the AND gate 170 and to an AND gate 178. The output of AND gate 177 is also applied as a second input to AND gate 178.

The output of AND gate 178 is applied to a NOT gate 179 which generates the −Memory Write signal applied to the memory control as shown in FIG. 5. The output of AND gate 178 is applied directly to provide the Plus Gate SDR to Memory signal. The output of AND gate 169 is applied to a NOT gate 180, the output of which is the −Reset SAR signal. The output of gate 180 is also applied as an input to an AND gate 175 to provide the +SAR signal.

The output of AND gate 177 is applied to the phase hold terminal of a double gated latch 181, the output of which is applied as an input to an AND gate 182. The output of AND gate 169 is applied to the reset terminal of the double gated latch 181.

The +T2 Clock signal is applied as an input to an AND gate 183, the output of which is applied to the clock input of the double gated latches 174 and 176. The +1st Cycle signal is applied as a second input to AND gate 183 and also to the clock input of the double gated latch 181. The output of gate 182 generates the −Write SDR FM Memory signal, which is used as a sample clock for data resulting from a storage read operation.

FIG. 11 illustrates timing diagrams of the sequencing control provided by the microprocessors 60 and 62 as shown in FIG. 5. As can be seen, each storage cycle comprises three microinstruction cycles indicated by bracket 184. Each microinstruction cycle includes four clocks T1, T2, T3 and T4. During the first microinstruction cycle, bus turnaround is accomplished with the 1st cycle and memory controls 1 and 2 as shown in FIG. 11. During the second and third microcode cycles, storage and access is accomplished as indicated by the Memory Request, Write and SAR Valid signals as indicated in FIG. 11. The read and write, as well as stop clock signals indicate the timing of the read and write signals sequencing.

Figure 12:
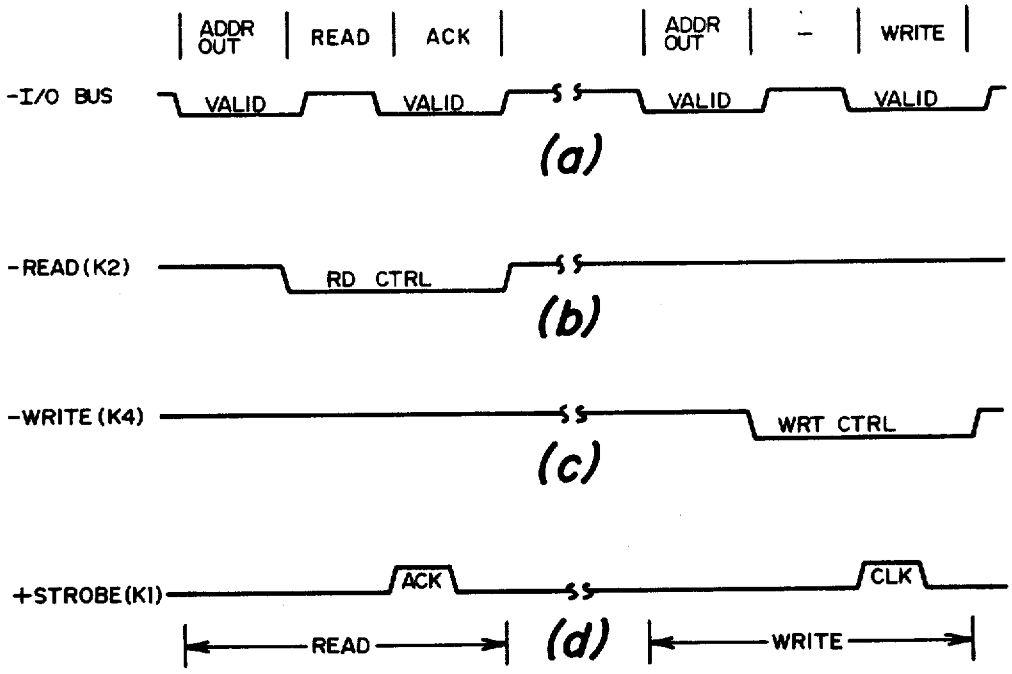

FIGS. **12*a–e* illustrate various control signals utilized with the I/O channels of the microprocessors 60, 62 and 130 shown in FIGS. 4 and 5. FIG. 12*a* illustrates the operation of the −I/O bus signals. FIG. 12*b* illustrates the −Read commands while FIG. 12*c* illustrates the −Write commands. The +strobe signal is shown in FIG. 12*d***.

The illustrated timing diagrams indicate that the read and write signals according to the present invention use a time-division multiplex technique. On a read operation, the address of the device to be selected is presented on the bidirectional bus. Tag line controls are then activated which cause the particular I/O device to be selected and cause it to present data to the microprocessor. The microprocessor utilizes an implicit acknowledge. The I/O device selected has the capability of overriding the acknowledge if the I/O wishes to halt the microprocessor or to slow the microprocessor down, such as in control problems which are due to an inability to respond in time.

The write sequence to an I/O device is similar to the read in that the microprocessor first presents the address out on the I/O bus. The write data is then presented to the I/O device and a clock line is provided which is a combination clock and acknowledge.

FIG. 13 is a block diagram of the line adapters 118 and 140 shown in FIGS. 5 and 6. The basic line adapter circuitry 186 is connected to the I/O bus leading to the microprocessors 62 and 130 shown in FIGS. 5 and 6. A clock extraction circuit 187 is connected to the line adapter 186. The line adapter 186 is connected through a line driver/receiver 188 to the first link of the twin axial bus 189. The line adapter 186 is connected through a line drive/receiver 190 which is connected to the second link of the twin axial bus 191. The line adapter 186 thus serves to control the line synchronization, polling, parity, address and encoding/decoding of the biphase-coded bit-serial data frames utilized by the system.

FIG. 14 is a more detailed electrical block diagram of the line adapter shown in FIG. 13. The clock extraction circuit 187 shown in FIG. 13 applies clock signals to a clock generator 192. The clock extraction circuit 187 is a standard biphase clock extractor. The output of the clock generator 192 comprises a clock and a clock divided by two signals which are applied to a control circuit 194. Control circuit 194 will be shown in greater detail in FIG. 15.

Control Circuit 194 generates the Cycle Steal Request Signal which is applied via signal line 196 to the I/O Bus Output 198. As is known, Cycle Steal transfer enables the microprocessor 62 (FIG. 5) to input data at a higher rate than the normal rate to storage. This technique, also called direct memory access, supplies the resources required for address and storage, handling byte counts, and the like without going through a programmed sequence of instructions for each transfer. This capability is provided within the microprocessors 62 and 130 (FIGS. 5 and 6).

The I/O bus 199 is received from one of the microprocessors 62 or 130 shown in FIGS. 5 and 6 and is applied to an I/O Bus Receiver 200. The I/O Bus Receiver 200 selects the Cycle Steal Enable signal generated by the microprocessor and supplies it to the control circuit 194 via signal line 202. The data applied on the external I/O bus 199 is converted by the I/O Bus Receiver 200 to an internal representation to enable the data to be input to a series of registers 204, 206, 208, 210 and 212. Registers 214 and 216 are also provided which have their outputs connected via a signal line 218 to the I/O Bus Output 198. Register 204 thus receives data while register 216 transmits data received from a conventional serializer/deserializer (serdes) 220 which comprises a 13 bit serial/parallel offloading shift register. In its parallel loading mode, the serdes 220 is loaded through a serdes funnel 222 which receives data from registers 204, 206, 208 and 210. In the serial mode of the serdes 220, the serdes 220 is loaded with data from either of the line driver/receivers 188 or 190 which are connected to a receiver multiplexer 224. The multiplexed data is presented through a biphase decoder 226 and loaded into the serdes 220. The output of the serdes 220 is applied to a biphase encoder 228 which supplies data to the respective line drivers.

The interrupt request generator 230 generates an interrupt request signal via signal line 231 for application to the I/O bus output 198. A real time clock 232 provides a signal to the generator 230 which causes a real time clock interrupt. The address decode/check circuit 236 also receives the output from the serdes 220. A serial parity generator/check circuit 238 is connected between the biphase decoder 226 and the biphase encoder 228, as illustrated. The output of the receiver multiplexer 224 is also applied to the clock extraction circuit 187.

As noted, when the serdes 220 is in its parallel mode, it is loaded from the serdes funnel 222 and then is offloaded to register 216 which in turn may load its content into register 214. A parity generate circuit 240 is connected to register 216 and via signal line 218 to the I/O bus output 198. When the serdes 220 is in the serial mode, it is loaded with data from either of the line driver/receivers 188 or 190 through the receiver multiplexer 224. The particular line driver/receiver 188 or 190 is selected from bits in register 208 and that selection information is placed in the biphase decoder 226 which decodes the information into a series of digital ones and zeros. This data is loaded serially into the serdes 220 and into the serial parity generator check circuit 238 to indicate that the serdes 220 is full. When the serdes 220 is full, this information is offloaded into register 216 and one portion of the serdes 220 is then diverted to the address decode/check circuit 236. The address decode/check circuit 236 checks the address of each received message and allows only those messages addressed to that particular station. When this data has been transmitted the station address is also placed in the serdes 220 for transmission to the primary media terminal to indicate which satellite the data is emanating from.

When data is being transmitted from the line adapter shown in FIG. 14, this information is applied through the serdes funnel 222 into the serdes 220. Address information generally comes from register 208 from which it is brought up to the biphase encoder 228 and transmitted. At the appropriate time, in the preferred embodiment of the present invention at the 13th bit of the frame, a parity bit from the serial parity generator/check circuit 238 is inserted into the frame and the biphase encoder 228 transmits the data via the line driver to the desired station.

FIG. 15 illustrates an electrical block diagram of the control circuit 194 shown in FIG. 14. The power on reset 250 generates a signal to be sent to the various portions of the control circuit 194 to produce an initial state for the control circuit 194. The receive sync machine 252 receives the signal from the receiver multiplexer 224 previously shown in FIG. 14 and detects a bit pattern on the input to achieve "message and bit synchronization". This synchronization information is then transferred to the sequence controller 254. When a full message has been decoded, the sequence controller 254 inquires from the received command decode 256 as to which type of message has been received.

There are three types of commands that are decoded and handled by the sequence controller 254. The messages include the poll, the read activate and the write activate which are illustrated as being generated from the received command decode 256 and applied to the sequence controller 254. When the sequence controller 254 receives a command, the command is placed in a buffer location in register 214 previously shown in FIG. 14. The sequence controller 254 will then signal the microprocessor that a command has been received. A transmit monitor 258 receives each of the transmissions made from the receiver multiplexer 224 shown in FIG. 14 and determines whether the transmission is properly going out. In case of a malfunction, the transmit monitor 258 applies the signal to register 212.

A delay counter 260 interconnected to sequence controller 254 has a first function of allowing sufficient time for turnaround of the system. When one terminal stops transmitting and another terminal starts to make a response, there must be a sufficient time for the line to quiesce and for reflections to die out. The delay counter 260 provides this time function by waiting 16 microseconds before the delay counter 260 allows the receivers 188 and 190 to be turned on after a transmission. The delay counter 260 also waits for 24 microseconds after reception is completed before the delay counter 260 turns on all the transmitters in order to make a response. In addition, the delay counter 260 produces a 4 microsecond series of pulses to the sequence control 254 which allows the sequence control 254 to generate the sync sequence. The sync sequence is provided to the biphase encoder 228 previously shown in FIG. 14. The sync sequence enables the receiving circuits and the receive sync machine 252 to become synchronized with the incoming messages.

A frame counter 262 interconnected to sequence controller 254 counts out the 16 bits for each transmission and denotes the time when the parity bit is to be inserted for each frame. A mode number counter 264 receives an input from register 210 (FIG. 14) and enables the sequence controller 254 to produce and fill frames in between each data frame. The mode number counter 264 counts the number of the filled frames which are inserted between data frames in order to slow down the line. The serdes clock generator 266 generates the clocks which are used to not only shift the serdes 220, one bit for each bit of incoming or outgoing bit, but also to create the load and unload timings which are necessary to load the serdes 220 from the appropriate register through the serdes funnel 222. The clock generated from the serdes clock generator 266 also creates the line necessary to offload the data from the serdes 220 to register 216 or register 214. The line driver/receiver control 268 receives an output from the sequence controller 254 to control the turning on of the line driver/receivers of the form 188 or 190 previously shown in FIG. 13. The control 268 also controls the turning on of receiver for the particular lines required.

Figure 16:
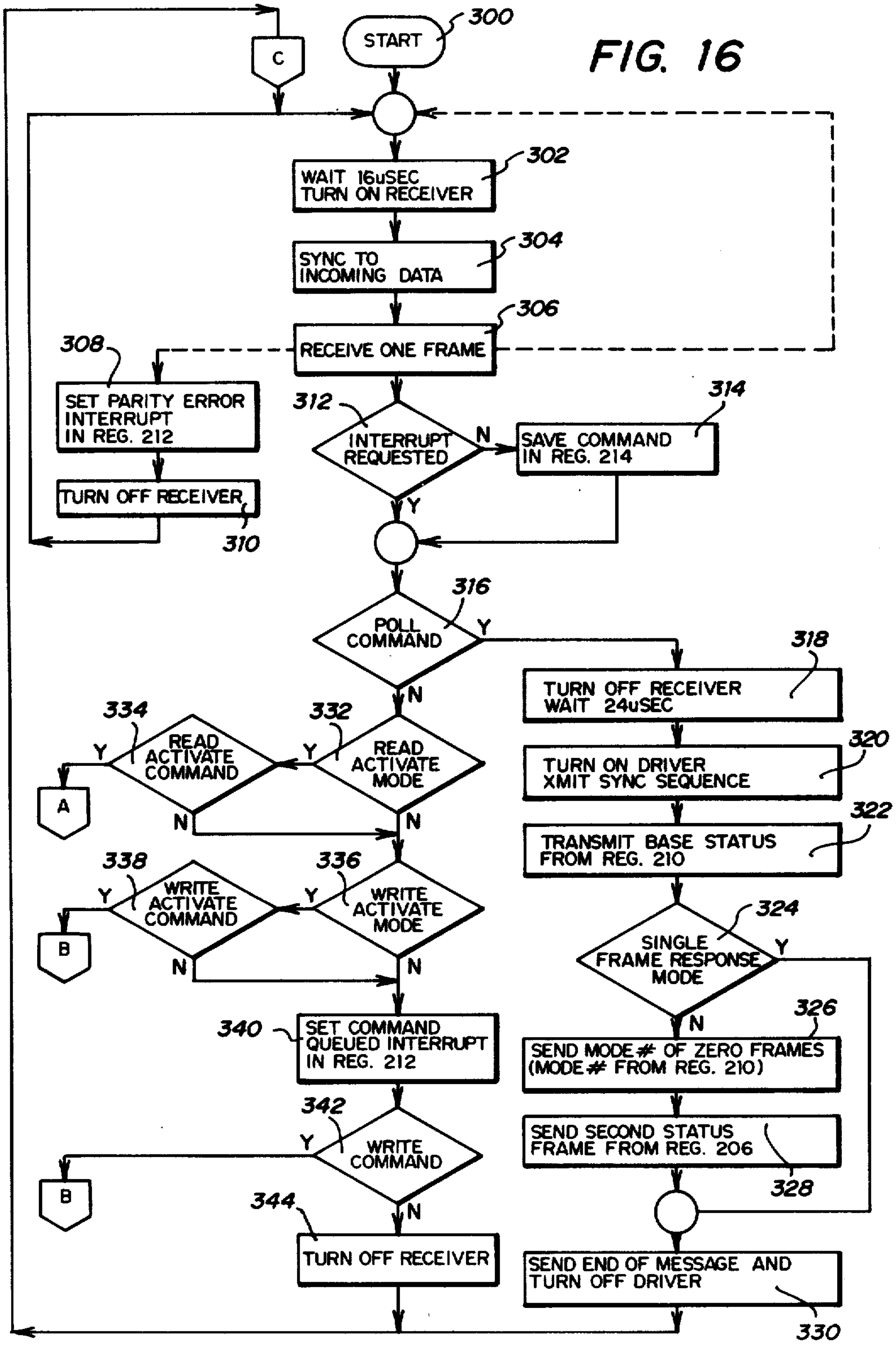
Figure 17:
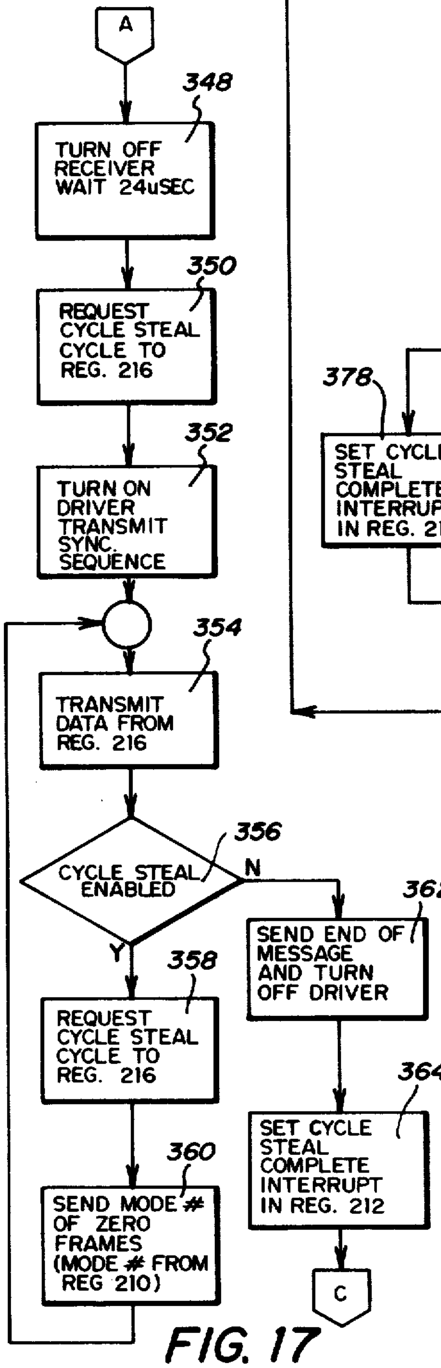
Figure 18:
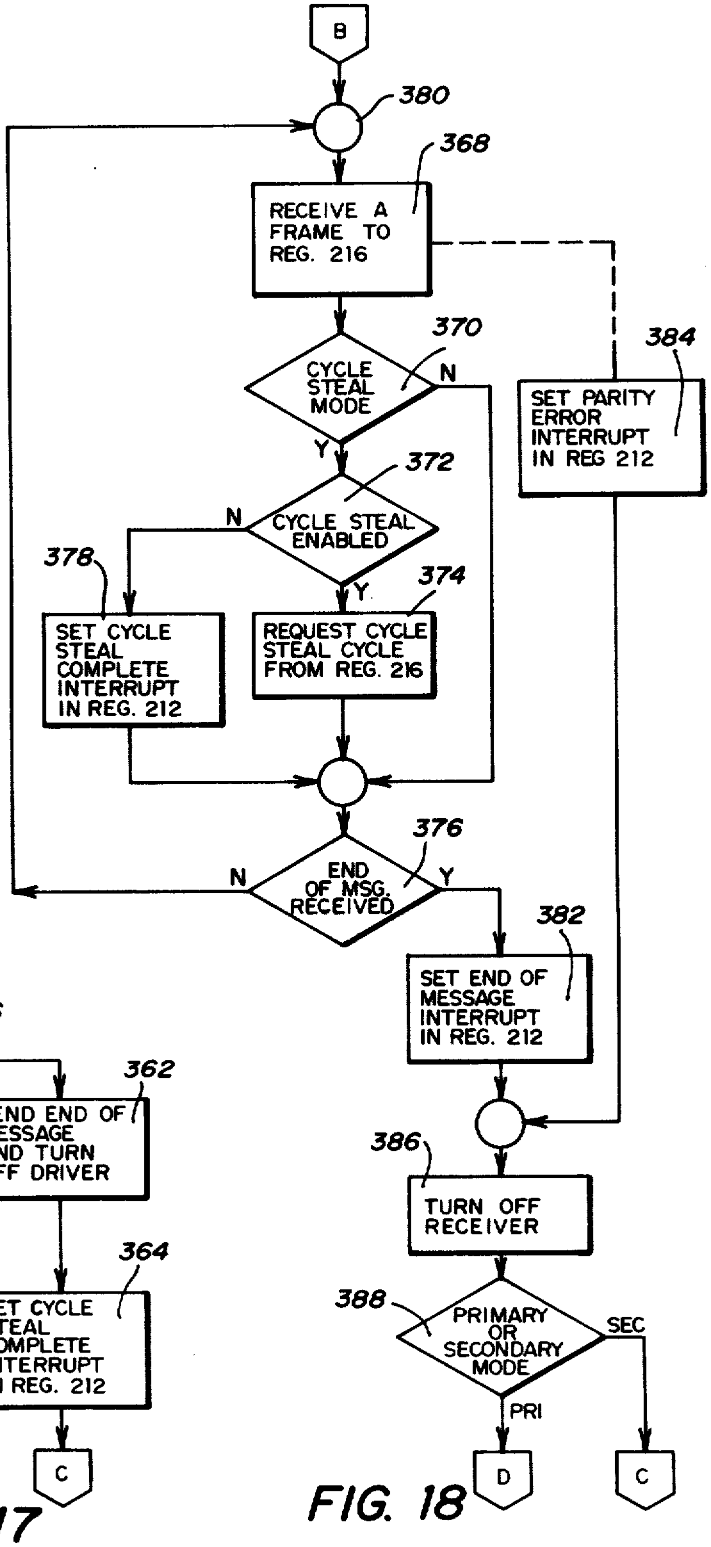
Figure 19:
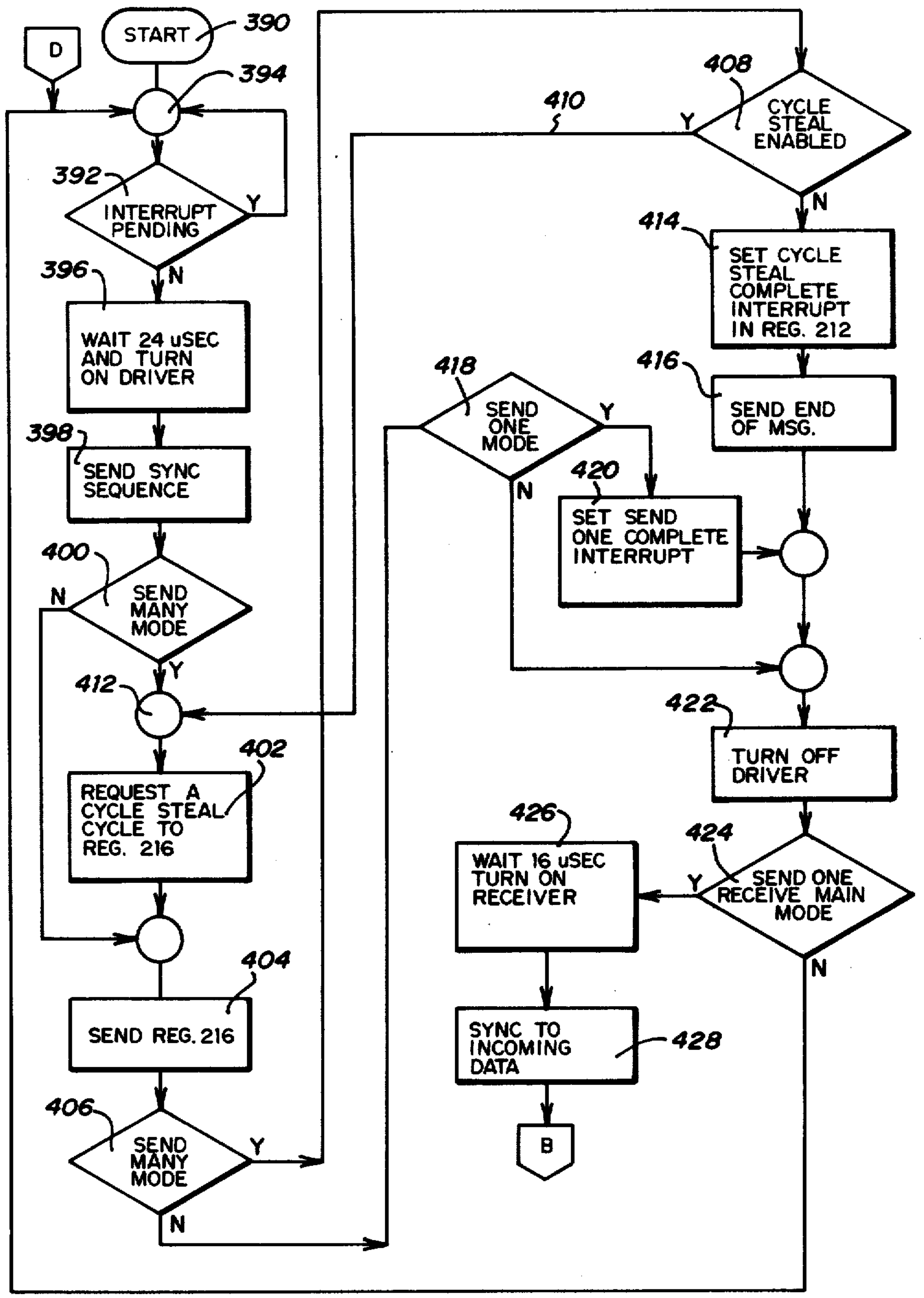

FIGS. 16–19 are flowcharts illustrating the operation of the line adapter circuitry shown in FIGS. 14 and 15. FIGS. 16–18 illustrate the operation of the line adapter in the secondary mode of operation while FIG. 19 illustrates the sequence of operation of the line adapter in the primary mode.

Referring to FIG. 16, the secondary mode sequence is initiated at the start 300. At 302, the system waits 16 microseconds before turning on the receiver. At 304 the system synchronizes to the incoming data in a "line active" that is set in register 212 (FIG. 14). One frame is received at 306 and if a station address mismatch is determined, the program is re-executed. If a parity error is detected, the parity error interrupt is set at 308 in register 212. The receiver is then turned off at 310 and the program re-executed.

After receiving one frame, if the station address is correct and if no parity error is detected, a decision is made at 312 as to whether or not an interrupt has been requested. If not, a command is generated to register 214 and is saved at 314. A decision is made at 316 as to whether or not a poll command is present. If so, the receiver is turned off at 318 and the system waits 24 microseconds before turning on a driver transmit sync sequence at 320. The base status is transmitted at 322 from the contents of register 210. A decision is made at 324 as to whether or not the system is in single frame respond mode. If not, a mode number is transmitted at 326 of zero frames which is the mode number from register 210. At 328, the second status of the frame is sent from the register 206. At 330, the end of message is sent and the driver is turned off and the loop reiterates (returns) to point C after start 300.

If the decision at decision step 316 is negative (no), the decision is made at 332 as to whether or not the system is in the read activate mode. If so, and a read activate command is present at 334, the flow chart moves to point A in FIG. 17 to be subsequently described.

If the read activate mode is not present at 322, the decision is made at 336 as to whether or not the write activate mode is present. If so, and the write activate command is present at 338, the flowchart moves to point B in FIG. 18 to be subsequently described. If the write activate mode is not present at 336, the command queued interrupt is set at 340 in register 212. If a write command is present at 342, the flowchart moves to point B in FIG. 18. If the write command is not present, the receiver is turned off at 344 and the system reiterates to point C after start 300.

FIG. 17 illustrates that the receiver is turned off at 348 and a wait of 24 microseconds is initiated. At 350, the cycle steal is requested to register 216. At 352, the driver transmit sync sequence is turned on and at 354 data is transmitted from the register 216. A decision is made at 356 as to whether or not a cycle steal is enabled.

The media microprocessor 62 shown in FIG. 5 includes a cycle steal enable line which indicates that additional cycle steal operations are allowable in the sequence of operations. If no more cycle steals are allowable, the system will stop transmitting or receiving data. If additional cycle steals are allowable, the cycle steal request is generated which will be honored by the media microprocessor 62.

The request cycle steal cycle to register 216 is made at 358 and the mode number of zero frame is transmitted at 360 from register 210. If this cycle steal is not enabled at 356, the end of message is transmitted at 362 and the driver is turned off. The cycle steal complete interrupt is set at 364 in register 212 and the cycle reiterates to FIG. 16 at point C.

FIG. 18 illustrates at 368 the reception of a frame to register 216. The base cycle steal mode is available at 370. A decision is made at 372 as to whether or not the cycle steal mode has been enabled. If so, the cycle steal is requested from register 216 at 374. If the cycle steal mode is not available at 370, a decision is made at 376 as to whether or not an end of message has been received. If the cycle steal is not enabled at 372, the cycle steal complete interrupt is set at 378 in register 212. If the end of message has not been received, the flowchart reiterates to a combination point 380 below point B. If the end of message is received at 376, the end of message interrupt is set at 382 in register 212. If a parity error is detected at 368, the parity error interrupt is set at 384 in register 212. The receiver is turned off at 386 and the decision is made at 388 as to whether or not the system is in the primary or the secondary mode and the program continues at either point D or point C.

Referring to FIG. 19, the flow diagram of operation in the primary mode is illustrated. The program is initiated at 390 and a decision is made at 392 as to whether or not an interrupt is pending. If so, the system moves back to combination point 394. If no interrupt is pending at 392, the system waits 24 microseconds at 396 and then turns on the driver. The sync sequence is sent at 398 and a decision is made at 400 as to whether a many mode has been sent. If so, a cycle steal cycle is requested at 402 to register 216. The data from register 216 is sent at 404 and a many mode decision is again made at 406.

If a many mode is sent, the decision is made at 408 as to whether or not the cycle steal is enabled. If yes, the program reiterates via line 410 to combination point 412. If not, the cycle steal complete interrupt is set in register 212 at 414. The end of message is sent at 416.

If many mode has not been sent at 406, the decision is made at 418 as to whether or not one mode has been sent. If yes, a send one complete interrupt is set at 420. The driver is turned off at 422 and the decision is made at 424 as to whether one received main mode has been sent. If yes, 16 microseconds are waited before turning on the receiver at 426. The sync to the incoming data is made at 428 and the program reiterates to point B in FIG. 18. If one received mode is not sent at 424, the system reiterates to point 394. At 428, in order to sync to incoming data, the indication "line active" is set in register 212. At point B, if the station address mismatch occurs in the first frame, the "address mismatch" interrupt is set in register 212.

FIG. 20 illustrates a somewhat diagrammatic view of a diskette 450 for use with the present invention. As is well known, the diskette comprises a flexible magnetic disk that is permanently enclosed in a protective jacket. The disk and jacket assembly, termed the diskette, may be manually inserted and removed from a read and write mechanism located in the terminals of the invention as shown in FIG. 1.

The diskette 450 as shown in FIG. 20 contains four discrete data sets. The first data set is termed the LIBR, or the device micro code program library and contains a paging index and paged function or application programs and user-defined tables. This library contains the various routines and tables for controlling the basic operation of the present system. Certain of the programs are paged when requested and executed in the RAM storage space previously described.

The diskette 450 also includes an area entitled CRCK, or negative credit file exchange data set. In addition, the diskette 450 includes a PRLU, or a price look-up file exchange data set. The CRCK and PRLU store data for additional exchange with a host digital processor. Finally, the diskette 450 includes a TLOG, or transaction log exchange date set, which comprises the basic data captured resulting from entering of transactions and the like through the terminals. The TLOG contains the necessary information which must be communicated between the point-of-sale terminals of the invention and the ultimate data processing system. The diskette 450 may be removed from the terminals and carried or mailed to a remote location wherein the data may be processed by a data processing system. Alternatively, as previously noted, the contents of the transaction of the TLOG may be directly transmitted from the terminal to a host central data processor by known data communications methods and protocols.

FIG. 21 is a simplified somewhat diagrammatic view of a media terminal illustrating data flow in both the primary mode and in the secondary mode of operation. Like numerals are used for like and corresponding parts of the system previously identified in FIG. 5. Hence, the local satellite microprocessor 60 is indicated as being connected to the input keyboard 74. The microprocessor 60 is connected via a data bus to the storage 460. It will be understood that storage 460 comprises the private and common storage provided by the RAM's 80, 84 and 98 and ROS's 82 and 100 which are shown in FIG. 5. The media microprocessor 62 is also connected by a data bus to the storage 460. The diskette 116 is connected to the media microprocessor 62. The line adapter 118 is connected to the media microprocessor 62 and is connected via the twin axial bus 462 to remaining cluster satellite terminals in the manner previously described.

The data path when the media terminal shown in FIG. 21 is in the primary mode is indicated by a dashed line. The data path when the media terminal is in the secondary mode of operation is indicated by the dotted line.

When the media terminal is in the primary mode of operation, the diskette 116 serves as the permanent memory for the entire cluster of terminals, including the primary media terminal. Consequently, data coming from satellite terminals is applied through the media microprocessor 62 for storage on the diskette 116 via the data path 464. In addition, data is supplied to the diskette 116 from the keyboard 74 through the local satellite microprocessor 60 and through the media microprocessor 62 via the data path 464. The interfacing hardware of the system masks from the media microprocessor 62 the fact of whether data being transmitted to diskette 116 is coming from a remote satellite or from the local satelite processor 60.

When the system is in the primary mode, the media microprocessor 62 periodically polls the satellite terminals via the line adapter 18 to determine whether or not each satellite terminal has data which needs to be transmitted to the diskette 116. The media microprocessor 62 also periodically polls the local satellite microprocessor 60 in order to receive data input from the keyboard 74 for temporary storage in the storage 460.

In addition to data entered through the keyboard 74 and through the keyboards of the other satellite terminals, media microprocessor 62 handles paging requests for various programs and data tables stored in the diskette 116. For example, assuming a remote satellite terminal is changing from a sales mode to a total readout, the total readout program stored in the diskette 116 is requested by the satellite terminal and is then sent from the media microprocessor 62 through the line adapter 118 to the satellite terminal, wherein the program is loaded into the satellite terminal's memory in order to perform the desired function. At the same time, requests can be made from the local satellite microprocessor 60. In addition, the local satellite microprocessor 60 may request that the diskette 116 be changed.

When the media terminal shown in FIG. 21 is being operated in the secondary mode, the primary control functions of the media station have been transferred to another media station. When the media station is in the secondary mode, the system does not utilize the diskette 116 but acts in a similar manner to the remaining satellite terminals. In this mode, data is transmitted from the keyboard 74 through the local satelite microprocessor 60 to the storage 460. When the terminal is polled, data is transmitted from the storage 460 through the media microprocessor 62 and through the line adapter 118 to the primary media station for storage on the diskette located at that remote station.

When the media microprocessor 62 is in the secondary mode, it no longer polls addresses for satellite terminals but does poll the local satellite microprocessor 60. When the media microprocessor 62 detects a request from the local satellite microprocessor of available data, the media microprocessor 62 makes a request on the cable 462 in a similar manner as other satellite terminals. When the media microprocessor at the primary media terminal sees the request from the media microprocessor 62, that request would be detected and the sequence of commands would then be executed in order to pick up the data from the storage 460.

When the media microprocessor 62 is in the secondary mode, it functions to make two types of requests to the keyboard 74. The first request is a keyboard read command for prompting the operator for specific information, such as, for example, the date or time. Media microprocessor 62 would issue to keyboard 74 a read command to unlock the keyboard 74 for operator entry. This command overrides any command being routed to keyboard 74 from the local satellite so that the media station request for information gets serviced immediately. The local satellite is then allowed to turn again to keyboard 74 input data.

The second type of request in the media microprocessor 62 secondary mode is a wait for action code request. This wait request is made of the keyboard 74 whenever the media station has not made a direct request to the keyboard 74 in the form of a keyboard unlock type request. The wait for action code request instructs keyboard 74 to service any local satellite keyboard request until the key sequence action code key 59 and the numeral 9 key (FIG. 4) are depressed on keyboard 74. This key sequence alerts the media station to initiate a regular enable keyboard command to request the required additional information to switch from the secondary to the primary operating mode. The wait for action code request does not interfere with the keyboard processing in that local satellites are serviced in the normal manner; however, when the action code 9 request is made by the operator, that request is routed to the media microprocessor 62 which then issues a direct request to the keyboard for an unlock and prompts the operator for information regarding the mode change.

FIG. 22 illustrates the relationship of various portions of the microcode programs of the present invention in association with the control of various portions of the circuitry of the invention. The local satellite application code 480 provides control from the local satellite microprocessor to the various I/O devices, the LKIO subroutine 484 is used to perform I/O operations on the keyboard/display 482 of the timer. The LKIO subroutine 484 performs I/O operations for the keyboard, the transaction display, the customer display, audible alarm, drum prompt which provides prompting instructions to the operator in front of the terminal, time of day clock, security lock, hard counters and machine type indicators. Similarly, the printer 486 is controlled by the subroutine LPIO 488. The LPIO subroutine 488 also controls operation on the cash drawer utilized with the timer.

The virtual keyboard/display I/O control, termed VKIO 490, comprises a portion of the media application code 492 and operates to accept request for keyboard-/display operations and passes the request to the local satellite or satellite terminal for processing. The virtual printer I/O control subroutine, termed VPIO 494, is also a portion of the media application code 492 and accepts request for printer or cash drawer operations in a media feature and passes the request to the local satellite terminal for processing.

The virtual file I/O block, VFIO 495, is associated with the virtual secondary intermachine adapter subroutine, hereinafter termed VSIA 496, which accepts requests and passes a request directly to the integral media feature for processing. The primary intermachine adapter I/O control subroutine, termed PIA 498, is used to perform requested I/O operations on the intermachine adapter hardware (IMA) or line adapter IMA 500. The PIA subroutine accepts requests from the VSIA in the local satellite application code 480. The PIA 498 is operable to provide the primary media mode of operation previously noted.

The virtual secondary intermachine adapter I/O control subroutine, termed SIAM 502, accepts requests and passes the request directly to the integral media feature for processing in the satellite second mode of operation. The diskette I/O subroutine, termed PIO 504, serves to perform I/O operations in the diskette file 506.

FIG. 22 also illustrates the interrelation of the various subroutines in the operation of the present terminal when used in the remote satellite mode of operation. In this mode of operation, the keyboard display 520 is controlled by the keyboard I/O subroutine, termed KYIO 522, which comprises a portion of the remote satellite application code 523. The printer 524 has its operation and request handled by a printer I/O program subroutine 526. A secondary intermachine adapter subroutine, termed SIA 528, interrelates with the IMA hardware, or line adapter IMA, 530. In the mode of operation as a satellite station, the IMA program 532 interrelates with a second media station 534 in the manner previously described.

In addition to responding to the I/O request as noted above, the code of the invention also includes other subroutines which perform such functions as paper advance of the printer, log out, diskette reset and control, light emitting diode (LED) control, and the like. The LED's provide an indication to the operator of log out functions when displays of various error logs and the like are displayed. The LED's also provide operator indication of diskette availability. The diskette reset function is a logic restart of the RAM programs. In operation, the diskette reset function is caused to initiate by removing the diskette without application program acknowledgement. The LED's are also utilized to display internal machine errors and malfunctions and the like.

Many of the subroutines for use with the present invention are stored in the ROS memory shown in FIG. 5. A program accesses a ROS subroutine by executing a special instruction to the microprocessor termed the supervisor call, denoted by the mnemonic SVC. An SVC instruction, which is in the afore-mentioned System/3 instruction set, is a 1-byte unconditional branch instruction. A request code byte immediately following the SVC identifies the call subroutine. Memory in the RAM allocated fo use in subroutine linkage is in the form of a stack of eight 8-byte entries. The stack, termed CCSTK, has a stack pointer defined as CCSPTR which is used to indicate the active stack entry. CCSPTR points to the left-most byte of an 8-byte stack entry.

Execution of the SVC causes control to be passed to a ROS linkage routine which saves 7 bytes of information pertaining to the calling program. Prior to entry of the 7 stack bytes, the stack pointer is updated to point at the next stack entry location. Control is then passed to a routing routine which branches to the target subroutine based on the request code byte. The branch address is determined by searching a RAM table from a RAM shown in FIG. 5 which is addressed or the request code value. If found, and associated branch address and parameter list length are then used. If not found, the branch address and parameter list length associated with the request code in a ROS table are used. The parameter list length is saved in the stack entry in the 8-byte location. Prior to the branch to the target subroutine, the bytes in the stack entry are then used to restore the XR1 and ARR registers with their values at the time the SVC was executed. One of the registers, XR2, is loaded with the address of the parameter list for the subroutine, or the bytes following the SVC. (XR1, XR2 and ARR are the names of System/3 registers, and therefore of their counterparts in the microprocessors 60 and 62.)

The target subroutine then executes and returns to the calling program via a return linkage subroutine. Multiple entry points are defined for the return linkage subroutine to support variation on return branching and restoring of index register from the stack.

Entry points in the return linkage subroutine cause the return branch address to be developed from the saved registers' values and parameter list length byte. One entry point returns by branching via the address contained in register XR2. In some instances, a single SVC may be used to initiate processing of a series of subroutine requests. This capability is termed chaining and is indicated in the request code byte by a "1" in bit 0. All of the request codes except the last one in the chain must have the chaining bit on.

A conventionally organized multi-level interrupt-handler routine INTRH receives control whenever an interrupt signal is received from an I/O device. An interrupt also occurs when power is first applied to the system. The INTRH routine decodes the interrupt, saves the system status and directs control to specific microcode routines for processing the interrupt.

The ROS subroutines are utilized to support I/O operations, data manipulation, calculations and general processing of terminal functions. These subroutines are of conventional types and are mostly directed to routine data manipulation, and will therefore not be discussed in detail. Other routines which are commonly or frequently performed are also stored in the RAM shown in FIG. 5. Linkage to these subroutines is subroutine specific, not following the subroutine access method described for ROS Subroutines.

In the following discussion of subroutines according to the invention, the first two characters of a microcode name being XX indicates a ROS subroutine, while the first two characters on the microcode name being YY indicates a RAM subroutine.

FIG. 23 illustrates the frame format for use with the XXPIA primary intermachine adapter subroutine. As can be seen, bit 0–3 of the 16-bit frame comprise a fill frame. The third bit comprises the parity bit. The bits 4–6 comprise the address or destination frame. Bits 7-14 comprise the command or data frame, while bit 15 comprises the sync frame.

FIGS. 24–28 comprise sequence diagrams of various command sequences in the XXPIA subroutine. Referring to FIG. 24, the media terminal commands are shown on the upper portion of the diagram, while satellite commands are shown on the lower portion of the diagram. A media satellite periodically polls the line to determine if there is any traffic required to be directed on the line. A poll is then taken by the media signal as indicated at 550. The poll is indicated in one byte or frame. The satellite station responds to the poll by a status indication at 552 which comprises two frames of status data. The poll is then followed by a command from the media terminal, termed a READ command, indicating that the I/O control block from the satellite should be read. The media terminal then generates another poll and the satellite generates a NOT BUSY status command response. The media terminal then generates an ACTIVATE READ command and N frames of VFIO control block data is transmitted from the satellite terminal. The VFIO control block data frames are related to the VSIA subroutine 496 shown in FIG. 22. The media terminal again generates a poll (virtual file I/O control block) and the satellite terminal response with a NOT BUSY status command response to terminate the READ IOB command sequence.

In some cases, the VFIO control block is transferred in the READ IOB command sequence as shown in FIG. 24, invokes the transfer of a program stored in the diskette memory media terminal to the satellite terminal. The paged microcode is transferred from the diskette file of the media terminal through the PIA subroutine 498 into the IMA hardware 500 over the twin axial bus and through the IMA hardware 530 to the SIA subroutine 528 as shown in FIG. 22. The program is then applied to the memory of the satellite for performance of the desired function. The READ IOB sequence provides the addresses within the diskette for the desired program. The media terminal then digests that address information, obtains the desired program from the diskette and initiates a sequence termed WRITE DATA on the line via the PIA and IMA hardware shown in FIG. 22.

The WRITE DATA command sequence is illustrated in FIG. 25 and is initiated by a WRITE DATA command 554 generated from the media terminal. Following the WRITE DATA command is one frame of a poll command which is followed by two frames of a status NOT BUSY from the satellite terminal. An ACTIVATE WRITE command is then initiated from the media terminal followed by N frames of data from the media terminal. The data frames are written into the memory of the satellite terminal. The media terminal then applies a one frame poll and a NOT BUSY status command response from the satellite terminal terminates the WRITE DATA command sequence.

In some cases, the VRIO control block data frames shown in FIG. 24 indicate that the satellite terminal has data to be read into and stored on the media terminal's diskette, such as transaction log record or the like. The READ DATA sequence is shown in FIG. 26, and is initiated by a READ DATA command 556 generated from the media terminal. At the next poll from the media terminal, the satellite terminal responds with a NOT BUSY status response. The media terminal then generates the ACTIVATE READ command and the satellite terminal responds with N frames of READ DATA. For example, in the case of transaction log records, well over 100 frames of READ DATA could be transmitted to the media terminal at this point. A poll from the media terminal would then result in a NOT BUSY status response from the satellite terminal indicating that the READ DATA command sequence was complete.

In order to complete the sequence just described, the control block data frames must be updated and transmitted back to the satellite terminal. This sequence is accomplished by the WRITE IOB command sequence shown in FIG. 27. This command sequence means tht the VFIO control block data frames go back to the satellite terminal from which they originated with updated new addresses of the file and any additional updated data required such that the control block data frames are in the current state for subsequent use for the next operation satellite terminal device to perform. The WRITE IOB sequence as shown in FIG. 27 is initiated by a WRITE command generated at 558 by the media terminal. Upon the next poll from the media terminal, the satellite terminal provides a NOT BUSY status command response. The ACTIVATE WRITE command is then generated from the media terminal, followed by N frames of VFIO/CB updated data. This updated data is then stored in the satellite terminal for subsequent use. Following the next poll from the media terminal, the satellite responds with a NOT BUSY status response to terminate the WRITE IOB command sequence.

When a satellite terminal comes up from an off state, the media terminal assigns a specific address to the satellite terminal. FIG. 28 illustrates the assignment of the address. The polling sequence is initiated by the poll at 560 from the media terminal followed by a POWER ON TRANSIENT response from the satellite terminal. The SET ADDRESS command is generated from the media terminal and is terminated by a NEW ADDRESS poll subsequently generated by the media terminal which comprises the new address for storage in the satellite terminal.

The SET ADDRESS portion of the command sequence is terminated by a NOT BUSY status command response generated from the satellite terminal. A set mode sequence is initiated by a SET MODE command from the media terminal which indicates the desired mode of operation. The set mode sequence is terminated by a poll from the media followed by a NOT BUSY status command from the satellite terminal.

FIG. 29 comprises a diagram of the PIA control block. The PIA subroutine 498 was indicated in FIG. 22. The control block PIA as shown in FIG. 29 provides the communicating linkage between the primary operations mode microcode of the system and the XXPIA subroutine. As can be seen, the PIA control block comprises 15 bytes 0–E, each of which comprises 8 bits which may be numbered 0–7 from left to right. Description of the bits of the XXPIA control block shown in FIG. 29 follows.

As noted, the media terminal primary intermachine adapter I/O subroutine, termed XXPIA, is used by the media feature to perform I/O operations on the intermachine adapter as a primary terminal. The address of the primary intermachine adapter control block must be loaded into register XR1 prior to the call of XXPIA. XXPIA resets the status bits in the control block byte 0 as shown in FIG. 29 prior to performing the requested operation.

The line adapter and the I/O control subroutine XXPIA form the link between the media and satellite terminals shown in FIGS. 1–3. XXPIA provides primary station control facilities over the line adapter hardware. XXPIA responds to application requests that are to control the various terminals of the system. This enables the sending of data to or from any satellite in the system including the local satellite. FIG. 22, previously described, illustrates the relationship between XXPIA and other I/O subroutines and the line adapter hardware. Referring to FIG. 29, the various bits of the XXPIA control block comprise the following:

Byte 0 Bits 0–3—X'C'—Device ID—Set up in the control block to identify it as an XXPIA control block.

Byte 0 Bit 4—UC—Unit Check—Set with device ebd (DE) to indicate an XXPIA detected failure. Unit check indicates that an error code in byte 5 describes the error condition.

Byte 0 Bit 5—SE—Satellite Exception—Set with device end (DE) to indicate a satellite detected exception condition has been reported. The specific satellite exception condition is indicated in "station" status byte '1'" (control block byte 8).

Byte 0 Bit 6—DE—Device End—Set by the I/O control code when the I/O request has been serviced. DE may be set with UC, SE, or UE to indicate an exception completion. Only one exception bit may be set with DE.

Byte 0 Bit 7—UE—Unit Exception—Set with device end to indicate that some condition set in byte 6 has been detected.

UE is used when a satellite station does not respond to a command, ie, terminal is offline. In this situation, byte 6, bit 7 is set. This exception condition is reported only after the I/O control code has retried the operation that received no response sufficiently to ensure that the terminal is offline.

Byte 1—Command Byte 0—Specifies the operation that is to be performed. The valid command byte values are described below. Line frame formats are specified in the following Table I.

TABLE I

| Frame \ Bit | 0 1 2 3 4 5 6 7 8 9 10 11 12 13 14 15 |
|---|---|
| SET MODE | 0 0 0 X G-POST 0 0 0 1 0 0 1 1 1 |
| | FILL P ADDR S |
| SET ADDRESS | 0 0 0 X / / / X X X 0 0 1 0 0 1 |
| | FILL P POT ADDR NEW ADDR S |
| RESET | 0 0 0 X G-POST 0 0 0 0 0 0 1 0 1 |
| | FILL P ADDR S |
| MODE CONTROL | 0 0 0 X / / / X X X X X 0 0 0 1 |
| | FILL P FILL COUNT S |

TABLE I-continued

| Frame \ Bit | 0 1 2 3 4 5 6 7 8 9 10 11 12 13 14 15 |
|---|---|
| READ DEVICE | 0 0 0 X G-POST X X X 0 1 1 0 0 1 |
| ID | FILL P ADDR QUEUE S |
| ACTIVATE | 0 0 0 X G-POST 0 0 0 0 0 0 0 0 1 |
| READ | FILL P ADDR S |
| ACTIVATE | 0 0 0 X G-POST 0 0 0 0 0 0 0 1 1 |
| WRITE | FILL P ADDR S |
| ID | 0 0 0 X / / / X X X X X X X X 1 |
| RESPONSE | FILL P ID DATA S |
| READ IOB | 0 0 0 X G-POST X X X 0 1 0 0 0 1 |
| | FILL P ADDR QUEUE S |
| READ | 0 0 0 X G-POST X X X X X X X X 1 |
| RESPONSE | FILL P ADDR READ DATA S |
| READ BUFFER | 0 0 0 X G-POST X X X 1 1 0 0 0 1 |
| | FILL P ADDR QUEUE S |
| WRITE IOB | 0 0 0 X G-POST X X X 0 1 1 1 0 1 |
| | FILL P ADDR QUEUE S |
| WRITE DATA | 0 0 0 X G-POST X X X X X X X X 1 |
| | FILL P ADDR DATA BYTE S |
| WRITE BUFFER | 0 0 0 X G-POST X X X 1 1 1 1 0 1 |
| | FILL P ADDR QUEUE S |
| POLL | 0 0 0 X G-POST 0 0 0 1 0 0 0 0 1 |
| | FILL P ADDR S |
| POLL ACK | 0 0 0 X G-POST 0 0 1 1 0 0 0 0 1 |
| | FILL P ADDR S |
| POLL RESET | 0 0 0 X G-POST 0 1 0 1 0 0 0 0 1 |
| | FILL P ADDR S |
| POLL | 0 0 0 X G-POST X X X X X X X X 1 |
| RESPONSE 1 | FILL P ADDR STATUS BYTE 1 S |
| POLL | 0 0 0 X / / / X X X X X X X X 1 |
| RESPONSE 2 | FILL P STATUS BYTE 2 S |
| CLEAR | 0 0 0 X G-POST X X X 1 0 0 1 0 1 |
| | FILL P ADDR QUEUE S |
| RESET IMA | 0 0 0 X G-POST 0 0 1 0 0 0 1 0 1 |
| | FILL P ADDR S |

Data is transmitted bit 15 first

P = Even parity on bits 3–15

S = Sync = 1

G-POST ADDR = The 3-bit address of a specific (general point-of-sale) terminal in the cluster Referring to Table I, X' 01' Command—Set Mode—initiates a set mode sequence.

A set mode command frame is transmitted to the addressed terminal station followed by a mode control byte frame. The fill count field (bits 7–11) in the mode control byte frame is supplied by the application. Bits 3–7 in the byte pointed to by the data address control block field contains the fill count. The fill count specifies in binary the number of times an 8-bit fill byte (X'00') is repeated between consecutive frames. Since only 16-bit frames are sent, the fill count must be even. An odd specification will be rounded up by one. The present terminals run at full speed, therefore, the fill count is X'00'. Following the transmission of the mode control byte frame, XXPIA will poll the addressed secondary station until NON BUSY status is returned. The last status bytes received are stored in control block bytes 8 and 9. The set mode command is used in the power on transition sequence. Device end is set when the set mode sequence is complete. The set mode command cannot be issued to the local satellite (address X'00').

X'02' Command—Set Address—Initiates a set address sequence.

A set address command frame is transmitted on the port specified by a function or application program in bits 3 and 4 in control block byte 7. Station address X'7' appears in bits 5–7, Table I. The address assigned (frame bits 7, 8 and 9) is specified in bits 0, 1 and 2 in control block byte A. Following the transmission of the set address command frame, XXPIA will poll the new address until NON BUSY status is returned. The last status bytes received are stored in control block bytes 8 and 9.

If the addressed secondary station does not respond to the poll for NON BUSY status or a parity error is detected on the response to the poll, XXPIA will transmit a reset IMA command to the address just assigned. XXPIA will then poll address X'7' until power on transition status is returned. When power on transition status is returned, XXPIA will transmit a set of address command and the above sequence will be repeated. If a parity error is detected on the response from address X'7', a reset IMA command is transmitted to address X'7' and address X'7' is polled for power on transition status. XXPIA retries the set address sequence for up to 5 seconds before error status is reported to the application.

The set address command assigns an address to the secondary station on the addressed line that most recently transmitted power on transition status. The first nonbusy poll response following a set address command must be a power on transition response. The set address command is used in the power on transition sequence. Device end is set when the set address sequence is complete. The set address command cannot be issued to the local satellite (address X'00').

X'03' Command—Reset—Initiates a reset satellite station command sequence.

A reset command frame is transmitted to the addressed secondary station. Following the transmission of the set address command frame, XXPIA will poll the addressed secondary station until non busy status is returned or there is no response. The last status bytes received are stored in control block bytes 8 and 9. When a secondary station receives a reset command, it will operate as it does following a power on reset. The reset command is used for error recovery purposes. Device end is set when the reset sequence is complete.

X'04' Command—Read ID—Initiates a read ID sequence.

The one byte ID received from the satellite station is stored at the address contained in control block bytes 3 and 4. A read device ID command frame is transmitted to the addressed secondary station. The queue frame field (bits 7, 8 and 9) is supplied by the application in control block byte A bits 0, 1 and 2. The queue field in a read device ID frame is currently ignored by a satellite terminal. Following the transmission of the read device ID command, XXPIA will poll the addressed terminal until non busy status is returned.

When non busy status is returned, XXPIA transmits an activate read command frame to the addressed terminal. The addressed terminal will return an ID respoonse frame to XXPIA. XXPIA will move the data portion of the ID response (bits 7-14) to the address pointed to by control block bytes 3 and 4. Following receipt of the ID response, XXPIA will poll the addressed terminal until non busy status is received. The last status bytes received are stored in control block bytes 8 and 9.

The read ID command can be used to identify the type of terminal that has just powered on. A terminal satellite is identified by the code X'78'. A media station operating in media secondary mode is identified by the code X'79'. The read device ID command is used in the power on transition sequence.

X'05' Command—Read IOB—Initiates a read IOB sequence.

A read IOB command frame is transmitted to the addressed secondary station. The queue frame field (bits 7, 8 and 9) is supplied by the application in control block byte A bits 0, 1 and 2. The queue field specifies to a secondary station the specific IOB that is to be transmitted to the primary station.

Following the transmission of the read IOB command, XXPIA will poll the addressed terminal until non busy status is returned. When non busy status is returned, XXPIA transmits an activate read command frame to the addressed terminal. The addressed terminal will return multiple read response frames each containing a byte of IOB data until the entire IOB is transmitted. The last read response frame will have the G-POST address field (bits 4, 5 and 6) set to 111. As each byte is received, it is placed by XXPIA sequentially in ascending memory locations starting at the data address in control block bytes 3 and 4.

Therefore, a copy of the IOB that was pointed to by the queued XXSIA, YYSIAM, or XXVSIA request in the secondary station would appear in the media features memory starting at the data address. Following receipt of the IOB, XXPIA will poll the addressed terminal until non busy status is received. The last status bytes received are stored in control block bytes 8 and 9. Note that it is not the XXSIA, YYSIAM, or XXVSIA IOB that is transmitted but the IOB that is pointed to by the XXSIA, YYSIAM, or XXVSIA IOB.

The read IOB command is used in the poll service routine. The read IOB is issued to determine the type of service a terminal is requesting. A read IOB command causes the data buffer pointer in the addressed satellite to be set to the beginning of the data buffer. Any subsequent read or write commands will cause data to be transferred starting at the beginning of the data buffer. The resetting effect of the read IOB command is used during error recovery to retransmit the contents of the data buffer.

X'06' Command—Read Buffer—Initiates a read buffer sequence.

A read buffer command frame is transmitted to the addressed secondary station. The queue frame field (bits 7, 8 and 9) is supplied by the application in control block byte A bits 0, 1 and 2. The queue field specifies to a secondary station the IOB whose associated data is to be transmitted.

Following the transmission of the read buffer command, XXPIA will poll the addressed terminal until non busy status is returned. When non busy status is returned, XXPIA transmits an activate read command frame to the addressed terminal. The addressed terminal will return multiple read response frames each containing a byte of buffer data until one transmission block is transmitted. The last read response frame in a block will have the address field (bits 4, 5 and 6) set to 111.

As each byte is received, it is placed by XXPIA sequentially in ascending memory locations starting at the data address in control block bytes 3 and 4. Following receipt of the buffer data, XXPIA will poll the addressed terminal until non busy status is received. The last status bytes received are stored in control block bytes 8 and 9. The read buffer command is used in the poll service routine. When a request is determined to be of a "write" type (ie, data transferred from secondary to primary) a read buffer command is issued to transfer the data. One read buffer command is required for each block of data to be transmitted from secondary to primary station (see XXSIA).

X'07' Command—Write IOB—Initiates a write IOB sequence.

A write IOB command frame is transmitted to the addressed secondary station. The queue frame field (bits 7, 8 and 9) is supplied by the application in control block byte A bits 0, 1 and 2. The queue field specifies to a secondary station the IOB that will be transmitted by the media station. Following the transmission of the write IOB command, XXPIA will poll the addressed terminal until non busy status is returned. When non busy status is returned, XXPIA transmits an activate write command frame to the addressed terminal.

XXPIA will then transmit multiple write data frames each containing a byte of IOB data until the entire IOB is transmitted. The last write data frame will have the address field (bits 4, 5 and 6) set to 111. The leftmost byte of the IOB to transmit is stored at the address in control block bytes 3 and 4. Following the last IOB byte transmission, XXPIA will poll the addressed terminal until non busy status is received. The last status bytes received are stored in control block bytes 8 and 9. The write IOB command is used in the poll service routine. It is used to return the completed IOB (with DE set) to the terminal initiating the request.

X'08' Command—Write Buffer—Initiates a write buffer sequence.

A write buffer command frame is transmitted to the addressed secondary station. The queue frame field (bits 7, 8 and 9) is supplied by the application in control block byte A bits 0, 1 and 2. The queue field specifies to a secondary station the IOB whose associated data will be transmitted by the media station. Following the transmission of the write buffer command, XXPIA will poll the addressed terminal until non busy status is returned. When non busy status is returned, XXPIA transmits an activate write command frame to the addressed terminal.

XXPIA will then transmit multiple write data frames each containing a byte of data until the entire data buffer is transmitted. The last write data frame will have the terminal address field (bits 4, 5 and 6) set to 111. The leftmost byte of the data to transmit to the secondary station is stored at the address in control block bytes 3 and 4. Following the last data byte transmission, XXPIA will poll the addressed terminal until non busy status is received. The last status bytes received are stored in control block bytes 8 and 9. The write buffer command is used in the poll service routine. It is used to transfer data to a secondary station when a "read" type (data transfer from primary to secondary) request is received. At a secondary station, the data transmitted by a write buffer command will constitute one transmission block. One write buffer command is required for each transmission block expected by the secondary station.

X'09' Command—Poll—Initiates a poll sequence.

A poll command frame is transmitted to the addressed secondary station. The addressed station will return one or two status response frames. If the addressed station has received a set mode command, two status response frames will be returned, otherwise only one will be returned. Responses of "busy" status will cause XXPIA to repeat the poll command until a non busy response is received.

The status bytes are contained in bits 7–14 of the poll response frames, one byte per frame. The last status byte(s) received is stored in the control block bytes 8 and 9. If no byte 2 was received, byte 9 is set to X'00' by XXPIA. Poll response 1 bits 4, 5 and 6 are set to 111 if only one poll response frame is transmitted.

X'OA' Command—Poll Reset—Initiates a poll and reset parity error sequence.

A poll reset command frame is transmitted to the addressed secondary station. One or two status frames will be returned by the addressed station. If the returned status indicates a busy condition, XXPIA will transmit poll (non reset) frames and continue to analyze the returned status until non busy status is returned. The last status bytes received will be stored in the control block bytes 8 and 9. The poll reset command is issued to reset a previously indicated parity error status bit. The poll reset command cannot be issued to the local satellite (address X'00').

X'OB' Command—Poll Ack—Initiates a poll and ACK (acknowledge) status sequence.

A poll ACK command frame is transmitted to the addressed secondary station. One or two status frames will be returned by the addressed station. If the returned status indicates a busy condition, XXPIA will transmit poll (non ACK) frames and continue to analyze the returned status until non busy status is returned. The last status bytes received will be stored in the control block bytes 8 and 9. the poll ACK command is issued to acknowledge exception status transmitted by a secondary station. The poll ACK command cannot be issued to the local satellite (address X'00').

X'OC' Command—Clear—Initiates a clear command sequence.

A clear command frame is transmitted to the addressed secondary station. The queue to be cleared is specified in control block byte A. Following the transmission of the clear command, XXPIA will poll the addressed terminal until non busy status is returned. The last status received is stored in control block bytes 8 and 9. This command causes any currently pending requests in the specified queue to be flushed without being executed. Appropriate status is presented to the secondary application by the flushed requests.

X'OD' Command—Line Activate—XXPIA polls the indicated satellite station but does not wait for a response. This command is used to keep terminals on a particular line from timing out when another line requires more than 15 seconds of continuous service.

The line activate command cannot be issued to the local satellite (address X'00').

X'OE' Command—Reset IMA—Initiates a reset IMA command sequence.

A reset IMA command frame is transmitted to the addressed secondary station. Following the transmission of the reset IMA command, XXPIA will poll the addressed terminal until non busy status is returned or there is no response. The last status received is stored in control block bytes 8 and 9. This command causes the addressed secondary station to return to power on transition state and request a new address. Requests that are pending at the secondary station are not affected and will be presented after the address assignment sequence has been completed. The reset IMA command cannot be issued to the local satellite (address X'00').

X'OF' Command—Monitor Line—XXPIA monitors the specified line (station address) for activity.

The monitor period is 5 seconds ±10%. Device end is set at the end of the monitor period. Sense byte 6 bit 6 is set if activity is detected. Activity is defined as any signals on the line. The monitor line command cannot be issued to the local satellite (address X'00').

Referring again to the control block shown in FIG. 29, Byte 2—Command Byte 1—Reserved for system expansion.

Bytes 3 and 4—Provides a pointer to a data buffer for the following commands:

SET MODE—MODE BYTE
READ ID—ID BYTE
READ IOB—IOB
READ DATA—DATA
WRITE IOB—IOB
WRITE DATA—DATA

The address points to the leftmost byte of the data buffer.

Byte 5—Error Code—Used to indicate the failure detected when UC is set with DE status.

Byte 6 Bit 5—Busy Time Out—The addressed station has been reporting busy status to a poll for more than 5 seconds.

Byte 6 Bit 6—Line Active—At device end time of a monitor line command, this bit indicates if any line activity was detected.

Byte 6 Bit 7—No Response—This bit is set with UE to indicate that a polled terminal did not respond.

Byte 7—Station Address—Contains the station to be addressed for all command sequences.

The format for the station address is as follows:

Bits 0-2—Reserved
Bits 3-4—Line address 01-11
Bits 5-7—Satellite address

The address X'00' is reserved for the local satellite.

Satellite address 111 is used by terminals that have just powered on and have not received a set address command. The local satellite (address X'00') does not report power on transition status to an integral media feature because the local satellite is not connected to its integral media feature through the IMA hardware. At power on or when a disk is inserted, the media feature assumes that the local satellite has completed its power on transition sequence. The media feature views the local satellite as address X'00'.

Bytes 8 and 9—Station Status Byte 1 and 2—These bytes contain the status returned by a satellite terminal to the last poll of any sequence.

Status byte 1 is defined as follows:

Bit 0—Busy
1—Line parity error
2—Reserved
3—Reserved
4-6—Exception status
7—Even/Odd response level Status Bit 0—Busy 0=Not Busy, 1=Busy A terminal reporting busy status is in the process of servicing a previously issued command. No further commands will be accepted until non busy status is reported. Busy is a real time response updated by a secondary station without changing bit 7 (response level).

Status Bit 1—Line Parity
0=No parity error detected
1=Line parity error detected Line parity error is reported by a secondary station that detects a parity error in a received frame. The media station must reset the parity indication in a secondary station by issuing a poll reset command before any other commands are issued.

Status Bits 4-6—Exception Status—Exception status is encoded as follows:

| Bit 4 | 5 | 6 | |
|---|---|---|---|
| 0 | 0 | 0 | No exception status |
| 0 | 0 | 1 | Activate lost |
| 0 | 1 | 0 | Invalid activate |
| 0 | 1 | 1 | Reserved |
| 1 | 0 | 0 | Invalid command |
| 1 | 0 | 1 | Storage overrun |
| 1 | 1 | 0 | Queue empty |
| 1 | 1 | 1 | Power on transition |

When an exception condition is detected, processing of the current command will be discontinued, and only poll, poll ACK, poll reset, set mode, reset and reset IMA will be processed until the exception status is reset. Exception status other than power on transition must be reset by the media station by issuing a poll ACK command. Power on transition status is reset by issuing a set mode command.

001—Activate Lost—A line error was detected between a read command and an activate read, or between a write command and an activate write.

010—Invalid Activate—An activate read command was received following a write buffer or write IOB command, or an activate write command was received following a read buffer, read IOB, or read ID command.

100—Invalid Command—The secondary station received a command bit combination that is not defined in the command set.

101—Storage Overrun—An attempt was made to read or write data beyond allowed storage limits.

110—Queue Empty—The queue that was referenced in a media request to read or write data, or read or write an IOB did not have an outstanding request (IOB's).

111—Power on Transition—This status is transmitted by a secondary station immediately following a power on, after receiving a reset or reset IMA command, or when a no service or media unavailable time-out occurs. Power on transition status must be reset by the media station by transmitting a set mode command. XXSIA contains a discussion of the power on transition sequence.

Status Bit 7—Even/Odd Response Level—The even/odd response level bit is used by the media station to differentiate between new status and retransmitted status. Status is retransmitted by a secondary station on each poll it receives until a poll ACK command is received and new status is available. The first status response after power up will be on level 0; therefore, the first new status report will be on level 1.

Real time response status bits (bits 0 and 1) are changed by a secondary station without updating the even/odd response level.

Status byte 2 is defined as follows:

| | |
|---|---|
| Bit 0 | Request pending in queue 0 |
| 1 | Request pending in queue 1 |
| 2 | Request pending in queue 2 |
| 3 | Request pending in queue 3 |
| 4 | Request pending in queue 4 |
| 5 | Request pending in queue 5 |
| 6 | Request pending in queue 6 |
| 7 | Request pending in queue 7 |

Status byte 2 is not transmitted while power on transition status is being reported in status byte 1. A secondary terminal queue represents a stack of requests that have the same service priority. Queue 0 is the highest priority, queue 7 is lowest priority; the queue structure allows the media station to identify the priority of a request without reading the request control block (IOB). The bits in status byte 2 indicate the queues in the secondary station that have requests awaiting media station service.

When a terminal is polled, status byte 2 is checked for any request. If a request is found, the IOB in the highest priority queue requesting service is read into the media station. The request is analyzed and a read or write buffer is issued. The IOB is then written back to the secondary station, with completion status.

Two queues are used by a satellite terminal. Queue 3 is used for logging requests with a VFIO type IOB and for all requests with an LDIO IOB. Queue 6 is used for paging requests with a VFIO type IOB.

Byte A—Station Queue—Indicates to the satellite station queue that a sequence is directed.

There are eight secondary station queues (0–7). Each queue represents a stack of secondary station requests having the same service priority. Queue 0 is highest priority; queue 7 is lowest priority. The queue structure allows the media station to identify the priority of a request without reading the request control block (IOB). Requests are serviced FIFO within a queue.

Control block byte A contains the queue, in binary, in bits 0, 1, and 2. Byte A specifies the queue to which the command is directed.

This field is required for the following commands:

READ ID
READ IOB
READ BUFFER
WRITE IOB
WRITE BUFFER
CLEAR (QUEUE)

Bytes B and C—Max Byte Count—Contains the maximum byte count for read operations and the transmit byte count for write operations.

If the maximum byte count is exceeded during a read operation an error is indicated.

Bytes D and E—Set by XXPIA following a read operation to indicate the actual number of bytes received.

XXSIA

The Secondary Intermachine Adapter I/O control subroutine, termed XXSIA, is used to perform I/O operations on the intermachine adapter hardware in a remote satellite terminal. FIG. 30 illustrates the control block for XXSIA. The address of the control block must be loaded into register XR1 prior to the call of XXSIA. XXSIA resets the status bits in control block byte 2 prior to performing the requested operation.

Calling Format:

SVC
DC SL1 'REQUEST CODE'

The Secondary Intermachine Adapter I/O control subroutine (XXSIA), together with the line adapter IMA hardware, performs the line control functions required of a secondary station. These functions include responding to application requests made through the SIA I/O control block, and automatically responding to certain line requests made by the remote primary media station. XXSIA transmits power on transition status, accepts set address, reset, reset IMA, and set mode commands, and responds to a read device ID command when required without receiving an application request.

When XXSIA is reset, it assumes "power on transition state". In a satellite station, XXSIA is reset by a no service time-out, a media unavailable time-out, a power on or a reset or reset IMA line command. When in "power on transition state", XXSIA responds to any poll received for address X'7' with Power On Transition status. The primary station responds to POT status from address X'7' with a set address command. The set address command assigns the next unused line address to the secondary station.

If the primary station detects a parity error in response to a poll for address X'7', the primary station assumes that more than one secondary station has responded. The primary station sends a reset IMA command to address X'7' which causes the secondary stations in power on transition state to execute a random time delay routine which will delay the station's next response to a poll for address X'7'.

After an address has been assigned to a secondary station, the primary station will poll the assigned address and expect a POT status response. If a POT status response is not received, the primary station will issue a reset IMA command to the assigned address which will return the secondary station to "power on transition state". When the POT status response is received by the primary station from the secondary station with the assigned address, the primary station will send a set mode command to the secondary station. The set mode command sets the null frame fill count which specifies the number of null frames that must be inserted between each data frame transmitted by the secondary station.

Following the set mode command exchange, the primary station issues a read device ID command to the assigned address. The satellite station responds with a single byte device attribute code. The device attribute code indicates the secondary station's terminal type. XXSIA identifies with a code of X'78'.

Referring to FIG. 30:

Bytes 0 and 1—Work Byte—These bytes are used by XXSIA.

Byte 2 Bits 0–3—X'D'—Code identifies the control block as a satellite intermachine adapter control block.

Byte 2 Bit 4—UC—Unit check bit is set by the SIMA I/O control code with DE to indicate that an error was detected.

Byte 2 Bit 6—DE—Device end bit is set by the SIMA I/O control code to indicate that execution is complete.

Byte 2 Bit 7—UE—Unit exception bit is set when a recovered error occurred during or prior to the execution of the current command. Byte 5 contains the error code.

Byte 3 Bits 5–7—Queue—This field indicates the queue that is used for the request.

There are eight secondary station queues (0–7). Each queue represents a stack of secondary station requests having the same service priority. Queue 0 is highest priority, queue 7 is lowest priority. The queue structure allows the media station to identify the priority of a request without reading the request control block (IOB). Requests are serviced FIFO within a queue.

Bits 5–7 specify the queue in binary where the current request is directed.

Bytes 5 and 6—This field contains the address of the leftmost byte of a data buffer. This field must be specified if the request requires data transmission.

The data pointed to by this field is transmitted to the primary station when a read buffer command is received, or transmitted from the primary station when a write buffer command is received.

Byte 7—Error Code—When unit check status is set. This byte contains a code specifying the error condition.

Bytes 9 and A—IOB Address—Leftmost byte of an IOB that describes the request to the media station. Note the virtual file IOB at the end of the XXSIA section.

The IOB pointed to by this field is transmitted to the primary station when a read IOB command is received, or transmitted from the primary station when a write IOB command is received.

Byte B—IOB Length—Length (in bytes) of the IOB.

Byte C—# of Transmission Blocks—Number of transmission blocks to be transferred.

Bytes D and E—Transmission Block Size—Specifies the number of bytes contained in each transmission block.

A read transmission block consists of N read response frames. A write transmission block consists of N write data frames. The last frame transmitted in each block will have the address field set to 111 to indicate end of block.

The number of transmission blocks that will be required to complete a command can be calculated by dividing the buffer length by the transmission block size and rounding up to the nearest integer. When a portion of a transmission block exceeds the data available in the buffer, X'00' data bytes are transmitted for the remainder of the transmission block. Short blocks are not transmitted.

The media station will issue separate read buffer commands and activate reads (or write buffer commands and activate writes) for each transmission block to be transferred. The first read or write command causes the first N (where N is the length of a transmission block) bytes in the data buffer to be transferred; the next read or write command causes the next N bytes to be transferred. This procedure is repeated until all data is transferred.

A read IOB command causes the data pointer in the satellite to reset to the beginning of the data buffer. The next read or write command will cause the first N bytes in the data buffer to be transferred.

The transmission block size can be specified from 128 to 1024 bytes, in multiples of 128.

Bytes f and 10—IOB Receive Buffer Address—Address of work buffer used by the I/O control code to receive the IOB before moving it to the IOB address.

Bytes 11 and 12—Work area used by XXSIA.

Bytes 13 and 14—No Service Timeout—These bytes specify the time (±10%) XXSIA will wait before a no service timeout error is reported to the application. The time is specified in units of 1/3300 of a min. The following table lists some useful delays in hex:

| Delay (Min) | Hex |
|---|---|
| 1 | X'OCE4' |
| 2 | X'19C8' |
| 3 | X'26AC' |
| 4 | X'3390' |
| 5 | X'4074' |

This field is destroyed by XXSIA.

Bytes 15 through 16—Work area used by XXSIA.

VFIO

The virtual file IOB (VFIO) previously noted in FIG. 22 is used in a satellite station to perform I/O operations on the remote disk file. It is referenced by bytes '9' and 'A' in the XXSIA control block shown in FIG. 30.

The Virtual File IOB control block is shown in FIG. 31, wherein:

Byte 0 Bits 0-3—Device ID—X'4' identifies the control block as a Satellite Virtual File interface.

Byte 0 Bit 4—Unit Check (UC)—This bitis set at device end time if an error condition was detected.

Byte 1 Bit 2—Add—This command adds a 128-byte record to the file specified in bytes 'A'-'E'.

The transmission block size must be 128 and the number of records must be 1.

Byte 1 Bit 3—Modify Add—This command writes a 128-byte record over the last record added to the file specified in bytes 'A'-'E'.

The transmission block size must be 128 and the number of records must be 1.

Byte 1 Bit 5—Read—Data is read from the file specified in bytes 'A'-'E' into memory at the specified locations.

Byte 2 Bit 0—Get Time/Date—One 128-byte record containing time and date and media code level is transmitted to the satellite station and stored in the data area.

The transmission block size must be 128 and the number of transmission blocks must be 1.

Record Format:

Bytes 0-5—Date in the form MMDDYY or DDMMYY in unpacked decimal.

Byte 6—Blank (X'40')

Bytes 7-13—Edited date in the form MM-DD-Y or DD-MM-Y

Byte 14—Blank (X'40')

Bytes 15-18—Unpacked decimal time (HHMM)

Bytes 19-25—7 byte media ROS part number

Bytes 26-32—7 byte media ROS EC number

Bytes 33-39—7 byte media application (disk) part number

Bytes 40-46—7 byte media application (disk) EC number

Bytes 47-127—Reserved.

Byte 2 Bits 4-7—Memory Size—This field is set up by a satellite terminal requesting a VFIO operation. It indicates the amount of memory installed in the satellite requesting the operation. The field value is defined to be the same as the "memory size" field in the KYIO control block.

Bytes 3 and 4—Data Address—Contains the leftmost address of the data buffer used by ADD, MODIFY ADD, WRITE, and GET TIME/DATE operations.

Byte 5—Error Code—The error code is set by the media application code with unit check (UC) when an error is detected.

Byte 6 Bit 0—Local Satellite—This bit is set at device end time to indicate that the requesting application is running in the local satellite.

Bytes 7 and 8—Binary Logical Record Offset—The number of 128-byte logical records past the file BOE that reading or writing is to begin.

Byte 9—Binary Number of Transmission Blocks—The number of transmission blocks to read or write.

At device end time of read commands, this byte is set to the number of transmission blocks actually received.

Bytes A–E—Data Set Name—Five-character data set name, left justified. Defines the data set to be operated on.

Bytes F–14—Store/Register Number—Six-character store/register number.

Bytes 15–16—Block Size—Specifies the transmission block size that is to be used in servicing the request.

For Get Time/Date, Add, or Modify Add commands, the transmission block size must be 128 bytes. For Read commands, the block size can be 128 to 1024 in multiples of 128.

YYSIAM

The Secondary Intermachine Adapter I/O control subroutine, YYSIAM, is a RAM subroutine. The functions performed by YYSIAM are the same as performed by XXSIA, except for the following differences:

- Bit 0 of control block command type 3 is used to enable YYSIAM. This command must be issued before any SIA requests are initiated.
- When the initialization command is issued, the data address field (bytes 5 and 6) contains the leftmost address of a table that contains information used by YYSIAM. The table contains a device ID which for a satellite is X'78'.
- When YYSIAM is enabled, commands cannot be issued to XXPIA.
- Bit 1 of control block command byte 3 indicates that YYSIAM is to be disabled. YYSIAM must be disabled before commands can be issued to XXPIA. (Note a POR or disk reset will also allow commands to be issued to XXPIA).
- An additional error, X'79', is reported by YYSIAM when it receives a request without being enabled.

The address of the control block shown in FIG. 30 must be loaded into XR1 prior to calling YYSIAM.

Calling Format
B YYSIAM
NSI

XXVSIA

The Local Satellite Virtual Secondary Intermachine Adapter I/O control subroutine, XXVSIA, is included in the XXSIA subroutine. XXVSIA accepts requests in the same format as the Secondary Intermachine Adapter I/O control subroutines, but actually passes the request directly to the integral media feature for processing. Refer to FIG. 30 for detailed description of the XXSIA control block. The address of the control block must be loaded into XR1 prior to calling XXVSIA. XXVSIA resets the status bits in control block byte 2 prior to performing the requested operation.

The VFIO IOB described in XXSIA can be used with the XXVSIA control block. An additional IOB (LDIO) can also be used with XXVSIA.

Calling Format:
SVC
DC XL1 'REQUEST CODE'

LDIO

The local satellite disk IOB (LDIO) described above is used in a local satellite station to perform I/O operations on the media cluster disk file. This IOB is referenced in bytes 9 and A in the XXVSIA control block.

The local satellite disk IOB control block is shown in FIG. 32. The control block is defined by:

Byte 0 Bits 0–3—Device Id—X'E' identifies the control block as a Satellite Virtual File interface.

Byte 0 Bit 4—Unit Check (UC)—This bit is set at device end time if an error condition was detected.

Byte 1 Bit 1—Inhibit Disk Reset—Inhibits the disk reset function until a cancel is issued. Byte 1 Bit 2—Cancel—Cancels the inhibit disk reset function.

Byte 1 Bit 5—Write—The indicated data to be written to the media cluster file.

Byte 1 Bit 6—Read—The indicated data is read from the media cluster file.

Byte 1 Bit 7—Sync—A sync operation is performed.

Byte 2 Bit 1—Inhibit CS—Inhibits data Cycle Steal operations; the single byte of data pointed to by the data address is written to all file locations.

Byte 2 Bit 6—Media Cluster Reset—Causes the media cluster processor to execute its initialization program and enter the uninitialized operational state.

Byte 2 Bit 7—H Format—Specifies that the data is recorded on the media cluster file in a conventional format known as "H Format".

Bytes 3 and 4—Data Address—Contains the leftmost address of the data buffer used by read and write operations.

Byte 5—Error Code—The error code is set with unit check (UC) when an error is detected Byte 6 Bit 1—Media 2D—Set at command completion to indicate the type of diskette inserted in the Media Cluster File.

Byte 6 Bit 6—Disk In—Set at the completion of the execution of a cancel command to indicate if a diskette has been inserted.

Bytes 7 and 8—Work Area Address—This address points to the leftmost byte of a 256 byte work area used by the I/O control code when an index search is performed.

Bytes 9 and A—Binary Logical Record Offset—The number of 128-byte logical records past the file BOE that reading or writing is to begin.

Byte B—Binary Number of Logical Records—The number of 128-byte logical records to read or write. At device end time of read commands, this byte is set to the number of logical records actually received.

Bytes C–10—Data Set Name or Binary BOE—Five-character data set name, left justified. Defines the location of the beginning of the data set to be operated on.

This field is set to the binary "beginning of extent" (location) on the first command issued to a data set name.

Bytes 11–13—Binary EOD—Contains the binary physical end of data.

Bytes 14–16—Binary EOE—Contains the binary physical "end of extent", i.e., the end of the space allocated for the data set.

Bytes 17–19—Disk Error Location—Contains the packed decimal physical error location when a disk error is detected.

XXKYIO

FIG. 33 illustrates the control block for the keyboard/display I/O control subroutine termined XXKYIO, for standalone and remote satellite terminals. XXKYIO performs I/O operations on the keyboard 12, transaction display 14, customer display 15, drum prompt 17 (FIG. 1) and other elements of a terminal station. The address of the control block must be loaded into register XR1 prior to the call of XXKYIO. XXKYIO resets the status bits in control block byte 0 prior to performing the requested operation.

Calling Format:
SVC
DC XL1 'REQUEST CODE'

XXKYIO

FIG. 33 shows the keyboard/display I/O, XXKYIO, control block, wherein:

Byte 0 Bits 0-3—Device ID—X'1' identifies the control block as a keyboard/display interface control block.

Byte 0 Bit 4—Unit Check (UC)—This bit is set by the I/O control subroutine at device end time if an error condition was detected.

Byte 0 Bit 6—Device End (DE)—This bit is set by the I/O control subroutine when all commands indicated in the control block have been executed.

The operations performed when a keyboard/display request is made depends on the bits set in command bytes 1 and 2. Multiple operations may be performed with one I/O request. All operations requested will be performed unless inhibited by unit check conditions. After all commands have been executed and I/O operations are complete, device end is set.

The keyboard/display I/O control subroutine sounds the audible alarm if a keyboard key is pressed and there is no outstanding keyboard request.

Byte 0 Bit 7—Unit Exception (UE)—This bit is set by XXKYIO at device end time if an error was detected and corrected by XXKYIO. Byte 5 contains a code that describes the error condition.

Byte 1 Bit 0—Alarm—The I/O control subroutine turns on an audible alarm. The alarm sounds for a fixed time interval and then stops. The I/O control subroutine does not wait for the alarm to stop before executing other commands, if any, or setting device end.

Byte 1 Bit 1—Update Display 1—The transaction display is updated with the data pointed to by the Data Address in bytes 3 and 4 of the control block. This bit must be set when update display 2 is used. Byte 0 of the field pointed to by the data address contains the length of the field to be displayed. Bytes 1-32 of this field contain the data to be displayed. A maximum of nine characters plus decimal point may be displayed at one time. The position of the decimal point in the display is determined by a code in Byte 'A' defined as follows:

X'00'—No decimal point
X'01'—Decimal point with no decimal digits
X'02'—Decimal point with 1 decimal digit
X'03'—Decimal point with 2 decimal digits
X'04'—Decimal point with 3 decimal digits All other decimal point positions are invalid and will cause no decimal display.

The LED's on the transaction display are updated based on the bits in Byte 'B' of the control block. A bit on turns on the corresponding LED on the transaction display.

The amount due, subtotal, change and refund LED's are flashed on and off by XXKYIO when turned on by the application. THE LED's specified in byte B are the only transaction display discrete LED's controlled by an application program.

Byte 1 Bit 2—Update Display 2—The customer display and the LED's on the customer display are updated with data from the control block in the same way that the Update Display 1 command updates the transaction display and LED's. The Update Display 1 command bit must be set when this command is set.

Byte 1 Bit 3—Flash Display—May be set in conjunction with Update Display 1 and/or Update Display 2. If set, this causes the display(s) to be turned on and off at a fixed rate. This flashing continues after device end is set. The flashing is stopped by pressing any key on the keyboard after the enable keyboard command is executed, which may be part of the same I/O request. Byte 1 Bit 4—Update Prompt—Causes the drum prompt device to rotate to the position specified in byte 9 of the control block. The I/O control subroutine does not wait for the drum to rotate to the desired position before continuing with other commands or setting device end status.

Byte 1 Bit 5—Read Hard Counter—Non-volatile read/write memory elements, called hard counters, may be installed to retain some data items during power-down conditions. These counters may be copied into memory starting at the address specified by bytes 3 and 4 of the control block. No other command bits can be set with the read hard counter bit.

Byte 1 Bit 6—Write Hard Counter—Causes data from memory at the address specified by bytes 3 and 4 of the control block to be loaded into the hard counters.

The number of bytes transferred in a hard counter Read or Write is determined by the number of counters installed and is handled by the I/O control subroutine.

Byte 1 Bit 7—Update Time—The I/O control subroutine updates a hardware time-of-day clock with data from bytes 'C'-'F' of the control block.

If the Update Time command bit is not set, the I/O control subroutine loads bytes 'C'-'F' of the control block with the time from the time-of-day clock.

Byte 2 Bit 0—Buffer Reset—The length byte pointed to by the data address is set to zero (X'00'). The length byte determines where entered data is placed in the keyboard buffer. Entered data is placed at the start of the keyboard buffer plus the length byte plus 1. When data is entered, the length byte is incremented by one.

Byte 2 Bit 1—Single Key Mode—Causes device end status to be indicated with any key depression. If this bit is not set, device end is set only after a function key (non data key) is pressed.

Byte 2 Bit 3—Enable Keyboard—Allows data to be entered through the keyboard.

Entered data or function codes are stored in the keyboard buffer and the length byte is incremented for each key pressed. The keyboard consists of two classes of keys, data keys and function keys, as shown in FIG. 4. The keyboard code will decode data keys and return the EBCDIC equivalent (F0-F9). The multiple zero key functions as a double or triple zero key depending on the position of a hardware switch. When operated as a double zero key, it places X'F0F0' in the keyboard buffer and the length byte is incremented by 2. When operated as a triple zero key, it places X'F0F0F0' in the keyboard buffer and the length byte is incremented by 3.

When any key is pressed, the hex code(s) for the key is stored in the keyboard buffer according to the following formula: Data address (control block bytes 3 and 4) plus the value of the length byte (byte 0 as pointed to by the data address), plus one. If the key was a data key and the single key mode is not enabled, device end is not set. If single key mode is enabled or the key was a function key, device end is set.

The ½ (half-pence) key stores the code X'F5' in the keyboard buffer and sets the 'half-pence' status bit (byte 6 bit 3). The half-pence key must be followed by a function key. If a data key is pressed following the half-pence key, unit check and an error code are set with device end.

When the first key is depressed by the operator (for a control block), the customer display and transaction display are blanked out. The last eight (nine if the half-pence feature is present) characters or less are continuously displayed in the transaction display to allow the operator to monitor the keying of data. When any function key is pressed, the transaction and customer display are blanked. When the half-pence feature is installed, the half-pence display position is used only to display the half-pence amount.

Byte 2 Bit 4—Enable Half-Pence—This bit is used with Update Display 1 or 2 to indicate that data is to be displayed starting with the half-pence (optional) display position. The data to be displayed in this position is checked for being five, and if so, the character five is displayed. If not a five, a blank is displayed. If bit 4 is off, data is displayed starting from the standard positions. See FIGS. 4-12 for display examples.

This bit is also used with Enable Keyboard to allow entry of the half-pence key. If half-pence is pressed but not enabled the Half-Pence error (error code 17) and unit check status are set.

Byte 2 Bit 5—Enable Decimal Point—Causes the I/O control subroutine to keep track of the position of the decimal point in a key entered field. This position information is stored in byte 'A' at device end time. The possible values for this data are described under the definition of the update display 1 command. When not set, the decimal point key functions as a function key and causes device end to set.

Data that is keyed in with a decimal point is checked for validity by the I/O control subroutine. If decimal entries contain more than two integer positions, more than three decimal positions or more than one decimal point a "decimal point error" is indicated.

Byte 2 Bit 6—Inhibit Display—Inhibits the display of entered data.

Bytes 3 and 4—Data Address—Leftmost address of the keyboard buffer. Keyboard buffer consists of a length byte followed by 32 data bytes in storage. A byte of X'00' must precede the length byte. Entry through the keyboard is limited to 31 data keys and a function key.

Byte 5—Error Code—Set with unit check to indicate the error detected.

Byte 6 Bit 3—Half-Pence—Set by the I/O control subroutine to indicate that the ½ key was pressed during a keyboard operation in which Enable Half-Pence (Byte 2 bit 4) was on.

Byte 6 Bit 5—Security Lock Status—Set by the I/O control subroutine at device end time to indicate the status of a security lock. When set, it indicates that the security lock is in the unlocked position.

Bytes 7 and 8—Machine Configuration—Updated by the I/O control subroutine at device end time of all requests.

Byte 8 Bit 0—If set, indicates the hard counter feature is installed.

Byte 8 Bit 1—Wand—If set, indicates the wand feature is installed. (A wand is an optical scanner for reading printed codes on merchandise or labels.)

Byte 9—Drum Prompt Position—Specifies the position of the drum prompt for update prompt commands.

Byte A—Decimal Point Position—Specifies the position of the decimal point for update display commands and specifies the entered decimal point position for enable keyboard commands. The value in Byte A is described in the update display 1 command bit.

Byte B—Transaction Display LEDs—Corresponds to the LEDs on the customer and transaction display. Used during an update display command. The bits that are set cause the corresponding customer and/or transaction display LED to turn on.

Bytes C-F—Time-of-Day-Clock—Contains the time used to update the time-of-day clock in the update time command. This field is updated by the I/O control subroutine at device end time of all requests to reflect the current value of the time-of-day clock.

XXVKIO

FIG. 34 illustrates the command block for the virtual keyboard/display I/O control subroutine, XXVKIO, for media feature. XXVKIO is used to initiate keyboard/display I/O operations which are indirectly processed by the local satellite keyboard/display subroutine XXLKIO. The address of the virtual keyboard/display control block must be loaded into register XR1 prior to the call of XXVKIO. XXVKIO resets the status bits in control block byte 0 prior to performing the requested operation.

Calling Format:
SVC
DC XL1 'REQUEST CODE'

Commands initiated through the Virtual Keyboard/Display interface are executed by the local satellite's keyboard/display I/O control subroutine.

Commands from the Virtual Keyboard/Display interface override commands initiated by the local satellite. When the local satellite receives a command from the Virtual Keyboard/Display interface, device end is set in an outstanding local satellite XXLKIO command. XXLKIO updates the local satellite keyboard buffer with a "1" data key code and a "CLEAR" function key code, as if the operator pressed the "1" key and the Clear key. If the local satellite keyboard request is in single key mode, the buffer is updated with a clear function key code only.

The control block and commands for the Virtual Keyboard/Display interface XXVKIO are identical to the keyboard/display control block shown in FIG. 33 and commands with the exception of the "Wait for Action Code Key", the "Repetitive Alarm" and the hard counter commands.

The "Wait for Action Code Key" command modifies the servicing of the Action Code key by the keyboard/display I/0 control subroutine in the local satellite. The "Wait for Action Code Key" command must be issued alone.

The "Wait for Action Code Key" command causes XXVKIO to wait until the action code key is pressed (with no preceding digits) followed by the 9 key. When this sequence is keyed, Device End is set in the control block. No buffer updating occurs as a result of the "Wait for Action Code Key" command.

Issuing a "Wait for Action Code Key" command does not prevent keyboard/display commands, issued by the local satellite, from executing while the keyboard/display I/O control subroutine is waiting for the Action Code 9 depression.

The repetitive alarm command cuases the audible alarm to sound repetitively. The alarm sounds at the same rate as a display prompt is flashed. A depression of the Clear key terminates the sounding of the audible alarm and if an enable keyboard command is pending, causes device end to set for the outstanding keyboard enable command.

XXPRIO

FIG. 35 illustrates the control block for the Printer I/O control subroutine, XXPRIO, for standalone and remote satellite terminals. XXPRIO is used to perform I/O operations on the two-station matrix printer 16 and the cash drawers 18 (FIG. 1). The address of the control block must be loaded into register XR1 prior to the call of XXPRIO. XXPRIO resets the status bits in control block byte 0 prior to performing the requested operation.

Calling Format:

SVC

DC XL1 "REQUEST CODE'

The printer, not shown in detail in FIG. 1, comprises a combined document/receipt station and a separate journal station. Two rolls of paper supply forms for receipt and journal printing. A switch detects either roll empty or journal take-up roll full. The combined document/receipt station allows a form to be inserted between the print mechanism and the receipt paper when document printing is required. Two detector cells, one above and one below the print line, sense the presence or absence of a document in the combined print station.

The combined document/receipt station can print on the receipt paper or on an inserted document. When printing on the receipt paper, the printer is in "receipt mode". When printing on an inserted document, the printer is in "document mode". When the print microcode receives a print command, the status of the two cells is checked for consistency with the printer mode.

For example, if the printer is in receipt mode and receives a print command, both cells must be uncovered (i.e., no document inserted), or an error will be indicated to the application microcode. If the printer is in document mode, both cells must be covered or an error will be indicated to the application microcode.

When the machine is powered up, the printer defaults to receipt mode. Document mode is entered by issuing an autoinsert or manual insert command to the printer.

The printer I/O control code can queue up to three requests before the print operations become synchronous.

The printer control block is shown in FIG. 35, as follows:

Byte 0 Bits 0-3—Device ID—X'2' identifies the control block as a printer interface control block.

Byte 0 Bit 4—Unit Check (UC)—This bit is set by the I/O control subroutine at device end time if an error condition was detected.

Byte 0 Bit 6—Device End (DE)—This bit is set bu the I/O control subroutine when all commands indicated in the control block have been executed.

The operations performed when a printer request is made depends on the bits set in command bytes 1 and 2. Multiple operations may be performed with one I/O request. All operations requested will be performed unless inhibited by unit check conditions. After all I/O operations are complete, device end is set.

Byte 0 Bit 7—Unit Exception (UE)—This bit indicates that an error was detected that did not prevent the line from being printed. The error code is indicated in Byte 5.

Byte 1 Bit 1—Eject—The eject command is used to return to receipt mode from document mode. If the printer is in document mode and receives an eject command, the document in the combined document/receipt station will be fed out of the print station and the printer will return to receipt mode. If the printer is in receipt mode and receives an eject command, no operation is performed.

Byte 1 Bit 2—Auto Insert—An autoinsert command will cause the printer I/O control subroutine to wait for a document to cross the lower cell. When a document crosses the lower cell, the auto feeding mechanism will start trying to feed the document into position. When the document crosses the upper cell, the auto feeding mechanism will feed the document the number of lines specified in the control block and stop. If both upper and lower cells are still covered, the document is in position to print the first line. The command is complete and device end is indicated in the control block. The printer is now in document mode.

During execution of the autoinsert command, the lower cell may uncover before the top cell covers or the bottom cell may uncover after the top cell covers but before the prescribed line spacing has been performed. In the first case, where the bottom cell uncovers before the top cell covers, the feeding will stop and the printer will wait for the lower cell to cover. In the second case where the bottom cell uncovers after the top cell covers, the feed mechanism would continue to feed the document out of the print station and stop. The printer would wait for the lower cell to cover and the operation would be repeated. In either case the command is not complete and no error status is reported to the application.

The first line registration byte (byte 9) is used during the execution of an auto insert command. It specifies the number of 0.02 inch steps from the covering of the upper cell to line 1.

The operation of the auto insert command is not affected by the status of the paper roll full/empty sensor.

Byte 1 Bit 3—Manual Insert—A manual insert command will cause the printer I/O control subroutine to check the upper and lower cell. If both cells are covered, the printer enters document mode and returns device end status to the application. If both cells are uncovered, the printer remains in receipt mode and returns decide end status to the application. If one cell is covered and one is uncovered, a unit checkdevice end status is returned to the application, indicating an invalid manual insert.

The operation of the manual insert command is not affected by the status of the paper roll full/empty sensor.

Byte 1 Bit 5—Print DOC or R—The print document-/receipt command is used to print a line on the document/receipt station. Device end is set when the print operation is complete.

Byte 1 Bit 6—Print JR—The print journal command is used to print a line on the journal station. Device end is set when the print operation is complete. Byte 1 Bit 7—Use 2 Buffers—This modifier bit instructs the printer I/O control subroutine to use separate buffers for document/receipt and journal station printing. If the bit is not set, the data buffer is 31 bytes long and contains data that is printed in both stations. If the bit is set, the data buffer is 63 bytes long. The first 31 bytes are printed on the document/receipt station and the last 31 bytes are printed on the journal station.

Byte 2 Bit 0—Open Drawer 1—This command causes cash drawer 1 (18, FIG. 1) to open.

Byte 2 Bit 1—Open Drawer 2—This command causes cash drawer 2 (not shown) to open, if an optional second drawer is installed.

Byte 2 Bit 7—Recovery—After unit check status is reported, the print I/O control subroutine will not accept any commands until one is received with the recovery bit. This allows all commands in the print queue to be flushed after an error occurs. Commands encountered after a unit check condition and before a recovery bit is set will be returned with device end-unit check status with the error code (byte 5) zero and the recovery required sense bit set (bit 7 byte 6). When a command is received with the recovery bit set, the printer I/O control subroutine will reset the recovery bit in the control block and resume command execution starting with the control block that contained the recovery bit.

Bytes 3 and 4—Data Address—Contains the leftmost address of the print buffer. The print buffer is 31 or 63 bytes long depending on the setting of the Use 2 buffers bit (byte 2 bit 7).

Byte 5—Error Code—The error code is set by the I/O control subroutine with unit check (UC) or unit exception (UE) when an error is detected.

Byte 6 Bit 0—Cell A—This bit is set by the I/O control subroutine to indicate the status of the upper sales slip sensor cell. If the sensor is covered, the bit is set. This bit is updated at all device end times.

Byte 6 Bit 1—Cell B—This bit is set by the I/O control subroutine to indicate the status of the lower sales slip sensor cell. See byte 6 bit 0.

Byte 6 Bit 2—Insert Attempted—After requesting an auto insert operation, the requesting program may issue a cancel request to terminate the auto insert operation. If the operator has not started to insert the document when the cancel request is received, the auto insert command execution will terminate and device end status will be set. If the insert operation has been started (i.e., the document is feeding into position), the cancel request is delayed. If the document feeds into position without error, device end is set. If an insert error is rejected, device end-unit check is set and the "insert attempted" sense bit is set. This indicates that an insert was in process and failed when the cancel request was received. The "insert attempted" bit is set only if the cancel was detected while the feeding of the document occurred, not if it followed an aborted insert operation.

Byte 6 Bit 3—Drawer Status—At each device end time, this sense bit is updated to indicate if the cash drawers are open or closed. If any cash drawer is open (or both are open), the bit is set on by XXPRIO. If both drawers are closed, the bit is reset.

Byte 6 Bit 7—Recovery Required—See byte 2 bit 7—Recovery.

Byte 7—Number of Receipt/Document Spaces—The number of lines to space the document if in document mode or the receipt paper if in receipt mode. Spacing is performed after auto insert and after printing in combined commands.

Byte 8—Number of Journal Spaces—The number of lines to space the journal paper. Spacing is performed after auto insert and after printing in combined commands.

Byte 9—First Line Registration—This parameter is used in the execution of an auto insert command. It contains the number of 0.020 inch steps between upper cell cover and logical line 1 on the form.

XXVPIO

The virtual printer I/O control subroutine for the integral media feature, XXVPIO, is used to initiate printer I/O operations from the media processor which are indirectly processed by the local satellite printer subroutine XXLPIO. The address of the virtual printer control block must be loaded into register XR1 prior to the call of XXVPIO. XXVPIO resets the status bits in control block byte 0 prior to performing the requested operation.

Calling Format:

SVC

DC XL1 'REQUEST CODE'

Printer I/O operations initiated through XXVPIO are defined in detail by a control block identical in format to the control block described in XXPRIO and shown in FIG. 35.

XXLPIO

The local satellite printer I/O control subroutine, XXLPIO, is used to perform I/O operations on the two-station matrix printer and cash drawers which are initiated either directly through XXLPIO or indirectly through XXVPIO. Direct requests are accepted from the local satellite processor and require XR1 to be loaded with the address of the local satellite printer control block prior to the subroutine call. On these requests, XXLPIO resets the status bits in control block byte 0 prior to performing the requested operation.

Both indirect requests initiated through XXVPIO and direct requests through XXLPIO are defined in detail by the same format of printer control block XXPRIO shown in FIG. 35.

The following set of program listings for performing the functions of the present invention described above, in the microprocessors of the terminals, is written in publicly available IBM System/3 Assembler language.

Included below are program listings for the RAM application program for primary operational mode (MOM) and the RAM application program for secondary operational mode (MSOCC). In addition are included ROS subroutine XXPIA and XXSIA, as well as RAM subroutine YYSIAM.

Whereas the present invention has been described with respect to a specific embodiment thereof, it will be understood that various changes and modifications will be suggested to one skilled in the art, and it is intended to encompass such changes and modifications as fall within the scope of the appended claims.

```
        MOM  MEDIA OPERATIONAL MODE
ERR LOC  OBJECT CODE       ADDR STMT SOURCE STATEMENT
                                     ***************************************************************
                                     *                                                             *
                                     * MODULE-NAME      = BGNMOM      (GPOST-WRF'I)                *
                                     *                                                             *
                                     * DESCRIPTIVE-NAME = MEDIA OPERATIONAL MODE                   *
                                     *                                                             *
                                     *                                                             *
                                     *                                                             *
```

```
*  STATUS            = OPERATIONAL                                              *
*                                                                               *
*  FUNCTION          = 1. ENABLE ACTION CODE 9, WHICH ALLOWS A MODE OF          *
*                          OPERATION TO BE SELECTED.                            *
*                                                                               *
*                      2. A CALL TO YYMSEL CHECKS FOR MODE SELECTION            *
*                          AND VALIDITY OF THAT SELECTION.                      *
*                                                                               *
*                      3. IF SECONDARY MODE WAS SELECTED REPEAT STEP            *
*                          TWO.                                                 *
*                                                                               *
*                      4. IF SECONDARY MODE WAS NOT SELECTED MOM READS          *
*                          THE CONFIGURATION TABLE, BY A CALL TO XXDRWR         *
*                          AND INITIALIZES PERTINENT COMMON DATA AREAS.         *
*                                                                               *
*                      5. AT THIS POINT THE POLL ADDRESS POINTER                *
*                          (CCPADR) IS INITIALIZED TO X'00' TO DISABLE          *
*                          ALL PHYSICAL ADDRESSES EXCEPT THE LOCAL              *
*                          SATELLITE, IF STANDALONE MODE WAS SELECTED,          *
*                          WITH A X'FF' IMMEDIATELY FOLLOWING IT TO             *
*                          INDICATE END OF POLL LIST. IF MEDIA FEATURE          *
*                          OR PRIMARY MODE WAS SELECTED ALL ADDRESSES           *
*                          SHOULD REMAIN VALID IN THE POLL LIST.                *
*                                                                               *
*                      6. YYPOLL IS CALLED TO POLL A PHYSICAL ADDRESS           *
*                          POINTED AT BY CCPADR.                                *
*                                                                               *
*                      7. YYMSEL IS CALLED ONCE MORE TO CHECK IF                *
*                          THE OPERATIONAL MODE HAS BEEN CHANGED DURING         *
*                          THE PREVIOUS STEPS. IF OPERATION IS SAME             *
*                          GO BACK TO STEP ONE AND CONTINUE THERE.              *
*                          IF THE MODE SELECTED IS THE SAME AS PREVIOUS         *
*                          MODE SELECTED ENABLE ACTION CODE NINE                *
*                          FUNCTION AN CONTINUE.                                *
*                                                                               *
*                      8. BUMP POLL ADDRESS POINTER TO NEXT PHYSICAL            *
*                          ADDRESS.                                             *
*                                                                               *
*                          IF THIS IS THE END OF THE POLL LIST, CHECK           *
*                          FOR ANY Q3 REQUESTS WERE MADE THEN CHECK             *
*                          FOR ANY Q6 REQUESTS PENDING.                         *
*                                                                               *
*                          IF Q3 REQUEST QUE IS EMPTY GO TO STEP 5 AND          *
*                          CONTINUE 6, 7, 8.                                    *
*                                                                               *
*                          IF NO Q6 REQUESTS ARE PENDING ISSUE A CALL           *
*                          TO YYTPOL TO ISSUE A POWER ON TRANSITION             *
*                          TO BRING A STATION ONLINE TO THE MEDIA               *
*                          CONTROL. REPEAT STEP 5, 6, 7, 8.                     *
*                                                                               *
*                          IF THERE WAS A Q6 REQUEST PENDING CALL YYPOLL        *
*                          AND SERVICE THAT REQUEST, THEN REPEAT STEPS          *
*                          5, 6, 7, 8.                                          *
*                                                                               *
*  NOTES             = SEE BELOW                                                *
*                                                                               *
*                                                                               *
*        RESTRICTIONS         = SOURCE CODE MARGINS ARE 1-76                    *
*                                                                               *
*        REGISTER-CONVENTIONS = AR1 AND AR2 ARE INDEX REGISTERS ONE             *
*                               AND TWO RESPECTIVELY.   ARR IS THE ADD-         *
*                               RESS RECALL REGISTER.                           *
*                                                                               *
*  MODULE-TYPE       = RAM PAGED PROGRAM ( MEDIA FEATURE MAINLINE )             *
*                                                                               *
*        PROCESSOR    = SYSTEM 3 MOD 10 ASSEMBLER.                              *
*                                                                               *
*        MODULE-SIZE  = XXXXX DECIMAL BYTES                                     *
*                                                                               *
*        ATTRIBUTES   = SERIALLY REUSABLE                                       *
*                                                                               *
*  ENTRY-POINT       = BGNMOM (ONLY ONE ENTRY POINT)                            *
*                                                                               *
*                      DEFINED ENTRYS AB213 THRU AB23W ARE DEFINED              *
*                      AS ENTRYS FOR SUBROUTINE REFERANCES.                     *
*                                                                               *
*        PURPOSE      = MEDIA FEATURE CONTROL (SEE FUNCTION ABOVE)              *
*                                                                               *
*        LINKAGE      = NONE (BGNMOM IS PAGED IN BY THE MEDIA START             *
*                             PROGRAM)                                          *
*                                                                               *
*  INPUT             = NONE                                                     *
*                                                                               *
*  OUTPUT            = NONE                                                     *
*                                                                               *
*  EXIT-NORMAL       = OCCURS ONLY WHEN AN AUTHORIZED DISKETTE SWAP             *
*                      IS MADE.                                                 *
*                                                                               *
*  EXIT-ERROR        = ONLY ON A HARD DISKETTE ERROR WHICH CAUSES A             *
*                      POWER ON RESET TO BE ISSUED.                             *
*                                                                               *
*  EXTERNAL-REFERENCES = SEE BELOW                                              *
*                                                                               *
*        INCLUDED CODE  =  MOM IS THE DATA SET NAME                             *
*                                                                               *
*        ROUTINES       = YYPOLL  MEDIA FEATURE POLLING ROUTINE                 *
*                                                                               *
*                         YYTPOL  SATELLITE SIGNUP ROUTINE FOR THE              *
*                                 MEDIA FEATURE                                 *
*                                                                               *
*                         YYMSEL  THIS ROUTINE IS THE MEDIA FEATURES            *
*                                 MODE SELECTION HANDLER                        *
*                                                                               *
*        DATA-AREAS     = CONFIGURATION AREA                                    *
*                         MEDIA COMMON AREA (SEE MCOML)                         *
*                                                                               *
*        CONTROL-BLOCKS = CCMOCB AND CCMPCB                                     *
*                                                                               *
*                                                                               *
*                                                                               *
*  MACROS            =    MEDIA COMMON EQUATES, DISK EQUATES, COMMON            *
*                         AREA EQUATES ECT.                                     *
*                                                                               *
*                                                                               *
*                                                                               *
*  DATA SET          = SOURCE CODE AND OBJECT MODULE INFORMATION                *
*                                                                               *
*        SOURCE CODE LOCATION    = APPLICATION TERMINAL DEV. CTR                *
*                                  CARD FILE                                    *
*                                                                               *
*        SOURCE CODE NAME        = BGNMOM                                       *
*                                                                               *
*                                                                               *
*                                                                               *
*                                                                               *
```

```
                        *      OBJECT MODULE NAME     = BGNMON
                        *
                        *
                        *
                        ************************************************************************
0000                    MPICC  START
                        *      FTYPE
                        **     STAND ALONE STATION PROGRAM
                        **     WREN PROGRAM
                        **     RAM PROGRAM
                  0001         ENTRY CMNSAV
                  0109         ENTRY AB250
                  010A         ENTRY AB202
                  0114         ENTRY AB213
                  012B         ENTRY AB233
                  012C         ENTRY AB234
                  0133         ENTRY AB235
                  013A         ENTRY AB236
                  0141         ENTRY AB237
                  0148         ENTRY AB238
                  014F         ENTRY AB239
                  00F5         ENTRY CFLAG
                  0001         EXTRN YYACOD
                  0002         EXTRN YYPOLL
                  0003         EXTRN YYTPOL
                  0004         EXTRN YYMSEL
                  0005         EXTRN YYLMHD
                  0006         EXTRN LAC9
0000 34 01 0001                ST     CMNSAV,XR1
0004 C0 87 0005                B      YYLMHD                           LOG THE HEADER
                        *-----------------------------------------------------------------------
                        *      MEDIA OPERATIONAL MODE
                        *-----------------------------------------------------------------------
0008 C0 87 0001         ISSAC9 B      YYACOD                           ISSUE WAIT FOR ACTION CODE
                  000C  WAITAC EQU    *
000C C0 87 0004                B      YYMSEL
0010 0008         0011         DC     AL2(ISSAC9)
0012 0008         0013         DC     AL2(ISSAC9)
                  0014  SOHEAD EQU    *
0014 35 02 0001                L      CMNSAV,XR2
0018 BD F2 0C                  CLI    CCMODE(,XR2),SECMOD              SECONDARY MODE SELECTED
001B C0 81 0028                BE     PAGSEC                           PAGE IN SECONDARY MODE
001F BD F4 0C                  CLI    CCMODE(,XR2),X'F4'               SIGN OFF SELECTED
0022 C0 01 0030                BNE    RDCNF
                        *      SVC
0026 F5           0026  *      DC     XL1'F5'
0027 05           0027         DC     AL1(XXIPLM)                      GO TO MEDIA START
                  0028  PAGSEC EQU    *
0028 C2 01 0002                LA     SECPAG,XR1                       PUT IT XR1 AT OSN OF SEC. MODE PAGE
                        *      SVC
002C F5           002C  *      DC     XL1'F5'
002D 06           002D         DC     AL1(XXPAGM)
                        ***    INCASE OF AN ERROR -- PAGING
                        *      SVC
002E F5           002E  *      DC     XL1'F5'
002F 08           002F         DC     AL1(XXMERM)
                        ***
                        ***    READ THE CONFIGURATION TABLE
                        ***
                  0030  RDCNF  EQU    *
                        *      SVC
0030 F5           0030  *      DC     XL1'F5'
0031 26           0031         DC     AL1(XXDRWM)
0032 0000         0033         DC     AL2(0)                           ERROR LINKAGE TO XXMERM
0034 0008         0035         DC     AL2(DSKCB)                       C.B. ADDRESS
0036 0000         0037         DC     AL2(0)                           LOGICAL RECORD OFFSET
0038 0200         0039         DC     XL2'0200'                        READ COMMAND
                        *-----------------------------------------------------------------------
                        *      INITIALIZATION OF CCFLAG/CCQ3/CCQ6/IAL1/IAL2
                        *-----------------------------------------------------------------------
                  003A  INTLIZ EQU    *
003A 35 02 0001                L      CMNSAV,XR2
003E C2 01 01F5                LA     ABPOLL,XR1
0042 D2 01 02                  LA     2(,XR1),XR1                      XR1    1ST ENTRY OF POLL LIST
0045 B4 01 16                  ST     CCPADR(,XR2),XR1
0048 BA 20 07                  SBF    CCFLAG(,XR2),X'20'               RESET Q3 RESPONSE ALLOWED
004B 8C FF 13                  MVI    CCQ3(,XR2),X'FF'                 SET Q3 TO FF
004E 8C FF 14                  MVI    CCQ6(,XR2),X'FF'                 SET Q6 TO FF
0051 8C FF 15                  MVI    CCIAL1(,XR2),X'FF'               SET CCIAL1 TO FF
0054 8C FF 16                  MVI    CCIAL2(,XR2),X'FF'               SET CCIAL2 TO FF
0057 BD F3 0C                  CLI    CCMODE(,XR2),STAMOD
005A F2 01 07                  JNE    CALPOL
005D C2 01 01F5                LA     ABPOLL,XR1                       ELSE, THERE IS ONLY 1 PHY ADR (00)
0061 7C FF 00                  MVI    13(,XR1),X'FF'                   SET END OF POLL TABLE
                  0064  CALPOL EQU    *
0064 C0 87 0002                B      YYPOLL                           CALL POLLING ROUTINE
0068 C0 87 0004                B      YYMSEL
006C 0095         006D         DC     AL2(DIFMOD)                      SELECTED AN UP MODE
006E 00C4         006F         DC     AL2(SAMET)                       SELECTED SAME MODE
                  0070  INCPTR EQU    *
0070 AE 01 18 0008             ALC    CCPADR(2,XR2),BUMPTR             BUMP POLL PTR TO NEXT PHY ADR
0075 35 01 18                  L      CCPADR(,XR2),XR1
0078 7D FF 00                  CLI    0(,XR1),X'FF'                    END OF POLL LIST
007B C0 01 0064                BNE    CALPOL                           IF NO, GOTO CALPOL
007F BD FF 13                  CLI    CCQ3(,XR2),X'FF'                 Q3 EMPTY
0082 C0 01 003A                BNE    INTLIZ                           IF NO KEEP ON SERVICING Q3
0086 BD FF 14                  CLI    CCQ6(,XR2),X'FF'                 Q6 EMPTY
0089 C0 01 00A5                BNE    SERVQ6                           IF NO, SERVICE Q6
008D C0 87 0003                B      YYTPOL                           CALL POWER ON TRANSISTION
0091 C0 87 003A                B      INTLIZ
                  0095  DIFMOD EQU    *
0095 BD F2 0C                  CLI    CCMODE(,XR2),SECMOD              IS SEC. MODE REQUESTED
0098 C0 81 0028                BE     PAGSEC                           PAGE IN SECONDARY MODE
009C BD F4 0C                  CLI    CCMODE(,XR2),X'F4'               SIGN OFF SELECTED
009F C0 01 0008                BNE    ISSAC9
                        *      SVC
00A3 F5           00A3  *      DC     XL1'F5'
00A4 05           00A4         DC     AL1(XXIPLM)                      GO TO MEDIA START
                  00A5  SERVQ6 EQU    *
00A5 35 02 0001                L      CMNSAV,XR2
00A9 BA 20 07                  SBN    CCFLAG(,XR2),X'20'               SET Q6 RESPONSE ALLOWED
00AC 2C 00 00DA 14             MVC    LOIADR+1(1),CCQ6(,XR2)
                        *      SVC
00B1 F5           00B1  *      DC     XL1'F5'
00B2 1A           00B2         DC     AL1(XXVER2)
00B3 01F5         00B4         DC     AL2(ABPOLL)
00B5 0009         00B6         DC     AL2(LOIADR)
00B7 00CC         00B8         DC     AL2(SERRGR)
```

```
0039 84 01 1B        271       ST    CCPADR(,XR2),XR1
003C C0 87 0002      272       B     YYPOLL
0040 C0 87 003A      273       B     INITIZ

               00C4  275 SAME  EQU   *
00C4 C0 87 0001      276       B     YYACOD                  ISSUE WAIT FOR ACTION CODE
00C8 C0 87 0070      277       B     INCPTR

00CC C0 87 00CC      280 SERROR B    SERROR                  SOFTWARE ERROR

                     282 *         MCOMN
                     283+*-------------------------------------------------------
                     284+*         MEDIA COMMON EQUATES                          *
                     285+*-------------------------------------------------------

               0001  287+XR1     EQU   X'01'
               0002  288+XR2     EQU   X'02'
               0008  289+ARR     EQU   X'08'

               0008  291+UC      EQU   X'08'             UNIT CHECK
               0004  292+SE      EQU   X'04'             SATELLITE EXCEPTION
               0002  293+DE      EQU   X'02'             DEVICE END
               0001  294+UE      EQU   X'01'             UNIT EXCEPTION

               0002  296+ESP     EQU   X'02'             EXCEPTION STATUS IN PROCESS
               001A  297+VFLL    EQU   X'1A'             VIRTUAL FILE LENGTH
               0001  298+NORESP  EQU   X'01'             NO RESPONSE EXCEPTION STATUS BIT
               000C  299+QEMPTY  EQU   X'0C'             QUEUE EMPTY STATUS
               000A  300+OVRUN   EQU   X'0A'             STORAGE OVERRUN STATUS
               000E  301+PUTEXC  EQU   X'0E'             PUT EXCEPTION STATUS
               0010  302+QUEUE3  EQU   X'10'             QUEUE 3 STATUS
               0002  303+QUEUE6  EQU   X'02'             QUEUE 6 STATUS
               0004  304+DATADD  EQU   X'04'             DATA ADDRESS PIA CB

               0080  306+ACTIVE  EQU   X'80'
               0008  307+LINE1   EQU   X'08'
               0010  308+LINE2   EQU   X'10'
               0078  309+SATID   EQU   X'78'             SATELLITE GPOST ID
               0079  310+MEDID   EQU   X'79'             MEDIA GPOST ID
               00F1  311+PRIMOD  EQU   X'F1'             PRIMARY MODE
               00F2  312+SECMOD  EQU   X'F2'             SECONDARY MODE
               00F3  313+STAMOD  EQU   X'F3'             STANALONE MODE

                     315+* COMMAND BYTEO ASSIGNMENT
               0001  316+SETMOD  EQU   X'01'             SET MODE
               0002  317+SETADR  EQU   X'02'             SET ADDRESS
               0003  318+RESET   EQU   X'03'             RESET
               0004  319+RDID    EQU   X'04'             READ ID
               0005  320+RDIOB   EQU   X'05'             READ IOB
               0006  321+RDDATA  EQU   X'06'             READ DATA
               0007  322+WRIOB   EQU   X'07'             WRITE IOB
               0008  323+WRDATA  EQU   X'08'             WRITE DATA
               0009  324+POL     EQU   X'09'             POLL
               000A  325+POLRST  EQU   X'0A'             POLL RESET
               000B  326+POLACK  EQU   X'0B'             POLL ACK
               000C  327+CLEAR   EQU   X'0C'             CLEAR
               000D  328+LINACT  EQU   X'0D'             LINE ACTIVATE
               000E  329+RSTIMA  EQU   X'0E'             RESET IMA
               000F  330+MONLIN  EQU   X'0F'             MONITOR LINE
               0010  331+EMOD1   EQU   X'10'             ENABLE MODE 1
               0011  332+EMOD2   EQU   X'11'             ENABLE MODE 2
               0012  333+EMOD3   EQU   X'12'             ENABLE MODE 3
               0060  334+QUEID3  EQU   X'60'             QUEUE 3 REQUESTS WILL BE ACCEPTE
               00C0  335+QUEID6  EQU   X'C0'             QUEUE 6 REQUESTS WILL BE ACCEPTE

                     337 *         MRCEQ
                     338+****************************************************************
                     339+*                                                              *
                     340+*         REQUEST CODE EQUATES FOR SUBROUTINES MEDIA           *
                     341+*                                                              *
                     342+****************************************************************

                     344+*             MEDIA REQUEST CODE EQUATES

               0080  346+CHAIN   EQU   X'80'             INDICATOR BIT FOR CHAINING
               0000  347+XXPIO   EQU   X'00'
               0001  348+XXVRIO  EQU   X'01'
               0002  349+XXVPIO  EQU   X'02'
               0004  350+XXCOLX  EQU   X'04'
               0005  351+XXIPLM  EQU   X'05'
               0006  352+XXPAGM  EQU   X'06'
               0007  353+XXKBSM  EQU   X'07'
               0008  354+XXMERM  EQU   X'08'
               0009  355+XXGDCM  EQU   X'09'
               000A  356+XXCNCM  EQU   X'0A'
               000C  357+XXKBKM  EQU   X'0C'
               000D  358+XXSAVE  EQU   X'0D'
               000E  359+XXKMMX  EQU   X'0E'
               000F  360+XXGMMX  EQU   X'0F'
               0010  361+XXCDTA  EQU   X'10'
               0011  362+XXCDTL  EQU   X'11'
               0012  363+XXCDIX  EQU   X'12'
               0013  364+XXPRT3  EQU   X'13'
               0014  365+XXPRT2  EQU   X'14'
               0015  366+XXMOVE  EQU   X'15'
               0016  367+XXPERM  EQU   X'16'
               0017  368+XXELGM  EQU   X'17'
               0018  369+XXRCVM  EQU   X'18'
               0019  370+XXVERT  EQU   X'19'
               001A  371+XXVER2  EQU   X'1A'
               001B  372+XXVER3  EQU   X'1B'
               001C  373+XXVER4  EQU   X'1C'
               001D  374+XXFNK1  EQU   X'1D'
               001E  375+XXFNK2  EQU   X'1E'
               0020  376+XXMSGM  EQU   X'20'
               0021  377+XXIEL   EQU   X'21'
               0022  378+XXNVLM  EQU   X'22'
               0024  379+XXDISM  EQU   X'24'
               0025  380+XXPRSM  EQU   X'25'
               0026  381+XXDKWM  EQU   X'26'
               0027  382+XXLOGM  EQU   X'27'
               002D  383+XXDLSM  EQU   X'2D'
               0036  384+XXDKSM  EQU   X'36'
               003A  385+XXBL    EQU   X'3A'
               003B  386+XXBNE   EQU   X'3B'
               003C  387+XXBLT   EQU   X'3C'
               003D  388+XXBLE   EQU   X'3D'
               003E  389+XXBVT   EQU   X'3E'
               003F  390+XXBGE   EQU   X'3F'
               0040  391+XXSRCH  EQU   X'40'
               0041  392+XXVRI1  EQU   X'41'
               0042  393+XXVRI2  EQU   X'42'
               0043  394+XXVRI3  EQU   X'43'
               0044  395+XXVRI4  EQU   X'44'
               0045  396+XXVRS1  EQU   X'45'
               0046  397+XXVRS2  EQU   X'46'
               0047  398+XXVRS3  EQU   X'47'
```

```
0048        *XXVRS4 EQU   X'48'
004A        *XXSER2 EQU   X'4A'
004B        *XXBVA  EQU   X'4B'
004C        *XXMBLA EQU   X'4C'
004D        *XXPIA  EQU   X'4D'
004E        *XXTIME EQU   X'4E'

             *       MCMEQ
            **
            *******************************************************************
            **                                                                *
            **       COMMON AREA EQUATES-SEE MCOMI FOR DESCRIPTION OF FIELDS  *
            **                                                                *
            *******************************************************************
            **
0000        *CCPLEN EQU   X'00'                                  RECORDS IN PAGE BUFFER
0001        *CCLINE EQU   CCPLEN+1                             LINE POSISTION OF INSERTED DOC.
0003        *CCIEL  EQU   CCLINE+2                             INPUT ERROR LINKAGE ADDR.
0004        *CCSTA1 EQU   CCIEL+1                              STATUS BYTE  1
0005        *CCSTA2 EQU   CCSTA1+1                             STATUS BYTE 2
0006        *CCFLG1 EQU   CCSTA2+1                             SUBROUTINE FLAGS
0007        *CCFLAG EQU   CCFLG1+1                             MEDIA FLAGS
0009        *CCDERP EQU   CCFLAG+2                             DISK ERROR RECOVERY ADDRESS
000B        *CCLNK  EQU   CCDERP+2                             MEDIA LINKAGE ADDR. SAVE AREA
000C        *CCMODE EQU   CCLNK +1                             MEDIA CURRENT MODE
000E        *CCKPT  EQU   CCMODE+2                             ADDR. OF KEY TRANSLATION TABLE
0010        *CCNVTL EQU   CCKPT+2                              ADDR. OF THE NON-VOLATILE TOTALS
0012        *CCMCM2 EQU   CCNVTL+2                             ADDR. OF SECOND COMMO. AREA TACO
0013        *CCQ3   EQU   CCMCM2+1                             LOGGING REQUEST STATUS
0014        *CCQ6   EQU   CCQ3+1                               PAGING REQUEST STATUS
0015        *CCIAL1 EQU   CCQ6+1                               PHYS. ADDR. LINE 1
0016        *CCIAL2 EQU   CCIAL1+1                             PHYS.ADDR.LINE 2
0018        *CCPADR EQU   CCIAL2+2                             PULL ADDRESS
001B        *CCRSEC EQU   CCPADR+3                               REMAINING SECTORS IL I
001E        *CCPEW  EQU   CCRSEC+3                             PERSONALIZED EARLY WARNING SECTO
            **                                                 THRESHOLD
001F        *CCDECP EQU   CCPEW+1                              PERSONALIZED DECIMAL POINT POSIS
002B        *CCSUED EQU   CCDECP+12                            PERSONALIZED SUPPRESS EDIT FIELD
002C        *CCVFIO EQU   CCSUED+1                             C.B. SAVE AREA
0049        *CCDATE EQU   CCVFIO+29                            DATE SAVE AREA
0050        *CCEDAT EQU   CCDATE+7                             EDITED DATE FIELD
0058        *CCCLID EQU   CCEDAT+8                             STORE REGISTER SAVE AREA
005F        *CCACTN EQU   CCCLID+7                             ACTION CODE SAVE AREA
0063        *CCIOWK EQU   CCACTN+4                             ADDR. OF I/O WORK AREA
0064        *CCPCB1 EQU   CCIOWK+1                             VITUAL PRINTER C.B.
006E        *CCPCB2 EQU   CCPCB1+10                            VITUAL PRINTER C.B.
0078        *CCMDCB EQU   CCPCB2+10                            MEDIA TRANSACTION LOGGING USE
            **                                                 ONLY DIO CONTROL BLOCK
0092        *CCMPCB EQU   CCMDCB+26                            PAGEING CONTROL BLOCK
00AC        *CCPACB EQU   CCMPCB+26                            INTER-MACHINE ADAPTER C.B.
            **                                                 FOR USE WITH XXPIA
00BB        *CCVKCB EQU   CCPMCB+15                            VIRTUAL KEYBOARD/DISPLAY C.B.
00CC        *CCKYBL EQU   CCVKCB+17                            KEYBOARD BUFFER LL
00CD        *CCKYBF EQU   CCKYBL+1                             LEFT MOST BYTE OF KEY/DD BUFFER
00ED        *CCLBUF EQU   CCKYBF+32                            LOG ITEM BUFFER
            ** THE FOLLOWING ARE DISPLACED 256 FROM THE COMMON AREA
000B        *CCPBUF EQU   X'0B'                                PRINT BUFFER FOR I/O
004A        *CCPBF1 EQU   CCPBUF+63                            PRINT BUFFER 1
0089        *CCPBF2 EQU   CCPBF1+63                            PRINT BUFFER 2
00C8        *CCLR1  EQU   CCPBF2+63                            LEFT BYTE OF LOG REC. BUFFER
            ** THE FOLLOWING ARE DISPLACED 512 FROM THE COMMON AREA
00C7        *CCLR1R EQU   X'C7'                                RIGHTMOST BYTE OF ABOVE
00C8        *CCLR2  EQU   CCLR1R+1                             LEFT MOST BYTE OF LOG REC. BUFFE
            ** THE FOLLOWING ARE DISPLACED 768 FROM THE COMMON AREA
00C7        *CCLR2R EQU   X'C7'                                RIGHTMOST BYTE OF ABOVE
00C8        *CCERCB EQU   CCLR2R+1                             XXRCVM'S ERROR CONTROL BLOCK
            **
00D9        *CCRMTB EQU   CCERCB+17                            RAM ROUT TABLE ADDRESS
00DB        *CCPBA  EQU   CCRMTB+2                             ADDRESS OF THE PAGE ADDRES WITH
            **                                                 PATCHES IF ANY
            **

             *       ACTEQ
            **
            *******************************************************************
            **                                                                *
            **                 ACTION CODE EQUATES                            *
            **                                                                *
            *******************************************************************
            **
0001        *SGNOFF EQU   01                                   SIGN OFF
0002        *LGERAS EQU   02                                   LOG ERASE
0003        *DIAGNS EQU   03                                   DIAGNOSTIC
000B        *PERS1  EQU   11                                   OPTIONS 1 PERSONALIZATION
000C        *PERS2  EQU   12                                   OPTIONS 2 PERSONALIZATION
000D        *PERS13 EQU   13                                   RESERVED FOR PERSONALIZATION
000E        *PERS14 EQU   14                                   RESERVED FOR PERSONALIZATION
000F        *STPER  EQU   15                                   SALES TABLES PERSONALIZATION
0010        *NSTPER EQU   16                                   NON-SALES TABLES PERSONALIZATION
0011        *SCRPER EQU   17                                   SECURITY REQUIREMENTS PERSONALIZ
0012        *SCCPER EQU   18                                   SECURITY CODE PERSONALIZATION
0015        *MTRR   EQU   21                                   MACHINE CONTROL TOTALS READOUT W
0016        *CD1TRR EQU   22                                   CASH DRAWER 1 CONTROL TOTALS REA
0017        *CD2TRR EQU   23                                   CASH DRAWER 2 CONTROL TOTALS REA
0018        *RTTRR  EQU   24                                   REAL-TIME TOTALS READOUT WITH RE
0019        *OPNST  EQU   25                                   OPEN SALES TRANSACTIONS - CASHIE
001A        *OPNSTN EQU   26                                   OPEN SALES TRANSACTIONS - NON-CA
0023        *VOTOPT EQU   35                                   VOID PRIOR TRANSACTION
0024        *TRETRY EQU   36                                   TRANSACTION RE-ENTRY
0025        *TRNCM  EQU   37                                   TRAINING - CASHIERING MODE
0026        *TRNNCM EQU   38                                   TRAINING - NON-CASHIERING MODE
0029        *DATA41 EQU   41                                   DATA ENTRY MODE 41
002A        *DATA42 EQU   42                                   DATA ENTRY MODE 42
002B        *DATA43 EQU   43                                   DATA ENTRY MODE 43
002C        *MFC    EQU   44                                   CASH COUNT AND MACHINE
            **                                                   FINANCIAL CLOSE
002D        *D1FC   EQU   45                                   CASH COUNT AND CASH DRAWER 1
            **                                                   FINANCIAL CLOSE
002E        *D2FC   EQU   46                                   CASH COUNT AND CASH DRAWER 2
            **                                                   FINANCIAL CLOSE
002F        *CASHC  EQU   47                                   CASH COUNT
0033        *MTR    EQU   51                                   MACHINE CONTROL TOTALS READOUT
0034        *CD1TR  EQU   52                                   CASH DRAWER 1 CONTROL TOTALS REA
0035        *CD2TR  EQU   53                                   CASH DRAWER 2 CONTROL TOTALS REA
0036        *RTTR   EQU   54                                   REAL-TIME TOTALS READOUT
0037        *LOAN   EQU   55                                   LOAN
0038        *WITHDR EQU   56                                   WITHDRAWAL
003D        *CLOSE  EQU   61                                   CLOSE SALES TRANSACTIONS
0052        *TLOGPR EQU   82                                   TRANSACTION LOG PRINTOUT
0053        *RGATTL EQU   83                                   REGISTER AUXILIARY TOTALS
0054        *CLATTL EQU   84                                   CLUSTER AUXILIARY TOTALS
0055        *TSD    EQU   95                                   TRANSMIT SINGLE DISKETTE
0056        *TMD    EQU   96                                   TRANSMIT MULTIPLE DISKETTES
            **  NOTE   ACTION CODE 99 IS NOT OPERATOR SELECTABLE
0063        *POWRES EQU   99                                   POWER-ON RESET
            **
            **
```

```
         *       PRTEQ
        +*
        +*****************************************************************
        +*                                                               *
        +*       PRINT SUBROUTINES EQUATES                               *
        +*                                                               *
        +*****************************************************************
        +*
        +***     COMMAND BYTES
        +*
4000    +EJECT   EQU   X'4000'                      EJECT
2000    +AUTOIN  EQU   X'2000'                      AUTO INSERT
1000    +MANIN   EQU   X'1000'                      MANUAL INSERT
0800    +DBLW    EQU   X'0800'                      DOUBLE WIDTH
0400    +PRSSK   EQU   X'0400'                      PRINT ON SALES SLIP OR RECEIPT
0200    +PRJR    EQU   X'0200'                      PRINT ON JOURNAL
0100    +TWOBUF  EQU   X'0100'                      USE TWO BUFFERS
        +*
0080    +OPEN1   EQU   X'0080'                      OPEN DRAWER 1
0040    +OPEN2   EQU   X'0040'                      OPEN DRAWER 2
        +*
        +***     FLAG BYTE
        +*
        +*       CNCL  EQU TN GOCEQ MACRO           CANCEL OUTSTANDING COMMANDS
        +*       WDE   EQU IN GOCEQ MACRO           WAIT FOR DEVICE END
        +*

         *       KEYEQ
        +*
        +*****************************************************************
        +*                                                               *
        +*       PERSONALIZED KEY CODE EQUATES                           *
        +*                                                               *
        +*****************************************************************
        +*
        +***     PERSONALIZABLE KEYS     *********************************
        +*
0001    +PAY     EQU   1                            PAYMENT
0001    +PAYMNT  EQU   PAY
0002    +DEP     EQU   2                            DEPOSIT
0003    +NMDS    EQU   3                            NON-MERCHANDISE
0004    +ALW     EQU   4                            ALLOWANCE
0005    +DIS     EQU   5                            DISCOUNT
0006    +TAX     EQU   6                            TAX CODE
0007    +REPEAT  EQU   7                            REPEAT
0008    +RETURN  EQU   8                            RETURN
0009    +DEPT    EQU   9                            DEPARTMENT
000A    +CLASS   EQU   10                           CLASS
000B    +STOCK   EQU   11                           STOCK
000C    +STOT    EQU   12                           SUBTOTAL
000D    +MTAX    EQU   13                           MODIFY TAX
000E    +QTY     EQU   14                           QUANTITY
000F    +TOT     EQU   15                           TOTAL
000F    +TOTAL   EQU   TOT
0010    +SKU     EQU   16                           SKU
0011    +SALEP   EQU   17                           ORIGINAL PRICE
0011    +UPRIC   EQU   17                           ORIGINAL PRICE
0012    +DATA    EQU   18                           DATA
        +*
        +***     NON-PERSONALIZABLE KEYS     *****************************
        +*
0028    +ACTION  EQU   40                           ACTION
002E    +CL      EQU   46                           CLEAR
002E    +CLEAR   EQU   46                           CLEAR
0030    +EN      EQU   48                           ENTER
0030    +ENTER   EQU   48                           ENTER
0031    +DECP    EQU   49                           DECIMAL POINT
003E    +SL      EQU   62                           SLASH
003E    +SLASH   EQU   62                           SLASH
003F    +VOID    EQU   63                           VOID

         *       GOCEQ
        +*
        +*****************************************************************
        +*                                                               *
        +*       GUIDANCE SUBROUTINE EQUATES                             *
        +*                                                               *
        +*****************************************************************
        +*
        +*
        +***     DRUM PROMPTS
        +*
0000    +PRCL    EQU   0                            PRESS CLEAR
0001    +CSHR    EQU   1                            CASHIER
0002    +SALP    EQU   2                            SALESPERSON
0003    +TRANT   EQU   3                            TYPE TRANSACTION
0004    +AUTH    EQU   4                            AUTHORIZATION
0005    +SCRTY   EQU   5                            SECURITY
0006    +AIN     EQU   6                            AUTO INSERT SLIP
0007    +ACCT    EQU   7                            ACCOUNT NUMBER
0008    +PBAL    EQU   8                            PREVIOUS BALANCE
0009    +DEPAR   EQU   9                            DEPARTMENT
000A    +CLAS    EQU   10                           CLASS
000B    +STK     EQU   11                           STOCK
000C    +SKUNIT  EQU   12                           SKU
000D    +AMT     EQU   13                           AMOUNT
000E    +PCNT    EQU   14                           PERCENT
000F    +FEE     EQU   15                           FEE
0010    +DEPOS   EQU   16                           DEPOSIT
0011    +OSALP   EQU   17                           ORIGINAL SALESPERSON
0012    +MINAT   EQU   18                           MANUAL INSERT/AMOUNT TENDERED
0013    +MIN     EQU   19                           MANUAL INSERT
0014    +MINTOT  EQU   20                           MANUAL INSERT/TOTAL TRAN.
0015    +DISPPR  EQU   21                           SEE DISPLAY
0016    +CLSDRW  EQU   22                           CLOSE CASH DRAWER
        +*
        +***     COMMAND BYTES
        +*
8000    +ALARM   EQU   X'8000'                      ALARM
0300    +UPROM   EQU   X'0300'                      UPDATE PROMPT
0400    +RHC     EQU   X'0400'                      READ HARD COUNTERS
0200    +WHC     EQU   X'0200'                      WRITE HARD COUNTERS
        +*
0080    +BUFRES  EQU   X'0080'                      BUFFER RESET
0040    +SKEY    EQU   X'0040'                      SINGLE KEY MODE
0020    +ENWND   EQU   X'0020'                      ENABLE WAND
0010    +ENKEY   EQU   X'0010'                      ENABLE KEYBOARD
0004    +ENDP    EQU   X'0004'                      ENABLE DECIMAL POINT
0002    +INHIB   EQU   X'0002'                      INHIBIT DISPLAY
        +*
        +***     FLAG BYTE
        +*
0040    +RTFN    EQU   X'40'                        RETURN ON ANY FUNCTION KEY
0020    +TRFN    EQU   X'20'                        TRANSLATE FUNCTION CODES
0002    +CNCL    EQU   X'02'                        CANCEL OUTSTANDING COMMANDS
0001    +WDE     EQU   X'01'                        WAIT FOR DEVICE END
        +*
        +***     STATUS BYTE
        +*
```

```
                 0080  656+DECFM  EQU   X'80'              DECIMAL FORMAT DATA
                 0040  657+SDE    EQU   X'40'              SOME DIGITS ENTERED
                 0010  658+HPEN   EQU   X'10'              HALF PENCE
                 0008  659+DFWND  EQU   X'08'              DATA FROM WAND
                 0038  660+WAND   EQU   X'38'              DATA FROM WAND
                 0004  661+SECLS  EQU   X'04'              SECURITY LOCK STATUS
                 0001  662+HCFAIL EQU   X'01'              HARD COUNTER FAILURE
                       663+*
                       664+*
                       665+*
                       666+****************** DISPLAY EQUATES ************************************
                       667+*
                       668+*        COMMAND BYTES
                       669+*
                 0080  670+DSALRM EQU   X'80'              ALARM
                 0040  671+DS1    EQU   X'40'              UPDATE DISPLAY 1
                 0020  672+DS2    EQU   X'20'              UPDATE DISPLAY 2
                 0010  673+DSFLSH EQU   X'10'              FLASH DISPLAY
                 0002  674+DSSSGN EQU   X'02'              SUPRESS SIGN INDICATOR
                 0001  675+DSSZR  EQU   X'01'              SUPRESS LEADING ZEROS
                 0003  676+DSAUTO EQU   X'03'              AUTO FORMAT ( SUPRESS BOTH )
                       677+*
                       678+*        DISPLAY LEDS BYTE
                       679+*
                 0080  680+DSAMTD EQU   X'80'              AMOUNT DUE
                 0040  681+DSSUBT EQU   X'40'              SUBTOTAL
                 0020  682+DSCHNG EQU   X'20'              CHANGE
                 0010  683+DSREF  EQU   X'10'              REFUND
                 0008  684+DSCOMM EQU   X'08'              COMMUNICATION
                 0004  685+DSXTRA EQU   X'04'              EXTRA LED
                       686+*
                       687+*        DECIMAL POINT
                       688+*
                 00FF  689+DSPDP  EQU   X'FF'              PERSONALIZED DECIMAL POINT

                 00FF  691 EFF    EQU   X'FF'
0000             0001  692 CMNSAV DS    XL2
                 0002  693 SECPAG EQU   *
0002 7C04E2D6D4  0006  694        DC    CL5'@MSOM'
0007 0003        0008  695 BUMPTR DC    AL2(AB306-AB001)   PULL TABLE DISPLACEMENT
                 0009  696 LO1ADR EQU   *
0009 0100        000A  697        DC    XL2'0100'
                 000B  698 DSKCB  EQU   *
                       699 *      DTFMD ADDR-CFLAG,WORK-CFLAG,NUMR-EFF,DSN-@MCT
                       700+*      MEDIA FEATURE DISKETTE CONTROL BLOCK
000B 90          000B  701+       DC    XL1'90'            DEV ID DC,IDE
000C 00          000C  702+       DC    AL1(0)             R75,IDF,W128 R128,W256,R256,SYNC
000D 00          000D  703+       DC    AL1(0)             LOG ALL,INHIBIT CS
000E 00F5        000F  704+       DC    AL2(CFLAG)         DATA ADDRESS
00E0 00          00E0  705+       DC    XL1'00'            ERROR CODE
00E1 00          00E1  706+       DC    XL1'00'            ,RED TID,, ,POR LATCH,DISK IN
00E2 00F5        00E3  707+       DC    AL2(CFLAG)         WORK AREA ADDRESS
00E4 0000        00E5  708+       DC    AL2(0)             LOGICAL RECORD OFFSET
00E6 FF          00E6  709+       DC    AL1(EFF)           NUMBER OF LOGICAL RECORDS
00E7 7C04C3E340  00EB  710+       DC    CL5'@MCT'          DATA SET NAME OR DOE CCHRR
00EC 000000      00EE  711+       DC    XL3'0'             EOD CCHRR
00EF 000000      00F1  712+       DC    XL3'0'             EOE CCHRR
00F2 000000      00F4  713+       DC    XL3'000000'        DISK ERROR LOCATION
                       715 *        CNFIG
                       716+***********************************************************************
                       717+*                 SECTOR  1                                            *
                       718+***********************************************************************
00F5 80          00F5  719+CFLAG  DC    XL1'80'            CONFIGURATION TYPE FLAG
                       720+*            BIT 0 OFF= STANDALONE
                       721+*            BIT 0  ON= CLUSTER
00F6 00          00F6  722+       DC    XL1'00'            LEVEL CODE
00F7 F2F7F7F5F2F2F3 00FD  723+    DC    CL7'2775223'       PART NUMBER    2D  DOMESTIC CLUS
00FE F0F8F2F5F7F840 0104  724+    DC    CL7'082578 '       EC LEVEL CODE
0105 01          0105  725+AB8605 DC    XL1'01'            MEMORY SIZE FLAG BYTE
                       726+*        BITS(6 7) = RAM SIZE   '00'B = 16K,   '01'B = 24K,          *
                       727+*                               '10'B = 32K,   '11'B = NOT USED.     *
                       728+***********************************************************************
                       729+*        COMMON CONFIGURATION TO CLUSTER                             *
                       730+***********************************************************************

                 0106  732+       ENTRY ABCOMN
                 0106  733+ABCOMN EQU   *
                 0106  734+AB201  EQU   *
0106 F0F2F0      0108  735+       DC    CL3'020'           NUMBER SECTORS FOR EARLY
                       736+*                                 WARNING

0109 80          0109  738+AB250  DC    XL1'80'            MEDIA OPERATIONAL MODE SELECT
                       739+*        BIT 0 ON = PROMPT FOR MEDIA OPERATIONAL MODE AT SIGN ON
                       740+*        BIT 1 ON = NO PROMPT AND DEFAULT TO PRIMARY
                       741+*        BIT 2 ON = NO PROMPT AND DEFAULT TO SECONDARY
                       742+*        BIT 3 ON = NO PROMPT AND DEFAULT TO STANDALONE

                 010A  744+AB202  EQU   *
010A 00          010A  745+       DC    XL1'00'            DISKETTE LOGGING FORMAT
                       746+*        BIT 0 ON = LOGGING EXTENDED FORMAT
                       747+*        BIT 0 OFF = LOGGING BASIC FORMAT
                       748+*        BIT 1 ON = PRICE LOOKUP EXTENDED FORMAT
                       749+*        BIT 1 OFF = PRICE LOOKUP BASIC FORMAT
                       750+*        BIT 2 ON = NEGATIVE CREDIT FILE EXTENDED FORMAT
                       751+*        BIT 2 OFF = NEGATIVE CREDIT FILE BASIC FORMAT

                 010B  753+AB203  EQU   *
010B 80          010B  754+       DC    XL1'80'            TERMINAL PORT ASSIGNMENTS
                       755+*        BIT 0 ON = THERE ARE TERMINALS ON PORT 1
                       756+*        BIT 1 ON = THERE ARE TERMINALS ON PORT 2

                 010C  758+AB204  EQU   *
010C FF          010C  759+       DC    XL1'FF'            FUNCTION SELECTION (BYTE 1)
                       760+*        BIT 0 ON = OPTIONS PERSONALIZATION FUNCTION IS DESIRED
                       761+*        BIT 1 ON = TABLES PERSONALIZATION FUNCTION IS DESIRED
                       762+*        BIT 2 ON = TRANSACTION RE-ENTRY FUNCTION IS DESIRED
                       763+*        BIT 3 ON = TOTALS READOUT FUNCTION IS DESIRED
                       764+*        BIT 4 ON = LOAN/WITHDRAWAL FUNCTION IS DESIRED
                       765+*        BIT 5 ON = NOT USED
                       766+*        BIT 6 ON = OTHER DATA ENTRY FUNCTION IS DESIRED

                 010D  768+AB205  EQU   *
010D FF          010D  769+       DC    XL1'FF'            FUNCTION SELECTION (BYTE 2)
                       770+*        BIT 0 ON = VOID PRIOR TRANSACTION FUNCTION IS DESIRED
                       771+*        BIT 1 ON = AUXILLARY TOTALS FUNCTION IS DESIRED
                       772+*        BIT 2 ON = CASH COUNT FUNCTION IS DESIRED
                       773+*        BIT 3 ON = LOG PRINT FUNCTION IS DESIRED
                       774+*        BIT 4 ON = TRANSMIT MULTIPLE OR SINGLE DISKETTE FUNCTION
                       775+*                   IS DESIRED
                       776+*        BIT 5 ON = COPY PERSONALIZATION FUNCTION IS DESIRED
                       777+*        BIT 6 ON = MODIFY CONFIGURATION FUNCTION IS DESIRED
                       778+*        BIT 7 ON = CONFIGURATION FUNCTION IS DESIRED

                 010E  780+AB206  EQU   *
010E FF          010E  781+       DC    XL1'FF'            FUNCTION SELECTION (BYTE 3)
                       782+*        BIT 0 ON = FILE DATA ENTRY IS DESIRED
                       783+*        BIT 1 ON = SECURITY REQUIREMENTS PERS. IS DESIRED
```

```
                    784**              BIT 2 ON = STORE LEVEL SALES OPTIONS PERSONALIZATION IS
                    785**                         DESIRED
                    786**              BIT 3 ON = ENTERPRIZE LEVEL SALES OPTIONS PERSONALIZATION
                    787**                         IS DESIRED
                    788**              BIT 4 ON = NON-SALES OPTIONS PERSONALIZATION IS DESIRED
                    789**              BIT 5 ON = AUXILLIARY TOTALS TABLES PERSONALIZATION IS
                    790**                         DESIRED
                    791**              BIT 6 ON = SECURITY CODE PERSONALIZATION IS DESIRED
                    792**              BIT 7 ON = DATA ENTRY FORMAT TABLES PERSONALIZATION IS
                    793**                         DESIRED
010F 01      010F   795*AB207  EQU     *
             010F   796*       DC      XL1'1'                NUMBER OF TRACKS TO RESERVE
                    797**                                    FOR PRICE LOOKUP FILE
0110 01      0110   798*AB208  EQU     *
             0110   799*       DC      XL1'1'                NUMBER OF TRACKS TO RESERVE
                    800**                                    FOR NEGATIVE CREDIT FILE
0111 00      0111   802*AB210  EQU     *
             0111   803*       DC      XL1'00'               MEDIA FEATURE SIGN-ON LEVEL
0112 00      0112   804*AB211  EQU     *
             0112   805*       DC      XL1'00'               TRANSACTION LOG ERASE LEVEL
0113 00      0113   806*AB212  EQU     *
             0113   807*       DC      XL1'00'               MEDIA FEATURE DIAGNOSTICS LEVEL
0114 00      0114   808*AB213  EQU     *
             0114   809*       DC      XL1'00'               OPERATION MODE LEVEL
0115 00      0115   810*AB214  EQU     *
             0115   811*       DC      XL1'00'               ENTERPRIZE SALES OPTIONS
                    812**                                    PERSONALIZATION LEVEL
0116 00      0116   813*AB215  EQU     *
             0116   814*       DC      XL1'00'               STORE SALES OPTIONS
                    815**                                    PERSONALIZATION LEVEL
0117 00      0117   816*AB216  EQU     *
             0117   817*       DC      XL1'00'               NON-SALES OPTIONS
                    818**                                    PERSONALIZATION LEVEL
0118 00      0118   819*AB217  EQU     *
             0118   820*       DC      XL1'00'               MODIFY CONFIGURATION LEVEL
0119 00      0119   821*AB218  EQU     *
             0119   822*       DC      XL1'00'               SALES TABLES PERSONALIZATION
                    823**                                    LEVEL
011A 00      011A   824*AB219  EQU     *
             011A   825*       DC      XL1'00'               AUXILLARY TOTALS TABLES
                    826**                                    PERSONALIZATION LEVEL
011B 00      011B   827*AB220  EQU     *
             011B   828*       DC      XL1'00'               SECURITY REQUIREMENTS
                    829**                                    PERSONALIZATION LEVEL
011C 00      011C   830*AB221  EQU     *
             011C   831*       DC      XL1'00'               DATA ENTRY FORMAT TABLES
                    832**                                    PERSONALIZATION LEVEL
011D 00      011D   833*AB222  EQU     *
             011D   834*       DC      XL1'00'               REGISTER AUXILLARY TOTALS LEVEL
011E 00      011E   835*AB223  EQU     *
             011E   836*       DC      XL1'00'               CLUSTER AUXILLARY TOTALS LEVEL
011F 00      011F   837*AB224  EQU     *
             011F   838*       DC      XL1'00'               TRANSMIT SINGLE DISKETTE LEVEL
0120 00      0120   839*AB225  EQU     *
             0120   840*       DC      XL1'00'               TRANSMIT MULTIPLE DISKETTE LEVEL
0121 00      0121   841*AB226  EQU     *
             0121   842*       DC      XL1'00'               MULTIPLE DISKETTE TRANSACTION
                    843**                                    LOG PRINT LEVEL
0122 00      0122   844*AB227  EQU     *
             0122   845*       DC      XL1'00'               COPY PERSONALIZATION LEVEL
0123 00      0123   846*AB228  EQU     *
             0123   847*       DC      XL1'00'               MEDIA FEATURE SIGNOFF LEVEL
0124 00      0124   848*AB229  EQU     *
             0124   849*       DC      XL1'00'               VOID FUNCTION LEVEL
0125 00      0125   850*AB230  EQU     *
             0125   851*       DC      XL1'00'               FILE DATA ENTRY LEVEL
0126 00      0126   852*AB231  EQU     *
             0126   853*       DC      XL1'00'               TRANSMIT SINGLE DISKETTE/RECEIVE
                    854**                                    LEVEL
0127 00      0127   855*AB232  EQU     *
             0127   856*       DC      XL1'00'               TRANSMIT MULTIPLE DISKETTE/
                    857**                                    RECEIVE LEVEL
0128 00      0128   858*AB240  EQU     *
             0128   859*       DC      XL1'00'               RECEIVE LEVEL
0129 00      0129   860*AB241  EQU     *
             0129   861*       DC      XL1'00'               SECURITY CODE PERSONALIZATION
012A 00      012A   862*AB242  EQU     *
             012A   863*       DC      XL1'00'               CONFIGURATION LEVEL
012B 00      012B   865*AB233  EQU     *
             012B   866*       DC      XL1'00'               SECURITY REQUIREMENTS FLAG BYTE
                    867**              BIT 0 ON  = CODE OR KEY REQUIRED FOR SECURITY REQUIREMENTS
                    868**              BIT 0 OFF = KEY REQUIRED FOR SECURITY REQUIREMENTS
                    869**              BIT 1 ON  = CODE OR KEY REQUIRED FOR LEVEL 1
                    870**              BIT 1 OFF = KEY REQUIRED FOR LEVEL 1
                    871**              BIT 2 ON  = CODE OR KEY REQUIRED FOR LEVEL 2
                    872**              BIT 2 OFF = KEY REQUIRED FOR LEVEL 2
                    873**              BIT 3 ON  = CODE OR KEY REQUIRED FOR LEVEL 3
                    874**              BIT 3 OFF = KEY REQUIRED FOR LEVEL 3
                    875**              BIT 4 ON  = CODE OR KEY REQUIRED FOR LEVEL 4
                    876**              BIT 4 OFF = KEY REQUIRED FOR LEVEL 4
                    877**              BIT 5 ON  = CODE OR KEY REQUIRED FOR LEVEL 5
                    878**              BIT 5 OFF = KEY REQUIRED FOR LEVEL 5
012C 01      012C   880*AB234  EQU     *
012D FO      012D   881*       DC      XL1'1'
0132         012E   882*       DC      CL1'0'
             012F   883*       DS      CL5                   SECURITY CODE FOR LEVEL 1
0133 01      0133   884*AB235  EQU     *
0134 FO      0133   885*       DC      XL1'1'
013A         0134   886*       DC      CL1'0'
             0135   887*       DS      CL5                   SECURITY CODE FOR LEVEL 2
013A 01      013A   888*AB236  EQU     *
013B FO      013A   889*       DC      XL1'1'
0141         013B   890*       DC      CL1'0'
             013C   891*       DS      CL5                   SECURITY CODE FOR LEVEL 3
0141 01      0141   892*AB237  EQU     *
0142 FO      0141   893*       DC      XL1'1'
0148         0142   894*       DC      CL1'0'
             0143   895*       DS      CL5                   SECURITY CODE FOR LEVEL 4
0148 01      0148   896*AB238  EQU     *
0149 FO      0148   897*       DC      XL1'1'
014F         0149   898*       DC      CL1'0'
             014A   899*       DS      CL5                   SECURITY CODE FOR LEVEL 5
014F 01      014F   900*AB239  EQU     *
0150 FO      014F   901*       DC      XL1'1'
             0150   902*       DC      CL1'0'                SECURITY CODE FOR SECURITY
                    903**                                    REQUIREMENTS
0151         0155   904*       DS      CL5
0156         0174   905*       DS      31XL1                 SECTOR ALIGNMENT
                    906** ************************************************************
                    907** SECTOR 2
                    908** ************************************************************
                    909**
                    910**                        CONFIGURATION TABLES
                    911** ************************************************************
```

```
                          915+*****************************************************************
                          916+*        STORE/REGISTER CONFIGURATION                            *
                          917+*****************************************************************
                          918+*                                                                *
                          919+*        THE FOLLOWING IS THE FORMAT OF THE STORE/REGISTER TABLE  *
                          920+*        WHERE XXXXXX IS STORE/REGISTER NUMBER AND YY IS THE LAST *
                          921+*        TWO DIGITS OF THE PTAB DATA SET NAME                     *
                          922+*                                                                *
                          923+*            INDEX     FIELD1     FIELD2     FIELD3               *
                          924+*                                                                *
                          925+*            XXXXXX     SSYY       SNYY      FLAG BYTE            *
                          926+*                                                                *
                          927+*                                                                *
                          928+*        FLAG BYTE ASSIGNED AS FOLLOWS                            *
                          929+*             BIT(0) ON = STORE/REGISTER   ALLOCATED TO A TERMINAL. *
                          930+*             BIT(1) ON = CONFIG. USE ONLY (STORE/RG., PTABS LOADED). *
                          931+*             BITS(6 7) = RAM SIZE   '00'B = 16K,   '01'B = 24K,   *
                          932+*                                    '10'B = 32K,   '11'B = NOT USED. *
                          933+*                                                                *
                          934+*****************************************************************
                     0175 935+         ENTRY ABSTRG
                     0175 936+ABSTRG   EQU   *
0175 05              0175 937+         DC    IL1'05'
0176 0B              0176 938+         DC    IL1'11'
                          939+*****************************************************************
                     0177 940+AB301    EQU   *
0177 F0F0F0F0F0F1    017C 941+         DC    CL6'000001'          STORE/REGISTER NUMBER
                     017D 942+AB302    EQU   *
017D F0F1            017E 943+         DC    CL2'01'              SALES PERSONALIZATION FOR ST/RG
                     017F 944+AB303    EQU   *
017F F0F1            0180 945+         DC    CL2'01'              NONSALES PTAB FOR ST/RG
                     0181 946+AB305    EQU   *
0181 41              0181 947+AB306    DC    XL1'41'              FLAG BYTE
                          948+*-----------------------------------------------------------------*
                     0182 949+AB307    EQU   *
0182 F0F0F0F0F0F2    0187 950+         DC    CL6'000002'          STORE/REGISTER NUMBER
                     0188 951+AB308    EQU   *
0188 F0F1            0189 952+         DC    CL2'01'              SALES PERSONALIZATION FOR ST/RG
                     018A 953+AB309    EQU   *
018A F0F1            018B 954+         DC    CL2'01'              NONSALES PTAB FOR ST/RG
                     018C 955+AB311    EQU   *
018C 41              018C 956+AB312    DC    XL1'41'              FLAG BYTE
                          957+*-----------------------------------------------------------------*
                     018D 958+AB313    EQU   *
018D F0F0F0F0F0F3    0192 959+         DC    CL6'000003'          STORE/REGISTER NUMBER
                     0193 960+AB314    EQU   *
0193 F0F1            0194 961+         DC    CL2'01'              SALES PERSONALIZATION FOR ST/RG
                     0195 962+AB315    EQU   *
0195 F0F1            0196 963+         DC    CL2'01'              NONSALES PTAB FOR ST/RG
                     0197 964+AB317    EQU   *
0197 41              0197 965+AB318    DC    XL1'41'
                          966+*-----------------------------------------------------------------*
                     0198 967+AB319    EQU   *
0198 F0F0F0F0F0F4    019D 968+         DC    CL6'000004'          STORE/REGISTER NUMBER
                     019E 969+AB320    EQU   *
019E F0F1            019F 970+         DC    CL2'01'              SALES PERSONALIZATION FOR ST/RG
                     01A0 971+AB321    EQU   *
01A0 F0F1            01A1 972+         DC    CL2'01'              NONSALES PTAB FOR ST/RG
                     01A2 973+AB323    EQU   *
01A2 41              01A2 974+AB324    DC    XL1'41'              FLAG BYTE
                          975+*-----------------------------------------------------------------*
                     01A3 976+AB325    EQU   *
01A3 F0F0F0F0F0F5    01A8 977+         DC    CL6'000005'          STORE/REGISTER NUMBER
                     01A9 978+AB326    EQU   *
01A9 F0F1            01AA 979+         DC    CL2'01'              SALES PERSONALIZATION FOR ST/RG
                     01AB 980+AB327    EQU   *
01AB F0F1            01AC 981+         DC    CL2'01'              NONSALES PTAB FOR ST/RG
                     01AD 982+AB329    EQU   *
01AD 41              01AD 983+AB330    DC    XL1'41'
                          984+*-----------------------------------------------------------------*
                     01AE 985+AB331    EQU   *
01AE F0F0F0F0F0F6    01B3 986+         DC    CL6'000006'          STORE/REGISTER NUMBER
                     01B4 987+AB332    EQU   *
01B4 F0F1            01B5 988+         DC    CL2'01'              SALES PERSONALIZATION FOR ST/RG
                     01B6 989+AB333    EQU   *
01B6 F0F1            01B7 990+         DC    CL2'01'              NONSALES PTAB FOR ST/RG
                     01B8 991+AB335    EQU   *
01B8 41              01B8 992+AB336    DC    XL1'41'              FLAG BYTE
                          993+*-----------------------------------------------------------------*
                     01B9 994+AB337    EQU   *
01B9 F0F0F0F0F0F7    01BE 995+         DC    CL6'000007'          STORE/REGISTER NUMBER
                     01BF 996+AB338    EQU   *
01BF F0F1            01C0 997+         DC    CL2'01'              SALES PERSONALIZATION FOR ST/RG
                     01C1 998+AB339    EQU   *
01C1 F0F1            01C2 999+         DC    CL2'01'              NONSALES PTAB FOR ST/RG
                     01C3 1000+AB341   EQU   *
01C3 01              01C3 1001+AB342   DC    XL1'01'              FLAG BYTE
                          1002+*----------------------------------------------------------------*
                     01C4 1003+AB343   EQU   *
01C4 F0F0F0F0F0F8    01C9 1004+        DC    CL6'000008'          STORE/REGISTER NUMBER
                     01CA 1005+AB344   EQU   *
01CA F0F1            01CB 1006+        DC    CL2'01'              SALES PERSONALIZATION FOR ST/RG
                     01CC 1007+AB345   EQU   *
01CC F0F1            01CD 1008+        DC    CL2'01'              NONSALES PTAB FOR ST/RG
                     01CE 1009+AB347   EQU   *
01CE 01              01CE 1010+AB348   DC    XL1'01'              FLAG BYTE
                          1011+*----------------------------------------------------------------*
                     01CF 1012+AB349   EQU   *
01CF F0F0F0F0F0F9    01D4 1013+        DC    CL6'000009'          STORE/REGISTER NUMBER
                     01D5 1014+AB350   EQU   *
01D5 F0F1            01D6 1015+        DC    CL2'01'              SALES PERSONALIZATION FOR ST/RG
                     01D7 1016+AB351   EQU   *
01D7 F0F1            01D8 1017+        DC    CL2'01'              NONSALES PTAB FOR ST/RG
                     01D9 1018+AB353   EQU   *
01D9 01              01D9 1019+AB354   DC    XL1'01'              FLAG BYTE
                          1020+*----------------------------------------------------------------*
                     01DA 1021+AB355   EQU   *
01DA F0F0F0F0F1F0    01DF 1022+        DC    CL6'000010'          STORE/REGISTER NUMBER
                     01E0 1023+AB356   EQU   *
01E0 F0F1            01E1 1024+        DC    CL2'01'              SALES PERSONALIZATION FOR ST/RG
                     01E2 1025+AB357   EQU   *
01E2 F0F1            01E3 1026+        DC    CL2'01'              NONSALES PTAB FOR ST/RG
                     01E4 1027+AB359   EQU   *
01E4 01              01E4 1028+AB360   DC    XL1'01'              FLAG BYTE
                          1029+*----------------------------------------------------------------*
                     01E5 1030+AB361   EQU   *
01E5 F0F0F0F0F1F1    01EA 1031+        DC    CL6'000011'          STORE/REGISTER NUMBER
                     01EB 1032+AB362   EQU   *
01EB F0F1            01EC 1033+        DC    CL2'01'              SALES PERSONALIZATION FOR ST/RG
                     01ED 1034+AB363   EQU   *
01ED F0F1            01EE 1035+        DC    CL2'01'              NONSALES PTAB FOR ST/RG
                     01EF 1036+AB365   EQU   *
01EF 01              01EF 1037+AB366   DC    XL1'01'              FLAG BYTE
                          1038+*----------------------------------------------------------------*
01F0 FF              01F0 1039+        DC    XL1'FF'              END OF STORE/REGISTER TABLE
01F1 00000000        01F4 1040+        DC    4XL1'00'             SECTOR ALIGNMENT
```

```
                          1042+*************************************************************************
                          1043+*                   SECTOR  3                                           *
                          1044+*                                                                       *
                          1045+*************************************************************************
                          1046+*            POLL LIST                                                  *
                          1047+*************************************************************************
                   01F5   1049+             ENTRY ABPOLL
                   01F5   1050+ABPOLL       EQU   *
01F5 0008          01F6   1051+             DC    XL2'0008'         DISP/LL OF POLL LIST
                          1052+*************************************************************************
01F7 00            01F7   1053+AB001        DC    XL1'00'           LOCAL SATELLITE
01F8 80            01F8   1054+AB002        DC    XL1'80'           LOCAL SATELLITE IS ALWAYS ACTIVE
01F9 00            01F9   1055+AB003        DC    XL1'00'           ERROR COUNT
                   01FA   1056+AB004        EQU   *
01FA 4040          01FB   1057+             DC    2CL1' '
                   01FC   1058+AB005        EQU   *                 OFFSET FOR MODIFY ADD
01FC 000000000000  0201   1059+             DC    6XL1'00'          ST/RG
                          1060+*-----------------------------------------------------------------------*
0202 09            0202   1061+AB006        DC    XL1'09'           LINE 1, STATION   1
0203 00            0203   1062+AB007        DC    XL1'00'           FLAG BYTE
0204 00            0204   1063+AB008        DC    XL1'00'           ERROR COUNT
                   0205   1064+AB009        EQU   *
0205 4040          0206   1065+             DC    2CL1' '
                   0207   1066+AB010        EQU   *                 OFFSET FOR MODIFY ADD
0207 000000000000  020C   1067+             DC    6XL1'00'          ST/RG
                          1068+*-----------------------------------------------------------------------*
020D 11            020D   1069+AB011        DC    XL1'11'           LINE 2, STATION   1
020E 00            020E   1070+AB012        DC    XL1'00'           FLAG BYTE
020F 00            020F   1071+AB013        DC    XL1'00'           ERROR COUNT
                   0210   1072+AB014        EQU   *
0210 4040          0211   1073+             DC    2CL1' '
                   0212   1074+AB015        EQU   *                 OFFSET FOR MODIFY ADD
0212 000000000000  0217   1075+             DC    6XL1'00'          ST/RG
                          1076+*-----------------------------------------------------------------------*
0218 0A            0218   1077+AB016        DC    XL1'0A'           LINE 1, STATION   2
0219 00            0219   1078+AB017        DC    XL1'00'           FLAG BYTE
021A 00            021A   1079+AB018        DC    XL1'00'           ERROR COUNT
                   021B   1080+AB019        EQU   *
021B 4040          021C   1081+             DC    2CL1' '
                   021D   1082+AB020        EQU   *                 OFFSET FOR MODIFY ADD
021D 000000000000  0222   1083+             DC    6XL1'00'          ST/RG
                          1084+*-----------------------------------------------------------------------*
0223 12            0223   1085+AB021        DC    XL1'12'           LINE 2, STATION   2
0224 00            0224   1086+AB022        DC    XL1'00'           FLAG BYTE
0225 00            0225   1087+AB023        DC    XL1'00'           ERROR COUNT
                   0226   1088+AB024        EQU   *
0226 4040          0227   1089+             DC    2CL1' '
                   0228   1090+AB025        EQU   *                 OFFSET FOR MODIFY ADD
0228 000000000000  022D   1091+             DC    6XL1'00'          ST/RG
                          1092+*-----------------------------------------------------------------------*
022E 0B            022E   1093+AB026        DC    XL1'0B'           LINE 1, STATION   3
022F 00            022F   1094+AB027        DC    XL1'00'           FLAG BYTE
0230 00            0230   1095+AB028        DC    XL1'00'           ERROR COUNT
                   0231   1096+AB029        EQU   *
0231 4040          0232   1097+             DC    2CL1' '
                   0233   1098+AB030        EQU   *                 OFFSET FOR MODIFY ADD
0233 000000000000  0238   1099+             DC    6XL1'00'          ST/RG
                          1100+*-----------------------------------------------------------------------*
0239 13            0239   1101+AB031        DC    XL1'13'           LINE 2, STATION   3
023A 00            023A   1102+AB032        DC    XL1'00'           FLAG BYTE
023B 00            023B   1103+AB033        DC    XL1'00'           ERROR COUNT
                   023C   1104+AB034        EQU   *
023C 4040          023D   1105+             DC    2CL1' '
                   023E   1106+AB035        EQU   *                 OFFSET FOR MODIFY ADD
023E 000000000000  0243   1107+             DC    6XL1'00'          ST/RG
                          1108+*-----------------------------------------------------------------------*
0244 0C            0244   1109+AB036        DC    XL1'0C'           LINE 1, STATION   4
0245 00            0245   1110+AB037        DC    XL1'00'           FLAG BYTE
0246 00            0246   1111+AB038        DC    XL1'00'           ERROR COUNT
                   0247   1112+AB039        EQU   *
0247 4040          0248   1113+             DC    2CL1' '
                   0249   1114+AB040        EQU   *                 OFFSET FOR MODIFY ADD
0249 000000000000  024E   1115+             DC    6XL1'00'          ST/RG
                          1116+*-----------------------------------------------------------------------*
024F 14            024F   1117+AB041        DC    XL1'14'           LINE 2, STATION   4
0250 00            0250   1118+AB042        DC    XL1'00'           FLAG BYTE
0251 00            0251   1119+AB043        DC    XL1'00'           ERROR COUNT
                   0252   1120+AB044        EQU   *
0252 4040          0253   1121+             DC    2CL1' '
                   0254   1122+AB045        EQU   *                 OFFSET FOR MODIFY ADD
0254 000000000000  0259   1123+             DC    6XL1'00'          ST/RG
                          1124+*-----------------------------------------------------------------------*
025A 0D            025A   1125+AB046        DC    XL1'0D'           LINE 1, STATION   5
025B 00            025B   1126+AB047        DC    XL1'00'           FLAG BYTE
025C 00            025C   1127+AB048        DC    XL1'00'           ERROR COUNT
                   025D   1128+AB049        EQU   *
025D 4040          025E   1129+             DC    2CL1' '
                   025F   1130+AB050        EQU   *                 OFFSET FOR MODIFY ADD
025F 000000000000  0264   1131+             DC    6XL1'00'          ST/RG
                          1132+*-----------------------------------------------------------------------*
0265 15            0265   1133+AB051        DC    XL1'15'           LINE 2, STATION   5
0266 00            0266   1134+AB052        DC    XL1'00'           FLAG BYTE
0267 00            0267   1135+AB053        DC    XL1'00'           ERROR COUNT
                   0268   1136+AB054        EQU   *
0268 4040          0269   1137+             DC    2CL1' '
                   026A   1138+AB055        EQU   *                 OFFSET FOR MODIFY ADD
026A 000000000000  026F   1139+             DC    6XL1'00'          ST/RG
                          1140+*-----------------------------------------------------------------------*
0270 FF            0270   1141+             DC    XL1'FF'           END OF POLL LIST TABLE
0271 00000000      0274   1142+             DC    4XL1'00'          SECTOR ALIGNMENT

                          1144+*************************************************************************
                          1145+*                  SECTOR  4                                            *
                          1146+*************************************************************************
                          1147+*           TELEPROCESSING   MODES
                   0275   1148+AB7101       EQU   *
0275 02F1F0        0277   1149+             DC    XL3'02F1F0'       MAXIMUM NUMBER OF DISK ERRORS.
                          1150+*
                   0278   1151+AB7102       EQU   *                 TERMINAL ID USED.
                   0278   1152+AB7104       EQU   *                 HOST ID USED.
                   0278   1153+AB7134       EQU   *
                   0278   1154+AB7135       EQU   *
                   0278   1155+AB7136       EQU   *
0278 00            0278   1156+             DC    XL1'00'
                          1157+*                  BIT 0 = ON=TERMINAL ID USED.
                          1158+*                  BIT 1 = ON=HOST ID USED.
                          1159+*                  BIT 2   0 - TTB, 1 - TRS.
                          1160+*                  BIT 3   ON - NULL RECORD AT END OF FILE
                          1161+*                  BIT 4   ON - STATUS MESSAGE TRANSMITTED
                          1162+*
0279 00            0279   1163+AB7103       DC    TL1'0'
027A 404040404040404040 0288 1164+          DC    CL15' '           TERMINAL ID.
0282 40404040404040       1164+
0289 00            0289   1165+AB7105       DC    TL1'0'
028A 404040404040404040 0298 1166+          DC    CL15' '           HOST ID.
0292 40404040404040       1166+
```

```
0299 03                  0299 1167+AB7107 DC    IL1'3'                    NUMBER OF RETRIES ENQ FOR
                              1168+*                                      STATUS MESSAGE.
029A 04                  029A 1169+AB7111 DC    IL1'4'                    NAKS ACCEPTED IN RESPONSE TO
                              1170+*                                      TEXT.
029B 07                  029B 1171+AB7116 DC    IL1'7'                    TTD TIMEOUT COUNT.
029C 07                  029C 1172+AB7117 DC    IL1'7'                    ENQ RETRIES FOR MISSING RESPONSE
029D 00                  029D 1173+AB7118 DC    IL1'0'                    NUMBER OF TIMES TO RETURN TO
                              1174+*                                      WAIT FOR PHONE CALL IF HAVING
                              1175+*                                      PROBLEMS SENDING DATA IN
                              1176+*                                      TRANSMIT SINGLE DISKETTE
                              1177+*                                      FUNCTION.
029E 01                  029E 1178+AB7119 DC    XL1'01'                   BLOCKING FACTOR.
                         029F 1179+AB7120 EQU   *
                         029F 1180+AB7122 EQU   *
                         029F 1181+AB7123 EQU   *
                         029F 1182+AB7124 EQU   *
                         029F 1183+AB7125 EQU   *
                         029F 1184+AB7127 EQU   *
                         029F 1185+AB7129 EQU   *
                         029F 1186+AB7133 EQU   *
029F 4B                  029F 1187+       DC    XL1'4B'
                              1188+*
                              1189+*            BIT 0 = ON=TERMINAL INITIATES CALL.
                              1190+*            BIT 1 = ON=BUSINESS MACHINE CLOCK INSTALLED.
                              1191+*            BIT 3 = ON=IBM EXTERNAL MODEM INSTALLED.
                              1192+*            BIT 4 = ON=INTEGRATED MODEM INSTALLED.
                              1193+*            BIT 5 = ON=ANSWER TONE GENERATION.
                              1194+*            BIT 6 = ON=FULL SPEED.
                              1195+*            BIT 7 = ON= AUTO ANSWER
                              1196+*                    OFF= MANUAL ANSWER
02A0 01                  02A0 1197+AB7126 DC    IL1'1'                    1-DIR.
                              1198+*                                      2-COSIL.
02A1 01                  02A1 1199+AB7128 DC    IL1'1'                    1-SWITCHED
                              1200+*                                      2-LEASED.
02A2 17                  02A2 1201+AB7131 DC    IL1'23'
02A3 E3D9C1D5E2D4C9E2    02C1 1202+       DC    CL31'TRANSMISSION SUCCESSFUL'
02AB E2C9D6D540E2E4C3         1202+
02B3 C3C5E2E2C6E4D340         1202+
02BB 4040404040404040         1202+
02C2 19                  02C2 1203+AB7132 DC    IL1'25'
02C3 E3D9C1D5E2D4C9E2    02E1 1204+       DC    CL31'TRANSMISSION UNSUCCESSFUL'
02CB E2C9D6D540E4D5E2         1204+
02D3 E4C3C3C5E2E2C6E4         1204+
02DB D340404040404040         1204+
02E2 14                  02E2 1205+AB7130 DC    IL1'20'                   TIME TO WAIT FOR DISKETTE CHANGE
02E3 0000000000000000    02F4 1206+       DC    18XL1'00'
02EB 0000000000000000         1206+
02F3 0000                     1206+
                         02F5 1207        ENTRY BUFFER
                         02F5 1208 BUFFER EQU   *
                         FFFF 1209        END
```

MSOCC - SECONDARY OPERATIONAL MODE

```
ERR LOC  OBJECT CODE       ADDR STMT SOURCE STATEMENT

                                 3 ************************************************************************
                                 4 *                                                                      *
                                 5 * MODULE-NAME      = MSOCCM     (GPOST-WREN)                           *
                                 6 *                                                                      *
                                 7 * DESCRIPTIVE-NAME = MEDIA SECONDARY MODE                              *
                                 8 *                                                                      *
                                 9 *                                                                      *
                                10 *                                                                      *
                                11 * STATUS           = OPERATIONAL                                       *
                                12 *                                                                      *
                                13 * FUNCTION         = 1.  POLLS THE LOCAL SATELLITE                     *
                                14 *                                                                      *
                                15 *                    2.  IF THERE IS A QUEUE 3 OR QUEUE 6 REQUEST,   *
                                16 *                        THE VFIO BLOCK WILL BE READ INTO THE MEDIA   *
                                17 *                        PROCESSOR.  A SIAM WILL THEN BE ISSUED.      *
                                18 *                        WHEN THE SIAM IS COMPLETED, THE VFIO BLOCK   *
                                19 *                        WILL THEN BE WROTE BACK TO THE LOCAL SAT.    *
                                20 *                                                                      *
                                21 *                    3.  CHECKS FOR CHANGES IN THE OPERATING MODE.    *
                                22 *                        IF THERE IS A CHANGE IN THE OPERATING MODE,  *
                                23 *                        MSOCC WILL PAGE IN THE PRIMARY OPERATIONAL   *
                                24 *                        MODE                                         *
                                25 *                                                                      *
                                26 *                    4.  REPEATS STEPS 1, 2 AND 3 UNTIL THE           *
                                27 *                        OPERATIONAL MODE IS CHANGED.                 *
                                28 *                                                                      *
                                29 *         REGISTER-CONVENTIONS = XR1 AND XR2 ARE INDEX REGISTERS ONE   *
                                30 *                                AND TWO RESPECTIVELY.  ARR IS THE ADD-*
                                31 *                                RESS RECALL REGISTER.                 *
                                32 *                                                                      *
                                33 *         PROCESSOR    = SYSTEM 3 MOD 10 ASSEMBLER.                    *
                                34 *                                                                      *
                                35 *         MODULE-SIZE  = XXXXX DECIMAL BYTES                           *
                                36 *                                                                      *
                                37 *         MODULE TYPE  = RAM PAGED PROGRAM                             *
                                38 *                                                                      *
                                39 *         ATTRIBUTES   = SERIALLY REUSABLE                             *
                                40 *                                                                      *
                                41 * ENTRY-POINT      = MSOCC  (ONLY ONE ENTRY POINT)                     *
                                42 *                                                                      *
                                43 *         PURPOSE      = SECONDARY MODE (SEE FUNCTION ABOVE)           *
                                44 *                                                                      *
                                45 *         LINKAGE      = NONE.  MSOCC IS PAGED IN BY THE MEDIA START   *
                                46 *                        PROGRAM OR THE PRIMARY OPERATIONAL MODE.      *
                                47 *                                                                      *
                                48 * INPUT            = NONE                                              *
                                49 *                                                                      *
                                50 * OUTPUT           = NONE                                              *
                                51 *                                                                      *
                                52 * EXIT-NORMAL      = OCCURS WHEN MODE CHANGE IS SELECTED               *
                                53 *                                                                      *
                                54 * EXTERNAL-REFERENCES = SEE BELOW                                      *
                                55 *                                                                      *
                                56 *          ROUTINES       = YYSPMS  MODE SELECTION HANDLER             *
                                57 *                                                                      *
                                58 *                           YYSIAM  HANDLES INTER-MACHINE COMMUNICATIONS
                                59 *                                                                      *
                                60 *                           YYCORN  CHECKS FOR ERRORS AFTER POLLING    *
                                61 *                                                                      *
                                62 *                           YYWRVF  WRITES VIRTUAL FILE                *
                                63 *                                                                      *
                                64 *                           YYRDVF  READS VIRTUAL FILE                 *
                                65 *                                                                      *
                                66 *          DATA-AREAS     = MEDIA COMMON AREA (SEE MCOML)              *
                                67 *                                                                      *
                                68 *          CONTROL-BLOCKS = CCPRCB AND STANCB                          *
                                69 *                                                                      *
                                70 * MACROS           =      MEDIA COMMON EQUATES, COMMON AREA EQUATES    *
                                71 *                                                                      *
                                72 *                                                                      *
                                73 *                                                                      *
                                74 * DATA SET         = SOURCE CODE AND OBJECT MODULE INFORMATION         *
                                75 *                                                                      *
                                76 *                                                                      *
                                77 *
```

```
                        *                                                        *
                        *                                                        *
                        *                                                        *
                        *                                                        *
                        *                                                        *
                        *                                                        *
                        **********************************************************

0000                       MSOCC    START
                           *        FTYPE
                           +*       STAND ALONE STATION PROGRAM
                           +*       WHEN PROGRAM
                           +*       RAM PROGRAM
                  0130              ENTRY SIAMCB
                  015A              ENTRY CMNSAV
                  0180              ENTRY AB213
                  01C7              ENTRY AB233
                  01CB              ENTRY AB234
                  01CF              ENTRY AB235
                  01D6              ENTRY AB236
                  01DD              ENTRY AB237
                  01E4              ENTRY AB238
                  0001              EXTRN YYACOD
                  01EB              ENTRY AB239
                  0002              EXTRN YYSIAM
                  0003              EXTRN YYWRVF
                  0004              EXTRN YYRDVF
                  0005              EXTRN YYLDRN
                  0006              EXTRN YYSPMS

0000 34 01 015A                     ST     CMNSAV,XR1

                           *  READ THE CONFIGURATION TABLE
                           *        SVC
0004 F5           0004     +        DC     XL1'F5'
0005 26           0005              DC     AL1(XXDRWM)          REQUEST CODE FOR XXDRWM
0006 0000         0007              DC     XL2'0000'            ERROR LINKAGE (XXMERM)
0008 0177         0009              DC     AL2(DISK1)           CONTROL BLOCK ADDRESS
000A 0000         000B              DC     XL2'0000'            LOGICAL RECORD OFFSET
000C 0200         000D              DC     AL2(RD)              COMMAND BYTES (READ)

000E C2 02 0293                     LA     AB001,XR2            LOAD ADDRESS OF POLL LIST
0012 74 02 18                       ST     CCPADR(,XR1),XR2     STORE IN POLL LIST POINTER
0015 C2 01 0130                     LA     SIAMCB,XR1
0019 C2 02 014C                     LA     SATLID,XR2
001D 74 02 06                       ST     6(,XR1),XR2          LOAD SIAM C.B. WITH ADDRESS OF
                                                                SAT. ID TABLE
0020 7C 80 04                       MVI    4(,XR1),X'80'        ENABLE SIAM
0023 C0 87 0002                     B      YYSIAM
0027 78 80 04                       SBF    4(,XR1),X'80'        TURN OFF ENABLE SIAM BIT

                  002A     SAME     EQU    *
002A C0 87 0001                     B      YYACOD               SET WAIT FOR ACTION CODE 9
                  002E     BEGIN    EQU    *
002E 35 02 015A                     L      CMNSAV,XR2
0032 C2 01 0293                     LA     AB001,XR1
0036 B4 01 18                       ST     CCPADR(,XR2),XR1     POINT CCPADR TO 1ST POLL LIST
                                                                ENTRY

                           *  POLL THE LOCAL SATELLITE

0039 E2 01 AC                       LA     CCPACB(,XR2),XR1
003C 7C 00 07                       MVI    7(,XR1),X'00'        MOVE ADDRESS OF LOCAL SAT. TO
                                                                PTA C.B.
003F 7C 09 01                       MVI    1(,XR1),POL          MOVE POLL COMMAND TO PTA C.B.
                           *        SVC
0042 F5           0042     +        DC     XL1'F5'
0043 40           0043              DC     AL1(XXPTA)           POLL LOCAL SATELLITE

                  0044     WT       EQU    *
0044 78 02 00                       TBN    0(,XR1),DE           WAIT FOR DE
0047 C0 90 0044                     BF     WT
004B C0 87 0005                     B      YYCDRN               CHECK FOR ERRORS
004F 0103         0050              DC     AL2(SKIP2)

                           *  CHECK FOR Q3 AND Q6 REQUESTS

0051 78 10 09                       TBN    9(,XR1),QUEUE3       Q3 REQUESTED
0054 F2 90 10                       JF     SKIP1
0057 3C 03 0133                     MVI    SIAMCB+3,X'03'       SET QUEUE TO 3
005B 0C 01 0144 0149                MVC    SIAMCB+20(2),T1MIN   SET DELAY TIME TO 1 MINUTE
0061 7C 60 0A                       MVI    10(,XR1),QUEID3      MOVE QUEUE ID TO PTA C.B.
0064 F2 87 13                       J      CONT1

                  0067     SKIP1    EQU    *
0067 78 02 09                       TBN    9(,XR1),QUEUE6       Q6 REQUESTED
006A F2 90 9E                       JF     SKIP2
006D 3C 06 0133                     MVI    SIAMCB+3,X'06'       SET QUEUE TO 6
0071 0C 01 0144 014D                MVC    SIAMCB+20(2),T3MIN   SET DELAY TIME TO 3 MINUTES
0077 7C C0 0A                       MVI    10(,XR1),QUEID6      MOVE QUEUE ID TO PTA C.B.

                  007A     CONT1    EQU    *
007A C0 87 0004                     B      YYRDVF               READ IOB

                           *  XR2 NOW POINTING AT VFIO C.B.

007E 28 00 0147 00                  MZZ    IDSAV,0(,XR2)        SAVE IOB ID
0083 30 40 0147                     CLI    IDSAV,X'40'          IS IT VALID VFIO
0087 C0 81 0099                     BF     CONT2
008B 8A 08 00                       SBN    0(,XR2),UC           SET UC
008E BC 63 05                       MVI    5(,XR2),X'63'        SET INVALID IOB ERROR CODE
0091 C0 87 0003                     B      YYWRVF               WRITE BACK IOB
0095 C0 87 0103                     B      SKIP2

                           *  PASS THE REQUEST ON TO THE REMOTE MEDIA PROCESSOR

                  0099     CONT2    EQU    *
0099 C2 01 0130                     LA     SIAMCB,XR1
009D 4C 01 10 015C                  MVC    16(2,XR1),IRBA       SET IOB RECEIVE BUFFER ADDRESS
00A2 6C 00 0C 09                    MVC    12(1,XR1),9(,XR2)    SET NUMBER OF BLOCKS
00A6 6C 01 0E 16                    MVC    14(2,XR1),22(,XR2)   SET BLOCK SIZE
00AA 7C 1A 05                       MVI    11(,XR1),VFLL        SET IOB LENGTH
00AD 74 02 0A                       ST     10(,XR1),XR2         SET IOB ADDRESS
00B0 6C 01 06 04                    MVC    6(2,XR1),4(,XR2)     SET DATA ADDRESS
                  00B4     SIA      EQU    *
00B4 C0 87 0002                     B      YYSIAM
```

```
                          00B8   193 WAITT   EQU   *
00B8 C0 87 0006                  194         B     YYSPMS                CHECK FOR MODE CHANGE
00BC 0117                 00BD   195         DC    AL2(EXIT)             SELECTED DIFFERENT MODE
00BE 00C3                 00BF   196         DC    AL2(ACOD)             SELECTED SAME MODE
00C0 F2 87 04                    197         J     CONTJ
                          00C3   198 ACOD    EQU   *
00C3 C0 87 0001                  199         B     YYACOD
                          00C7   200 CONTJ   EQU   *
00C7 78 02 02                    201         TBN   2(,XR1),DE            WAIT FOR DE
00CA C0 93 00B8                  202         BF    WAITT

                                 205 *  CHECK FOR ERRORS

00CE 79 01 02                    207         TBN   2(,XR1),UE            UE SET
00D1 F2 10 37                    208         JT    SKIP2                 DO NOT READ BACK IOB IF SET
00D4 78 08 02                    209         TBN   2(,XR1),UC            UC SET
00D7 F2 90 20                    210         JF    CONT4                 CONTINUE IF NOT SET
00DA 70 72 07                    211         CLI   7(,XR1),X'72'         MEDIA UNAVAILABLE
00DD C0 81 00B4                  212         BE    SIA
00E1 70 79 07                    213         CLI   7(,XR1),X'79'         IS YYSIAM BEING CALLED WITHOUT
                                                                         BEING ENABLED
00E4 F2 01 11                    214         JNE   CONT3
00E7 C2 02 014C                  215         LA    SATLID,XR2
00EB 74 01 06                    216         ST    6(,XR1),XR1           LOAD SIAM C.B. WITH ADDRESS OF
                                                                         SAT. ID TABLE
00EE 7C 80 04                    217         MVI   4(,XR1),X'80'         ENABLE SIAM
00F1 C0 87 0002                  218         B     YYSTAM
00F5 78 80 04                    219         SBF   4(,XR1),X'80'         TURN OFF ENABLE SIAM BIT
00F8 02 01 06                    220 CONT3   LA    6(,XR1),XR1           POINT XR1 AT LENGTH BYTE
00FB 7C 01 00                    221         MVI   0(,XR1),X'01'         MOVE LENGTH BYTE INTO POSITION
                                 222 *       SVC
00FE F5                   00FF   223+        DC    XL1'F5'
00FF 17                   00FF   224         DC    AL1(XXELGM)           LOG THE ERROR
0100 C2 01 0130                  225         LA    SIAMCB,XR1
0104 F2 87 04                    226         J     SKIP2

                          0107   228 CONT4   EQU   *
0107 C0 87 0003                  229         B     YYWRVF                WRITE BACK IOB

                                 231 *  CHECK FOR MODE CHANGES

                          0108   233 SKIP2   EQU   *
0108 C0 87 0006                  234         B     YYSPMS                CHECK FOR MODE CHANGE
010F 0117                 0110   235         DC    AL2(EXIT)             SELECTED DIFFERENT MODE
0111 002A                 0112   236         DC    AL2(SAME)             SELECTED SAME MODE
0113 C0 87 002E                  237         B     BEGIN

                                 239 *  PAGE IN EITHER MEDIA OPERATIONS MODE OR START PAGE

                          0117   241 EXIT    EQU   *
0117 35 02 015A                  242         L     CMNSAV,XR2
011B 8D F4 0C                    243         CLI   CCMODE(,XR2),X'F4'    SIGN OFF SELECTED
011E F2 81 0D                    244         JE    SIGNOF
0121 C2 01 0154                  245         LA    MSTNAM,XR1            XR1  ADDRESS OF PAGE NAME
                                 246 *       SVC
0125 F5                   0125   247+        DC    XL1'F5'
0126 21                   0126   248         DC    AL1(XXIEL)
0127 0129                 0128   249         DC    AL2(NPARTN)
                          0129   250 NPARTN  EQU   *
                                 251 *       SVC
0129 F5                   0129   252+        DC    XL1'F5'
012A 06                   012A   253         DC    AL1(XXPAGM)           PAGE IN PRIMARY OPERATIONAL MODE
                          012B   254 ERROR   EQU   *
                                 255 *       SVC
012B F5                   012B   256+        DC    XL1'F5'
012C 22                   012C   257         DC    AL1(XXNVLM)
012D 03                   012D   258         DC    XL1'00'
                          012F   260 SIGNOF  EQU   *
                                 261 *       SVC
012E F5                   012E   262+        DC    XL1'F5'
012F 05                   012F   263         DC    AL1(XXIPLM)           GO TO MEDIA START

                                 265 *  SIAM CONTROL BLOCK

                          0130   267 SIAMCB  EQU   *
                                 268 *       DTFSI
                                 269+*       SATELLITE IMA INTERFACE CONTROL BLOCK
0130 0000                 0131   270+        DC    AL2(0)                WORK BYTES
0132 00                   0132   271+        DC    XL1'D0'               DEV ID UC,,DE
0133 00                   0133   272+        DC    AL1(0)                ,QUEUE 4,QUEUE 2,QUEUE 1
0134 00                   0134   273+        DC    AL1(0)
0135 0000                 0136   274+        DC    AL2(0)                DATA ADDRESS
0137 00                   0137   275+        DC    XL1'00'               ERROR CODE
0138 00                   0138   276+        DC    XL1'00'
0139 0000                 013A   277+        DC    AL2(0)                IOB ADDRESS
013B 00                   013B   278+        DC    AL1(0)                IOB LENGTH
013C 00                   013C   279+        DC    AL1(0)                NUMBER OF TRANSMISSION BLOCKS
013D 0000                 013E   280+        DC    AL2(0)                TRANSMISSION BLOCK SIZE
013F 0000                 0140   281+        DC    AL2(0)                ADDRESS OF IOB RECEIVE BUFFER
0141 000000000000         0146   282+        DC    XL6'00'               WORK AREA

0147 00                   0147   284 IDSAV   DC    XL1'00'               IOB ID SAVE
0148 0CE4                 0149   285 T1MIN   DC    XL2'0CE4'             1 MINUTE DELAY BYTES
014A 2CA6                 014B   286 T3MIN   DC    XL2'2CA6'             3 MINUTE DELAY BYTES
                          014C   287 SATEID  EQU   *
014C 7979797979797979     0153   288         DC    8XL1'79'              SATELLITE ID
                          0154   289 MSTNAM  EQU   *
0154 7CD4D6D440           0158   290         DC    CL5' MOM '
0159                      015A   291 CMNSAV  DS    XL2
015B 015D                 015C   292 IRBA    DC    AL2(IOBREC)           IOB RECEIVE BUFFER ADDRESS
                          015D   293 IOBREC  EQU   *                     IOB RECEIVE BUFFER
015D 0000000000000000     0176   294         DC    XL26'00'
                                 296 *       MACEQ
                                 297+*********************************************************
                                 298+*                                                       *
                                 299+*        REQUEST CODE EQUATES FOR SUBROUTINES MEDIA     *
                                 300+*                                                       *
                                 301+*********************************************************

                                 303+*          MEDIA REQUEST CODE EQUATES

                          0080   305+CHAIN   EQU   X'80'                 INDICATOR BIT FOR CHAINING
                          0030   306+XXPIO   EQU   X'30'
                          0001   307+XXVKIO  EQU   X'01'
                          0002   308+XXVPIO  EQU   X'02'
                          0004   309+XXCOLX  EQU   X'04'
                          0005   310+XXIPLM  EQU   X'05'
```

```
0006  311+XXPAGM  EQU   X'06'
0007  312+XXKBSM  EQU   X'07'
0008  313+XXMLKM  EQU   X'08'
0009  314+XXGOCM  EQU   X'09'
000A  315+XXCNCM  EQU   X'0A'
000C  316+XXKBRM  EQU   X'0C'
000D  317+XXSAVE  EQU   X'0D'
000E  318+XXKAMX  EQU   X'0E'
000F  319+XXGMMX  EQU   X'0F'
0010  320+XXCDTA  EQU   X'10'
0011  321+XXCDTL  EQU   X'11'
0012  322+XXCDTX  EQU   X'12'
0013  323+XXPRT3  EQU   X'13'
0014  324+XXPRT2  EQU   X'14'
0015  325+XXMOVE  EQU   X'15'
0016  326+XXPCRM  EQU   X'16'
0017  327+XXELGM  EQU   X'17'
0018  328+XXRCVM  EQU   X'18'
0019  329+XXVER1  EQU   X'19'
001A  330+XXVER2  EQU   X'1A'
001B  331+XXVER3  EQU   X'1B'
001C  332+XXVER4  EQU   X'1C'
001D  333+XXFNK1  EQU   X'1D'
001E  334+XXFNK2  EQU   X'1E'
0020  335+XXMSGM  EQU   X'20'
0021  336+XXIEL   EQU   X'21'
0022  337+XXNVLM  EQU   X'22'
0024  338+XXDISM  EQU   X'24'
0025  339+XXPRSM  EQU   X'25'
0026  340+XXDRWM  EQU   X'26'
0027  341+XXLOGM  EQU   X'27'
002D  342+XXDCSM  EQU   X'2D'
0036  343+XXDKSM  EQU   X'36'
003A  344+XXBE    EQU   X'3A'
003B  345+XXBNE   EQU   X'3B'
003C  346+XXBCT   EQU   X'3C'
003D  347+XXBLE   EQU   X'3D'
003E  348+XXBGT   EQU   X'3E'
003F  349+XXBGE   EQU   X'3F'
0040  350+XXSRCH  EQU   X'40'
0041  351+XXVRI1  EQU   X'41'
0042  352+XXVRI2  EQU   X'42'
0043  353+XXVRI3  EQU   X'43'
0044  354+XXVRI4  EQU   X'44'
0045  355+XXVRS1  EQU   X'45'
0046  356+XXVRS2  EQU   X'46'
0047  357+XXVRS3  EQU   X'47'
0048  358+XXVRS4  EQU   X'48'
004A  359+XXSER2  EQU   X'4A'
004B  360+XXBVA   EQU   X'4B'
004C  361+XXMBLA  EQU   X'4C'
004D  362+XXPIA   EQU   X'4D'
004E  363+XXTIME  EQU   X'4E'
      364 *             MCMEQ
      365+*
      366+****************************************************************
      367+*                                                              *
      368+*       COMMON AREA EQUATES-SEE MCOM1 FOR DESCRIPTION OF FIELDS *
      369+*                                                              *
      370+****************************************************************
      371+*
0000  372+CCPLEN  EQU   X'00'                      RECORDS IN PAGE BUFFER
0001  373+CCLINE  EQU   CCPLEN+1                   LINE POSISTION OF INSERTED DOC.
0003  374+CCIEL   EQU   CCLINE+2                   INPUT ERROR LINKAGE ADDR.
0004  375+CCSTA1  EQU   CCIEL+1                    STATUS BYTE 1
0005  376+CCSTA2  EQU   CCSTA1+1                   STATUS BYTE 2
0006  377+CCFLG1  EQU   CCSTA2+1                   SUBROUTINE FLAGS
0007  378+CCFLAG  EQU   CCFLG1+1                   MEDIA FLAGS
0009  379+CCDERP  EQU   CCFLAG+2                   DISK ERROR RECOVERY ADDRESS
000B  380+CCLNK   EQU   CCDERP+2                   MEDIA LINKAGE ADDR. SAVE AREA
000C  381+CCMODE  EQU   CCLNK +1                   MEDIA CURRENT MODE
000E  382+CCKPT   EQU   CCMODE+2                   ADDR. OF KEY TRANSLATION TABLE
0010  383+CCNVTL  EQU   CCKPT+2                    ADDR. OF THE NON-VOLATILE TOTALS
0012  384+CCMCM2  EQU   CCNVTL+2                   ADDR. OF SECOND COMMON AREA (MCO
0013  385+CCQ3    EQU   CCMCM2+1                   LOGGING REQUEST STATUS
0014  386+CCQ6    EQU   CCQ3+1                     PAGING REQUEST STATUS
0015  387+CCIAL1  EQU   CCQ6+1                     PHYS. ADDR. LINE 1
0016  388+CCIAL2  EQU   CCIAL1+1                   PHYS.ADDR.LINE 2
0018  389+CCPADR  EQU   CCIAL2+2                   FULL ADDRESS
001B  390+CCRSEC  EQU   CCPADR+3                     REMAINING SECTORS TO
001E  391+CCPEW   EQU   CCRSEC+3                   PERSONALIZED EARLY WARNING SECTO
      392+*                                        THRESHOLD
001F  393+CCDECP  EQU   CCPEW+1                    PERSONALIZED DECIMAL POINT POSIS
002B  394+CCSUED  EQU   CCDECP+12                  PERSONALIZED SUPPRESS EDIT FIELD
002C  395+CCVFID  EQU   CCSUED+1                   C.D. SAVE AREA
0049  396+CCDATE  EQU   CCVFID+29                  DATE SAVE AREA
0050  397+CCEDAT  EQU   CCDATE+7                   EDITED DATE FIELD
0058  398+CCCLID  EQU   CCEDAT+8                   STORE REGISTER SAVE AREA
005F  399+CCACTN  EQU   CCCLID+7                   ACTION CODE SAVE AREA
0063  400+CCIOWK  EQU   CCACTN+4                   ADDR. OF I/O WORK AREA
0064  401+CCPCB1  EQU   CCIOWK+1                   VITUAL PRINTER C.B.
006E  402+CCPCB2  EQU   CCPCB1+10                  VITUAL PRINTER C.B.
0078  403+CCMDCB  EQU   CCPCB2+10                  MEDIA TRANSACTION LOGGING USE
      404+*                                        ONLY DIO CONTROL BLOCK
0092  405+CCMPCB  EQU   CCMDCB+26                  PAGFING CONTROL BLOCK
00AC  406+CCPMCB  EQU   CCMPCB+26                  INTER-MACHINE ADAPTER C.B.
      407+*                                        FOR USE WITH XXPIA
00BB  408+CCVKCB  EQU   CCPMCB+15                  VIRTUAL KEYBOARD/DISPLAY C.B.
00CC  409+CCKYBL  EQU   CCVKCB+17                  KEYBOARD BUFFER LL
00CD  410+CCKYBF  EQU   CCKYBL+1                   LEFT MOST BYTE OF KEY/ID BUFFER
00ED  411+CCLBUF  EQU   CCKYBF+32                  LOG ITEM BUFFER
      412+* THE FOLLOWING ARE DISPLACED 256 FROM THE COMMON AREA
0008  413+CCPBUF  EQU   X'08'                      PRINT BUFFER FOR I/O
004A  414+CCPBF1  EQU   CCPBUF+63                  PRINT BUFFER 1
0089  415+CCPBF2  EQU   CCPBF1+63                  PRINT BUFFER 2
00C8  416+CCLR1   EQU   CCPBF2+63                  LEFT BYTE OF LOG REC. BUFFER
      417+* THE FOLLOWING ARE DISPLACED 512 FROM THE COMMON AREA
00C7  418+CCLK1R  EQU   X'C7'                      RIGHTMOST BYTE OF ABOVE
00C8  419+CCLK2   EQU   CCLK1R+1                   LEFT MOST BYTE OF LOG REC. BUFFE
      420+* THE FOLLOWING ARE DISPLACED 768 FROM THE COMMON AREA
00C7  421+CCLK2R  EQU   X'C7'                      RIGHTMOST BYTE OF ABOVE
00C8  422+CCERCB  EQU   CCLK2R+1                   XXRCVM'S ERROR CONTROL BLOCK
      423+*
00D9  424+CCRMTB  EQU   CCERCB+17                  RAM ROOT TABLE ADDRESS
00DB  425+CCPBA   EQU   CCRMTB+2                   ADDRESS OF THE PAGE ADDRES WITH
      426+*                                        PATCHES IF ANY
      427+*
      428 *             MCOMN
      429+*---------------------------------------------------------------
      430+*             MEDIA COMMON EQUATES                             *
      431+*---------------------------------------------------------------
0001  433+XR1     EQU   X'01'
0002  434+XR2     EQU   X'02'
0008  435+ARR     EQU   X'08'
0008  437+UC      EQU   X'08'                      UNIT CHECK
0004  438+SE      EQU   X'04'                      SATELLITE EXCEPTION
0002  439+DE      EQU   X'02'                      DEVICE END
0001  440+UE      EQU   X'01'                      UNIT EXCEPTION
```

```
                0002   442+ESP     EQU    X'02'                          EXCEPTION STATUS IN PROCESS
                001A   443+VFLL    EQU    X'1A'                          VIRTUAL FILE LENGTH
                0001   444+NORESP  EQU    X'01'                          NO RESPONSE EXCEPTION STATUS BIT
                000C   445+QEMPTY  EQU    X'0C'                          QUEUE EMPTY STATUS
                000A   446+OVRUN   EQU    X'0A'                          STORAGE OVERRUN STATUS
                000E   447+PUTEXC  EQU    X'0E'                          PUT EXCEPTION STATUS
                0010   448+QUEUE3  EQU    X'10'                          QUEUE 3 STATUS
                0002   449+QUEUE6  EQU    X'02'                          QUEUE 6 STATUS
                0004   450+DATADD  EQU    X'04'                          DATA ADDRESS PIA CR

                0080   452+ACTIVE  EQU    X'80'
                0008   453+LINE1   EQU    X'08'
                0010   454+LINE2   EQU    X'10'
                0078   455+SATID   EQU    X'78'                          SATELLITE GPOST ID
                0079   456+MEDID   EQU    X'79'                          MEDIA GPOST ID
                00F1   457+PRIMOD  EQU    X'F1'                          PRIMARY MODE
                00F2   458+SECMOD  EQU    X'F2'                          SECONDARY MODE
                00F3   459+STAMOD  EQU    X'F3'                          STANDALONE MODE

                       461+* COMMAND BYTEO ASSIGNMENT
                0001   462+SETMOD  EQU    X'01'                          SET MODE
                0002   463+SETADR  EQU    X'02'                          SET ADDRESS
                0003   464+RESET   EQU    X'03'                          RESET
                0004   465+RDID    EQU    X'04'                          READ ID
                0005   466+RDIOB   EQU    X'05'                          READ IOB
                0006   467+RDDATA  EQU    X'06'                          READ DATA
                0007   468+WRIOB   EQU    X'07'                          WRITE IOB
                0008   469+WRDATA  EQU    X'08'                          WRITE DATA
                0009   470+POL     EQU    X'09'                          POLL
                000A   471+POLRST  EQU    X'0A'                          POLL RESET
                000B   472+POLACK  EQU    X'0B'                          POLL ACK
                000C   473+KLEAR   EQU    X'0C'                          CLEAR
                000D   474+LINACT  EQU    X'0D'                          LINE ACTIVATE
                000E   475+RSTIMA  EQU    X'0E'                          RESET IMA
                000F   476+MONLIN  EQU    X'0F'                          MONITOR LINE
                0010   477+EMOD1   EQU    X'10'                          ENABLE MODE 1
                0011   478+EMOD2   EQU    X'11'                          ENABLE MODE 2
                0012   479+EMOD3   EQU    X'12'                          ENABLE MODE 3
                0060   480+QUEID3  EQU    X'60'                          QUEUE 3 REQUESTS WILL BE ACCEPTE
                00C0   481+QUEID6  EQU    X'C0'                          QUEUE 6 REQUESTS WILL BE ACCEPTE
                0177   482 DISK1   EQU    *
                       483 *       DIFMD  ADDR-CFLAG,WORK-CFLAG,NUMR-01,DSN- MCT
                       484+*       MEDIA FEATURE DISKETTE CONTROL BLOCK
0177 90         0177   485+        DC     XL1'90'                        DEV ID DC,,DE
0178 00         0178   486+        DC     AL1(0)                         R/S,IOR,W128 R128,W256,R256,SYNC
0179 00         0179   487+        DC     AL1(0)                          LOG ALL,INHIBIT CS
017A 0191       017A   488+        DC     AL2(CFLAG)                     DATA ADDRESS
017C 00         017C   489+        DC     XL1'00'                        ERROR CODE
017D 00         017D   490+        DC     XL1'00'                        MCD IID,, ,POR LATCH,DISK IN
017E 0191       017F   491+        DC     AL2(CFLAG)                     WORK AREA ADDRESS
0180 0000       0181   492+        DC     AL2(0)                         LOGICAL  RECORD OFFSET
0182 01         0182   493+        DC     AL1(01)                        NUMBER OF LOGICAL RECORDS
0183 7CD4C3E340 0187   494+        DC     CL5' MCT'                      DATA SET NAME OR BOF CCHRR
0188 000000     018A   495+        DC     XL3'0'                         EOD CCHRR
018B 000000     018D   496+        DC     XL3'0'                         EOF CCHRR
018E 000000     0190   497+        DC     XL3'000000'                    DISK ERROR LOCATION

                       499 *       DSKEQ
                       500+***********************************************************************
                       501+*                                                                     *
                       502+*       DISK SUBROUTINE EQUATES                                       *
                       503+*                                                                     *
                       504+***********************************************************************
                       505+*
                       506+***     COMMAND BYTES

                8000   508+RESPU   EQU    X'8000'                        RESET P.U. LATCH
                4000   509+INDRES  EQU    X'4000'                        INHIBIT DISK RESET
                0400   510+WRT     EQU    X'0400'                        WRITE
                0200   511+RD      EQU    X'0200'                        READ
                0100   512+SYNC    EQU    X'0100'                        SYNC
                0080   513+LOGALL  EQU    X'0080'                        LOG ALL
                0040   514+INCS    EQU    X'0040'                        INHIBIT CS

                       516+***     OPTIONS BYTE
                0001   517+WAIT    EQU    X'01'                          WAIT FOR DEVICE END


                       519 *       CNFIG
                       520+***********************************************************************
                       521+*                SECTOR  1                                            *
                       522+***********************************************************************
0191 80         0191   523+CFLAG   DC     XL1'80'                        CONFIGURATION TYPE FLAG
                       524+*              BIT 0 OFF= STANDALONE
                       525+*              BIT 0  ON= CLUSTER
0192 00         0192   526+        DC     XL1'00'                        LEVEL CODE
0193 F2F7F7F5F2F2F3 0199 527+      DC     CL7'2775223'                   PART NUMBER     20  DOMESTIC CLUS
019A F0F0F2F5F7F840 01A0 528+      DC     CL7'092578 '                   EC LEVEL CODE
01A1 01         01A1   529+AB8605  DC     XL1'01'                        MEMORY SIZE FLAG BYTE
                       530+*              BITS(6 7) = RAM SIZE    '00'B = 16K,    '01'B = 24K,      *
                       531+*                                      '10'B = 32K, '11'B = NOT USED.     *
                       532+***********************************************************************
                       533+*         COMMON CONFIGURATION TO CLUSTER                             *
                       534+***********************************************************************

                01A2   536+        ENTRY ABCOMN
                01A2   537+ABCOMN  EQU    *
                01A2   538+AB201   EQU    *
01A2 F0F2F0     01A4   539+        DC     CL3'020'                       NUMBER SECTORS FOR EARLY
                       540+*                                               WARNING

01A5 80         01A5   542+AB250   DC     XL1'80'                        MEDIA OPERATIONAL MODE SELECT
                       543+*      BIT 0 ON = PROMPT FOR MEDIA OPERATIONAL MODE AT SIGN ON
                       544+*      BIT 1 ON = NO PROMPT AND DEFAULT TO PRIMARY
                       545+*      BIT 2 ON = NO PROMPT AND DEFAULT TO SECONDARY
                       546+*      BIT 3 ON = NO PROMPT AND DEFAULT TO STANDALONE

                01A6   548+AB202   EQU    *
01A6 00         01A6   549+        DC     XL1'00'                        DISKETTE LOGGING FORMAT
                       550+*      BIT 0 ON = LOGGING EXTENDED FORMAT
                       551+*      BIT 0 OFF = LOGGING BASIC FORMAT
                       552+*      BIT 1 ON = PRICE LOOKUP EXTENDED FORMAT
                       553+*      BIT 1 OFF = PRICE LOOKUP BASIC FORMAT
                       554+*      BIT 2 ON = NEGATIVE CREDIT FILE EXTENDED FORMAT
                       555+*      BIT 2 OFF = NEGATIVE CREDIT FILE BASIC FORMAT

                01A7   557+AB203   EQU    *
01A7 80         01A7   558+        DC     XL1'80'                        TERMINAL PORT ASSIGNMENTS
                       559+*      BIT 0 ON = THERE ARE TERMINALS ON PORT 1
                       560+*      BIT 1 ON = THERE ARE TERMINALS ON PORT 2

                01A8   562+AB204   EQU    *
01A8 FF         01A8   563+        DC     XL1'FF'                        FUNCTION SELECTION (BYTE 1)
                       564+*      BIT 0 ON = OPTIONS PERSONALIZATION FUNCTION IS DESIRED
                       565+*      BIT 1 ON = TABLES PERSONALIZATION FUNCTION IS DESIRED
                       566+*      BIT 2 ON = TRANSACTION RE-ENTRY FUNCTION IS DESIRED
```

```
                            567+*                 BIT 3 ON = TOTALS READOUT FUNCTION IS DESIRED
                            568+*                 BIT 4 ON = LOAN/WITHDRAWAL FUNCTION IS DESIRED
                            569+*                 BIT 5 ON = NOT USED
                            570+*                 BIT 6 ON = OTHER DATA ENTRY FUNCTION IS DESIRED

                    01A9    572+AB205     EQU     *
01A9 FF             01A9    573+          DC      XL1'FF'                  FUNCTION SELECTION (BYTE 2)
                            574+*                 BIT 0 ON = VOID PRIOR TRANSACTION FUNCTION IS DESIRED
                            575+*                 BIT 1 ON = AUXILLARY TOTALS FUNCTION IS DESIRED
                            576+*                 BIT 2 ON = CASH COUNT FUNCTION IS DESIRED
                            577+*                 BIT 3 ON = LOG PRINT FUNCTION IS DESIRED
                            578+*                 BIT 4 ON = TRANSMIT MULTIPLE OR SINGLE DISKETTE FUNCTION
                            579+*                            IS DESIRED
                            580+*                 BIT 5 ON = COPY PERSONALIZATION FUNCTION IS DESIRED
                            581+*                 BIT 6 ON = MODIFY CONFIGURATION FUNCTION IS DESIRED
                            582+*                 BIT 7 ON = CONFIGURATION FUNCTION IS DESIRED

                    01AA    584+AB206     EQU     *
01AA FF             01AA    585+          DC      XL1'FF'                  FUNCTION SELECTION (BYTE 3)
                            586+*                 BIT 0 ON = FILE DATA ENTRY IS DESIRED
                            587+*                 BIT 1 ON = SECURITY REQUIREMENTS PERS. IS DESIRED
                            588+*                 BIT 2 ON = STORE LEVEL SALES OPTIONS PERSONALIZATION IS
                            589+*                              DESIRED
                            590+*                 BIT 3 ON = ENTERPRIZE LEVEL SALES OPTIONS PERSONALIZATION
                            591+*                              IS DESIRED
                            592+*                 BIT 4 ON = NON-SALES OPTIONS PERSONALIZATION IS DESIRED
                            593+*                 BIT 5 ON = AUXILLIARY TOTALS TABLES PERSONALIZATION IS
                            594+*                              DESIRED
                            595+*                 BIT 6 ON = SECURITY CODE PERSONALIZATION IS DESIRED
                            596+*                 BIT 7 ON = DATA ENTRY FORMAT TABLES PERSONALIZATION IS
                            597+*                              DESIRED

                    01AB    599+AB207     EQU     *
01AB 01             01AB    600+          DC      IL1'1'                   NUMBER OF TRACKS TO RESERVE
                            601+*                                            FOR PRICE LOOKUP FILE
                    01AC    602+AB208     EQU     *
01AC 01             01AC    603+          DC      IL1'1'                   NUMBER OF TRACKS TO RESERVE
                            604+*                                            FOR NEGATIVE CREDIT FILE

                    01AD    606+AB210     EQU     *
01AD 00             01AD    607+          DC      XL1'00'                  MEDIA FEATURE SIGN-ON LEVEL
                    01AE    608+AB211     EQU     *
01AE 00             01AE    609+          DC      XL1'00'                  TRANSACTION LOG ERASE LEVEL
                    01AF    610+AB212     EQU     *
01AF 00             01AF    611+          DC      XL1'00'                  MEDIA FEATURE DIAGNOSTICS LEVEL
                    01B0    612+AB213     EQU     *
01B0 00             01B0    613+          DC      XL1'00'                  OPERATION MODE LEVEL
                    01B1    614+AB214     EQU     *
01B1 00             01B1    615+          DC      XL1'00'                  ENTERPRIZE SALES OPTIONS
                            616+*                                            PERSONALIZATION LEVEL
                    01B2    617+AB215     EQU     *
01B2 00             01B2    618+          DC      XL1'00'                  STORE SALES OPTIONS
                            619+*                                            PERSONALIZATION LEVEL
                    01B3    620+AB216     EQU     *
01B3 00             01B3    621+          DC      XL1'00'                  NON-SALES OPTIONS
                            622+*                                            PERSONALIZATION LEVEL
                    01B4    623+AB217     EQU     *
01B4 00             01B4    624+          DC      XL1'00'                  MODIFY CONFIGURATION LEVEL
                    01B5    625+AB218     EQU     *
01B5 00             01B5    626+          DC      XL1'00'                  SALES TABLES PERSONALIZATION
                            627+*                                            LEVEL
                    01B6    628+AB219     EQU     *
01B6 00             01B6    629+          DC      XL1'00'                  AUXILLARY TOTALS TABLES
                            630+*                                            PERSONALIZATION LEVEL
                    01B7    631+AB220     EQU     *
01B7 00             01B7    632+          DC      XL1'00'                  SECURITY REQUIREMENTS
                            633+*                                            PERSONALIZATION LEVEL
                    01B8    634+AB221     EQU     *
01B8 00             01B8    635+          DC      XL1'00'                  DATA ENTRY FORMAT TABLES
                            636+*                                            PERSONALIZATION LEVEL
                    01B9    637+AB222     EQU     *
01B9 00             01B9    638+          DC      XL1'00'                  REGISTER AUXILLARY TOTALS LEVEL
                    01BA    639+AB223     EQU     *
01BA 00             01BA    640+          DC      XL1'00'                  CLUSTER AUXILLARY TOTALS LEVEL
                    01BB    641+AB224     EQU     *
01BB 00             01BB    642+          DC      XL1'00'                  TRANSMIT SINGLE DISKETTE LEVEL
                    01BC    643+AB225     EQU     *
01BC 00             01BC    644+          DC      XL1'00'                  TRANSMIT MULTIPLE DISKETTE LEVEL
                    01BD    645+AB226     EQU     *
01BD 00             01BD    646+          DC      XL1'00'                  MULTIPLE DISKETTE TRANSACTION
                            647+*                                            LOG PRINT LEVEL
                    01BE    648+AB227     EQU     *
01BE 00             01BE    649+          DC      XL1'00'                  COPY PERSONALIZATION LEVEL
                    01BF    650+AB228     EQU     *
01BF 00             01BF    651+          DC      XL1'00'                  MEDIA FEATURE SIGNOFF LEVEL
                    01C0    652+AB229     EQU     *
01C0 00             01C0    653+          DC      XL1'00'                  VOID FUNCTION LEVEL
                    01C1    654+AB230     EQU     *
01C1 00             01C1    655+          DC      XL1'00'                  FILE DATA ENTRY LEVEL
                    01C2    656+AB231     EQU     *
01C2 00             01C2    657+          DC      XL1'00'                  TRANSMIT SINGLE DISKETTE/RECEIVE
                            658+*                                            LEVEL
                    01C3    659+AB232     EQU     *
01C3 00             01C3    660+          DC      XL1'00'                  TRANSMIT MULTIPLE DISKETTE/
                            661+*                                            RECEIVE LEVEL
                    01C4    662+AB240     EQU     *
01C4 00             01C4    663+          DC      XL1'00'                  RECEIVE LEVEL
                    01C5    664+AB241     EQU     *
01C5 00             01C5    665+          DC      XL1'00'                  SECURITY CODE PERSONALIZATION
                    01C6    666+AB242     EQU     *
01C6 00             01C6    667+          DC      XL1'00'                  CONFIGURATION LEVEL

                    01C7    669+AB233     EQU     *
01C7 00             01C7    670+          DC      XL1'00'                  SECURITY REQUIREMENTS FLAG BYTE
                            671+*                 BIT 0 ON = CODE OR KEY REQUIRED FOR SECURITY REQUIREMENTS
                            672+*                 BIT 0 OFF = KEY REQUIRED FOR SECURITY REQUIREMENTS
                            673+*                 BIT 1 ON = CODE OR KEY REQUIRED FOR LEVEL 1
                            674+*                 BIT 1 OFF = KEY REQUIRED FOR LEVEL 1
                            675+*                 BIT 2 ON = CODE OR KEY REQUIRED FOR LEVEL 2
                            676+*                 BIT 2 OFF = KEY REQUIRED FOR LEVEL 2
                            677+*                 BIT 3 ON = CODE OR KEY REQUIRED FOR LEVEL 3
                            678+*                 BIT 3 OFF = KEY REQUIRED FOR LEVEL 3
                            679+*                 BIT 4 ON = CODE OR KEY REQUIRED FOR LEVEL 4
                            680+*                 BIT 4 OFF = KEY REQUIRED FOR LEVEL 4
                            681+*                 BIT 5 ON = CODE OR KEY REQUIRED FOR LEVEL 5
                            682+*                 BIT 5 OFF = KEY REQUIRED FOR LEVEL 5

                    01C8    684+AB234     EQU     *
01C8 01             01C8    685+          DC      IL1'1'
01C9 F0             01C9    686+          DC      CL1'0'                   SECURITY CODE FOR LEVEL 1
01CA                01CE    687+          DS      CL5
                    01CF    688+AB235     EQU     *
01CF 01             01CF    689+          DC      IL1'1'
01D0 F0             01D0    690+          DC      CL1'0'                   SECURITY CODE FOR LEVEL 2
01D1                01D5    691+          DS      CL5
                    01D6    692+AB236     EQU     *
01D6 01             01D6    693+          DC      IL1'1'
01D7 F0             01D7    694+          DC      CL1'0'                   SECURITY CODE FOR LEVEL 3
```

```
0108                         01DC   695+              DS    CL5
                             01DD   696+AB237         EQU   *
01DD 01                      01DD   697+              DC    XL1'1'
01DE F0                      01DE   698+              DC    CL1'0'                    SECURITY CODE FOR LEVEL 4
01DF                         01E3   699+              DS    CL5
                             01E4   700+AB238         EQU   *
01E4 01                      01E4   701+              DC    XL1'1'
01E5 F0                      01E5   702+              DC    CL1'0'                    SECURITY CODE FOR LEVEL 5
01F6                         01EA   703+              DS    CL5
                             01EB   704+AB239         EQU   *
01EB 01                      01EB   705+              DC    XL1'1'
01EC F0                      01EC   706+              DC    CL1'0'                    SECURITY CODE FOR SECURITY
                                    707+*                                               REQUIREMENTS
01ED                         01E1   708+              DS    CL5
01F2                         0210   709+              DS    31XL1                     SECTOR ALIGNMENT
                                    710+*****************************************************************
                                    711+*                   SECTOR  2                                   *
                                    712+*****************************************************************
                                    713+*****************************************************************
                                    714+*                         CONFIGURATION TABLES                  *
                                    715+*****************************************************************

                                    719+*****************************************************************
                                    720+*          STORE/REGISTER CONFIGURATION                         *
                                    721+*****************************************************************
                                    722+*                                                               *
                                    723+*          THE FOLLOWING IS THE FORMAT OF THE STORE/REGISTER TABLE *
                                    724+*          WHERE XXXXXX IS STORE/REGISTER NUMBER AND YY IS THE LAST *
                                    725+*          TWO DIGITS OF THE PTAB DATA SET NAME                 *
                                    726+*                                                               *
                                    727+*                INDEX     FIELD1    FIELD2    FIELD3           *
                                    728+*                                                               *
                                    729+*                XXXXXX     SSYY      SNYY     FLAG BYTE        *
                                    730+*                                                               *
                                    731+*                                                               *
                                    732+*           FLAG BYTE ASSIGNED AS FOLLOWS                       *
                                    733+*                  BIT(0) ON = STORE/REGISTER  ALLOCATED TO A TERMINAL. *
                                    734+*                  BIT(1) ON = CONFIG. USE ONLY (STORE/REG., PTABS LOADED). *
                                    735+*                  BITS(6 7) = RAM SIZE   '00'B = 16K,   '01'B = 24K, *
                                    736+*                                         '10'B = 32K, '11'B = NOT USED. *
                                    737+*                                                               *
                                    738+*****************************************************************
                             0211   739+          ENTRY ABSTRG
                             0211   740+ABSTRG    EQU   *
0211 05                      0211   741+          DC    XL1'05'
0212 08                      0212   742+          DC    XL1'11'
                                    743+*****************************************************************
                             0213   744+AB301     EQU   *
0213 F0F0F0F0F0F1            0218   745+          DC    CL6'000001'                   STORE/REGISTER NUMBER
0219 F0F1                    0219   746+AB302     EQU   *
                             021A   747+          DC    CL2'01'                       SALES PERSONALIZATION FOR ST/RG
021B F0F1                    021B   748+AB303     EQU   *
                             021C   749+          DC    CL2'01'                       NONSALES PTAB FOR ST/RG
021D 41                      021D   750+AB305     EQU   *
                             021D   751+AB306     DC    XL1'41'                       FLAG BYTE
                                    752+*-----------------------------------------------------------------*
                             021E   753+AB307     EQU   *
021E F0F0F0F0F0F2            0223   754+          DC    CL6'000002'                   STORE/REGISTER NUMBER
                             0224   755+AB308     EQU   *
0224 F0F1                    0225   756+          DC    CL2'01'                       SALES PERSONALIZATION FOR ST/RG
                             0226   757+AB309     EQU   *
0226 F0F1                    0227   758+          DC    CL2'01'                       NONSALES PTAB FOR ST/RG
                             0228   759+AB311     EQU   *
0228 41                      0228   760+AB312     DC    XL1'41'                       FLAG BYTE
                                    761+*-----------------------------------------------------------------*
                             0229   762+AB313     EQU   *
0229 F0F0F0F0F0F3            022E   763+          DC    CL6'000003'                   STORE/REGISTER NUMBER
022F F0F1                    022F   764+AB314     EQU   *
                             0230   765+          DC    CL2'01'                       SALES PERSONALIZATION FOR ST/RG
                             0231   766+AB315     EQU   *
0231 F0F1                    0232   767+          DC    CL2'01'                       NONSALES PTAB FOR ST/RG
                             0233   768+AB317     EQU   *
0233 41                      0233   769+AB318     DC    XL1'41'
                                    770+*-----------------------------------------------------------------*
                             0234   771+AB319     EQU   *
0234 F0F0F0F0F0F4            0239   772+          DC    CL6'000004'                   STORE/REGISTER NUMBER
                             023A   773+AB320     EQU   *
023A F0F1                    023B   774+          DC    CL2'01'                       SALES PERSONALIZATION FOR ST/RG
                             023C   775+AB321     EQU   *
023C F0F1                    023D   776+          DC    CL2'01'                       NONSALES PTAB FOR ST/RG
                             023E   777+AB323     EQU   *
023E 41                      023E   778+AB324     DC    XL1'41'                       FLAG BYTE
                                    779+*-----------------------------------------------------------------*
                             023F   780+AB325     EQU   *
023F F0F0F0F0F0F5            0244   781+          DC    CL6'000005'                   STORE/REGISTER NUMBER
                             0245   782+AB326     EQU   *
0245 F0F1                    0246   783+          DC    CL2'01'                       SALES PERSONALIZATION FOR ST/RG
                             0247   784+AB327     EQU   *
0247 F0F1                    0248   785+          DC    CL2'01'                       NONSALES PTAB FOR ST/RG
                             0249   786+AB329     EQU   *
0249 41                      0249   787+AB330     DC    XL1'41'
                                    788+*-----------------------------------------------------------------*
                             024A   789+AB331     EQU   *
024A F0F0F0F0F0F6            024F   790+          DC    CL6'000006'                   STORE/REGISTER NUMBER
                             0250   791+AB332     EQU   *
0250 F0F1                    0251   792+          DC    CL2'01'                       SALES PERSONALIZATION FOR ST/RG
                             0252   793+AB333     EQU   *
0252 F0F1                    0253   794+          DC    CL2'01'                       NONSALES PTAB FOR ST/RG
                             0254   795+AB335     EQU   *
0254 41                      0254   796+AB336     DC    XL1'41'                       FLAG BYTE
                                    797+*-----------------------------------------------------------------*
                             0255   798+AB337     EQU   *
0255 F0F0F0F0F0F7            025A   799+          DC    CL6'000007'                   STORE/REGISTER NUMBER
                             025B   800+AB338     EQU   *
025B F0F1                    025C   801+          DC    CL2'01'                       SALES PERSONALIZATION FOR ST/RG
                             025D   802+AB339     EQU   *
025D F0F1                    025E   803+          DC    CL2'01'                       NONSALES PTAB FOR ST/RG
                             025F   804+AB341     EQU   *
025F 01                      025F   805+AB342     DC    XL1'01'                       FLAG BYTE
                                    806+*-----------------------------------------------------------------*
                             0260   807+AB343     EQU   *
0260 F0F0F0F0F0F8            0265   808+          DC    CL6'000008'                   STORE/REGISTER NUMBER
                             0266   809+AB344     EQU   *
0266 F0F1                    0267   810+          DC    CL2'01'                       SALES PERSONALIZATION FOR ST/RG
                             0268   811+AB345     EQU   *
0268 F0F1                    0269   812+          DC    CL2'01'                       NONSALES PTAB FOR ST/RG
                             026A   813+AB347     EQU   *
026A 01                      026A   814+AB348     DC    XL1'01'                       FLAG BYTE
                                    815+*-----------------------------------------------------------------*
                             026B   816+AB349     EQU   *
026B F0F0F0F0F0F9            0270   817+          DC    CL6'000009'                   STORE/REGISTER NUMBER
                             0271   818+AB350     EQU   *
0271 F0F1                    0272   819+          DC    CL2'01'                       SALES PERSONALIZATION FOR ST/RG
                             0273   820+AB351     EQU   *
0273 F0F1                    0274   821+          DC    CL2'01'                       NONSALES PTAB FOR ST/RG
```

```
                          0275  822+AB353   EQU   *
0275 01                   0275  823+AB354   DC    XL1'01'          FLAG BYTE
                                824+*---------------------------------------------------------------*
                          0276  825+AB355   EQU   *
0276 F0F0F0F0F1F0         0276  826+        DC    CL6'000010'      STORE/REGISTER NUMBER
                          027C  827+AB356   EQU   *
027C F0F1                 027D  828+        DC    CL2'01'          SALES PERSONALIZATION FOR ST/RG
                          027E  829+AB357   EQU   *
027E F0F1                 027F  830+        DC    CL2'01'          NONSALES PTAB FOR ST/RG
                          0280  831+AB359   EQU   *
0280 01                   0280  832+AB360   DC    XL1'01'          FLAG BYTE
                                833+*---------------------------------------------------------------*
                          0281  834+AB361   EQU   *
0281 F0F0F0F0F1F1         0286  835+        DC    CL6'000011'      STORE/REGISTER NUMBER
                          0287  836+AB362   EQU   *
0287 F0F1                 0288  837+        DC    CL2'01'          SALES PERSONALIZATION FOR ST/RG
                          0289  838+AB363   EQU   *
0289 F0F1                 028A  839+        DC    CL2'01'          NONSALES PTAB FOR ST/RG
                          028B  840+AB365   EQU   *
028B 01                   028B  841+AB366   DC    XL1'01'          FLAG BYTE
                                842+*---------------------------------------------------------------*
028C FF                   028C  843+        DC    XL1'FF'          END OF STORE/REGISTER TABLE
028D 00000000             0290  844+        DC    4XL1'00'         SECTOR ALIGNMENT

                                846+*****************************************************************
                                847+*                   SECTOR 3                                    *
                                848+*****************************************************************
                                849+*****************************************************************
                                850+*             POLL LIST                                         *
                                851+*****************************************************************

                          0291  853+        ENTRY ABPOLL
                          0291  854+ABPOLL  EQU   *
0291 000B                 0292  855+        DC    XL2'000B'        DISP/LL OF POLL LIST
                                856+*****************************************************************
0293 00                   0293  857+AB001   DC    XL1'00'          LOCAL SATELLITE
0294 80                   0294  858+AB002   DC    XL1'80'          LOCAL SATELLITE IS ALWAYS ACTIVE
0295 00                   0295  859+AB003   DC    XL1'00'          ERROR COUNT
                          0296  860+AB004   EQU   *
0296 4040                 0297  861+        DC    2CL1' '          OFFSET FOR MODIFY ADD
                          0298  862+AB005   EQU   *
0298 000000000000         029D  863+        DC    6XL1'00'         ST/RG
                                864+*---------------------------------------------------------------*
029E 09                   029E  865+AB006   DC    XL1'09'          LINE 1, STATION   1
029F 00                   029F  866+AB007   DC    XL1'00'          FLAG BYTE
02A0 00                   02A0  867+AB008   DC    XL1'00'          ERROR COUNT
                          02A1  868+AB009   EQU   *
02A1 4040                 02A2  869+        DC    2CL1' '          OFFSET FOR MODIFY ADD
                          02A3  870+AB010   EQU   *
02A3 000000000000         02A8  871+        DC    6XL1'00'         ST/RG
                                872+*---------------------------------------------------------------*
02A9 11                   02A9  873+AB011   DC    XL1'11'          LINE 2, STATION   1
02AA 00                   02AA  874+AB012   DC    XL1'00'          FLAG BYTE
02AB 00                   02AB  875+AB013   DC    XL1'00'          ERROR COUNT
                          02AC  876+AB014   EQU   *
02AC 4040                 02AD  877+        DC    2CL1' '          OFFSET FOR MODIFY ADD
                          02AE  878+AB015   EQU   *
02AE 000000000000         02B3  879+        DC    6XL1'00'         ST/RG
                                880+*---------------------------------------------------------------*
02B4 0A                   02B4  881+AB016   DC    XL1'0A'          LINE 1, STATION   2
02B5 00                   02B5  882+AB017   DC    XL1'00'          FLAG BYTE
02B6 00                   02B6  883+AB018   DC    XL1'00'          ERROR COUNT
                          02B7  884+AB019   EQU   *
02B7 4040                 02B8  885+        DC    2CL1' '          OFFSET FOR MODIFY ADD
                          02B9  886+AB020   EQU   *
02B9 000000000000         02BE  887+        DC    6XL1'00'         ST/RG
                                888+*---------------------------------------------------------------*
02BF 12                   02BF  889+AB021   DC    XL1'12'          LINE 2, STATION   2
02C0 00                   02C0  890+AB022   DC    XL1'00'          FLAG BYTE
02C1 00                   02C1  891+AB023   DC    XL1'00'          ERROR COUNT
                          02C2  892+AB024   EQU   *
02C2 4040                 02C3  893+        DC    2CL1' '          OFFSET FOR MODIFY ADD
                          02C4  894+AB025   EQU   *
02C4 000000000000         02C9  895+        DC    6XL1'00'         ST/RG
                                896+*---------------------------------------------------------------*
02CA 0B                   02CA  897+AB026   DC    XL1'0B'          LINE 1, STATION   3
02CB 00                   02CB  898+AB027   DC    XL1'00'          FLAG BYTE
02CC 00                   02CC  899+AB028   DC    XL1'00'          ERROR COUNT
                          02CD  900+AB029   EQU   *
02CD 4040                 02CE  901+        DC    2CL1' '          OFFSET FOR MODIFY ADD
                          02CF  902+AB030   EQU   *
02CF 000000000000         02D4  903+        DC    6XL1'00'         ST/RG
                                904+*---------------------------------------------------------------*
02D5 13                   02D5  905+AB031   DC    XL1'13'          LINE 2, STATION   3
02D6 00                   02D6  906+AB032   DC    XL1'00'          FLAG BYTE
02D7 00                   02D7  907+AB033   DC    XL1'00'          ERROR COUNT
                          02D8  908+AB034   EQU   *
02D8 4040                 02D9  909+        DC    2CL1' '          OFFSET FOR MODIFY ADD
                          02DA  910+AB035   EQU   *
02DA 000000000000         02DF  911+        DC    6XL1'00'         ST/RG
                                912+*---------------------------------------------------------------*
02E0 0C                   02E0  913+AB036   DC    XL1'0C'          LINE 1, STATION   4
02E1 00                   02E1  914+AB037   DC    XL1'00'          FLAG BYTE
02E2 00                   02E2  915+AB038   DC    XL1'00'          ERROR COUNT
                          02E3  916+AB039   EQU   *
02E3 4040                 02E4  917+        DC    2CL1' '          OFFSET FOR MODIFY ADD
                          02E5  918+AB040   EQU   *
02E5 000000000000         02EA  919+        DC    6XL1'00'         ST/RG
                                920+*---------------------------------------------------------------*
02EB 14                   02EB  921+AB041   DC    XL1'14'          LINE 2, STATION   4
02EC 00                   02EC  922+AB042   DC    XL1'00'          FLAG BYTE
02ED 00                   02ED  923+AB043   DC    XL1'00'          ERROR COUNT
                          02EE  924+AB044   EQU   *
02EE 4040                 02EF  925+        DC    2CL1' '          OFFSET FOR MODIFY ADD
                          02F0  926+AB045   EQU   *
02F0 000000000000         02F5  927+        DC    6XL1'00'         ST/RG
                                928+*---------------------------------------------------------------*
02F6 0D                   02F6  929+AB046   DC    XL1'0D'          LINE 1, STATION   5
02F7 00                   02F7  930+AB047   DC    XL1'00'          FLAG BYTE
02F8 00                   02F8  931+AB048   DC    XL1'00'          ERROR COUNT
                          02F9  932+AB049   EQU   *
02F9 4040                 02FA  933+        DC    2CL1' '          OFFSET FOR MODIFY ADD
                          02FB  934+AB050   EQU   *
02FB 000000000000         0300  935+        DC    6XL1'00'         ST/RG
                                936+*---------------------------------------------------------------*
0301 15                   0301  937+AB051   DC    XL1'15'          LINE 2, STATION   5
0302 00                   0302  938+AB052   DC    XL1'00'          FLAG BYTE
0303 00                   0303  939+AB053   DC    XL1'00'          ERROR COUNT
                          0304  940+AB054   EQU   *
0304 4040                 0305  941+        DC    2CL1' '          OFFSET FOR MODIFY ADD
                          0306  942+AB055   EQU   *
0306 000000000000         030B  943+        DC    6XL1'00'         ST/RG
                                944+*---------------------------------------------------------------*
030C FF                   030C  945+        DC    XL1'FF'          END OF POLL LIST TABLE
030D 00000000             0310  946+        DC    4XL1'00'         SECTOR ALIGNMENT
```

```
                              948*********************************************************************
                              949**                SECTOR  4                                         *
                              950*********************************************************************
                              951**         TELEPROCESSING    MODES
                        0311  952+AB7101 EQU   *
0311 02F1F0             0313  953+       DC    XL3'02F1F0'                 MAXIMUM NUMBER OF DISK ERRORS.
                              954+*
                        0314  955+AB7102 EQU   *                           TERMINAL ID USED.
                        0314  956+AB7104 EQU   *                           HOST ID USED.
                        0314  957+AB7134 EQU   *
                        0314  958+AB7135 EQU   *
                        0314  959+AB7136 EQU   *
0314 00                 0314  960+       DC    XL1'00'
                              961+*            BIT 0 = ON=TERMINAL ID USED.
                              962+*            BIT 1 = ON=HOST ID USED.
                              963+*            BIT 2   0 - ITB, 1 - TRS.
                              964+*            BIT 3   ON - NULL RECORD AT END OF FILE
                              965+*            BIT 4   ON - STATUS MESSAGE TRANSMITTED
                              966+*
0315 00                 0315  967+AB7103 DC    ILL'0'
0316 404040404040404040 0324  968+       DC    CL15' '                     TERMINAL ID.
031E 40404040404040           968+
0325 00                 0325  969+AB7105 DC    ILL'0'
0326 404040404040404040 0334  970+       DC    CL15' '                     HOST ID.
032E 40404040404040           970+
0335 03                 0335  971+AB7107 DC    ILL'3'                      NUMBER OF RETRIES END FOR
                              972+*                                        STATUS MESSAGE.
0336 04                 0336  973+AB7111 DC    ILL'4'                      NAKS ACCEPTED IN RESPONSE TO
                              974+*                                        TEXT.
0337 07                 0337  975+AB7116 DC    ILL'7'                      ITO TIMEOUT COUNT.
0338 07                 0338  976+AB7117 DC    ILL'7'                      END RETRIES FOR MISSING RESPONSE
0339 00                 0339  977+AB7118 DC    ILL'0'                      NUMBER OF TIMES TO RETURN TO
                              978+*                                        WAIT FOR PHONE CALL IF HAVING
                              979+*                                        PROBLEMS SENDING DATA IN
                              980+*                                        TRANSMIT SINGLE DISKETTE
                              981+*                                        FUNCTION.
033A 01                 033A  982+AB7119 DC    XL1'01'                     BLOCKING FACTOR.
                        033B  983+AB7120 EQU   *
                        033B  984+AB7122 EQU   *
                        033B  985+AB7123 EQU   *
                        033B  986+AB7124 EQU   *
                        033B  987+AB7125 EQU   *
                        033B  988+AB7127 EQU   *
                        033B  989+AB7129 EQU   *
                        033B  990+AB7133 EQU   *
033B 48                 033B  991+       DC    XL1'48'
                              992+*
                              993+*            BIT 0 = ON=TERMINAL INITIATES CALL.
                              994+*            BIT 1 = ON=BUSINESS MACHINE  CLOCK  INSTALLED.
                              995+*            BIT 3 = ON=IBM EXTERNAL MODEM INSTALLED.
                              996+*            BIT 4 = ON=INTEGRATED MODEM INSTALLED.
                              997+*            BIT 5 = ON=ANSWER TONE GENERATION.
                              998+*            BIT 6 = ON=FULL SPEED.
                              999+*            BIT 7 = ON= AUTO ANSWER
                             1000+*                    OFF= MANUAL ANSWER
033C 01                 033C 1001+AB7126 DC    ILL'1'                      1-DTR.
                             1002+*                                        2-CDSTL.
033D 01                 033D 1003+AB7128 DC    ILL'1'                      1-SWITCHED
                             1004+*                                        2-LEASED.
033E 17                 033E 1005+AB7131 DC    ILL'23'
033F E3D9C1D5E2D4C9E2   0356 1006+       DC    CL31'TRANSMISSION SUCCESSFUL'
0347 E2C9D6D540E2E4C3        1006+
034F C3C5E2E2C6E4D340        1006+
0357 40404040404040          1006+
035E 19                 035E 1007+AB7132 DC    ILL'25'
035F E3D9C1D5E2D4C9E2   0370 1008+       DC    CL31'TRANSMISSION UNSUCCESSFUL'
0367 E2C9D6D540E4D5E2        1008+
036F E4C3C3C5E2E2C6E4        1008+
0377 D3404040404040          1008+
037E 14                 037E 1009+AB7130 DC    ILL'20'                     TIME TO WAIT FOR DISKETTE CHANGE
037F 0000000000000000   0390 1010+       DC    18XLL'00'
0387 0000000000000000        1010+
038F 0000                    1010+
                        FFFF 1011        END
TOTAL STATEMENTS IN ERROR IN THIS ASSEMBLY =       0

       XXPIA - PRIMARY INTERMACHINE ADAPTER ROUTINE
ERR LOC  OBJECT CODE      ADDR STMT SOURCE STATEMENT
                          0000    7       ENTRY XXPIA              PRIMARY INTERMACHINE ADAPTER
                                  8 *
                          0001    9       EXTRN CBPROC             CONTROL BLOCK PROCESSING
                          0002   10       EXTRN CMDPIA             COMMAND GLOBAL VARIABLE
                          0003   11       EXTRN CMDPTB             CMD PROC TIME BOMB CONTROL BLOCK
                          0004   12       EXTRN CMDPTP             COMMAND PROCESSOR TEMPORARY
                          0005   13       EXTRN CMDTBA             CMD TABLE ADDRESS
                          020D   14       ENTRY CMDTBL             COMMAND TABLE ADDRESS
                          0006   15       EXTRN IMASK              INTERRUPT MASK
                          0007   16       EXTRN INTON              TURN ON INTERUPTS ROUTINE
                          0008   17       EXTRN STATE              RAM STATE VALUE
                          0009   18       EXTRN SYSFLG             SYSTEM FLAG
                          000A   19       EXTRN SYSFG2             MEDIA SYSTEM FLAG
                          000B   20       EXTRN SYSMSK             SYSTEM MASK
                          000C   21       EXTRN TCMND              SHIFT BITS WORK AREA
                          000D   22       EXTRN TCMNDF             REFERENCE POINTER
                          000E   23       EXTRN TMPADD             CYCLE STEAL TEMPORARY ADDRESS
                          000F   24       EXTRN TMPLEN             CYCLE STEAL TEMPORARY LENGTH
                          0010   25       EXTRN XMDE               DEVICE END ROUTINE
                          0011   26       EXTRN XMEOP              END OF PROCESS ROUTINE
                          0012   27       EXTRN XMNORS             NO RESPONSE ERROR PROCESS
                          0013   28       EXTRN XMPLLX             POLL COMMAND PROCESS
                          0014   29       EXTRN XMPLNB             POLL UNTIL NOT BUSY
                          0015   30       EXTRN XMSEND             TRANSMIT ONE COMMAND
                          0016   31       EXTRN XMSHFT             SHIFT BITS ROUTINE
                          0017   32       EXTRN XMSM               SEND MANY
                          0018   33       EXTRN XMSTOO             LOCAL SATELLITE COMMAND PROCESSOR
                          0019   34       EXTRN XMSIRM             SEND ONE RECEIVE MANY
                          001A   35       EXTRN XMTMT              TRANSMIT ONE FRAME
                          001B   36       EXTRN XMSSML             FIVE SECOND MONITOR LINE
                          001C   37       EXTRN XXRRTN             SUPERVISORY RETURN ROUTINE
                          001D   38       EXTRN XXIREQ             INTERVAL TIMER REQUEST ROUTINE
                          001E   39       EXTRN XXIXCL             INTERVAL TIMER CANCEL ROUTINE
                          001F   40       EXTRN X0000              CONSTANT - X'0000'
                          0020   41       EXTRN X0001              CONSTANT - X'01'
                          0021   42       EXTRN X0002              CONSTANT - X'02'
                          0022   43       EXTRN XMNCOM             COMMUNICATION TERMINATION ROUTINE
                                 44 *     SEQUM
                                 45+* * * * * * * * * * * * * * * * * * * * * * * * * * * * * * * * * * *
                                 46+*
                                 47+*  IMA LEVEL INTERRUPT
                                 48+*
                                 49+* * * * * * * * * * * * * * * * * * * * * * * * * * * * * * * * * * *
                          0004   50+IMALVL EQU   4                     IMA LEVEL INTERRUPT
                                 51+* * * * * * * * * * * * * * * * * * * * * * * * * * * * * * * * * * *
                                 52+*
                                 53+*  REGISTER DEFINITIONS
```

```
           +*
0001       +XR1      EQU   1                         INDEX REGISTER 1
0002       +XR2      EQU   2                         INDEX REGISTER 2
0008       +ARR      EQU   8                         ADDRESS REGISTER SET ON BRANCH
0010       +IAR      EQU   X'10'                     INSTRUCTION ADDRESS REGISTER
000C       +RCSCW    EQU   X'0C'                     CYCLE STEAL WORD
000D       +RCSADR   EQU   X'0D'                     CYCLE STEAL ADDRESS
00FE       +MASKR    EQU   X'FE'                     INTERRUPT MASK
           +*
           +*  BIT PATTERNS
           +*
0000       +OFF      EQU   X'00'
0080       +BIT0     EQU   X'80'
0040       +BIT1     EQU   X'40'
0020       +BIT2     EQU   X'20'
0010       +BIT3     EQU   X'10'
0008       +BIT4     EQU   X'08'
0004       +BIT5     EQU   X'04'
0002       +BIT6     EQU   X'02'
0001       +BIT7     EQU   X'01'
           +*
007F       +NBIT0    EQU   X'7F'
00BF       +NBIT1    EQU   X'BF'
00DF       +NBIT2    EQU   X'DF'
00EF       +NBIT3    EQU   X'EF'
00F7       +NBIT4    EQU   X'F7'
00FB       +NBIT5    EQU   X'FB'
00FD       +NBIT6    EQU   X'FD'
00FE       +NBIT7    EQU   X'FE'
00FF       +ON       EQU   X'FF'
00FF       +ALL      EQU   ON
00FF       +ANY      EQU   ON
0000       +CLEAR    EQU   OFF
00C0       +MSK01    EQU   BIT0+BIT1
0001       +ONE      EQU   1                         EQUATE 1
           +*
           +*******************************************************************
           +*
           +*  XXPIA CONTROL BLOCK DEFINITIONS
           +*
           +***      FIELD LENGTHS
           +*
0000       +LF       EQU   0                         LINK FIRST - FIRST BYTE OF LINK
0001       +LL       EQU   1                         LINK LAST BYTE OF TWO BYTE FIELD
0003       +LTD      EQU   3                         LINK TIME DELTA
0005       +LRA      EQU   5                         LINK RETURN ADDRESS
0000       +LFIRST   EQU   0                         FIRST BYTE NO OFFSET
0001       +LDID     EQU   1                         LENGTH OF DEVICE ID
0001       +LCMND0   EQU   1                         LENGTH OF COMMAND 0
0001       +LCMND1   EQU   1                         LENGTH OF COMMAND 1
0002       +LDATAP   EQU   2                         LENGTH OF DATA POINTER
0001       +LERROR   EQU   1                         LENGTH OF ERROR CODE
0001       +LFAIL    EQU   1                         LENGTH OF FAILURE CODE
0001       +LSTAT    EQU   1                         LENGTH OF STATION ADDRESS
0001       +LPRESP   EQU   1                         LENGTH OF POLL RESPONSE
0001       +LQUEUE   EQU   1                         LENGTH OF QUEUE FIELD
0001       +LCMDMD   EQU   1                         LENGHT OF COMMAND MODIFIER FIELD
0002       +LMAXBC   EQU   2                         LENGTH OF MAXIMUM BYTE COUNT
0002       +LRECBC   EQU   2                         LENGTH OF RECEIVED BYTE COUNT
           +*
           +***      LOCATION OFFSETS
           +*
0000       +DEVICE   EQU   LFIRST                    DEVICE ID AND CODES
0001       +CMND0    EQU   DEVICE+LDID               COMMAND BYTE 0
0002       +CMND1    EQU   CMND0+LCMND0              COMMAND BYTE 1
0004       +DATAP    EQU   CMND1+LCMND1+LL           DATA BUFFER POINTER
0005       +ERROR    EQU   DATAP+LL                  ERROR BYTE
0006       +FAIL     EQU   ERROR+LERROR              FAILURE CODES
0007       +STAT     EQU   FAIL+LFAIL                STATION ADDRESS
0008       +PRESP    EQU   STAT+LSTAT                POLL RESPONSE
0009       +PIAQUE   EQU   PRESP+LPRESP              QUEUE TO PROCESS
000A       +CMDMOD   EQU   PIAQUE+LQUEUE             COMMAND MODIFIER
000C       +MAXBC    EQU   CMDMOD+LCMDMD+LL          MAXIMUM BYTE COUNT
000E       +RECBC    EQU   MAXBC+LMAXBC              RECEIVED BYTE COUNT
           +*
           +***      FIELDS WITHIN XXPIA CONTROL BLOCK BYTES
           +*
           +** DEVICE ID AND CODES
00C0       +DEVID    EQU   X'C0'                     PIA CONTROL BLOCK ID
0008       +UC       EQU   BIT4                      UNIT CHECK
0004       +SE       EQU   BIT5                      SATELLITE EXCEPTION
0002       +DE       EQU   BIT6                      DEVICE END
0001       +UE       EQU   BIT7                      UNIT EXCEPTION
000A       +UCDE     EQU   UC+DE                     UNIT CHECK AND DEVICE END
0003       +UEDE     EQU   UE+DE                     UNIT EXCEPTION AND DEVICE END
000F       +NDEVID   EQU   X'0F'                     RESET CONDITION CODES
           +*
           +** COMMAND BYTE 0
           +*
0001       +CSETM    EQU   X'01'                     CODE FOR SET MODE
0002       +CSETA    EQU   X'02'                     CODE FOR SET ADDRESS
0003       +CRST     EQU   X'03'                     CODE FOR RESET
0004       +CRDID    EQU   X'04'                     CODE FOR READ ID
0005       +CRDIB    EQU   X'05'                     CODE FOR READ IOB
0006       +CRDBF    EQU   X'06'                     CODE FOR READ BUFFER
0007       +CWTIB    EQU   X'07'                     CODE FOR WRITE BUFFER
0008       +CWTBF    EQU   X'08'                     CODE FOR WRITE BUFFER
0009       +CPOLL    EQU   X'09'                     CODE FOR POLL
000A       +CPRPE    EQU   X'0A'                     CODE FOR POLL RESET PARITY ERROR
000B       +CPACK    EQU   X'0B'                     CODE FOR POLL ACKNOWLEDGE
000C       +CCLR     EQU   X'0C'                     CODE FOR CLEAR QUEUE
000D       +CLNAC    EQU   X'0D'                     CODE FOR LINE ACTIVATE
000E       +CRSTI    EQU   X'0E'                     CODE FOR RESET IMA
000F       +CMNCN    EQU   X'0F'                     CODE FOR MONITOR LINE
0000       +ERPROC   EQU   X'00'                     ERROR PROCESS
           +*
           +** XXPIA ERROR CODES
           +*
0092       +MAXBCE   EQU   X'92'                     MAXIMUM BYTE COUNT EXCEEDED
0093       +LINEPE   EQU   X'93'                     LINE PARITY ERROR
0094       +CMDINV   EQU   X'94'                     COMMAND INVALID
0095       +HDWECK   EQU   X'95'                     IMA HARDWARE CHECK
0002       +LINEAC   EQU   BIT6                      LINE ACTIVE
0001       +NRESP    EQU   BIT7                      NO RESPONSE
           +*
           +** STATION ADDRESS
           +*
0018       +PORT     EQU   BIT3+BIT4                 PORT SELECTION
00E7       +NPORT    EQU   ALL-PORT                  ALL EXCEPT PORT BITS
0007       +STATN    EQU   BIT5+BIT6+BIT7            STATION ADDRESSED
00F8       +NSTATN   EQU   ALL-STATN                 ALL EXCEPT STATION BITS
001F       +ADDR     EQU   PORT+STATN                PORT AND STATION ADDRESS
001F       +LSATAD   EQU   ADDR                      LOCAL SATELLITE ADDRESS
           +*
```

```
        178+** POLL RESPONSE STATUS BYTE
        179+*
0080    180+BUSY     EQU   BIT0                        BUSY STATUS
0040    181+LPE      EQU   BIT1                        LINE PARITY ERROR
        182+*
004E    183+EXSTAT   EQU   BIT1+BIT4+BIT5+BIT6         EXCEPTION CONDITIONS
0000    184+CES      EQU   0                           CLEAR EXCEPTION STATUS
00F1    185+NEX      EQU   X'F1'                       NO EXCEPTION STATUS
0002    186+ATL      EQU   BIT6                        ACTIVATE LOST
0004    187+INA      EQU   BIT5                        INVALID ACTIVATE
0006    189+RES      EQU   BIT5+BIT6                   RESERVED
0008    189+INC      EQU   BIT4                        INVALID COMMAND
000A    190+STY      EQU   BIT4+BIT6                   STORAGE OVERRUN
000C    191+QUE      EQU   BIT4+BIT5                   QUEUE EMPTY
000E    192+POT      EQU   BIT4+BIT5+BIT6              POWER ON TRANSITION
0001    193+EVNODD   EQU   BIT7                        EVEN ODD RESPONSE
0008    194+AMM      EQU   INC                         ADDRESS MISMATCH
000E    195+UESTB    EQU   BIT4+BIT5+BIT6              UNIT EXCEPTION STATUS BITS
        196+*
        197+** STATION QUEUE
        198+*
00E0    199+STQUE    EQU   BIT0+BIT1+BIT2              STATION QUEUE
001F    200+NSTQUE   EQU   ALL-STQUE                   NOT STATION QUEUE
        201+*
        202+*        SYSTEM FLAG EQUATES (SYSFG2)
        203+*
0080    204+PRO      EQU   BIT0                        CONTROL BLOCK PROCESSING FLAG
0040    205+SIAENB   EQU   BIT1                        YYSIAM ENABLE FLAG
0020    206+POLRSP   EQU   BIT2                        POLL RESPONSE FLAG
0010    207+CSD      EQU   BIT3                        CYCLE STEAL DIRECTION TI-XMIT
        208+*
        209+*************************************************************
        210+*        SYSTEM FLAG EQUATES FOR SYSFLG
        211+*************************************************************
0002    212+MEDACT   EQU   BIT6                        MEDIA ACTIVITY FLAG
        213+*
        214+*** XXVSIA FLAGS
        215+*
0040    216+STAPOR   EQU   BIT1                        POWER ON RESET
        217+*
        218+** FAILURE CODES
        219+*
0004    220+BUSYTO   EQU   BIT5                        BUSY TIMEOUT
        221+*
        222+*        COMMAND DELAYS
        223+*
0014    224+POLDEL   EQU   20                          DELAY FOR POLL RESPONSE
0014    225+SFTADY   EQU   20                          DELAY FOR SETTING ADDRESS
002F    226+MINCMD   EQU   X'2F'                       DELAY FOR COMMAND PROCESSING
        227+*
        228+*        COMMAND TABLE EQUATES
        229+*
0004    230+CTINCR   EQU   4                           COMMAND TABLE INCREMENT
0003    231+LCMDAD   EQU   3                           LINK COMMAND ADDRESS
0001    232+LCMD     EQU   1                           LINK COMMAND
0003    233+LSCINC   EQU   3                           LOCAL SATELLITE COMMAND INCREMEN
        234+*
        235+*        MEDIA STATE EQUATES
        236+*
0000    237+MXST0    EQU   0                           STATE 0 - NULL
0002    238+MXST1    EQU   2                           STATE 0 - READ
0004    239+MXST2    EQU   4                           STATE 0 - WRITE
        240+*
        241+*
00FF    242+LASTRY   EQU   X'FF'                       MAXIMUM NUMBER OF POLLS TRIED
        243+*
        244+*************************************************************
        245+*
        246+** XXSIA CONTROL BLOCK OFFSETS
        247+*
0002    248+LCB      EQU   2                           LINK CONTROL BITS
0004    249+ENBS     EQU   4                           SIA CONTROL BITS
0006    250+LDAS     EQU   6                           LINK DATA ADDRESS
0007    251+LERS     EQU   7                           ERROR CODE BYTE
000A    252+LIA      EQU   10                          LINK IOB ADDRESS
000B    253+LIL      EQU   11                          LINK IOB LENGTH
000C    254+LRL      EQU   12                          NUMBER OF XMITS
000E    255+LTBS     EQU   14                          XMIT BLOCK SIZE
        256+*
        257+*  XXSIA ERROR CODES
        258+*
0073    259+CLRQUE   EQU   X'73'                       CLEAR QUEUE ERROR CODE
0079    260+INVMDE   EQU   X'79'                       INVALID MODE (YYSIAM)
        261+*
        262+** COMMAND BYTE 2  (XXSIA CONTROL BLOCK)
        263+*
0080    264+ENB      EQU   BIT0                        SIA INITIALIZATION COMMAND
0040    265+DISABL   EQU   BIT1                        DISABLE YYSIAM COMMAND
        266+*
        267+*************************************************************
        268+*
        269+*
        270+*        GPOST COMMANDS
        271+*
0000    272+ACTR     EQU   X'00'                       ACTIVATE READ
0001    273+ACTW     EQU   X'01'                       ACTIVATE WRITE
0002    274+RESET    EQU   X'02'                       RESET
0004    275+SETADD   EQU   X'04'                       SET ADDRESS
0008    276+READI    EQU   X'08'                       READ IOB
000C    277+READDI   EQU   X'0C'                       READ DEVICE ID
000E    278+WRITEI   EQU   X'0E'                       WRITE IOB
0010    279+POLL     EQU   X'10'                       POLL
0022    280+RSTIMA   EQU   X'22'                       RESET IMA
0050    281+POLCR    EQU   X'50'                       POLL WITH RESET PARITY
0030    282+POLLA    EQU   X'30'                       POLL WITH ACKNOWLEDGE
0012    283+CLER     EQU   X'12'                       CLEAR QUEUE
0013    284+SET40D   EQU   X'13'                       SET MODE
0018    285+READB    EQU   X'18'                       READ BUFFER
001E    286+WRITEB   EQU   X'1E'                       WRITE BUFFER
        287+*
        288+*        SHORTENED MNEMONICS
        289+*
0000    290+AR       EQU   ACTR                        ACTIVATE READ
0001    291+AW       EQU   ACTW                        ACTIVATE WRITE
0060    292+MRACT    EQU   X'60'                       MEDIA READ ACTIVATE
0040    293+MWACT    EQU   X'40'                       MEDIA WRITE ACTIVATE
        294+*
        295+*        NON COMMAND BITS
        296+*
00E0    297+NCMND    EQU   X'E0'                       NON COMMAND BITS
        298+*
        299+*************************************************************
        300+*
        301+*        I/O REGISTER DEFINITIONS
        302+*
0029    303+RLED     EQU   X'29'                       MEDIA AVAILABLE LED REGISTER
0060    304+RCYST    EQU   X'60'                       CYCLE STEAL REGISTER
0060    305+RFRAME   EQU   X'60'                       FRAME BUFFER
```

```
      0061  306*RTWST  EQU   X'61'                        TWINAX STATUS REGISTER
      0062  307*RCNTR  EQU   X'62'                        CONTROL REGISTER
      0063  308*RBSST  EQU   X'63'                        BASE STATUS REGISTER
      0064  309*RQUES  EQU   X'64'                        QUEUE STATUS REGISTER
      0065  310*RCMDB  EQU   X'65'                        COMMAND BUFFER
            311**
            312**      TWINAX STATUS REGISTER X'61' BIT DEFINITIONS (RTWST)
            313**
      0080  314*PD     EQU   BIT0                         LINE PARITY DISPLAY
      0040  315*PE     EQU   BIT1                         PARITY ERROR INTERRUPT
      0020  316*LM     EQU   BIT2                         LINE MESSAGE MONITOR
      0010  317*AM     EQU   BIT3                         ADDRESS MISMATCH
      0008  318*CQ     EQU   BIT4                         COMMAND QUEUED
      0008  319*SI     EQU   BIT4                         SEND ONE
      0004  320*TM     EQU   BIT5                         TRANSMISSION MONITOR
      0002  321*DT     EQU   BIT6                         DATA STREAM TERMINATION DELIMITE
      0001  322*CS     EQU   BIT7                         CYCLE STEAL
      0041  323*PECS   EQU   PE+CS                        PARITY ERROR AND CYCLE STEAL
      0003  324*CD     EQU   CS+DT                        CYCLE STEAL AND DSTD
      007F  325*RPD    EQU   ALL-PD                       RESET PARITY DISPLAY
      00BF  326*RPE    EQU   ALL-PE                       RESET PARITY ERROR
      00DF  327*RLM    EQU   ALL-LM                       RESET LINE MONITOR
      00EF  328*RAM    EQU   ALL-AM                       RESET ADDRESS MISMATCH
      00F7  329*RCQ    EQU   ALL-CQ                       RESET COMMAND QUEUED
      00F7  330*RSI    EQU   ALL-SI                       RESET SEND ONE
      00FB  331*RTM    EQU   ALL-TM                       RESET TRANSMISSION MONITOR
      00FD  332*RDT    EQU   ALL-DT                       RESET DSTD
      00FE  333*RCS    EQU   ALL-CS                       RESET CYCLE STEAL
      00FC  334*RCD    EQU   ALL-CD                       RESET CYCLE STEAL AND DSTD
      00F3  335*RCTM   EQU   ALL-CQ-TM                    RESET CMND QUEUED AND TRIT MONIT
      00A4  336*RSTINT EQU   ALL-PE-AM-SI-DT-CS           RESET ALL INTERRUPT BITS
            337**
            338**      CONTROL REGISTER X'62' BIT DEFINITIONS (RCNTR)
            339**
      001F  340*NULL   EQU   X'1F'                        NULL
      0020  341*SONE   EQU   X'20'                        SEND ONE COMMAND FOR CONTROL REG
      0020  342*SENDI  EQU   X'20'                        SEND ONE FRAME
      0040  343*WRTCAD EQU   X'40'                        WRITE COMMAND
      0060  344*RDCMD  EQU   X'60'                        READ COMMAND
      0080  345*POTB   EQU   X'80'                        POWER ON TRANSITION
      00A0  346*TBPR   EQU   X'A0'                        TWO BYTE POLL RESPONSE
      00C0  347*RACT   EQU   X'C0'                        READ ACTIVATE
      00E0  348*WACT   EQU   X'E0'                        WRITE ACTIVATE
      0008  349*PORT1  EQU   BIT4                         PORT ONE
      0007  350*ADDR7  EQU   X'07'                        ADDRESS 7 IN CONTROL REGISTER
      00A7  351*TBPR7  EQU   TBPR+ADDR7                   TWO BYTE POLL RESPONSE AND ADDR
      0088  352*CNTR   EQU   POTB+PORT1                   POWER ON TRANSITION AND PORT 1
      008F  353*CNTR7  EQU   CNTR+7                       INITIALIZATION STATE OF REGISTER
            354**
            355**  DIAGNOSTIC ROUTINE INTERRUPT LEVEL BIT
            356**
      00FF  357*DEVMSK EQU   X'FF'                        I/O DEVICE INTERRUPT MASK
      00FB  358*IMAOFF EQU   X'FB'                        IMA TURN OFF MASK
            359*************  IMA HARDWARE ERROR  ************************************
      0000  360*RRESET EQU   X'00'                        IMA MODE SELECT
            361*************  IMA HARDWARE ERROR  ************************************
            362              PRINT ON
      0000  364 PIA000 EQU   *                            DO UNTIL
0000 39 80 000A        365   TBF   SYSFG2,PRO             --END OF PROCESS
0004 C0 90 0000        366   JF    PIA000                 END DO UNTIL
0008 3A 80 000A        367   SBN   SYSFG2,PRO             SET PROCESSING FLAG
000C 34 01 0001        368   ST    CBPROC,XR1             SAVE POINTER TO CONTROL BLOCK
0010 38 02 0009        369   SBF   SYSFLG,MEDACT          RESET NO MEDIA ACTIVITY FLAG
                       370 *                              ALLOW MAXIMUM TIME FOR PROCESSING
0014 C2 01 0003        371   LA    CMOPTI,XR1             (SET REFERENCE POINTER TO CB)
0018 C0 97 001E        372   B     XXTXCL                 CANCEL ENTRY FROM QUEUE
001C C2 01 0003        373   LA    CMOPTB,XR1             (SET REFERENCE POINTER TO CB)
0020 4C 03 05 0208     374   MVC   LRA(4,XR1),LPEPAD      (LOAD RETURN ADDRESS)
0025 C0 87 001D        375   B     XXTREQ                 (QUEUE REQUEST)
0029 35 01 0001        376   L     CBPROC,XR1             RESTORE CONTROL BLOCK POINTER
002D 78 0F 00          377   SBF   DEVICE(,XR1),NDEVIO    CLEAR CONTROL BITS
0030 4C 01 06 001F     378   MVC   FAIL(2,XR1),X0000      CLEAR ERROR CODE AND FAILURE BITS
0035 4C 01 09 001F     379   MVC   PIABUF(2,XR1),X0000    CLEAR POLL RESPONSE
003A 79 1F 07          380   TBF   STAT(,XR1),LSATAD      IF ADDRESSING LOCAL SATELLITE
003D F2 90 03          381   JF    PIA200                 * ***
0040 C0 87 0018        382   B     XMST00                 * PROCESS LOCAL SATELLITE
0044 C0 87 0201        383   B     PIA999                 * ***
      0048  384 PIA200 EQU   *                            ELSE,
0048 38 40 000A        385   TBN   SYSFG2,SIAENB          * IF SECONDARY MODE
004C C0 10 01F6        386   BT    PIA997                 * * TERMINATE
                       387 *                              * ELSE,
0050 C0 87 0022        388   B     XANCOM                 * * BRANCH TO RESET COMMUNICATIONS
                       389 *                              * * MASK OFF IMA INTERRUPT
      0054  390 TEST   EQU   *                            * * DO UNTIL ALL INTERRUPTS ARE OFF
                       391 * XFR   R1-MASKR,I2-OFF        * * * MASK OFF INTERRUPTS
0054 F6         0054   392+  DC    IL1'246'               *
0055 FE         0055   393+  DC    AL1(MASKR)             *
0056 00         0056   394+  DC    AL1(OFF)               *
                       395 * BNEQ  R1-MASKR,I2-OFF,ADD-TEST  * END DO
0057 CA         0057   396+  DC    IL1'202'               *
0058 FF         0058   397+  DC    AL1(MASKR)             *
0059 00         0059   398+  DC    AL1(OFF)               *
005A 0054       005B   399+  DC    AL2(TEST)              *
005C 38 04 0006        400   SBF   IMASK,IMALVL           * * (SET INT MASK TO DISABLE IMA)
                       401 * LR    R1-MASKR,ADD-IMASK     * * (DISABLE IMA INTERRUPT)
0060 33         0060   402+  DC    IL1'51'                *
0061 FF         0061   403+  DC    AL1(MASKR)             *
0062 0006       0063   404+  DC    AL2(IMASK)             *
                       405 * LR    R1-DEVMSK,ADD-IMASK    * * (MASK OFF ALL INTERRUPTS)
0064 33         0064   406+  DC    IL1'51'                *
0065 FF         0065   407+  DC    AL1(DEVMSK)            *
0066 0006       0067   408+  DC    AL2(IMASK)             *
0068 78 E0 07          409   SBF   STAT(,XR1),NCMND       * * CLEAR NON-COMMAND MODIFIER BITS
                       410 * LR    R1-RCNTR,B-1,DISP-STAT * * LOAD NEW ADDRESS
006B 73         006B   411+  DC    IL1'115'               *
006C 62         006C   412+  DC    AL1(RCNTR)             *
006D 07         006D   413+  DC    AL1(STAT)              *
006E 35 01 0001        414   L     CBPROC,XR1             * * RESTORE POINTER TO CONTROL BLOCK
0072 35 02 0005        415   L     CMDTBA,XR2             * * SET REF PTR TO COMND TABLE ADDR
      0076  416 PIA300 EQU   *                            * * DO WHILE
0076 90 00 00 01       417   CLC   0(1,XR2),CMNDO(,XR1)   * * --COMMAND OK
007A F2 81 00          418   JE    PIA400                 * * * ***
007D 80 00 00          419   CLI   0(,XR2),ERPROC         * * --END OF TABLE NOT FOUND
0080 F2 81 07          420   JE    PIA400                 * * * ***
0083 F2 02 04          421   LA    CTINCR(,XR2),XR2       * * * MOVE TO NEXT TABLE ENTRY
0086 C0 87 0076        422   B     PIA300                 * * * ***
      008A  423 PIA400 EQU   *                            * * END DO WHILE
008A 2C 00 0002 01     424   MVC   CMDPTA,CCMD(1,XR2)     * * LOAD COMMAND GLOBAL VARIABLE
008F B5 10 03          425   L     LCMDAD(,XR2),IAR       * * CASE - PROCESS CMD - COMMAND=
      0092  427 XMSETM EQU   *                            * * CASE 1 - SET MODE - CMD='01'
0092 1C 01 000E 04     428   MVC   TMPADD,DATAP(2,XR1)    * * LOAD CYCLE STEAL TEMPORARY ADD
0097 0C 01 000F 0020   429   MVC   TMPLEN(2),X0001        * * LOAD CYCLE STEAL TEMPORARY LGTH
009D C0 87 0017        430   B     XMSM                   * * SEND MULTIPLE FRAMES
      00A1  431 SETM10 EQU   *                            * * DO WHILE
                       432 * JOB   R1-RTWST,I2-CS,ADD-SETM20 * * --NOT CYCLE STEAL INTERRUPT OK
00A1 04         00A1   433+  DC    IL1'212'               *
00A2 61         00A2   434+  DC    AL1(RTWST)             *
00A3 01         00A3   435+  DC    AL1(CS)                *
```

```
00A4 08            00A4              DC    AL1(SETM20-1-*)          *
00A5 39 80 000A                      TBF   SYSFG2,PRO               * * --NOT END OF PROCESS
00A9 F2 10 04                        JT    SETM20                   * * * ***
00AC C0 87 00A1                      B     SETA10                   * * * WAIT
                   00B0      SETM20  EQU   *                        * * END DO UNTIL
00B0 C0 87 0022                      B     XMNCOM                   * * CALL COMM TERMINATION ROUTINE
                                  *  SWAIT TIME=MINCMD              * * PAUSE
00B4 DD 2E 0200 0200                 CLC   512(MINCMD),512
00BA C0 87 0014                      B     XMPLNB                   * * POLL UNTIL NOT BUSY
00BE C0 87 01FD                      B     PIA998                   * * SET DEVICE END & END CASE 2
                   00C2      XMSETA  EQU   *                        * * CASE 2 - SET ADDRESS - CMD='02'
                   00C2      SETA10  EQU   *                        * * DO UNTIL ADDRESS IS SET OR EOP
00C2 3C 04 0002                      MVI   CMDPIA,SETADD            * * * LOAD SET ADD CMD IN GBL VAR
00C6 1E 00 0002 0A                   ALC   CMDPIA,CMDMOD(1,XR1)     * * * SET ADDRESS IN GLOBAL VARIABLE
00CB C0 87 001A                      B     XMTMT                    * * * TRANSMIT ONE
                                  *  SWAIT TIME=MINCMD              * * * DELAY FOR SETTING OF ADDRESS
00CF DD 2E 0200 0200                 CLC   512(MINCMD),512
                                  *                                 * * * SET ADDRESSING TO NEW ADDRESS
00D5 C0 87 0016                      B     XMSHFT                   * * * (SHIFT COMMAND MODIFIER BITS)
00D9 C2 01 0000                      LA    TCMNDF,XR1               * * * (SET REFERENCE POINTER)
                                  *  STR   R1-KCNTR,B-1,DISP-0      * * * (SAVE NON-ADDRESS BITS)
00DD 72            00DD              DC    IL1'114'
00DE 62            00DE              DC    AL1(KCNTR)
00DF 00            00DF              DC    AL1(0)
00E0 78 07 00                        SBF   0(,XR1),STATN            * * * (CLEAR STATION ADDRESS)
00E3 5E 00 00 01                     ALC   0(1,XR1),1(1,XR1)        * * * (LOAD NEW STATION ADDRESS)
                                  *  LR    R1-KCNTR,B-1,DISP-0      * * * (LOAD NEW ADDRESS IN HARDWARE)
00E7 73            00E7              DC    IL1'115'
00E8 62            00E8              DC    AL1(KCNTR)
00E9 00            00E9              DC    AL1(0)
00EA C0 87 0014                      B     XMPLNB                   * * * POLL UNTIL NOT BUSY
00EE 35 01 0001                      L     CBPKOC,XR1               * * * RESTORE POINTER TO CONTROL BLK
00F2 7D 93 05                        CLI   ERROR(,XR1),LINEPE       * * * IF PARITY ERROR OR
00F5 F2 81 07                        JE    SETA15                   * * * ***
00F8 38 20 000A                      TBN   SYSFG2,POLRSP            * * * --NO RESPONSE
00FC F2 10 0C                        JT    SETA20                   * * * * ***
                   00FF      SETA15  EQU   *                        * * * * ***
00FF 3C 22 0002                      MVI   CMDPIA,RSTIMA            * * * * LOAD RESET IMA IN GBL VAR
0103 C0 87 001A                      B     XMTMT                    * * * * TRANSMIT ONE FRAME
0107 38 20 000A                      SBF   SYSFG2,POLRSP            * * * * RESET POLL RESPONSE FLAG
                   010B      SETA20  EQU   *                        * * * ELSE, CONTINUE
                                  *  BOB   R1-RTWST,I2-PE,ADD-SETA10 * * --CHECK PARITY ERROR
010B C4            010B              DC    IL1'196'
010C 61            010C              DC    AL1(RTWST)
010D 40            010D              DC    AL1(PE)
010E 00C2          010E              DC    AL2(SETA10)
0110 38 20 000A                      TBN   SYSFG2,POLRSP            * * --CHECK END OF PROCESS
0114 F2 90 11                        JF    SETA30                   * * * ***
0117 39 80 000A                      TBF   SYSFG2,PRO               * * * ***
011B F2 90 0A                        JF    SETA30                   * * * ***
011E 7C C0 00                        MVI   DEVICE(,XR1),DEVID       * * * CLEAR CONTROL BITS
0121 7C 00 06                        MVI   FAIL(,XR1),CLEAR         * * * CLEAR FAILURE BITS
0124 C0 87 00C2                      B     SETA10                   * * * ***
                   0128      SETA30  EQU   *                        * * END DO UNTIL
0128 38 80 000A                      TBN   SYSFG2,PRO               * * IF END OF PROCESS
012C F2 10 06                        JT    SETA40                   * * * ***
012F 7C 95 05                        MVI   ERROR(,XR1),HDWECK       * * * SET IMA HARDWARE CHECK
0132 F2 87 C1                        J     PIA997                   * * * SET UNIT CK & DEVICE END
                   0135      SETA40  EQU   *                        * * ELSE, CONTINUE
0135 C0 87 0022                      B     XMNCOM                   * * BRANCH TO RESET COMM
0139 C0 87 01FD                      B     PIA998                   * * SET DEVICE END & END CASE 2
                   013D      XMRST   EQU   *                        * * CASE 3 - RESET - CMD='03'
                   013D      XMRSTI  EQU   *                        * * CASE 14 - RESET IMA - CMD='0E'
013D C0 87 0015                      B     XMSEND                   * * SEND ONE FRAME
0141 C0 87 01FD                      B     PIA998                   * * SET DEVICE END & END CASE 3,14
*****************************************************************************
                   0145      XMLNAC  EQU   *                        * * CASE 13 - LINE ACTIVATE - CMD='0D'
0145 C0 87 001A                      B     XMTMT                    * * TRANSMIT ONE FRAME
0149 C0 87 01FD                      B     PIA998                   * * SET DEVICE END & END CASE 13
*****************************************************************************
                   014D      XMRDID  EQU   *                        * * CASE 4 - READ ID - CMD='04'
                   014D      XMRDIB  EQU   *                        * * CASE 5 - READ IOB - CMD='05'
                   014D      XMRDBF  EQU   *                        * * CASE 6 - READ BUFFER - CMD='06'
014D 38 10 000A                      SBF   SYSFG2,CSD               * * SET CYCLE STEAL 'IN' FLAG
0151 F2 87 04                        J     RDWT00
                   0154      XMWTIB  EQU   *                        * * CASE 7 - WRITE IOB - CMD='07'
                   0154      XMWTBF  EQU   *                        * * CASE 8 - WRITE BUFFER - CMD='08'
0154 3A 10 000A                      SBN   SYSFG2,CSD               * * SET CYCLE STEAL 'OUT' FLAG
                   0158      RDWT00  EQU   *
0158 1E 00 0002 0A                   ALC   CMDPIA,CMDMOD(1,XR1)     * * IDENTIFY QUEUE
015D C0 87 0015                      B     XMSEND                   * * SEND WRITE COMMAND
0161 39 80 000A                      TBF   SYSFG2,PRO               * * IF NOT END OF PROCESS
0165 35 01 0001                      L     CBPKOC,XR1               * * RESTORE POINTER TO CONTROL BLOCK
0169 F2 10 39                        JT    RDWT20                   * * * ***
                                  *  SWAIT TIME=MINCMD              * * * WAIT
016C DD 2E 0200 0200                 CLC   512(MINCMD),512
0172 C0 87 0007                      B     INTON                    * * * TURN ON INTERRUPTS
0176 1C 01 000E 04                   MVC   TMPADD,DATAP(2,XR1)      * * * LOAD CYCLE STEAL TEMP ADDRESS
017B 1C 01 000F 0C                   MVC   TMPLEN,MAXBC(2,XR1)      * * * LOAD CYCLE STEAL TEMP LENGTH
0180 38 10 000A                      TBN   SYSFG2,CSD               * * * IF READ OPERATION
0184 F2 10 0E                        JT    RDWT10                   * * * * ***
0187 3C 02 0008                      MVI   STATE,MXST1              * * * * CHANGE TO READ STATE
018B 3C 00 0002                      MVI   CMDPIA,ACTR              * * * * SET FIRST CMD TO SATELLITE
018F C0 87 0019                      B     XMSIRM                   * * * * SEND ONE, RECEIVE MANY FRAMES
0193 F2 87 15                        J     RDWT30                   * * * * ***
                   0196      RDWT10  EQU   *                        * * * ELSE,
0196 3C 04 0008                      MVI   STATE,MXST2              * * * * CHANGE TO WRITE STATE
019A 3C 01 0002                      MVI   CMDPIA,ACTW              * * * * SET FIRST CMD TO SATELLITE
019E C0 87 0017                      B     XMSM                     * * * * SEND MULTIPLE FRAMES
01A2 F2 87 08                        J     RDWT30                   * * * * ***
                                  *                                 * * * END IF
                   01A5      RDWT20  EQU   *                        * * ELSE,
01A5 7C 95 05                        MVI   ERROR(,XR1),HDWECK       * * * SET IMA HARDWARE CHECK ERROR
01A8 F2 87 48                        J     PIA997                   * * * SET UNIT CK & DEVICE END & END
                   01AB      RDWT30  EQU   *                        * * END IF
01AB F2 87 53                        J     PIA999                   * * END CASE 7 OR 8
                   01AE      XMPOLL  EQU   *                        * * CASE 9 - POLL - CMD='09'
01AE C0 87 0014                      B     XMPLNB                   * * POLL UNTIL NOT BUSY
01B2 F2 87 4B                        J     PIA998                   * * SET DEVICE END & END CASE 9
*****************************************************************************
                   01B5      XMPRPF  EQU   *                        * * CASE 10 - POLL RST PARITY - CMD=...
                   01B5      XMPACK  EQU   *                        * * CASE 11 - POLL ACK - CMD='0B'
01B5 C0 87 0013                      B     XMPLLX                   * * POLL
                                  *  SWAIT TIME=MINCMD              * * WAIT FOR POLL RESPONSE
01B9 DD 2E 0200 0200                 CLC   512(MINCMD),512
01BF C0 87 0014                      B     XMPLNB                   * * POLL UNTIL NOT BUSY
01C3 F2 87 37                        J     PIA998                   * * SET DEVICE END & END CASE A OR B
*****************************************************************************
                   01C6      XMCLR   EQU   *                        * * CASE 12 - CLR QUEUE - CMD='0C'
01C6 1E 00 0002 0A                   ALC   CMDPIA,CMDMOD(1,XR1)     * * IDENTIFY QUEUE
01CB C0 87 0015                      B     XMSEND                   * * SEND ONE FRAME
01CF F2 87 28                        J     PIA998                   * * SET DEVICE END & END CASE 12
*****************************************************************************
```

```
                      01D2  567 XMMNLN EQU   *                    * * CASE 15 - MONITOR LINE - CMD=*OF*
01D2 C2 01 0003             568              LA    CMDPTB,XR1     * * CANCEL EOP MONITOR
01D6 C0 87 001E             569              B     XXTACL         * * ***
                            570 *                                 * * QUEUE 5 SEC DELAY
01DA C2 01 0003             571              LA    CMDPTB,XR1     * * (POINT TO CONTROL BLOCK)
01DE 4C 03 05 020C          572              MVC   LRA(4,XR1),FVSAD  * * (LOAD RETURN ADD AND TIME DELTA)
                            573 *            OR    R1-RCNTR,I2-TBPR7 * TURN ON CONTROL REGISTER
01E3 EA               01E3  574+             DC    IL1'250'       *
01E4 62               01E4  575+             DC    AL1(RCNTR)     *
01E5 A7               01E5  576+             DC    AL1(TBPR7)     *
                            577 *            AND   R1-RTWST,I2-RLM  * * (RESET LINE MONITOR)
01E6 F8               01E6  578+             DC    IL1'248'       *
01E7 61               01E7  579+             DC    AL1(RTWST)     *
01E8 0F               01E8  580+             DC    AL1(RLM)       *
01E9 C0 87 001D             581              B     XXTREQ         * * QUEUE REQUEST
01ED F2 87 11               582              J     PIA999         * * END CASE 15
                            583 ************************************************************
                            584 ************************************************************
                      01F0  585 XMERR  EQU   *                    * * CASE 0 - ERROR - CMD =*01*-*OF*
01F0 7C 94 05               586              MVI   ERROR(,XR1),CMDINV * * SET INVALID COMMAND ERROR
01F3 F2 87 00               587              J     PIA997         * * SET UNIT CHK & DEVICE END AND END
                      01F6  589 PIA997 EQU   *
01F6 35 01 0001             590              L     CBPROC,XR1     * SET POINTER TO CONTROL BLOCK
01FA 7A 08 00               591              SBN   DEVICE(,XR1),UC  * SET UNIT CHECK
                      01FD  592 PIA998 EQU   *
01FD C0 87 0010             593              B     XMDE           * SET DEVICE END
                      0201  594 PIA999 EQU   *                    END CASE
0201 C0 87 001C             595              B     XXRRTN         RESTORE REGISTERS AND RETURN
                            596 *
0205 00A5             0206  597              DC    XL2'0A5'       * COMMAND PROCESS MAX TIME DELAY
0207 0011             0208  598 CPEPAD DC    AL2(XMEOP)     ADDRESS OF EOP ROUTINE
                            599 *
0209 0113             020A  600 DLY5SC DC    XL2'0113'      * MAX TIME TO PROCESS A CONTROL BLOCK
020B 001B             020C  601 FVSAD  DC    AL2(XM5SML)    ADDRESS OF 5 SECOND MONITOR LINE
                            602 *
                      020D  603 CMDTBL EQU   *
020D 01               020D  604              DC    AL1(CSETM)     SET MODE MODE CODE
020E 13               020E  605              DC    AL1(SETMOD)    SET MODE COMMAND
020F 0092             0210  606              DC    AL2(XMSETM)    SET MODE ROUTINE ADDRESS
0211 02               0211  607              DC    AL1(CSETA)     SET ADDRESS CODE
0212 04               0212  608              DC    AL1(SETADD)    SET ADDRESS COMMAND
0213 00C2             0214  609              DC    AL2(XMSETA)    SET ADDRESS ROUTINE ADDRESS
0215 03               0215  610              DC    AL1(CRST)      RESET CODE
0216 02               0216  611              DC    AL1(RESET)     RESET COMMAND
0217 0130             0218  612              DC    AL2(XMRST)     RESET ROUTINE ADDRESS
0219 04               0219  613              DC    AL1(CRDID)     READ DEVICE ID CODE
021A 0C               021A  614              DC    AL1(READDI)    READ DEVICE ID COMMAND
021B 0140             021C  615              DC    AL2(XMRDID)    READ DEVICE ID ROUTINE ADDRESS
021D 05               021D  616              DC    AL1(CRDIB)     READ IOB CODE
021E 08               021E  617              DC    AL1(READI)     READ IOB COMMAND
021F 0140             0220  618              DC    AL2(XMRDIB)    READ IOB ROUTINE ADDRESS
0221 06               0221  619              DC    AL1(CRDBF)     READ BUFFER CODE
0222 18               0222  620              DC    AL1(READB)     READ BUFFER COMMAND
0223 0140             0224  621              DC    AL2(XMRDBF)    READ BUFFER ROUTINE ADDRESS
0225 07               0225  622              DC    AL1(CWTIB)     WRITE IOB CODE
0226 0E               0226  623              DC    AL1(WRITEI)    WRITE IOB COMMAND
0227 0154             0228  624              DC    AL2(XMWTIO)    WRITE IOB ROUTINE ADDRESS
0229 08               0229  625              DC    AL1(CWTBF)     WRITE BUFFER CODE
022A 1E               022A  626              DC    AL1(WRITEB)    WRITE BUFFER COMMAND
022B 0154             022C  627              DC    AL2(XMWTBF)    WRITE BUFFER ROUTINE ADDRESS
022D 09               022D  628              DC    AL1(CPOLL)     POLL CODE
022E 10               022E  629              DC    AL1(POLL)      POLL COMMAND
022F 01AE             0230  630              DC    AL2(XMPOLL)    POLL ROUTINE ADDRESS
0231 0A               0231  631              DC    AL1(CPRPE)     POLL RESET PARITY CODE
0232 50               0232  632              DC    AL1(POLLR)     POLL RESET PARITY COMMAND
0233 0185             0234  633              DC    AL2(XMPRPE)    POLL RESET PARITY ROUTINE ADDRESS
0235 0B               0235  634              DC    AL1(CPACK)     POLL ACKNOWLEDGE CODE
0236 30               0236  635              DC    AL1(POLLA)     POLL ACKNOWLEDGE COMMAND
0237 0185             0238  636              DC    AL2(XMPACK)    POLL ACKNOWLEDGE ROUTINE ADDRESS
0239 0C               0239  637              DC    AL1(CCLR)      CLEAR QUEUE CODE
023A 12               023A  638              DC    AL1(CLER)      CLEAR QUEUE COMMAND
023B 01C6             023C  639              DC    AL2(XMCLR)     CLEAR QUEUE ROUTINE ADDRESS
023D 0D               023D  640              DC    AL1(CLNAC)     LINE ACTIVATE CODE
023E 10               023E  641              DC    AL1(POLL)      LINE ACTIVATE COMMAND
023F 0145             0240  642              DC    AL2(XMLNAC)    LINE ACTIVATE ROUTINE ADDRESS
0241 0E               0241  643              DC    AL1(CRSTI)     RESET IMA CODE
0242 22               0242  644              DC    AL1(RSTIMA)    RESET IMA COMMAND
0243 0130             0244  645              DC    AL2(XMRSTI)    RESET IMA ROUTINE ADDRESS
0245 0F               0245  646              DC    AL1(CMNLN)     MONITOR LINE CODE
0246 10               0246  647              DC    AL1(POLL)      MONITOR LINE COMMAND
0247 01D2             0248  648              DC    AL2(XMMNLN)    MONITOR LINE ROUTINE ADDRESS
0249 00               0249  649              DC    AL1(ERPROC)    ERROR CODE
024A 10               024A  650              DC    AL1(POLL)      ERROR COMMAND (FILL)
024B 01F0             024C  651              DC    AL2(XMERR)     ERROR ROUTINE ADDRESS
                      0000  652              END   XXPIA          END OF MODULE

TOTAL STATEMENTS IN ERROR IN THIS ASSEMBLY =      0

        XXSIA - SECONDARY INTERMACHINE ADAPTER QUEUEING ROUTINE      D. MAY

ERR LOC  OBJECT CODE       ADDR STMT SOURCE STATEMENT

    0000                          2 XXSIA   START
                                  3 *
                                  4 *
                           00BF   5         ENTRY SIXMAD          ADDRESS OF XXSTXM
                                  6 *
                           0001   7         EXTRN SYSFLG          SYSTEM FLAG
                           0002   8         EXTRN SIAQTB          SIA QUEUE TABLE
                           0003   9         EXTRN SIASR           SIA SAVE REGISTER
                           0004  10         EXTRN SIAT2F          STORAGE AREA, FIRST BYTE
                           0005  11         EXTRN SIATP2          SIA TEMPORARY VARIABLE - 2 BYTES
                           0006  12         EXTRN SIAINX          SIA INDEX
                           0007  13         EXTRN SIATMP          SIA TEMPORARY VARIABLE
                           0008  14         EXTRN X0000           CONSTANT - X'0000'
                           0009  15         EXTRN X0001           CONSTANT - X'0001'
                           000A  16         EXTRN XSSTXM          TIME BOMB PROCESSING
                           000B  17         EXTRN XSQOF           QUEUE BITS OFF ROUTINE
                           000C  18         EXTRN XXCONS          ROS CONSTANTS
                           000D  19         EXTRN XXRRTN          SVC RETURN ROUTINE
                           000E  20         EXTRN XXTREQ          QUEUING ROUTINE
                                 21 *
                                 22 *       SEQU
                                 23+*
                                 24+*  REGISTER DEFINITION
                                 25+*
                           0001  26+XR1     EQU   1               INDEX REGISTER 1
                           0002  27+XR2     EQU   2               INDEX REGISTER 2
                           0008  28+ARR     EQU   8               ADDRESS REGISTER SET ON BRANCH
                           0010  29+IAR     EQU   X'10'           INSTRUCTION ADDRESS REGISTER
                           000C  30+RCSCW   EQU   X'0C'           CYCLE STEAL WORD
                           000D  31+RCSADR  EQU   X'0D'           CYCLE STEAL ADDRESS
                           00FE  32+MASKR   EQU   X'FE'           INTERRUPT MASK REGISTER
                                 33+*
                                 34+*  BIT PATTERNS
                                 35+*
                           0000  36+OFF     EQU   X'00'
```

```
0080   37+BIT0     EQU   X'80'
0040   38+BIT1     EQU   X'40'
0020   39+BIT2     EQU   X'20'
0010   40+BIT3     EQU   X'10'
0008   41+BIT4     EQU   X'08'
0004   42+BIT5     EQU   X'04'
0002   43+BIT6     EQU   X'02'
0001   44+BIT7     EQU   X'01'
007F   45+NBIT0    EQU   X'7F'
00BF   46+NBIT1    EQU   X'BF'
00DF   47+NBIT2    EQU   X'DF'
00EF   48+NBIT3    EQU   X'EF'
00F7   49+NBIT4    EQU   X'F7'
00FB   50+NBIT5    EQU   X'FB'
00FD   51+NBIT6    EQU   X'FD'
00FE   52+NBIT7    EQU   X'FE'
00FF   53+ON       EQU   X'FF'
       54+*
       55+*   IMMEDIATE FIELDS
       56+*
0000   57+LAST     EQU   OFF                    LAST QUEUE ENTRY
0080   58+DPSET    EQU   BIT0                   SET DISPATCH PROCESS
0000   59+SIACBF   EQU   X'00'                  SIA CONTROL BLOCK FILL
0000   60+CLEAR    EQU   OFF                    ZERO FILL
0010   61+SIAILF   EQU   X'10'                  SIA I/O BUFFER LENGTH FILL
0008   62+MASK8    EQU   BIT4                   MASK 8'S DIGIT
0007   63+MSK421   EQU   X'07'                  MASK DIGITS 4,2,1
00F8   64+NBT421   EQU   X'F8'                  MASK ALL DIGITS BUT 4,2,1
0001   65+MASK1    EQU   BIT7                   MASK 1'S DIGIT
0010   66+MSK16    EQU   BIT3                   MASK 16TH'S DIGIT
00F8   67+MAXTD    EQU   X'F8'                  MAXIMUM TIME DELTA
00E0   68+CPROCD   EQU   X'F0'                  CLEAR QUEUE PROCESSING DONE
       69+*
       70+*   QUEUE ENTRY OFFSETS
       71+*
0000   72+LF       EQU   0                      LINK FIRST BYTE
0001   73+LL       EQU   1                      LINK LAST BYTE
0003   74+TD       EQU   3                      TIME DELTA
0005   75+RT       EQU   5                      RETURN ADDRESS
       76+*
       77+*   LENGTHS OF QUEUE ENTRIES
       78+*
0002   79+LKL      EQU   LL+1                   LINK LENGTH
0002   80+TDL      EQU   TD-LL                  TIME DELTA LENGTH
0002   81+RTL      EQU   RT-TD                  RETURN LENGTH
       82+*
       83+*   QUEUE HEAD CONTROL BLOCK LENGTH
       84+*
0002   85+DS       EQU   2                      DISPATCH POINTER LENGTH
0002   86+DC       EQU   2                      DECREMENT POINTER LENGTH
0001   87+EQU      EQU   1                      INDEX BYTE LENGTH
       88+*
       89+*   STACK OFFSETS
       90+*
0001   91+ARE      EQU   1                      ADDRESS ENTRY IN STACK
0003   92+TDE      EQU   3                      RJCT TIME DELTA OFFSET
0003   93+LSR      EQU   3                      LINK SAVE REGISTER
       94+*
       95+*   CONTROL BLOCK OFFSETS
       96+*
0009   97+LLR      EQU   9                      LINK NUMBER OF LOGICAL RECORDS
0002   98+LCB      EQU   2                      LINK CONTROL BITS
0007   99+LERS     EQU   7                      SIA CONTROL BLOCK ERROR CODE
0003  100+LQUE     EQU   3                      LINK QUEUE CODE OF SIA CB
0005  101+LRA      EQU   5                      LINK RETURN ADDRESS
0003  102+LTD      EQU   3                      LINK TIME DELTA
0008  103+LTDS     EQU   8                      LINK TIME DELTA SAVE
000A  104+LIA      EQU   10                     LINK IOB ADDRESS IN SIA CB
000B  105+LIL      EQU   11                     LINK IOB LENGTH IN SIA CB
0006  106+LDAS     EQU   6                      LINK DATA ADDRESS IN SIA CB
000E  107+LIBS     EQU   14                     LINK INIT BLOCK SIZE IN SIA CB
000C  108+LRL      EQU   12                     LINK NUMBER OF UNITS IN SIA CB
0010  109+LWB      EQU   16                     IOB RECEIVE BUFFER ADDRESS
0011  110+LTL      EQU   X'11'                  LINK TIME BOMB LINK
0016  111+LTRA     EQU   X'16'                  LINK TIME BOMB RETURN ADDRESS
      112+*
      113+*   STATE EQUATES
      114+*
0000  115+XST0     EQU   0                      STATE 0  - INITIALIZATION
0002  116+XST1     EQU   2                      STATE 1  - ADDRESSING
0004  117+XST2     EQU   4                      STATE 2  - MODE
0006  118+XST3     EQU   6                      STATE 3  - COMMAND ACCEPTANCE
0008  119+XST4     EQU   8                      STATE 4A - READ IOB
000A  120+XST5A    EQU   10                     STATE 5A - WRITE IOB
000C  121+XST5B    EQU   12                     STATE 5B - WRITE BUFFER
      122+*
      123+*        BUSY2 EQUATES
      124+*
0080  125+FILEBY   EQU   BIT0                   FILE IS BUSY
0040  126+IMABSY   EQU   BIT1                   IMA IS BUSY
      127+*
      128+*   I/O REGISTER SYMBOLS
      129+*
0029  130+RLED     EQU   X'29'                  MEDIA AVAILABLE LED REGISTER
0060  131+RCYST    EQU   X'60'                  CYCLE STEAL
0060  132+RFRAME   EQU   X'60'                  FRAME BUFFER
0061  133+RTWST    EQU   X'61'                  TWINAX STATUS REGISTER
      134+*************************************************************************
      135+*************************************************************************
0062  136+RCNTR    EQU   X'62'                  CONTROL REGISTER
0063  137+RBSST    EQU   X'63'                  BASE STATUS
0064  138+RQUES    EQU   X'64'                  QUEUE STATUS
0065  139+RCMDB    EQU   X'65'                  COMMAND BUFFER
      140+*
      141+*     MEDIA AVAILABLE LED
      142+*
0004  143+MAL      EQU   BIT5                   MEDIA AVAILABLE LED BIT
00FB  144+RMA      EQU   NBIT5                  RESET MEDIA AVAILABLE LED BIT
      145+*
      146+*        CONTROL REGISTER X'62' BIT DEFINITIONS
      147+*
0080  148+POTB     EQU   BIT0                   POWER ON TRANSITION
00A0  149+TBPR     EQU   X'A0'                  2 BYTE POLL RESPONSE
00C0  150+RACT     EQU   X'C0'                  READ ACTIVATE
00E0  151+WACT     EQU   X'E0'                  WRITE ACTIVATE
0020  152+SONE     EQU   X'20'                  SEND ONE COMMAND FOR CONTROL REG
001F  153+NULL     EQU   X'1F'                  NULL
001F  154+BRST     EQU   X'1F'                  BIT RESET OF BITS 0,1,2
0008  155+PORT1    EQU   BIT4                   I/O PORT 1
008F  156+ONEBP    EQU   POTB+PORT1+7           1 BYTE POLL RESPONSE,PORT1,STAT7
      157+** * * * * * ** IMA HARDWARE REQUIRES TWO BYTE POLL RESP * * * * * * *
00A8  158+CNTR     EQU   TBPR+PORT1             PWR ON TRANSITION AND PORT 1
      159+** * * * * * ** IMA HARDWARE REQUIRES TWO BYTE POLL RESP * * * * * * *
00AF  160+CNTR7    EQU   CNTR+7                 P.O.T., PORT 1, ADDR. 7
      161+*
```

```
006F  162+POT17   EQU   POT3+PORT1+7                  P.O.T.,ADDR7,PORT 1
      163+*  CYCLE STEAL COMBINATION FLAGS
      164+*
00FF  165+ALL     EQU   ON                            CYCLE STEAL BITS IN SIA REQUEST
00FF  166+ANY     EQU   ON                            BITS SET IN 'FILE' C7S7REQUEST
      167+*
      168+*  TWINAX STATUS REGISTER X'61' BIT DEFINITIONS
      169+*
0080  170+PD      EQU   BIT0                          LINE PARITY DISPLAY
0040  171+PE      EQU   BIT1                          PARITY ERROR
0020  172+LM      EQU   BIT2                          LINE MESSAGE MONITOR
0010  173+AM      EQU   BIT3                          ADDRESS MISMATCH
0008  174+CQ      EQU   BIT4                          COMMAND QUEUED
0004  175+TM      EQU   BIT5                          TRANSMISSION MONITOR
0002  176+DT      EQU   BIT6                          DATA STREAM TERMINATION DELIMITE
0001  177+CS      EQU   BIT7                          CYCLE STEAL
0008  178+ST      EQU   BIT4                          SEND ONE IN TWINAX STATUS REG.
0041  179+PECS    EQU   PE+CS                         PARITY ERROR OR CYCLE STEAL
0003  180+CD      EQU   CS+DT                         CYCLE STEAL AND DSTD
007F  181+RPD     EQU   NBIT0                         RESET LINE PARITY DISPLAY
00BF  182+RPE     EQU   NBIT1                         RESET PARITY ERROR
00DF  183+RLM     EQU   NBIT2                         RESET LINE MESSAGE MONITOR
00EF  184+RAM     EQU   NBIT3                         RESET ADDRESS MISMATCH
00F7  185+RCQ     EQU   NBIT4                         RESET COMMAND QUEUED
00FB  186+RTM     EQU   NBIT5                         RESET TRANSMISSION MONITOR
00FD  187+RDS     EQU   NBIT6                         RESET DATA STREAM TERMINATION DE
00FE  188+RCS     EQU   NBIT7                         RESET CYCLE STEAL
00FC  189+RCD     EQU   ON-CS-DT                      RESET CYCLE STEAL AND DSTD
00F3  190+RCTM    EQU   ON-CQ-TM                      RESET QUEUED - XMITION MONITOR
00A4  191+RALI    EQU   ALL-PE-CS-DT-AM-CQ            RESET ALL INTERRUPT BITS
00F5  192+RQD     EQU   ON-CQ-DT                      RESET CMND QUEUED + DSTD
      193+*
      194+*  GPDST COMMANDS
      195+*
0000  196+ACTR    EQU   X'00'                         ACTIVATE READ
0001  197+ACTW    EQU   X'01'                         ACTIVATE WRITE
0002  198+RESET   EQU   X'02'                         RESET
0004  199+SETADD  EQU   X'04'                         SET ADDRESS
000B  200+READI   EQU   X'0B'                         READ IOB
000C  201+READID  EQU   X'0C'                         READ DEVICE ID
000F  202+WRITEI  EQU   X'0F'                         WRITE IOB
0010  203+POLL    EQU   X'10'                         POLL
0022  204+RSTIMA  EQU   X'22'                         RESET IMA
0030  205+POLLA   EQU   X'30'                         POLL WITH ACKNOWLEDGE
0050  206+POLLR   EQU   X'50'                         POLL WITH RESET PARITY
0012  207+CLER    EQU   X'12'                         CLEAR QUEUE
0013  208+SETMOD  EQU   X'13'                         SET MODE
0018  209+READB   EQU   X'18'                         READ BUFFER
001E  210+WRITEB  EQU   X'1E'                         WRITE BUFFER
      211+*
      212+*  COMMAND MNEMONICS FOR EXCEPTION STATUS PROCESSING
      213+*
0000  214+AR      EQU   ACTR                          ACTIVATE READ
0001  215+AW      EQU   ACTW                          ACTIVATE WRITE
      216+*
      217+*  MASK FOR MASKING OFF COMMAND MODIFIER BITS
      218+*
00E0  219+NCMND   EQU   X'E0'                         NON COMMAND BITS
      220+*
      221+*  CYCLE STEAL CONTROL BITS
      222+*
00C0  223+READCS  EQU   X'C0'                         CYCLE STEAL READ/ENABLE
0040  224+WRTCS   EQU   X'40'                         CYCLE STEAL WRITE/ENABLE
      225+*
      226+*
      227+*  EXCEPTION STATUS FOR THE BASE STATUS REGISTER X'63'
      228+*
0000  229+CES     EQU   X'00'                         CLEAR EXCEPTION STATUS
00F1  230+NEX     EQU   X'F1'                         NO EXCEPTION
0002  231+ATL     EQU   X'02'                         ACTIVATE LOST
0004  232+INA     EQU   X'04'                         INVALID ACTIVATE
0006  233+RES     EQU   X'06'                         RESERVED
0008  234+INC     EQU   X'08'                         INVALID COMMAND
000A  235+STV     EQU   X'0A'                         STORAGE OVERRUN
000C  236+QUE     EQU   X'0C'                         QUEUE EMPTY
000E  237+POT     EQU   X'0E'                         POWER ON TRANSITION
00F1  238+CLR     EQU   X'F1'                         CLEAR MASK
0001  239+EVNODD  EQU   BIT7                          EVEN/ODD POLL RESPONSE
0008  240+AMM     EQU   INC                           ADDR MISMATCH = AN INVALID COMMA
000E  241+UESTBT  EQU   BIT4+BIT5+BIT6                UNIT EXCEPTION STATUS BITS
      242+*
      243+*
      244+*  PARAMETER LIST DELIMITER
      245+*
0000  246+END     EQU   OFF                           END OF PARAMETER LIST
      247+*
      248+*
      249+*  ERROR OFFSETS INTO QUEUED SIA CONTROL BLOCKS
      250+*
0002  251+SCB     EQU   2                             ID AND CONTROL BITS
0007  252+SER     EQU   7                             SIA ERROR BYTE
      253+*
      254+*  SYSTEM FLAG EQUATES
      255+*
0080  256+DPF     EQU   BIT0                          DISPATCH PROCESSING FLAG
0040  257+UEF     EQU   BIT1                          UNIT EXCEPTION FLAG FOR CONTROL
0020  258+EXST    EQU   BIT2                          EXCEPTION STAUS FLAG
0010  259+RSTDEL  EQU   BIT3                          RANDOM DELAY COMPLETION FLAG
0008  260+MEDAV   EQU   BIT4                          MEDIA AVAILABLE FLAG
0002  261+MEDACT  EQU   BIT6                          MEDIA ACTIVITY FLAG
0001  262+CSF     EQU   BIT7                          CYCLE STEAL FLAG
      263+*
      264+*  STA ERROR CODES
      265+*
0071  266+HDWECK  EQU   X'71'                         IMA HARDWARE CHECK
0072  267+MSUNAV  EQU   X'72'                         MEDIA STATION UNAVAILABLE
0073  268+CLRQUE  EQU   X'73'                         CLEAR QUEUE
0077  269+SERTEX  EQU   X'77'                         SERVICE TIMEOUT EXCEEDED
0078  270+LENERR  EQU   X'78'                         LENGTH ERROR
0079  271+INVCMD  EQU   X'79'                         INVALID COMMAND
      272+*
      273+*  SIA CONTROL BLOCK 'CONTROL BIT' DEFINITIONS
      274+*
0001  275+UE      EQU   BIT7                          UNIT EXCEPTION
0002  276+DE      EQU   BIT6                          DEVICE END
0008  277+UC      EQU   BIT4                          UNIT CHECK
000A  278+UCDE    EQU   UC+DE                         UNIT CHECK AND DEVICE END
      279+*
      280+*  NEW COMMAND EQUATES FOR SUBROUTINE LINKAGE
      281+*
0022  282+MURST   EQU   RESET+BIT2                    MEDIA STATION UNAVAILABLE RESET
0022  283+STRST   EQU   RESET+BIT2                    SERVICE TIMEOUT UNAVAILABLE
0022  284+IMRST   EQU   RESET+BIT2                    IMA RESET COMMAND
      285+*
      286+*  COMMON DISPLACEMENTS USED FOR REGISTER DISPLACEMENTS ONLY
      287+*
0001  288+ONE     EQU   1                             EQUATE 1
0002  289+TWO     EQU   2                             EQUATE 2
0003  290+THREE   EQU   3                             EQUATE THREE
      291+*
```

```
                           292**
                           293**      QUEUE CONTROL BIT DEFINITION
                           294**
                     0080  295+QATFLG EQU   BIT0                        QUEUE BITS FLAG
                           296**
                           297**  DIAGNOSTIC ROUTINE INTERRUPT LEVEL BIT
                           298**
                     0004  299+IMALVL EQU   BIT5                        IMA LEVEL INTERRUPT
                     00FB  300+NIMALV EQU   NBIT5                       NOT IMA LEVEL INTERRUPT
                     00FD  301+IMAOFF EQU   X'F0'                       IMA TURN OFF MASK
                     00FF  302+DEVMSK EQU   X'FF'                       I/O DEVICE INTERRUPT MASK
                           303**
                           304**  COMMAND DELAYS
                           305**
                     002F  306+MINCMD EQU   X'2F'                       DELAY FOR COMMAND PROCESSING
                           307**
                           308*************** IMA HARDWARE ERROR *****************************************
                     0000  309+RRESET EQU   X'00'                       IMA MODE SELECT
                           310*************** IMA HARDWARE ERROR *****************************************
                           311            PRINT ON
 0000 3? 03 0001           313            TGF   SYSFLG,MEDAV            IF MEDIA AVAILABLE
 0004 F2 ?? 70             314            JF    STA300                  * ***
 0007 34 01 0003           315            ST    STASR,XR1               * SAVE POINTER TO RQCB
 000A 9C 01 01 0000        316            MVC   LL(2,XR1),X0000         * SET FORWARD LINK OF RQCB
                     0010  317 STA100 EQU   *                           * DO UNTIL INDEX REMAINS UNCHANGED
 0010 9C 00 0007 0006      318            MVC   STATMP(1),STAINX        * * SAVE INDEX
 0016 7C 00 02             319            MVI   LCB(,XR1),STACBF        * * CLEAR CONTROL BITS
 0019 7C 00 07             320            MVI   LERSI,XR1),CLEAR        * * CLEAR ERROR CODE
                           321 *                                        * * FIND PROPER QUEUE
 001C C2 02 0002           322            LA    STAQTB,XR2              * * (POINT TO TOP OF TABLE)
 0020 73 F8 03             323            SBF   LQUE(,XR1),NBT421       * * (INSURE VALID CODE)
 0023 3C 00 0004           324            MVI   STATZF,CLEAR            * * (CLEAR WORK AREA)
 0027 1C 00 0005 03        325            MVC   STATP2,LQUE(1,XR1)      * * (LOAD VALUE OF QUEUE)
 002C 36 02 0005           326            A     STATP2,XR2              * * (MOVE POINTER QUEUE X 1)
 0030 36 02 0005           327            A     STATP2,XR2              * * (MOVE POINTER QUEUE X 2)
                     0034  328 STA200 EQU   *                           * * DO WHILE
 0034 00 00 00             329            CLI   LF(,XR2),LAST           * * --NOT LAST ENTRY OR
 0037 F2 01 0F             330            JE    STA300                  * * * ***
 003A 20 01 0003 01        331            CLC   STASR,LL(2,XR2)         * * --NOT SAME ENTRY
 003F F2 01 07             332            JE    STA300                  * * * ***
 0042 65 02 01             333            L     LL(,XR2),XR2            * * * MOVE ALONG LINK
 0045 C0 87 0034           334            B     STA200                  * * * ***
                     0049  335 STA300 EQU   *                           * * END DO WHILE
 0049 64 01 01             336            ST    LL(,XR2),XR1            * * CONCATENATE RQCB ONTO LINK
 004C 0D 00 0007 0006      337            CLC   STATMP(1),STAINX        * * ***
 0052 C0 01 0010           338            JNE   STA100                  * END DO UNTIL
 0056 0E 00 0006 0009      339            ALC   STAINX(1),X0001         * INCREMENT INDEX
 005C 3C 00 0004           340            MVI   STATZF,CLEAR            * CLEAR STORAGE AREA
 0060 1C 00 0005 03        341            MVC   STATP2,LQUE(1,XR1)      * LOAD STORAGE AREA WITH QUEUE
 0065 3A 80 0005           342            SBN   STATP2,QATFLG           * SET BITS ON FLAG
 0069 35 01 0005           343            L     STATP2,XR1              * LOAD VALUE OF QUEUE
 006D C0 87 0008           344            B     XSQBF                   * UPDATE QUEUE STATUS
 0071 35 01 0003           345            L     STASR,XR1               * RESTORE REGISTER
 0075 4C 01 16 008F        346            MVC   LRA(2,XR1),STXMAD       * LOAD RETURN ADDRESS
 007A 02 01 11             347            LA    LTL(,XR1),XR1           * SET POINTER TO RQCB
 007D C0 87 000F           348            B     XXTREQ                  * QUEUE REQUEST
 0081 F2 87 0C             349            J     STA500                  * ***
                     0084  350 STA400 EQU   *                           ELSE,
 0084 7A 0A 02             351            SBN   LCBI(,XR1),ULDE         * SET UNIT CHECK AND DEVICE END
 0087 7C 72 07             352            MVI   LERSI(,XR1),MSUNAV      * SET MEDIA UNAVAILABLE ERROR
                     008A  353 STA500 EQU   *                           END IF
                     008A  354 STA999 EQU   *
 008A C0 87 0000           355            B     XXRRTN                  RESTORE REGISTERS AND RETURN
                           356 *
 008E 0000           008F  357 STXMAD DC    AL2(XSSTXM)             ADDRESS OF XSSTXM
                     0000  358            END   XXSTA                   END OF MODULE
TOTAL STATEMENTS IN ERROR IN THIS ASSEMBLY =     0
```

```
        YYSTAM - SATELLITE CONTROLLED SECONDARY MODE
ERR LOC  OBJECT CODE      ADDR STMT SOURCE STATEMENT
     0000                        2 YYSTAM START
                                 3 *
                                 4 * CHANGED BRANCH TO PUR TO BRANCH TO XSC2TM
                                 5 *
                                 6 *
                                 7 *
                                 8 * CHANGE MASK FOR SETTING INTERRUPTS OFF
                                 9 *
                                10 * YYSTAM - SATELLITE CONTROLLED SECONDARY MODE
                                11 *************************************************************
                                12 *************************************************************
                                13 *
                           00AA 14          ENTRY BUSY2                CYCLE STEAL FLAG
                           00AB 15          ENTRY FLAGR
                           00AC 16          ENTRY FLAGR2
                           00AE 17          ENTRY RUSADD               BUS TABLE ADDRESS SAVE
                           0030 18          ENTRY STATSV               STATE TABLE ADDRESS SAVE
                                19 *
                           0001 20          EXTRN CB15SC               15 SECOND CONTROL BLOCK
                           0002 21          EXTRN DEVIDA               DEVICE ID TABLE
                           0003 22          EXTRN INTOFF               INTERRUPT OFF ROUTINE
                           0004 23          EXTRN XSC2TM               2 SEC TIME DOMR CANCEL
                           0005 24          EXTRN XSIMAI               YYSTAM INITIALIZED ROUTINE
                           0006 25          EXTRN XXSTA                STA QUEUEING ROUTINE FOR YYSTAM
                           0007 26          EXTRN XXTACL               TIMER CANCEL ROUTINE
                                27 *
                                28 *        SEQY
                           0001 29+SM999    EQU   1                    INTERRUPT LEVEL RETURN LABEL
                           0003 30+YYSTAT   EQU   3                    IMA STATE TABLE
                           0005 31+YYSTAS   EQU   5                    IMA STATE VALUE
                           0007 32+TREQ     EQU   7                    OFFSET VALUE FOR XXTREQ
                           0009 33+TXCL     EQU   9                    OFFSET VALUE FOR XXTXCL
                           000B 34+RESTR    EQU   11                   OFFSET VALUE FOR RESTORE
                           000D 35+IMAIN    EQU   13                   OFFSET VALUE FOR INTON
                           000F 36+CSRF     EQU   15                   OFFSET VALUE FOR XSCSR
                           0011 37+CSWF     EQU   17                   OFFSET VALUE FOR XSCSW
                           0013 38+CSREQ    EQU   19                   OFFSET VALUE FOR BUSY2
                           0015 39+CSAD     EQU   21                   OFFSET VALUE FOR TMPADJ
                           0017 40+CSCHU    EQU   23                   OFFSET VALUE FOR TMPLCJ
                           0019 41+SYSFQ    EQU   25                   OFFSET VALUE FOR SYSFQ
                           001B 42+IMATF    EQU   27                   OFFSET VALUE FOR INTOFF
                                43+*
                           0000 44+XST0     EQU   0                    STATE 0 EQUATE
                           0002 45+XST1     EQU   2                    STATE 1 EQUATE
                           0003 46+XXRSTB   EQU   X'03'                REQUEST CODE FOR XXRSTB
                                47          PRINT ON
                                48 *
                                49 *        SEQUM
                                50+* * * * * * * * * * * * * * * * * * * * * * * * * * * * * *
                                51+*
                                52+*   IMA LEVEL INTERRUPT
                                53+*
```

```
        54+* * * * * * * * * * * * * * * * * * * * * * * * * * * * * * * * * * *
0004    55+IMALVL  EQU   4                               IMA LEVEL INTERRUPT
        56+* * * * * * * * * * * * * * * * * * * * * * * * * * * * * * * * * * *
        57+*
        58+*  REGISTER DEFINITIONS
        59+*
0001    60+XR1     EQU   1                               INDEX REGISTER 1
0002    61+XR2     EQU   2                               INDEX REGISTER 2
0008    62+ARR     EQU   8                               ADDRESS REGISTER SET ON BRANCH
0010    63+IAR     EQU   X'10'                           INSTRUCTION ADDRESS REGISTER
000C    64+RCSCW   EQU   X'0C'                           CYCLE STEAL WORD
000D    65+RCSADR  EQU   X'0D'                           CYCLE STEAL ADDRESS
00FE    66+MASKR   EQU   X'FE'                           INTERRUPT MASK
        67+*
        68+*  BIT PATTERNS
        69+*
0000    70+OFF     EQU   X'00'
0080    71+BIT0    EQU   X'80'
0040    72+BIT1    EQU   X'40'
0020    73+BIT2    EQU   X'20'
0010    74+BIT3    EQU   X'10'
0008    75+BIT4    EQU   X'08'
0004    76+BIT5    EQU   X'04'
0002    77+BIT6    EQU   X'02'
0001    78+BIT7    EQU   X'01'
        79+*
007F    80+NBIT0   EQU   X'7F'
00BF    81+NBIT1   EQU   X'BF'
00DF    82+NBIT2   EQU   X'DF'
00EF    83+NBIT3   EQU   X'EF'
00F7    84+NBIT4   EQU   X'F7'
00FB    85+NBIT5   EQU   X'FB'
00FD    86+NBIT6   EQU   X'FD'
00FE    87+NBIT7   EQU   X'FE'
00FF    88+ON      EQU   X'FF'
00FF    89+ALL     EQU   ON
00FF    90+ANY     EQU   ON
0000    91+CLEAR   EQU   OFF
00C0    92+MSKDI   EQU   BIT0+BIT1
0001    93+ONE     EQU   1                               EQUATE 1
        94+*
        95+*****************************************************************
        96+*
        97+*  XXPIA CONTROL BLOCK DEFINITIONS
        98+*
        99+***     FIELD LENGTHS
       100+*
0000   101+LF      EQU   0                               LINK FIRST - FIRST BYTE OF LINK
0001   102+LL      EQU   1                               LINK LAST BYTE OF TWO BYTE FIELD
0003   103+LTD     EQU   3                               LINK TIME DELTA
0005   104+LRA     EQU   5                               LINK RETURN ADDRESS
0000   105+LFIRST  EQU   0                               FIRST BYTE NO OFFSET
0001   106+LDID    EQU   1                               LENGTH OF DEVICE ID
0001   107+LCMND0  EQU   1                               LENGTH OF COMMAND 0
0001   108+LCMND1  EQU   1                               LENGTH OF COMMAND 1
0002   109+LDATAP  EQU   2                               LENGTH OF DATA POINTER
0001   110+LERROR  EQU   1                               LENGTH OF ERROR CODE
0001   111+LFAIL   EQU   1                               LENGTH OF FAILURE CODE
0001   112+LSTAT   EQU   1                               LENGTH OF STATION ADDRESS
0001   113+LPRESP  EQU   1                               LENGTH OF POLL RESPONSE
0001   114+LQUEUE  EQU   1                               LENGTH OF QUEUE FIELD
0001   115+LCMDMD  EQU   1                               LENGHT OF COMMAND MODIFIER FIELD
0002   116+LMAXBC  EQU   2                               LENGTH OF MAXIMUM BYTE COUNT
0002   117+LRECBC  EQU   2                               LENGTH OF RECEIVED BYTE COUNT
       118+*
       119+***     LOCATION OFFSETS
       120+*
0000   121+DEVICE  EQU   LFIRST                          DEVICE ID AND CODES
0001   122+CMND0   EQU   DEVICE+LDID                     COMMAND BYTE 0
0002   123+CMND1   EQU   CMND0+LCMND0                    COMMAND BYTE 1
0004   124+DATAP   EQU   CMND1+LCMND1+LL                 DATA BUFFER POINTER
0005   125+ERROR   EQU   DATAP+LL                        ERROR BYTE
0006   126+FAIL    EQU   ERROR+LERROR                    FAILURE CODES
0007   127+STAT    EQU   FAIL+LFAIL                      STATION ADDRESS
0008   128+PRESP   EQU   STAT+LSTAT                      POLL RESPONSE
0009   129+PIAQUE  EQU   PRESP+LPRESP                    QUEUE TO PROCESS
000A   130+CMDMOD  EQU   PIAQUE+LQUEUE                   COMMAND MODIFIER
000C   131+MAXBC   EQU   CMDMOD+LCMDMD+LL                MAXIMUM BYTE COUNT
000E   132+RECBC   EQU   MAXBC+LMAXBC                    RECEIVED BYTE COUNT
       133+*
       134+*       BUSY2 EQUATES
       135+*
0080   136+FILEBY  EQU   BIT0                            FILE IS BUSY
0040   137+IMABSY  EQU   BIT1                            IMA IS BUSY
       138+*
       139+***     FIELDS WITHIN XXPIA CONTROL BLOCK BYTES
       140+*
       141+*** DEVICE ID AND CODES
00C0   142+DEVID   EQU   X'C0'                           PIA CONTROL BLOCK ID
0008   143+UC      EQU   BIT4                            UNIT CHECK
0004   144+SE      EQU   BIT5                            SATELLITE EXCEPTION
0002   145+DE      EQU   BIT6                            DEVICE END
0001   146+UE      EQU   BIT7                            UNIT EXCEPTION
000A   147+UCDE    EQU   UC+DE                           UNIT CHECK AND DEVICE END
0003   148+UEDE    EQU   UE+DE                           UNIT EXCEPTION AND DEVICE END
000F   149+NDEVID  EQU   X'0F'                           RESET CONDITION CODES
       150+*
       151+*** COMMAND BYTE 0
       152+*
0001   153+CSETM   EQU   X'01'                           CODE FOR SET MODE
0002   154+CSETA   EQU   X'02'                           CODE FOR SET ADDRESS
0003   155+CRST    EQU   X'03'                           CODE FOR RESET
0004   156+CRDID   EQU   X'04'                           CODE FOR READ ID
0005   157+CRDIB   EQU   X'05'                           CODE FOR READ IOB
0006   158+CRDBF   EQU   X'06'                           CODE FOR READ BUFFER
0007   159+CWTIB   EQU   X'07'                           CODE FOR WRITE BUFFER
0008   160+CWTBF   EQU   X'08'                           CODE FOR WRITE BUFFER
0009   161+CPOLL   EQU   X'09'                           CODE FOR POLL
000A   162+CPRPE   EQU   X'0A'                           CODE FOR POLL RESET PARITY ERROR
000B   163+CPACK   EQU   X'0B'                           CODE FOR POLL ACKNOWLEDGE
000C   164+CCLR    EQU   X'0C'                           CODE FOR CLEAR QUEUE
000D   165+CLNAC   EQU   X'0D'                           CODE FOR LINE ACTIVATE
000E   166+CRSTI   EQU   X'0E'                           CODE FOR RESET IMA
000F   167+CMNLN   EQU   X'0F'                           CODE FOR MONITOR LINE
0000   168+ERPROC  EQU   X'00'                           ERROR PROCESS
       169+*
       170+*** XXPIA ERROR CODES
       171+*
0092   172+MAXBCE  EQU   X'92'                           MAXIMUM BYTE COUNT EXCEEDED
0093   173+LINEPE  EQU   X'93'                           LINE PARITY ERROR
0094   174+CMDINV  EQU   X'94'                           COMMAND INVALID
0095   175+HDWECK  EQU   X'95'                           IMA HARDWARE CHECK
0002   176+LINEAC  EQU   BIT6                            LINE ACTIVE
0001   177+NRESP   EQU   BIT7                            NO RESPONSE
       178+*
       179+*** STATION ADDRESS
       180+*
```

```
0018  181+PORT    EQU   BIT3+BIT4                    PORT SELECTION
00E7  182+NPORT   EQU   ALL-PORT                     ALL EXCEPT PORT BITS
0007  183+STATN   EQU   BIT5+BIT6+BIT7               STATION ADDRESSED
00F8  184+NSTATN  EQU   ALL-STATN                    ALL EXCEPT STATION BITS
001F  185+ADDR    EQU   PORT+STATN                   PORT AND STATION ADDRESS
001F  186+LSATAD  EQU   ADDR                         LOCAL SATELLITE ADDRESS
      187+*
      188+*** POLL RESPONSE STATUS BYTE
      189+*
0080  190+BUSY    EQU   BIT0                         BUSY STATUS
0040  191+LPE     EQU   BIT1                         LINE PARITY ERROR
      192+*
004E  193+EXSTAT  EQU   BIT1+BIT4+BIT5+BIT6          EXCEPTION CONDITIONS
0000  194+CES     EQU   0                            CLEAR EXCEPTION STATUS
00F1  195+NEX     EQU   X'F1'                        NO EXCEPTION STATUS
0002  196+ATL     EQU   BIT6                         ACTIVATE LOST
0004  197+INA     EQU   BIT5                         INVALID ACTIVATE
0006  198+RES     EQU   BIT5+BIT6                    RESERVED
0008  199+INC     EQU   BIT4                         INVALID COMMAND
000A  200+STV     EQU   BIT4+BIT6                    STORAGE OVERRUN
000C  201+QUE     EQU   BIT4+BIT5                    QUEUE EMPTY
000E  202+POT     EQU   BIT4+BIT5+BIT6               POWER ON TRANSITION
0001  203+EVNODD  EQU   BIT7                         EVEN ODD RESPONSE
0008  204+AMM     EQU   INC                          ADDRESS MISMATCH
000E  205+UESTB   EQU   BIT4+BIT5+BIT6               UNIT EXCEPTION STATUS BITS
      206+*
      207+*** STATION QUEUE
      208+*
00E0  209+STQUE   EQU   BIT0+BIT1+BIT2               STATION QUEUE
001F  210+NSTQUE  EQU   ALL-STQUE                    NOT STATION QUEUE
      211+*
      212+*         SYSTEM FLAG EQUATES (SYSFG2)
      213+*
0080  214+PRO     EQU   BIT0                         CONTROL BLOCK PROCESSING FLAG
0040  215+SIAENB  EQU   BIT1                         YYSIAM ENABLE FLAG
0020  216+POLRSP  EQU   BIT2                         POLL RESPONSE FLAG
0010  217+CSD     EQU   BIT3                         CYCLE STEAL DIRECTION (1=XMIT)
      218+*
      219+**************************************************************
      220+*         SYSTEM FLAG EQUATES FOR SYSFLG
      221+**************************************************************
0002  222+MEDACT  EQU   BIT6                         MEDIA ACTIVITY FLAG
      223+*
      224+**** XXVSIA FLAGS
      225+*
0040  226+STAPOR  EQU   BIT1                         POWER ON RESET
      227+*
      228+*** FAILURE CODES
      229+*
0004  230+BUSYTO  EQU   BIT5                         BUSY TIMEOUT
      231+*
      232+*         COMMAND DELAYS
      233+*
0014  234+POLDEL  EQU   20                           DELAY FOR POLL RESPONSE
0014  235+SETADY  EQU   20                           DELAY FOR SETTING ADDRESS
002F  236+MINCMD  EQU   X'2F'                        DELAY FOR COMMAND PROCESSING
      237+*
      238+*         COMMAND TABLE EQUATES
      239+*                                          COMMAND TABLE INCREMENT
0004  240+CTINCR  EQU   4                            LINK COMMAND ADDRESS
0003  241+LCMDAD  EQU   3                            LINK COMMAND
0001  242+LCMD    EQU   1                            LOCAL SATELLITE COMMAND INCREMEN
0003  243+LSCINC  EQU   3
      244+*
      245+*         MEDIA STATE EQUATES
      246+*
0000  247+MXST0   EQU   0                            STATE 0 - NULL
0002  248+MXST1   EQU   2                            STATE 3 - READ
0004  249+MXST2   EQU   4                            STATE 0 - WRITE
      250+*
      251+*
00FF  252+LASTRY  EQU   X'FF'                        MAXIMUM NUMBER OF POLLS TRIED
      253+*
      254+**************************************************************
      255+*
      256+*** XXSTA CONTROL BLOCK OFFSETS
      257+*
0002  258+LCB     EQU   2                            LINK CONTROL BITS
0004  259+NBS     EQU   4                            STA CONTROL BITS
0006  260+LDAS    EQU   6                            LINK DATA ADDRESS
0007  261+LERS    EQU   7                            ERROR CODE BYTE
000A  262+LIA     EQU   10                           LINK IOB ADDRESS
000B  263+LIL     EQU   11                           LINK IOB LENGTH
000C  264+LRL     EQU   12                           NUMBER OF XMITS
000E  265+LTBS    EQU   14                           XMIT BLOCK SIZE
      266+*
      267+* XXSTA ERROR CODES
      268+*
0073  269+CLRQUE  EQU   X'73'                        CLEAR QUEUE ERROR CODE
0079  270+INVMDE  EQU   X'79'                        INVALID MODE (YYSIAM)
      271+*
      272+*** COMMAND BYTE 2 (XXSTA CONTROL BLOCK)
      273+*
0080  274+ENB     EQU   BIT0                         STA INITIALIZATION COMMAND
0040  275+DISABL  EQU   BIT1                         DISABLE YYSIAM COMMAND
      276+*
      277+**************************************************************
      278+*
      279+*
      280+*         GPOST COMMANDS
      281+*
0000  282+ACTR    EQU   X'00'                        ACTIVATE READ
0001  283+ACTW    EQU   X'01'                        ACTIVATE WRITE
0002  284+RESET   EQU   X'02'                        RESET
0004  285+SETADD  EQU   X'04'                        SET ADDRESS
0008  286+READI   EQU   X'08'                        READ IOB
000C  287+READDI  EQU   X'0C'                        READ DEVICE ID
000E  288+WRITEI  EQU   X'0E'                        WRITE IOB
0010  289+POLL    EQU   X'10'                        POLL
0022  290+RSTIMA  EQU   X'22'                        RESET IMA
0050  291+POLLR   EQU   X'50'                        POLL WITH RESET PARITY
0030  292+POLLA   EQU   X'30'                        POLL WITH ACKNOWLEDGE
0012  293+CLER    EQU   X'12'                        CLEAR QUEUE
0013  294+SETMOD  EQU   X'13'                        SET MODE
0018  295+READB   EQU   X'18'                        READ BUFFER
001E  296+WRITEB  EQU   X'1E'                        WRITE BUFFER
      297+*
      298+*         SHORTENED MNEMONICS
      299+*
0000  300+AR      EQU   ACTR                         ACTIVATE READ
0001  301+AW      EQU   ACTW                         ACTIVATE WRITE
0060  302+MRACT   EQU   X'60'                        MEDIA READ ACTIVATE
0040  303+MWACT   EQU   X'40'                        MEDIA WRITE ACTIVATE
      304+*
      305+*         NON COMMAND BITS
      306+*
00E0  307+NCMND   EQU   X'E0'                        NON COMMAND BITS
      308+*
      309+**************************************************************
```

```
                         310**
                         311**          I/O REGISTER DEFINITIONS
                         312**
                  0029   313*RLED     EQU     X'29'                      MEDIA AVAILABLE LED REGISTER
                  0060   314*RCYST    EQU     X'60'                      CYCLE STEAL REGISTER
                  0060   315*RFRAMF   EQU     X'60'                      FRAME BUFFER
                  0061   316*RTWST    EQU     X'61'                      TWINAX STATUS REGISTER
                  0062   317*RCNTR    EQU     X'62'                      CONTROL REGISTER
                  0063   318*RBSST    EQU     X'63'                      BASE STATUS REGISTER
                  0064   319*RQUES    EQU     X'64'                      QUEUE STATUS REGISTER
                  0065   320*RCMDB    EQU     X'65'                      COMMAND BUFFER
                         321**
                         322**          TWINAX STATUS REGISTER X'61' BIT DEFINITIONS (RTWST)
                         323**
                  0080   324*PD       EQU     BIT0                       LINE PARITY DISPLAY
                  0040   325*PE       EQU     BIT1                       PARITY ERROR INTERRUPT
                  0020   326*LM       EQU     BIT2                       LINE MESSAGE MONITOR
                  0010   327*AM       EQU     BIT3                       ADDRESS MISMATCH
                  0008   328*CQ       EQU     BIT4                       COMMAND QUEUED
                  0004   329*SI       EQU     BIT5                       SEND ONE
                  0004   330*TM       EQU     BIT5                       TRANSMISSION MONITOR
                  0002   331*DT       EQU     BIT6                       DATA STREAM TERMINATION DELIMITE
                  0001   332*CS       EQU     BIT7                       CYCLE STEAL
                  0041   333*PECS     EQU     PE+CS                      PARITY ERROR AND CYCLE STEAL
                  0003   334*CD       EQU     CS+DT                      CYCLE STEAL AND DSTD
                  007F   335*RPD      EQU     ALL-PD                     RESET PARITY DISPLAY
                  00BF   336*RPE      EQU     ALL-PE                     RESET PARITY ERROR
                  00DF   337*RLM      EQU     ALL-LM                     RESET LINE MONITOR
                  00EF   338*RAM      EQU     ALL-AM                     RESET ADDRESS MISMATCH
                  00F7   339*RCQ      EQU     ALL-CQ                     RESET COMMAND QUEUED
                  00F7   340*RSI      EQU     ALL-SI                     RESET SEND ONE
                  00FB   341*RTM      EQU     ALL-TM                     RESET TRANSMISSION MONITOR
                  00FD   342*RDT      EQU     ALL-DT                     RESET DSTD
                  00FE   343*RCS      EQU     ALL-CS                     RESET CYCLE STEAL
                  00FC   344*RCD      EQU     ALL-CD                     RESET CYCLE STEAL AND DSTD
                  00F3   345*RCTM     EQU     ALL-CQ-TM                  RESET CMND QUEUED AND TRIT MONIT
                  00A4   346*RSTINT   EQU     ALL-PE-AM-SI-DT-CS         RESET ALL INTERRUPT BITS
                         347**
                         348**          CONTROL REGISTER X'62' BIT DEFINITIONS (RCNTR)
                         349**
                  001F   350*NULL     EQU     X'1F'                      NULL
                  0020   351*SONE     EQU     X'20'                      SEND ONE COMMAND FOR CONTROL REG
                  0020   352*SEND1    EQU     X'20'                      SEND ONE FRAME
                  0040   353*WRTCMD   EQU     X'40'                      WRITE COMMAND
                  0060   354*RDCMD    EQU     X'60'                      READ COMMAND
                  0080   355*PUTB     EQU     X'80'                      POWER ON TRANSITION
                  00A0   356*TBPR     EQU     X'A0'                      TWO BYTE POLL RESPONSE
                  00C0   357*RACT     EQU     X'C0'                      READ ACTIVATE
                  00E0   358*WACT     EQU     X'E0'                      WRITE ACTIVATE
                  0008   359*PORT1    EQU     BIT4                       PORT ONE
                  0007   360*ADDR7    EQU     X'07'                      ADDRESS 7 IN CONTROL REGISTER
                  00A7   361*TBPR7    EQU     TBPR+ADDR7                 TWO BYTE POLL RESPONSE AND ADDR
                  0088   362*CNTR     EQU     POTB+PORT1                 POWER ON TRANSITION AND PORT 1
                  008F   363*CNTR7    EQU     CNTR+7                     INITIALIZATION STATE OF REGISTER
                         364**
                         365**   DIAGNOSTIC ROUTINE INTERRUPT LEVEL BIT
                         366**
                  00FF   367*DEVMSK   EQU     X'FF'                      I/O DEVICE INTERRUPT MASK
                  00FB   368*IMAOFF   EQU     X'FB'                      IMA TURN OFF MASK
                         369*************   IMA HARDWARE ERROR   ********************************
                  0000   370*RRESET   EQU     X'00'                      IMA MODE SELECT
                         371*************   IMA HARDWARE ERROR   ********************************
0000 34 01 00A2          372                ST      X1SAVE,XR1           SAVE INDEX REGISTER ONE
0004 34 02 00A4          373                ST      X2SAVE,XR2           SAVE INDEX REGISTER TWO
0008 34 08 00A6          374                ST      YYSAVE,ARR           SAVE RETURN LINK
                         375 *              SVC                          SAVE ROS TABLE ADDRESS
000C F5           000C   376*               DC      XL1'F5'
000D 03           000D   377                DC      AL1(XXRSTB)          ***
000E 34 02 00AF          378                ST      ROSADD,XR2           ***
0012 85 02 19            379                L       SYSFG(,XR2),XR2      ***
0015 B8 40 00            380                TBN     0(,XR2),STAENB       IF YYSTAM IS NOT ENABLED
0018 F2 10 28            381                JT      SM200                * ***
001B 78 80 34            382                TBN     ENBS(,XR1),ENB       * IF THIS IS NOT ENB YYSTAM REQ
001F F2 10 39            383                JT      SM100                * * ***
0021 7A 0A 02            384                SBN     LCB(,XR1),UCDE       * * SET UC/DE
0024 7C 79 07            385                MVI     LFRS(,XR1),INVMDE    * * SET ERROR TO INVALID MODE
0027 F2 87 73            386                J       SM990                * * ***
                  002A   387 SM100          EQU     *                    * ELSE,
002A C0 87 0005          388                B       XSIMAI               * * CALL INITIALIZATION ROUTINE
002E 35 02 00AE          389                L       ROSADD,XR2           * * SET YYSTAM ENABLED FLAG
0032 85 02 19            390                L       SYSFG(,XR2),XR2      * * ***
0035 BA 40 00            391                SBN     0(,XR2),STAENB       * * ***
0038 35 01 00A2          392                L       X1SAVE,XR1           * * SET POINTER TO CONTROL BLOCK
003C 75 01 06            393                L       6(,XR1),XR1          * * SET DEVICE ID TABLE POINTER
003F 34 01 0002          394                ST      DEVIDA,XR1           * * ***
0043 F2 87 57            395                J       SM990                * * ***
                  0046   396 SM200          EQU     *                    ELSE,
0046 78 40 04            397                TBN     ENBS(,XR1),DISABL    * IF THIS IS NOT A DISABLE REQ
0049 F2 10 07            398                JT      SM300                * * ***
004C C0 87 0006          399                B       XXSTA                * * IMA TRANS QUEUE REQUEST
0050 F2 87 4A            400                J       SM990                * * ***
                  0053   401 SM300          EQU     *                    * ELSE,
                  0053   402 D01            EQU     *                    DO UNTIL ALL INTRPTS MASKED OFF
                         403 *              XER     R1-MASKR,I2-OFF      * MASK OFF INTERRUPTS
0053 F6           0053   404*               DC      IL1'246'             OP CODE
0054 FE           0054   405*               DC      AL1(MASKR)           R1
0055 00           0055   406*               DC      AL1(OFF)             IMM
                         407 *              BNEQ    R1-MASKR,I2-OFF,ADD-D01   END DO
0056 CA           0056   408*               DC      IL1'202'             OP CODE
0057 FE           0057   409*               DC      AL1(MASKR)           R1
0058 00           0058   410*               DC      AL1(OFF)             IMM
0059 0053         005A   411*               DC      AL2(D01)             ADDRESS
005B 3A 04 4059          412                SBN     X'4059',IMALVL       TURN OFF IMA LEVEL MASK
                         413 *              LR      R1-DEVMSK,ADD-X'4059'   RESTORE DEVICE MASK
005F 33           005F   414*               DC      IL1'51'              OP CODE
0060 FF           0060   415*               DC      AL1(DEVMSK)          R1
0061 4059         0062   416*               DC      AL2(X'4059')         ADDRESS
                         417 *              LR      R1-MASKR,ADD-X'4059'    REENABLE INTERRUPTS
0063 33           0063   418*               DC      IL1'51'              OP CODE
0064 FE           0064   419*               DC      AL1(MASKR)           R1
0065 4059         0066   420*               DC      AL2(X'4059')         ADDRESS
0067 C2 01 0001          421                LA      CD15SC,XR1           * * CANCEL 15 SEC TIME BOMB
006B C0 87 0007          422                B       XXTXCL               * * ***
006F C0 87 0004          423                B       XSL2TB               * * CLEAR QUEUES
0073 35 02 00AE          424                L       ROSADD,XR2           * * RESET YYSTAM ENABLED FLAG
0077 85 02 19            425                L       SYSFG(,XR2),XR2      * * ***
007A B3 40 00            426                SBF     0(,XR2),STAENB       * * ***
007D 35 02 00AF          427                L       ROSADD,XR2           * * CLEAR IMA CYCLE STEAL FLAG
0081 85 02 13            428                L       CSREQ(,XR2),XR2      * * ***
0084 B8 40 00            429                SBF     0(,XR2),IMABSY       * * ***
0087 35 02 00AE          430                L       ROSADD,XR2           * * RESTORE STATE TABLE ADDRESS
008B 85 02 03            431                L       YYSTAT(,XR2),XR2     * * ***
008E 8C 01 00 00B0       432                MVC     0(2,XR2),STATSV      * * ***
0093 35 02 00AF          433                L       ROSADD,XR2           * * CLEAR STATE TABLE OFFSET
0097 85 02 05            434                L       YYSTAS(,XR2),XR2     * * ***
009A 8C 00 00            435                MVI     0(,XR2),OFF          * * ***
                  009D   436 SM990          EQU     *                    END IF
```

```
009D 35 01 00B2            437          L      X1SAVE,XR1         RESTORE INDEX REGISTER ONE
00A1 35 02 00B4            438          L      X2SAVE,XR2         RESTORE INDEX REGISTER TWO
00A5 35 10 00B6            439          L      YYSAVE,IAR         RETURN THROUGH SAVED LINK
                           440 *
00A9               00AA    441 BUSY2    DS     XL2                CYCLE STEAL FLAG
00AB               00AB    442 FLAGR    DS     XL1
00AC               00AC    443 FLAGR2   DS     XL1
00AD               00AE    444 ROSADD   DS     XL2                ROS TABLE ADDRESS SAVE
00AF               00B0    445 STATSV   DS     XL2                STA STATE TABLE ADDRESS SAVE
00B1               00B2    446 X1SAVE   DS     XL2                INDEX REGISTER SAVE AREA
00B3               00B4    447 X2SAVE   DS     XL2                INDEX REGISTER SAVE AREA
00B5               00B6    448 YYSAVE   DS     XL2                RETURN LINK A SAVE AREA
                   0000    449          END    YYSTAM
TOTAL STATEMENTS IN ERROR IN THIS ASSEMBLY =   0
```

We claim:

1. A clustered system of data-entry terminals, comprising:

(A) a communications link;

(B) a removable, non-volatile storage medium containing a plurality of application-code modules as well as at least first and second transaction data;

(C) a media terminal including (a) direct-access storage means for removably holding said storage medium and for directly transferring said application-code modules and said transaction data, (b) first input/output means for entering and displaying said first transaction data, (c) first line-adapter means coupled to said communications link for transmitting said application-code modules and for receiving said second transaction data, (d) first addressable storage means having a read/write part and containing microcode for loading different ones of said application-code modules into said read/write part, (e) first programmable processing means coupled to the above media-terminal elements for executing both said microcode and any of said application-code modules in said addressable storage, and (f) first enclosure means for housing the above media-terminal elements in a unitary physical package and for providing access to said removable, non-volatile storage medium;

(D) at least one satellite terminal including (a) second input/output means for entering and displaying said second transaction data, (b) second line-adapter means coupled to said communications link for transmitting said second transaction data to said media terminal and for receiving said applications-code modules from said media terminal, (c) second addressable storage means having a read/write part and containing microcode for loading different ones of said application-code modules into said read/write part, (d) second programmable processing means coupled to the above satellite-terminal elements for executing both said microcode and any of said application-code modules in said addressable storage means, and (e) second enclosure means for housing the above satellite-terminal elements in a further unitary physical package.

2. The system of claim 1, wherein said removable, non-volatile storage medium is a magnetic medium.

3. The system of claim 2 wherein said magnetic medium is a flexible disk.

4. The system of claim 1 wherein said direct-access storage means includes a third programmable processing means.

5. The system of claim 4 wherein said third processing means is coupled to said second addressable storage means for communication with said second processing means.

6. The system of claim 1, wherein said first and second addressable storage means each have a read-only part for containing said microcode.

* * * * *